United States Patent
Selvaraj et al.

(10) Patent No.: US 8,520,225 B2
(45) Date of Patent: Aug. 27, 2013

(54) PRINT DRIVER LOCALIZATION SUPPORT FROM PRINTING DEVICE TO SUPPORT MULTIPLE USER PROFILES

(75) Inventors: Senthil K. Selvaraj, Snoqualmie, WA (US); Zhenning Xiao, Renton, WA (US)

(73) Assignee: Ricoh Company, Ltd., Tokyo (JP)

( * ) Notice: Subject to any disclaimer, the term of this patent is extended or adjusted under 35 U.S.C. 154(b) by 942 days.

(21) Appl. No.: 12/399,895

(22) Filed: Mar. 6, 2009

(65) Prior Publication Data

US 2010/0225959 A1 Sep. 9, 2010

(51) Int. Cl.
*G06F 3/12* (2006.01)
*G06F 3/00* (2006.01)
*G06K 15/02* (2006.01)

(52) U.S. Cl.
USPC .......... 358/1.13; 358/1.15; 358/501; 358/1.2; 358/401; 719/321; 719/327; 719/329

(58) Field of Classification Search
USPC ......... 358/1.13, 1.15, 501, 1.2, 401; 715/243
See application file for complete search history.

(56) References Cited

U.S. PATENT DOCUMENTS

| | | |
|---|---|---|
| 5,467,434 A | 11/1995 | Hower et al. |
| 5,487,168 A | 1/1996 | Geiner et al. |
| 5,513,126 A | 4/1996 | Harkins et al. |
| 5,692,111 A | 11/1997 | Marbry et al. |
| 5,768,483 A | 6/1998 | Maniwa et al. |
| 5,845,076 A | 12/1998 | Arakawa |
| 5,875,350 A | 2/1999 | Comp et al. |
| 5,996,029 A | 11/1999 | Sugiyama et al. |
| 5,999,945 A | 12/1999 | Lahey et al. |

(Continued)

FOREIGN PATENT DOCUMENTS

| | | |
|---|---|---|
| GB | 2347766 | 9/2000 |
| JP | 2002-014786 | * 1/2002 |

(Continued)

OTHER PUBLICATIONS

Systems Inc., "PostScript Printer Description File Format Specification 4.3—Chapters 1 & 2", Internet Citation, XP002158174, retrieved from http://partners.adobe.com/asn/developer/pdfs/tn/5003.PPD_Spec_v4.3.pdf, 18 pages.

(Continued)

*Primary Examiner* — King Poon
*Assistant Examiner* — Beniyam Menberu
(74) *Attorney, Agent, or Firm* — Hickman Palermo Truong Becker Bingham Wong LLP; Daniel D. Ledesma

(57) ABSTRACT

According to an approach for printing, a print driver is configured to retrieve printing device capabilities data from a Web service-enabled printing device. The printing device capabilities data specifies for a particular feature and a particular option supported by the Web service-enabled printing device, a plurality of languages in which the particular feature and the particular option may be displayed. The print driver generates, based at least upon the capabilities data, printer description data that specifies display data that indicates how the particular feature and the particular option are to be displayed, on a GUI, in the plurality of languages. In response to user input, the print driver generates, based at least upon the display data and language data that specifies a particular language, GUI data which, when processed, causes the particular feature and the particular option to be displayed on a GUI in the particular language.

20 Claims, 8 Drawing Sheets

(56) References Cited

U.S. PATENT DOCUMENTS

| | | | |
|---|---|---|---|
| 6,148,346 A | 11/2000 | Hanson | |
| 6,351,320 B1 | 2/2002 | Shin | |
| 6,421,135 B1 | 7/2002 | Fresk et al. | |
| 6,453,127 B2 | 9/2002 | Wood et al. | |
| 6,501,472 B1 | 12/2002 | Hunt et al. | |
| 6,631,010 B1 | 10/2003 | Foster et al. | |
| 6,789,111 B1 | 9/2004 | Brockway et al. | |
| 6,825,941 B1* | 11/2004 | Nguyen et al. | 358/1.15 |
| 6,898,624 B2 | 5/2005 | Young et al. | |
| 6,952,831 B1 | 10/2005 | Moore | |
| 6,967,728 B1 | 11/2005 | Vidyanand | |
| 7,002,703 B2 | 2/2006 | Parry | |
| 7,082,574 B2* | 7/2006 | Ogino et al. | 715/764 |
| 7,120,910 B2 | 10/2006 | Matsuda et al. | |
| 7,136,941 B2 | 11/2006 | Nguyen et al. | |
| 7,162,518 B2* | 1/2007 | Takahashi | 709/217 |
| 7,174,534 B2 | 2/2007 | Chong et al. | |
| 7,180,616 B2 | 2/2007 | Miyoshi et al. | |
| 7,312,887 B2 | 12/2007 | Wu | |
| 7,522,299 B2 | 4/2009 | Nguyen et al. | |
| 7,605,936 B2 | 10/2009 | Uchida et al. | |
| 7,633,403 B2* | 12/2009 | Abe et al. | 340/691.6 |
| 7,728,999 B2* | 6/2010 | White et al. | 358/1.15 |
| 7,809,807 B2 | 10/2010 | Tominaga | |
| 7,849,094 B2* | 12/2010 | Arai | 707/756 |
| 8,099,486 B2* | 1/2012 | Nakamura et al. | 709/223 |
| 8,149,431 B2 | 4/2012 | Barton et al. | |
| 8,243,294 B2 | 8/2012 | Herrmann et al. | |
| 2001/0050684 A1 | 12/2001 | Smith | |
| 2002/0030840 A1 | 3/2002 | Itaki et al. | |
| 2002/0054339 A1 | 5/2002 | Arakawa | |
| 2002/0078160 A1* | 6/2002 | Kemp et al. | 709/208 |
| 2002/0171857 A1 | 11/2002 | Hisatomi et al. | |
| 2002/0174444 A1 | 11/2002 | Gatto et al. | |
| 2002/0184294 A1 | 12/2002 | Volkoff et al. | |
| 2003/0030664 A1 | 2/2003 | Parry | |
| 2003/0033368 A1 | 2/2003 | Tominaga | |
| 2003/0160989 A1 | 8/2003 | Chapin et al. | |
| 2003/0174357 A1* | 9/2003 | Lester et al. | 358/1.15 |
| 2003/0184782 A1 | 10/2003 | Perkins et al. | |
| 2004/0019628 A1 | 1/2004 | Puri et al. | |
| 2004/0130744 A1 | 7/2004 | Wu et al. | |
| 2004/0179231 A1 | 9/2004 | Savino et al. | |
| 2004/0215665 A1 | 10/2004 | Edgar et al. | |
| 2004/0246505 A1* | 12/2004 | Oh | 358/1.1 |
| 2004/0263900 A1 | 12/2004 | Nguyen et al. | |
| 2005/0046886 A1 | 3/2005 | Ferlitsch | |
| 2005/0099650 A1 | 5/2005 | Brown et al. | |
| 2005/0111029 A1 | 5/2005 | Dehart | |
| 2005/0162688 A1* | 7/2005 | Nakaoka et al. | 358/1.15 |
| 2005/0213136 A1 | 9/2005 | Noyama et al. | |
| 2005/0223390 A1 | 10/2005 | Moore | |
| 2005/0225795 A1 | 10/2005 | Nuggehalli et al. | |
| 2006/0023244 A1 | 2/2006 | Mitsui | |
| 2006/0087682 A1 | 4/2006 | Lee | |
| 2006/0221372 A1 | 10/2006 | Onishi et al. | |
| 2006/0221391 A1 | 10/2006 | Okazawa et al. | |
| 2006/0268328 A1 | 11/2006 | Park et al. | |
| 2007/0002355 A1* | 1/2007 | Kai | 358/1.13 |
| 2007/0002368 A1 | 1/2007 | Corona | |
| 2007/0013935 A1 | 1/2007 | Uchida | |
| 2007/0086023 A1 | 4/2007 | Kadota | |
| 2007/0097399 A1 | 5/2007 | Boyd et al. | |
| 2007/0136485 A1 | 6/2007 | Mitsui | |
| 2007/0174521 A1 | 7/2007 | Aritomi | |
| 2007/0214409 A1 | 9/2007 | Miyata | |
| 2007/0263242 A1 | 11/2007 | Takahashi | |
| 2008/0007742 A1 | 1/2008 | Abe et al. | |
| 2008/0037062 A1 | 2/2008 | Omino et al. | |
| 2008/0059978 A1 | 3/2008 | Nishio | |
| 2008/0068635 A1 | 3/2008 | Asano | |
| 2008/0192121 A1* | 8/2008 | Hashimoto | 348/207.2 |
| 2008/0231886 A1 | 9/2008 | Wehner et al. | |
| 2008/0239373 A1 | 10/2008 | Suzuki | |
| 2008/0297838 A1 | 12/2008 | Matsui et al. | |
| 2008/0301277 A1 | 12/2008 | Tsujiguchi | |
| 2009/0040549 A1 | 2/2009 | Miyamoto | |
| 2009/0063718 A1* | 3/2009 | Sekine et al. | 710/8 |
| 2009/0190150 A1 | 7/2009 | Selvaraj et al. | |
| 2010/0027040 A1 | 2/2010 | Kuroda | |
| 2010/0082782 A1 | 4/2010 | Ding | |
| 2010/0100832 A1 | 4/2010 | Wang et al. | |
| 2010/0188688 A1 | 7/2010 | Selvaraj et al. | |
| 2010/0225933 A1 | 9/2010 | Xiao et al. | |
| 2010/0225957 A1 | 9/2010 | Liu | |
| 2010/0225958 A1 | 9/2010 | Selvaraj et al. | |

FOREIGN PATENT DOCUMENTS

| | | | |
|---|---|---|---|
| JP | 2003233482 A | | 8/2003 |
| JP | 2005031956 A | | 2/2005 |
| JP | 2005148953 A | | 6/2005 |
| JP | 2005228148 A | | 8/2005 |
| JP | 2006/024199 A | | 1/2006 |
| JP | 2006155289 A | | 6/2006 |
| JP | 2007-034899 | * | 8/2007 |
| WO | WO 2004/070607 A1 | | 8/2004 |

OTHER PUBLICATIONS

European Patent Office, "European Search Report", application No. EP 09151185, 8 pages.

U.S. Appl. No. 12/253,823, filed Oct. 17, 2008, Final Office Action, mailed Feb. 8, 2011.

U.S. Appl. No. 12/019,610, filed Jan. 24, 2008, Office Action, mailed Mar. 30, 2012.

U.S. Appl. No. 11/846,926, filed Aug. 29, 2007, Final Office Action, mailed Aug. 15, 2011.

U.S. Appl. No. 12/253,823, filed Oct. 17, 2008, Final Office Action, mailed Aug. 31, 2011.

U.S. Appl. No. 11/846,926, filed Aug. 29, 2007, Interview Summary, mailed Sep. 21, 2011.

European Patent Office, "European Search Report", application No. EP 07250298, dated Feb. 23, 2010, 8 pages.

Xerox, Xerox 4595 Copier/Printer System Administration Guide, Jan. 2008, Xerox, pp. 1-402.

U.S. Appl. No. 11/846,869, filed Aug. 29, 2007, Final Office Action, mailed Oct. 27, 2011.

U.S. Appl. No. 12/399,891, filed Mar. 6, 2009, Notice of Allowance, mailed Mar. 14, 2013.

U.S. Appl. No. 12/360,794, filed Jan. 27, 2009, Notice of Allowance, mailed Jan. 25, 2013.

U.S. Appl. No. 12/399,884, filed Mar. 6, 2009, Final Office Action, mailed Nov. 26, 2012.

U.S. Appl. No. 12/399,891, filed Mar. 6, 2009, Final Office Action, mailed Nov. 28, 2012.

U.S. Appl. No. 12/019,610, filed Jan. 24, 2008, Final Office Action, mailed Sep. 26, 2012.

U.S. Appl. No. 13/360,794, filed Jan. 27, 2009, Office Action, mailed Sep. 20, 2012.

U.S. Appl. No. 12/399,799, filed Mar. 6, 2009, Final Office Action, mailed Sep. 18, 2012.

U.S. Appl. No. 12/399,891, filed Mar. 6, 2009, Office Action, mailed Jun. 6, 2012.

U.S. Appl. No. 12/399,884, filed Mar. 6, 2009, Office Action, mailed Jun. 21, 2012.

U.S. Appl. No. 12/399,799, filed Mar. 6, 2009, Office Action, mailed Jun. 8, 2012.

U.S. Appl. No. 12/399,895, filed Mar. 6, 2009, Office Action, mailed Apr. 23, 2013.

* cited by examiner

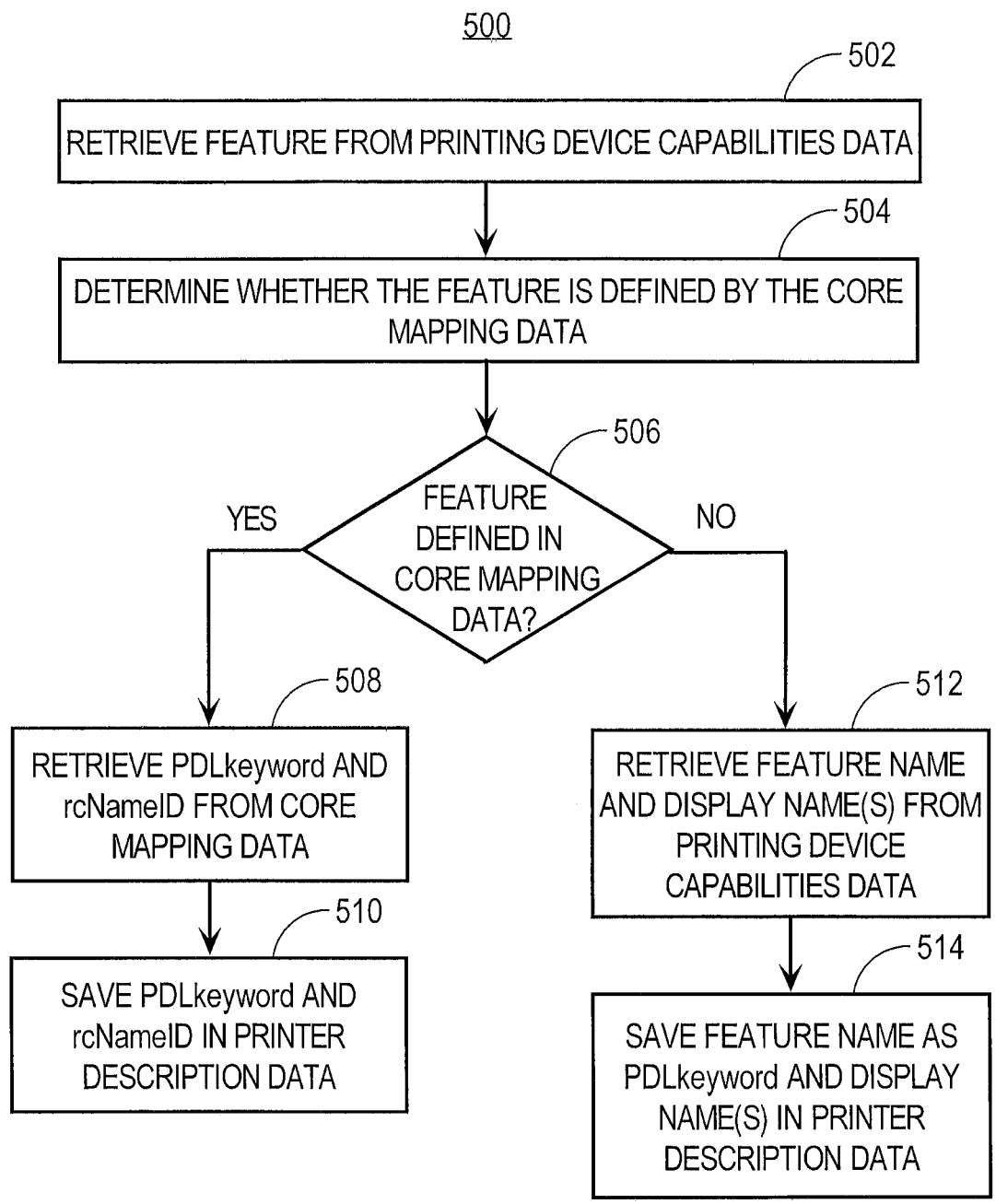

PRINT DRIVER LOCALIZATION SUPPORT FROM PRINTING DEVICE TO SUPPORT MULTIPLE USER PROFILES

RELATED APPLICATION DATA

This application is related to U.S. patent application Ser. No. 12/399,799 entitled "Driverless Architecture For Printing Systems", filed Mar. 6, 2009, U.S. patent application Ser. No. 12/399,891 entitled "Paper Size Support For A Print System", filed Mar. 6, 2009, and U.S. patent application Ser. No. 12/399,884 entitled "Approach For Printing to Web Services-Enabled Printing Devices", filed Mar. 6, 2009, U.S. patent application Ser. No. 11/846,884 entitled "Capability-Based Control Of A Computer Peripheral Device", filed Aug. 29, 2007, U.S. patent application Ser. No. 11/846,926 entitled "Automatically Generating Capability-Based Computer Peripheral Device Drivers", filed Aug. 29, 2007, U.S. patent application Ser. No. 12/019,610 entitled "On-Demand Print Driver", filed Jan. 24, 2008, U.S. patent application Ser. No. 12/253,823 entitled "Providing Device Defined User Interface Modifiers To A Computer System", filed Oct. 17, 2008, and U.S. patent application Ser. No. 12/360,794 entitled "Automatically Updating A Printer Driver With New Printing Device Features", filed Jan. 27, 2009, the contents all of which are incorporated by reference in their entirety for all purposes as if fully set forth herein.

FIELD OF THE INVENTION

The present invention relates generally to printing systems and printing to Web service-enabled printing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

When a user wishes to print an electronic document on a printing device, a print subsystem on the user's client device processes application data generated by an application program and generates print data. The print data includes all the information required by the printing device to print the electronic document. For example, a user creates an electronic document using a word processing application on a PC. The user then selects a print option in the word processing application to request that the electronic document be printed to a particular printer. The print subsystem on the PC processes this request by processing the application data generated by the word processing application to generate print data in a format supported by the particular printer, and sends the print data to the particular printer. Generally, print data is sent to a printing device as part of a print job that is recognized by the printing device.

Generating print data conventionally involves the use of a print driver that is specific to the target printing device. That is, each print driver converts print data into a format supported by the target printing device. Therefore, in order for a client device to correctly print to a particular printing device, the client device must have installed on it the print driver for the particular printing device.

Current print systems suffer from multiple disadvantages. For example, print drivers do not provide language support for certain languages in which a user might be prefer. The only available option for such a user is to either (a) locate a print driver that has language support for a particular language or (b) do without that language support. However, one of the problems with having to locate a new print driver that supports a particular language is that the new print driver must be generated and distributed to a large number of users. Printing device manufacturers attempt to provide current print drivers available on their Website for download, but many users do not know to check a manufacturer's Website for current drivers. Furthermore, many print drivers must be certified by the company that makes the operating system or by printing device manufactures, which can be time consuming and expensive. Any changes to a print driver typically trigger a re-certification requirement.

SUMMARY

An approach is provided for printing to Web service-enabled printing devices. A print driver, executing on a client device, retrieves, from a Web service-enabled printing device, printing device capabilities data that specifies a plurality of features and options currently supported by the Web service-enabled printing device. The printing device capabilities data specifies, for a particular feature and a particular option of the plurality of features and options, a plurality of languages in which the particular feature and the particular option may be displayed. The print driver generates, based at least upon the printing device capabilities data, printer description data that specifies display data that indicates how the particular feature and the particular option are to be displayed, on a graphical user interface, in the plurality of languages. In response to user input, the print driver generates, based at least upon the display data contained in the printer description data and language data, graphical user interface data which, when processed at the client device, causes the particular feature and the particular option to be displayed on a graphical user interface in the particular language. The language data specifies a particular language of the plurality of languages that is currently selected for the client device. The print driver receives, from an application program, application data generated by the application program. The print driver generates, based at least upon the application data, print data and a print job ticket. The print driver causes the print data and the print job ticket to be transmitted to the Web service-enabled printing device.

The present invention is illustrated by way of example, and not by way of limitation, in the figures of the accompanying drawings and in which like reference numerals refer to similar elements and in which:

BRIEF DESCRIPTION OF THE DRAWINGS

FIG. 5 is a flow diagram depicting an approach for generating printer description data.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. OVERVIEW
II. PRINTING SYSTEM ARCHITECTURE
III. PRINTING TO WSD PRINTING DEVICES
   A. Graphical User Interfaces in Different LANGUAGES
IV. GENERATING PRINTER DESCRIPTION DATA
V. DYNAMIC UPDATING OF PRINTER DESCRIPTION DATA
VI. IMPLEMENTATION MECHANISMS
VII. APPENDIX A—EXAMPLE DEVICE CAPABILITIES DATA
VIII. APPENDIX B—EXAMPLE CORE MAPPING DATA
IX. APPENDIX B—EXAMPLE PRINTER DESCRIPTION DATA I. Overview An approach is provided that allows the installation of a print driver that supports a minimum set of Web service-enabled printing device features and options. The print driver can be customized to support the current configuration of multiple Web service-enabled printing devices, support multiple languages for one or more features and/or options supported by Web service-enabled printing devices, and change the language of displayed features and/or options depending on the language setting for the user that is currently logged into the computer system.

Figure 1:
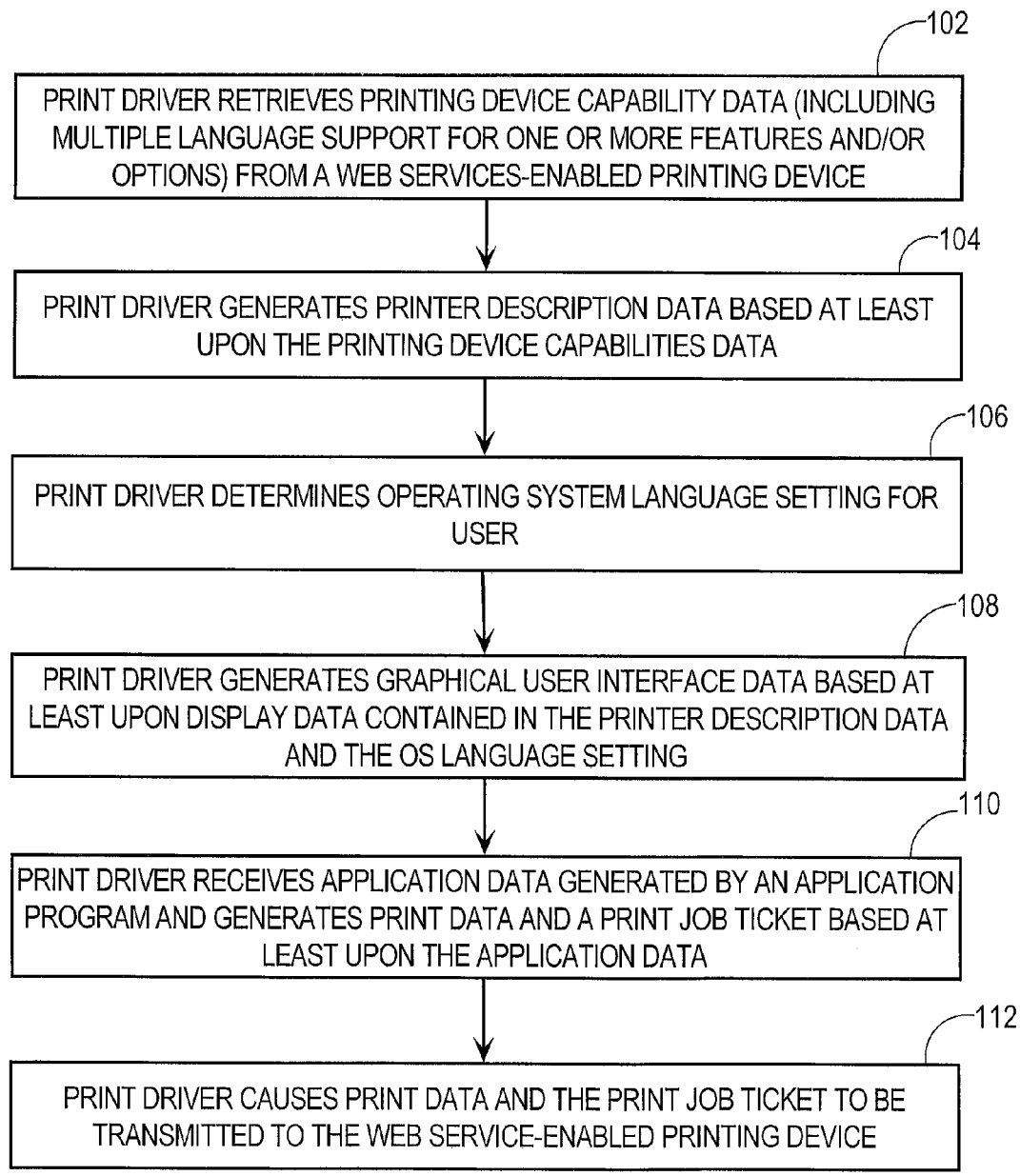
FIG. 1 is a flow diagram that depicts an approach for printing to a Web service-enabled printing device.

FIG. 1 is a flow diagram that depicts an approach for printing to a Web service-enabled printing device, according to an embodiment of the invention. In step 102, a print driver that is installed and executing on a client device retrieves printing device capabilities data from a Web service-enabled printing device. The printing device capabilities data specifies a plurality of features and options currently supported by the Web service-enabled printing device. The printing device capabilities data also specifies, for at least a particular feature and a particular option, a plurality of languages in which the particular feature and particular option may be displayed on a graphical user interface (GUI).

In step 104, the print driver generates printer description data based at least upon the printing device capabilities data. Printer description data specifies display data for one or more features and options currently supported by the Web service-enabled printing device. The display data indicates how the particular feature and the particular option are to be displayed, on a GUI, in the plurality of languages.

In step 106, the print driver determines a language setting for a user of the client device. The language setting may be indicated, for example, by an operating system (OS) variable that corresponds to the user. The value of the language setting indicates a language in which to display data to the user that is currently logged in to the computer system. Thus, if a different user logs in to the computer system and the different user is associated with a different language setting than the language setting for the previous user (e.g., French instead of English), then some of the printing features and/or options are displayed in a GUI in the different language, depending on whether those printing features and/or options are associated with display names in the different language.

In step 108, the print driver generates GUI data based at least upon the display data contained in the printer description data. Generating the GUI data comprises the print driver locating the appropriate language string from the printer description data based on the language setting. When processed at the client device, the graphical user interface data causes at least a portion of the features and options to be displayed on a graphical user interface.

In step 110, the print driver receives application data generated by an application program and generates print data and a print job ticket based at least upon the application data.

In step 112, the print driver causes the print data and the print job ticket to be transmitted to the Web service-enabled printing device for processing.

II. Printing System Architecture

Figure 2:
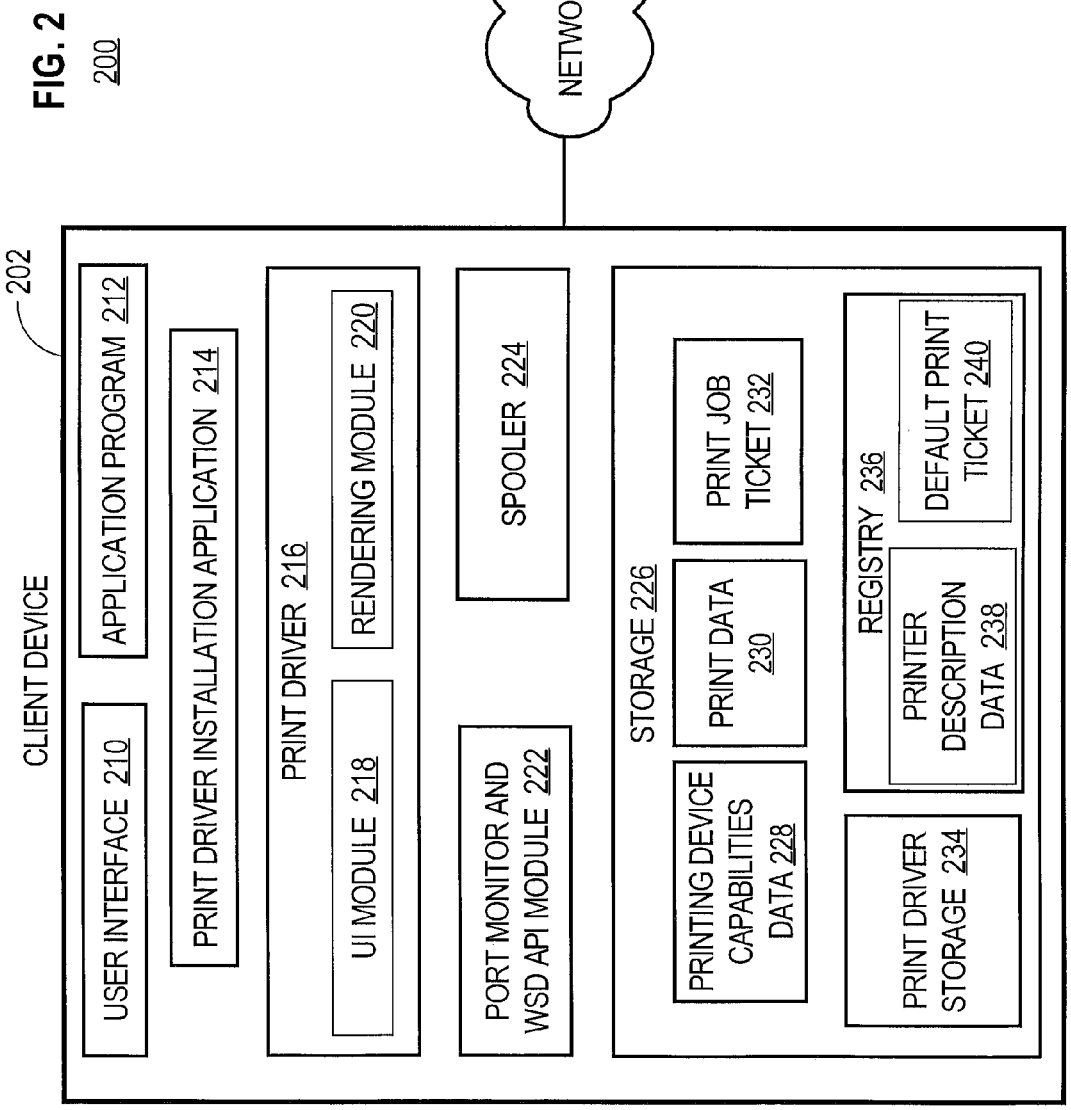
FIG. 2 is a block diagram that depicts an example printing arrangement that includes a client device and a printing device communicatively coupled via a network.

FIG. 2 is a block diagram that depicts an example printing arrangement 200 that includes a client device 202 and a Web service-enabled (WSD) printing device 204 communicatively coupled via a network 206. Network 206 may be implemented by any medium or mechanism that provides for the exchange of data between client device 202 and WSD printing device 204. Examples of network 206 include, without limitation, a network such as a Local Area Network (LAN), Wide Area Network (WAN), Ethernet or the Internet, or one or more terrestrial, satellite or wireless links.

WSD printing device 204 includes a WSD printing service 208. Client device 202 includes a user interface 210, an application program 212, a print driver installation application 214, a print driver 216, with a User Interface (UI) module and a rendering module 220, a port monitor and Web service Device (WSD) Application Program Interface (API) module 222, a spooler 224 and a storage 226. Storage 226 stores printing capabilities data 228, print data 230 and a print job ticket 232. Storage also includes a print driver storage 234 and a registry 236 that stores printer description data 238 and a default print ticket 240. Each of these elements is briefly described below and in more detail hereinafter.

User interface 210 is a mechanism and/or medium for presenting information to a user and allowing user input. Application program 212 may be any type of program that prints data. Examples of application program 212 include, without limitation, a word processing program, a spreadsheet program, an email client, etc. A single application program 212 is depicted in FIG. 2 for purposes of explanation, but client device 202 may have any number of application programs.

Printer driver installation application 214 performs installation of print driver 216 which may include installing any data or files required by print driver 216. Installation of print driver 216 may also include obtaining data and/or files from other sources and locations, depending upon an implementation, as well as performing any configuration required by an operating system.

Print driver 216 interacts with application program 212 to generate print data for printing on WSD printing device 204. UI module 218 generates graphical user interface data which, when processed by application program 212, provides a graphical user interface on user interface 210 for a user to select the features and options to be used when printing a particular electronic document. Rendering module 220 processes application data generated by application program 212 and generates print data which, when processed by WSD printing device 204, cause a printed version of an electronic document reflected in the print data to be printed at WSD printing device 204. Print driver 216 performs various other functions that are described in more detail hereinafter.

Port monitor and WSD API module 222 allows communications between print driver 216 and WSD printing device 204. For example, the WSD API module 222 may be installed on a custom port and print driver 216 communicates with the WSD API module 222 via the custom port. The port monitor and WSD API module 222 communicates with WSD printing device 204. Thus, port monitor and WSD API module 222 is capable of converting client side commands, e.g., BiDi function calls, to SOAP requests, in the form of SOAP envelopes, and is also capable of extracting XML information from SOAP responses received from WSD printing device 204, in the form of SOAP envelopes, and generating BiDi function call responses. Port monitor and WSD API module 222 sends SOAP requests to the port associated with WSD printing service 208.

Printing device capabilities data 228 is data that specifies the current features and options, i.e., allowed values for each feature, of WSD printing device 204. Examples of printing device features include, without limitation, a paper tray, duplex printing, stapling, hole punching, ultraviolet (UV) coating, etc. Each feature has one or more options, i.e., values. Some features may only have two options. For example, UV coating typically has two options, such as "enabled" or "disabled". Other features, for example, paper size, may have many options, e.g., "A4", "legal", "8½×11", etc. Printing device capabilities data 228 stored on client device 202 may include printing device capability data for any number of WSD printing devices.

Print data 230 is data generated by print driver 216, based at least upon application data generated by application program 212, which when processed by WSD printing device 204, causes a printed version of an electronic document represented in the print data 230 to be printed. Print job ticket 232 specifies one or more parameters that indicate how print data 230 is to be processed at WSD printing device 204. Print data 230 may include data for multiple print jobs and print job ticket 232 may include multiple print job tickets.

Printer driver storage 234 contains one or more print drivers that are used by client device to print on printing devices. Registry 236 is an area of storage 226 for storing printer description data 238 and the default print ticket 240. Registry 236 may be a protected area of storage 226 that is under the control of an operating system on client device 202. Default print ticket 240 includes data that indicates default options for the features supported by WSD printing device 204. Default print ticket 240 may include default print tickets for any number of printing devices.

Print driver 216 generates printer description data 238 based at least upon printing device capabilities data 228. Printer description data 238 specifies display data for one or more feature and options currently supported by WSD printing device 204. Print driver 216 uses printer description data 238 to generate graphical user interface data and also for generating print data 230 and/or print job ticket 232.

III. Printing to WSD Printing Devices

Figure 3:
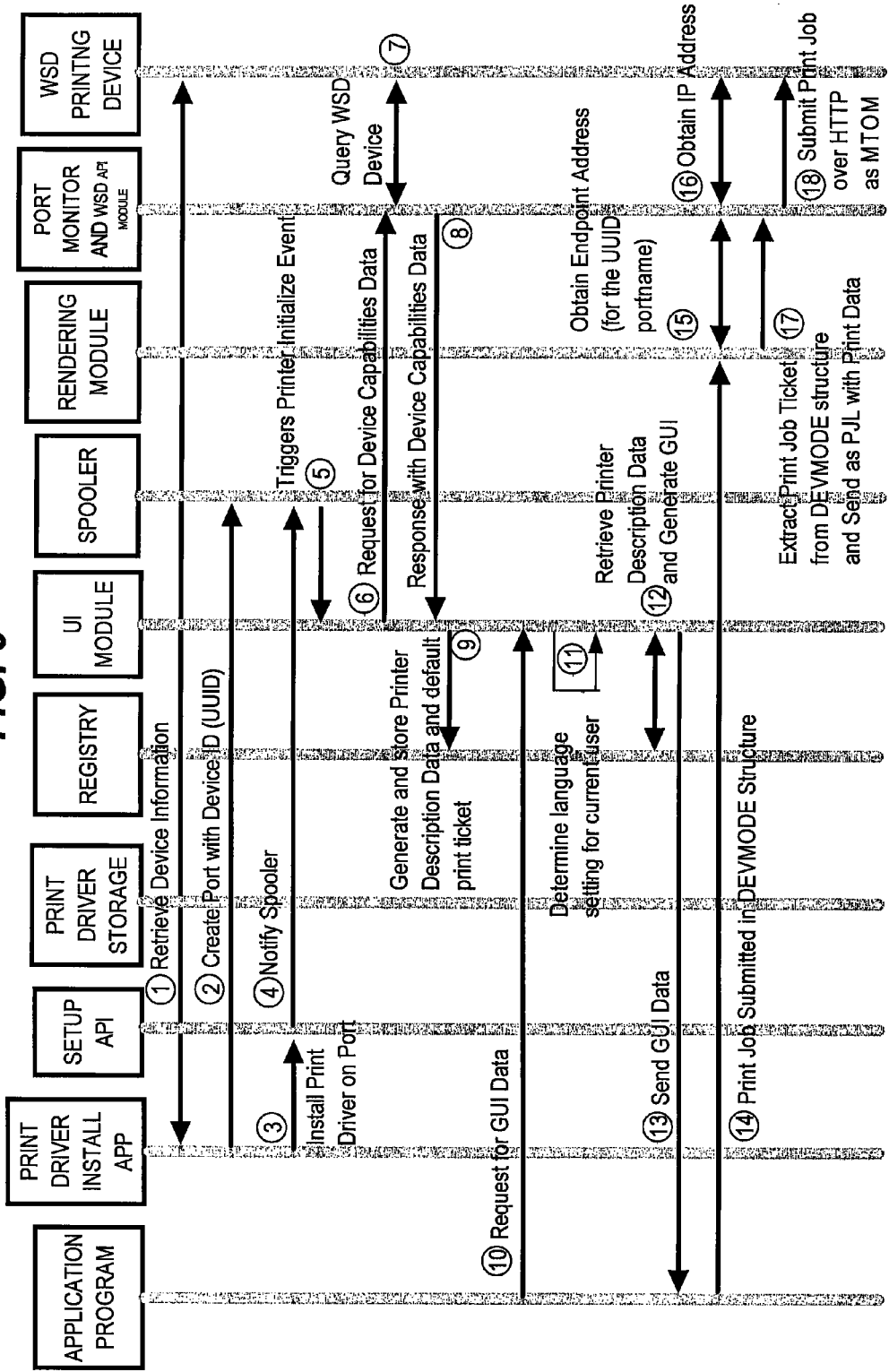
FIG. 3 is a flow diagram that depicts an approach for printing to a WSD printing device.

FIG. 3 is a sequence diagram 300 that depicts an approach for printing to a WSD printing device, according to an embodiment of the invention. In this depicted approach, the client device operating system does not support compatible device IDs. One example situation in which the approach depicted in FIG. 3 may be used is where the operating system on client device 202 does not support the use of a compatible identification. That is, the operating system requires a print driver that matches the target printing device. Examples of these types of operating systems include Windows XP, Windows Vista and other non-Windows operating systems. Typically, the operating system will obtain a device ID of the printing device to be installed and will search for a print driver having the same device ID. For example, in the context of the Windows operating system, the operating system will search for a setup file (known as an INF file) that has a device ID that matches the device ID of the printing device to be installed.

However, embodiments of the invention are not limited to the depicted approach. In another approach, the client device operating system does support compatible device IDs. This means that the operating system will search for a setup file that exactly matches the printing device to be installed. If an exact match is not found, the operating system will attempt to locate a setup file for the class, type, or group of printing device to be installed. An example of this type of operating system is Windows 7.

Returning to FIG. 3, it is presumed that the print driver installation application 214 has discovered the available printing devices and that WSD printing device 204 has been selected for installation. Print driver installation application 214 installs a basic print driver with a basic Generic Printer Description (GPD) file that contains the information necessary, for a standard set of minimum features, to generate a graphical user interface and to generate print data.

In Step 1, print driver installation application 214 retrieves device information from WSD printing device 204, for example, using a unicast request for the metadata of WSD printing device 204. The device information may include, for example, a model number of WSD printing device 204. In Step 2, a port is created using the UUID of WSD printing device 204. In Step 3, print driver installation application 214 installs the print driver on the created port by interacting with a setup API. In Step 4, the setup API notifies spooler 224, which in Step 5 triggers a printer initialization event. For example, this printer initialize event may have an event code of PRINTER_EVENT_INITIALIZE.

In Step 6, UI module 218 responds to the printer initialization event by sending to the port monitor and WSD API module 222 a request for the device capabilities of WSD printing device 204. The request may be implemented, for example, by a call to a SendRecvBiDiData function that contains a request for the device capabilities data of WSD printing device 204. In this situation, the SendRecvBiDiData function makes a call to port monitor and WSD API module 222.

In Step 7, the port monitor and WSD API module 222 receives from UI module 218 the request for the device capabilities data of WSD printing device 204. Port monitor and WSD API module 222 generates a SOAP request, in the form of a SOAP envelope, based at least upon the request received from UI module 218 and forwards the SOAP request to WSD printing device 204. WSD printing device 204 generates and sends to port monitor and WSD API module 222 a SOAP response (in the form of a SOAP envelope) that includes the device capabilities data for WSD printing device 204. The device capabilities data for WSD printing device 204 specifies the features and options currently supported by WSD printing device 204. The device capabilities data in the SOAP response may include any portion or all of the device capabilities data available on WSD printing device 204, depending upon a particular implementation. In addition, the device capability data may be retrieved using any number of SOAP requests and responses. The SOAP response may also include a default print ticket that specifies default options for WSD printing device 204.

In Step 8, port monitor and WSD API module 222 sends to UI module 218 a response that contains the device capabilities data of WSD printing device 204. This may include port monitor and WSD API module 222 extracting XML information from the SOAP response and generating a response that includes the extracted information. In the situation where the request was implemented using a call to SendRecvBiDiData function, the response to the function call contains the device capabilities data from WSD printing device 204.

In Step 9, UI module 218 generates printer description data 238 for WSD printing device 204 and stores printer description data 238 in registry 236. The process for generating printer description data 238 is described in more detail hereinafter. Printer description data 238 and default print ticket 240 are stored in registry 236.

In Step 10, application program 212 makes a request to UI module 218 for Graphical User Interface (GUI) data. In step 11, UI module 218 determines the language setting for the current user.

In Step 12, UI module 218 retrieves printer description data 238 from registry 236 and generates GUI data based at least in part upon on the display data (in printer description data 238) that indicates how one or more of the features and/or options are to be displayed in a plurality of languages. This may include, for example, obtaining strings that correspond to string variables contained in printer description data 238. As described in more detail hereinafter, the string variables are retrieved from a core mapping file (identified therein by rcNameID Value tags) and added to printer description data 238. Strings for the string variables are retrieved from one or more data files that may be maintained, for example, to support different languages, and included in the GUI data. For example, the one or more data files may contain a list of the string variables and corresponding strings that display a feature name or an option name in a particular language. To change the GUI to another language, the one or more data files are substituted with one or more other data files that contain the list of the string variables and corresponding strings that display a feature name or an option name in another language.

The GUI data includes data which, when processed by application program 212, allows a user to view and change the features and settings supported by WSD printing device 204. The GUI data may include, for example, display data that includes display strings that correspond to features and options currently supported by WSD printing device 204.

In Step 13, UI module 218 provides the GUI data to application program 212. If one or more of the features and/or options in printer description data 238 are associated with a particular language that is the same as the language indicated by the language setting, then those one or more features and/or options will be displayed in a resulting GUI in the particular language.

A user interacts with application program 212 to view and select particular features and options to be used for printing a particular electronic document. For example, the user may select duplex, color printing with hole punching.

A. Graphical User Interfaces in Different Languages

Figure 4A:
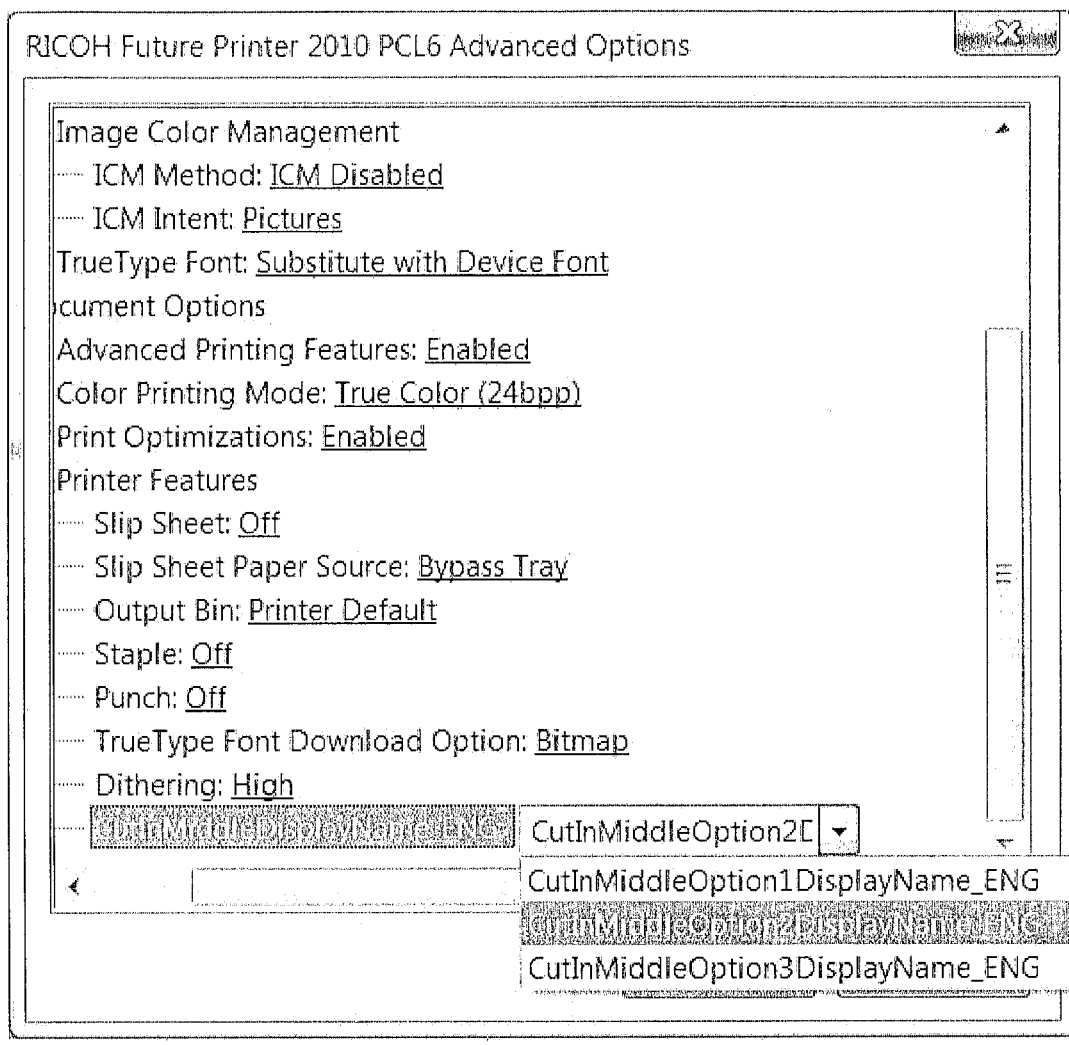
FIGS. 4A-B are diagrams that depict screen shots of GUIs that may be generated based on the language setting of different users or of the same user.
Figure 4B:
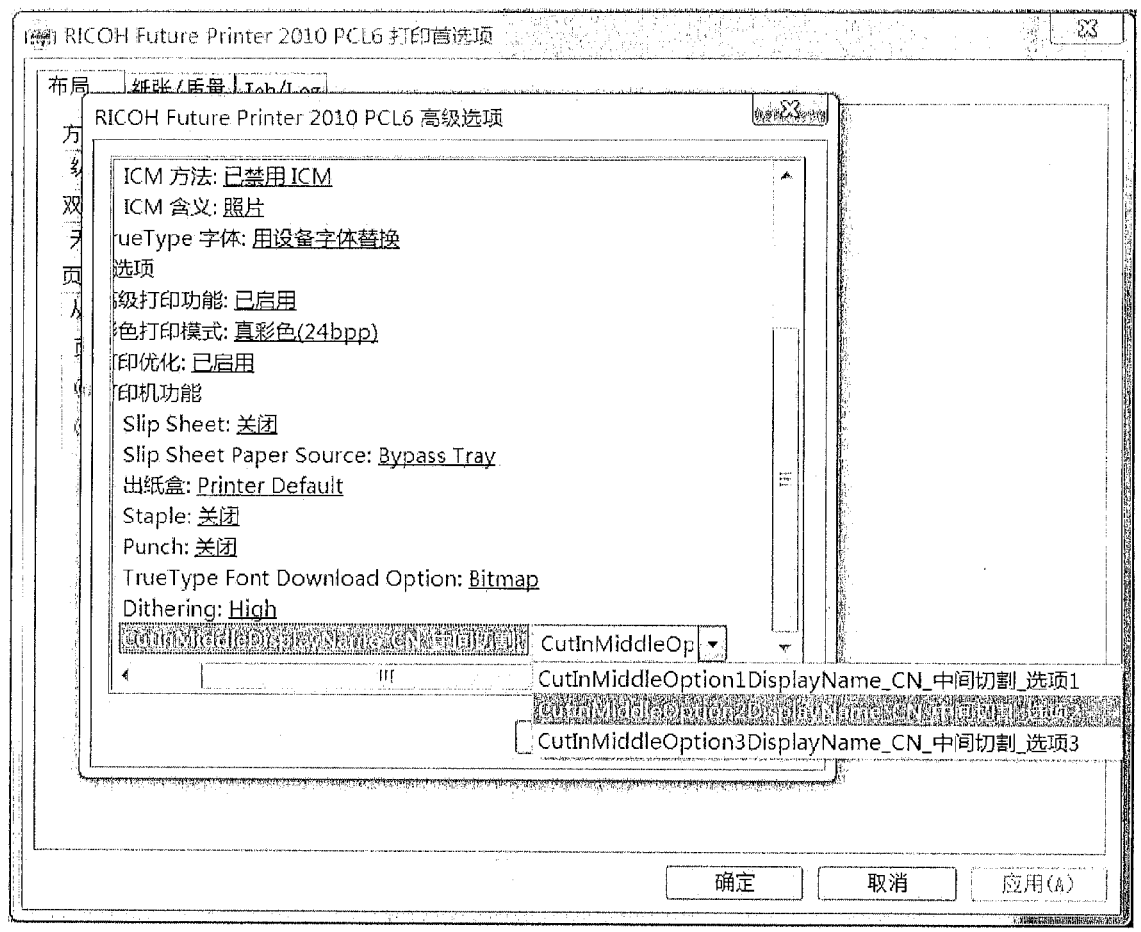

FIGS. 4A and 4B are diagrams that depict screen shots of GUIs 402 and 404, respectively, that may be generated based on the language setting of different users or of the same user. In FIG. 4A, the language setting is English. In this example, all the features and options of the printing device (i.e., RICOH Future Printer 2010 PCL6) depicted in GUI 402 are associated with display data that indicates how the features and options are to be displayed in English.

In FIG. 4B, the language setting is Mandarin Chinese. The language setting may reflect the language setting of a different user. For example, GUI 402 depicted in FIG. 4A may be displayed for a first user and GUI 404 in FIG. 4B may be displayed for a second user that is different than the first user.

As another example, GUI 402 depicted in FIG. 4A may be displayed for a first user. Then, in response to input from the first user, GUI 404 depicted in FIG. 4B is displayed for the first user. The user input may be a change to the language setting or a selection of one or more GUI elements (not shown) that cause the language of one or more features and/or options to be displayed in another language.

As yet another example, GUI 402 may be generated using a print driver and displayed for a first user that wants to print to a first WSD printing device. GUI 404 may be generated using the same print driver and displayed for a second user (either the same as or different than the first user) that wants to print to a second WSD printing device that is different than the first WSD printing device. Thus, the printing device capabilities data and the printer description data associated with the first WSD printing device are different, respectively, than the printing device capabilities data and the printer description data associated with the second WSD printing device.

Not all of the features and options in GUI 404 depicted in FIG. 4B are associated with display data that indicates how those features and options are to be displayed in Mandarin Chinese. Some of the features and options are displayed in English because those features and options do not have (e.g., in the device capabilities data and the printer description data) corresponding display data that indicate how those features and options are to be displayed in Mandarin Chinese.

Returning to FIG. 3, once the user has selected various options elected to print the particular electronic document, in Step 14, application program 212 generates and provides to rendering module 220 a print job with a device mode (DEVMODE) structure that has a single string variable that holds the print job ticket that specifies the job settings. In Step 15, rendering module sends to port monitor and WSD API module 222 a BiDi request for the endpoint address of the device with the port name of the UUID, which in the present example is WSD printing device 204. In Step 16, port monitor and WSD API module 222 generates and sends to WSD printing device 204 a request for the IP address of WSD printing device 204. WSD printing device 204 provides its IP address to port monitor and WSD API module 222, which provides the IP address to rendering module 220.

In Step 17, rendering module 220 extracts the print job ticket from the DEVMODE structure and sends the print job ticket as one or more Printer Job Language (PJL) commands to port monitor and WSD API module 222 with print data 230. The PJL commands may be included as part of print data 230, or sent separately. In Step 18, port monitor and WSD API module 222 submits the print job, including print data 230 and print job ticket 232, to WSD printing device 204 over HTTP. The print data 230 and print job ticket 232 may be sent to WSD printing device 204 using the W3C Message Transmission Optimization Mechanism (MTOM).

IV. Generating Printer Description Data

As previously described herein, UI module 218 is configured to generate and store, in registry 236, printer description data 238 and is also configured to store default print tickets received from WSD printing device 204. Printer description data 238 is used by UI module 218 to generate GUI data which, when processed by application program 212, causes a GUI to be displayed on user interface 210 that displays the features and options supported by WSD printing device 204 and allows a user to select one or more features and options to be used when printing a particular electronic document.

The process for generating printer description data 238 generally involves combining information from the printing device capabilities data 228 for WSD printing device 204 and data from Core Mapping Data that is provided as part of the basic installed print driver. Appendix A includes example printing device capabilities data, Appendix B includes example core mapping data and Appendix C includes example printer description data.

According to one embodiment of the invention, UI module 218 examines the printing device capabilities data 228 and identifies the printing device features specified therein. For each feature and option in printing device capabilities data 228, UI module 218 determines whether the feature is defined in the core mapping data. Core mapping data includes PDLKeywords and rcNameIDs for a standard set of printing device features and options. If a particular feature in printing device capabilities data 228 is defined in the core mapping data, then UI module 218 retrieves PDLkeyWord value and rcNameID Value for the particular feature and each of the corresponding options from the core mapping file and stores the PDLkeyWord values and the rcNameID Values in printer description data 238. The PDLkeyWord value provides a mapping between a feature or option terminology understood by print driver 216 and the terminology understood by WSD printing service 208 for the same feature or option. The rcNameID Value indicates the name of a string variable (resource ID, which is defined in the resource file with the string value) that contains the string for the feature or option. The string (rcNameID Value) is included in the GUI data that is generated by UI module 218 and provided to application program 212. Consider the following example. Suppose that printing device capabilities data 228 includes a feature named "InputTray4". Suppose further that this feature is defined in the core mapping data as indicated below in Table I.

TABLE I

```
<DeviceFeature Value="InputTray4">
    <PDLKeyword Value="InputTray4"/>
    <rcNameID Value="RC_STR_TRAY4" />
    <FeatureOption Value="NotInstalled">
        <PDLKeyword Value="NotInstalled" />
        <rcNameID Value="RC_STR_NOTINSTALLED" />
    </FeatureOption >
    <FeatureOption Value="Installed">
        <PDLKeyword Value="Installed" />
        <rcNameID Value="RC_STR_INSTALLED" />
    </FeatureOption >
</DeviceFeature >
```

As indicated in Table I, the feature InputTray4 has two options that include "NotInstalled" and "Installed". Note that the feature and each option has both a specified PDLKeyword value and a specified rcNameID value, which UI module 218 retrieves and stores in printer description data.

If the particular feature in printing device capabilities data 228 is not defined in the core mapping file, then the particular feature is typically a new feature. In this situation, UI module 218 uses the feature name for the particular feature from the printing device capabilities data 228 to generate the PDLKeyWord value for printer description data 238. In addition, UI module 218 includes the DisplayName values for the particular feature in printer description data 238. Multiple DisplayName values may be included in printer description data 238 for one or more features and/or options to provide support for multiple languages for those features and/or options. The display name values are included in the GUI data that is generated by UI module 218 and provided to application program 212.

Referring to the prior example, suppose that the feature named "InputTray4" is not defined in the core mapping data. Suppose further that this feature is defined in printing device capabilities data 228 as indicated below in Table II.

TABLE II

```
<rodp:InputTray4>
    <rodp:DisplayName xml:lang="en-US">Tray 4</rodp:DisplayName>
    <rodp:DefaultOption>NotInstalled</rodp:DefaultOption>
    <rodp:InputTray4Entry Name="NotInstalled">
        <rodp:DisplayName xml:lang="en-US">Not
        Installed</rodp:DisplayName>
    </rodp:InputTray4Entry>
    <rodp:InputTray4Entry Name="Installed">
        <rodp:DisplayName
        xml:lang="en-US">Installed</rodp:DisplayName>
    </rodp:InputTray4Entry>
</rodp:InputTray4>
```

As indicated in TABLE II, there are no PDLKeyword values or rcNameID values contained in the definition of the InputTray4 feature in printing device capabilities data 228. In this example, the feature name "InputTray4" is stored in printer description data 238 as the PDLKeyword value. Also, UI module 218 retrieves the DisplayName values for the feature and each option and stores the DisplayName values in printer description data 238.

Consider the following example that illustrates multiple language support for a feature (and each of corresponding options) supported by WSD printing device 304. Suppose that printing device capabilities data 228 includes the following data:

TABLE III

```
<rodp:UVCoating>
    <rodp:DisplayName xml:lang="en-US">UV Coating</rodp:DisplayName>
    <rodp:DisplayName xml:lang="zh-CN">渡膜 </rodp:DisplayName>
    <rodp:DefaultOption>Option1</rodp:DefaultOption>
    <rodp:UVCoatingEntry Name="Option1">
        <rodp:DisplayName xml:lang="en-US">Option 1</rodp:DisplayName>
        <rodp:DisplayName xml:lang="zh-CN">渡膜 1</rodp:DisplayName>
    </rodp:UVCoatingEntry>
    <rodp:UVCoatingEntry Name="Option2">
        <rodp:DisplayName xml:lang="en-US">Option 2</rodp:DisplayName>
        <rodp:DisplayName xml:lang="zh-CN">渡膜 2</rodp:DisplayName>
    </rodp:UVCoatingEntry>
</rodp:UVCoating>
```

As indicated in Table III, WSD printing device 304 contains support for English and Chinese display names for the UV coating printing feature. From this portion of printing device capabilities data 228, UI module 218 generates the following printer description data indicated in Table IV:

TABLE IV

```
<DeviceFeature Value="UVCoating">
    <PDLKeyword Value="UVCoatingPDLName"/>
    <DisplayName xml:lang="en-US" Value="UV Coating" />
    <DisplayName xml:lang="zh-CN" Value='渡膜' />
    <FeatureOption Value="Option1">
        <PDLKeyword Value="Option1PDLKeyWord" />
        <DisplayName xml:lang="en-US" Value="Option1" />
        <DisplayName xml:lang="zh-CN" Value='渡膜1" />
    </FeatureOption >
    <FeatureOption Value="Option2">
        <PDLKeyword Value="2PDLKeyWord" />
        <DisplayName xml:lang="en-US" Value="Option2" />
        <DisplayName xml:lang="zh-CN" Value='渡膜2" />
    </FeatureOption>
</DeviceFeature>
```

As indicated in Table IV, the printing feature "UVCoating" is associated with a PDLKeyword value and display name data that indicates how to display the feature in English and in Mandarin Chinese. In this example, as evidence that the printing device feature "UVCoating" is not defined in the core mapping data, the printing feature "UVCoating" is not associated with an rcNameID value.

FIG. 5 is a flow diagram 500 depicting an approach for generating printer description data 238 for a particular feature from printing device capabilities data 228, according to one embodiment of the invention. This approach may be used for any number of features and also for any number of options for each feature. In step 502, a feature is retrieved from printing device capabilities data 228. In step 504, a determination is made whether the feature is defined in the core mapping data. In step 506, if the feature is defined in the core mapping data, then in step 508, the PDLkeyword and rcNameID are retrieved from the core mapping data. In step 510, the PDLkeyword and rcNameID are stored in printer description data 238. As previously mention herein, printer description data 238 may include printer description data for any number of WSD printing devices.

If, in step 506, a determination is made that the feature is not defined in the core mapping data, then in step 512, the feature name and display name(s) are retrieved from printing device capabilities data 228. As previously described herein, multiple display names may be used to provide support for multiple languages. In step 514, the feature name is stored in printer description data 238 as the PDLkeyword for the feature. Also, the display name(s) are stored in printer description data 238 in association with the feature.

V. Dynamic Updating of Printer Description Data

Figure 6:
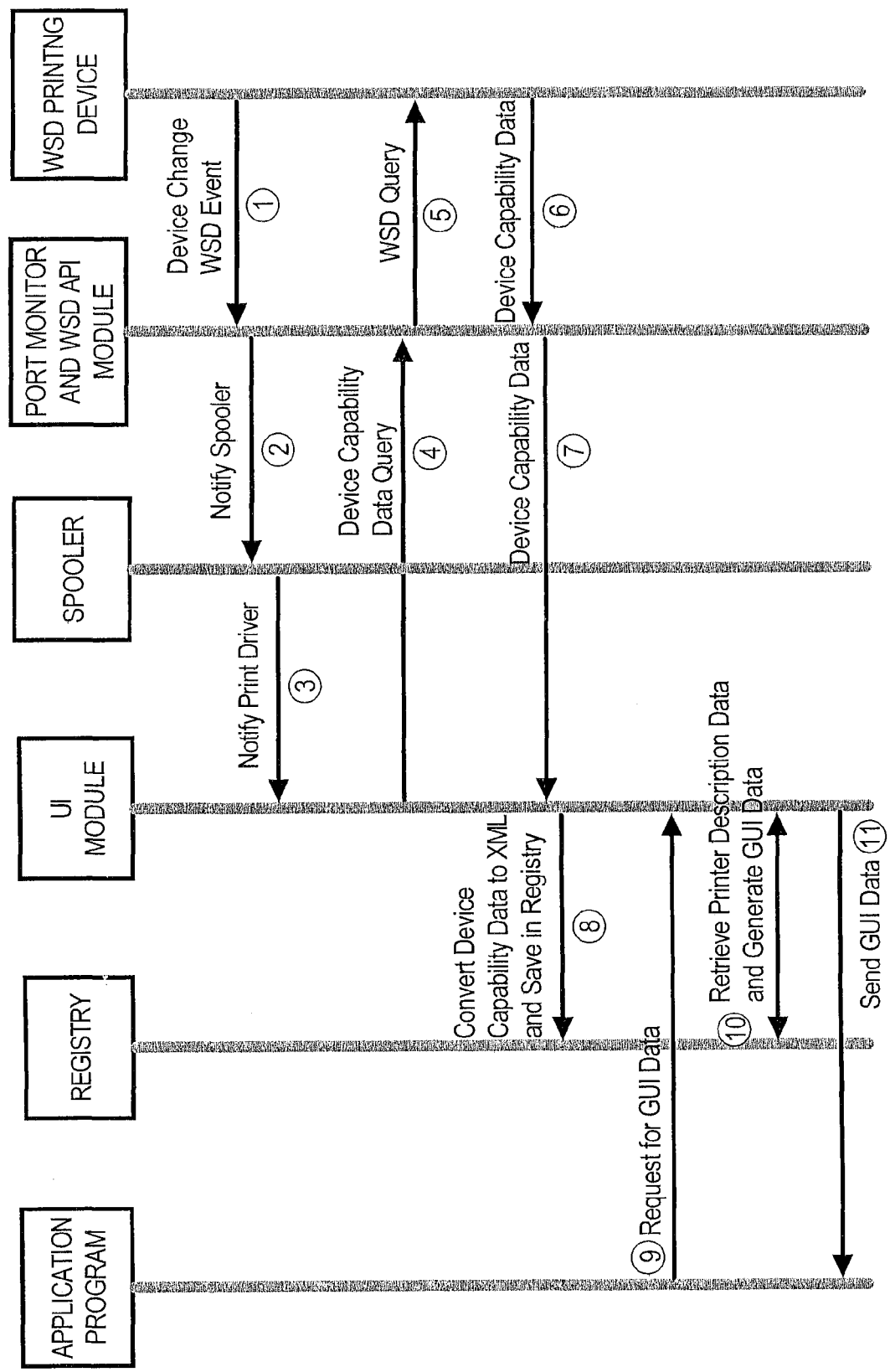
FIG. 6 is a flow diagram that depicts an approach for updating printer description data.

FIG. 6 is a flow diagram that depicts an approach for updating printer description data, according to one embodiment of the invention. In Step 1, WSD printing device 204 generates an event indicating a change in printing features or options. This may include the deletion, addition, or change of a printing feature or option. Port monitor and WSD API module 222 has subscribed to receive this event and receives the event. For example, port monitor and WSD API module 222 may receive an event notification in the form of a SOAP message specifying the event.

In Step 2, port monitor and WSD API module 222 receives the event notification and notifies spooler 224. In Step 3, spooler 224 notifies UI module 218. In Step 4, UI module sends to the port monitor and WSD API module 222 a request for the device capabilities of WSD printing device 204. The request may be implemented, for example, by a call to a SendRecvBiDiData function that contains a request for the device capabilities data of WSD printing device 204. In this situation, the SendRecvBiDiData function makes a call to port monitor and WSD API module 222.

In Step 5, the port monitor and WSD API module 222 receives from UI module 218 the request for the device capabilities data of WSD printing device 204. Port monitor and WSD API module 222 generates a SOAP request, in the form of a SOAP envelope, based at least upon the request received from UI module 218 and forwards the SOAP request to WSD printing device 204.

In Step 6, WSD printing device 204 generates and sends to port monitor and WSD API module 222 a SOAP response, in the form of a SOAP envelope, that includes the device capabilities data for WSD printing device 204. The device capabilities data for WSD printing device 204 specifies the features and options currently supported by WSD printing device 204. The device capabilities data in the SOAP response may include any portion or all of the device capabilities data available on WSD printing device 204, depending upon a particular implementation. For example, the device capabilities data retrieved in response to the event notification may include all of the device capabilities data available on WSD printing device 204. Alternatively, only the device capabilities data that corresponds to the change in features or options may be retrieved from WSD printing device 204. In addition, the device capability data may be retrieved using any number of SOAP requests and responses. The SOAP response may also include a default print ticket that specifies default options for WSD printing device 204.

In Step 7, port monitor and WSD API module 222 sends to UI module 218 a response that contains the device capabilities data of WSD printing device 204. This may include port monitor and WSD API module 222 extracting XML information from the SOAP response and generating a response that includes the extracted information. In the situation where the request was implemented using a call to SendRecvBiDiData function, the response to the function call contains the device capabilities data from WSD printing device 204.

In Step 8, UI module 218 generates printer description data 238 for WSD printing device 204 and stores printer description data 238 in registry 236 as previously described herein. Alternatively, UI module 218 may update the existing printer description data for WSD printing device 204 to reflect the change in the features and/or options made to WSD printing device 204.

In Step 9, application program 212 makes a request to UI module 218 for GUI data. In Step 10, UI module 218 retrieves printer description data 238 from registry 236 and generates the requested GUI data. The GUI data includes data which, when processed by application program 212, allows a user to view and change the features and settings supported by WSD printing device 204. The GUI data may include, for example, display data that includes display strings that correspond to features and options currently supported by WSD printing device 204. In Step 11, UI module 218 provides the GUI data to application program 212. The process for processing a print job then continues as previously described in FIGS. 3 and 4.

VI. Implementation Mechanisms

According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
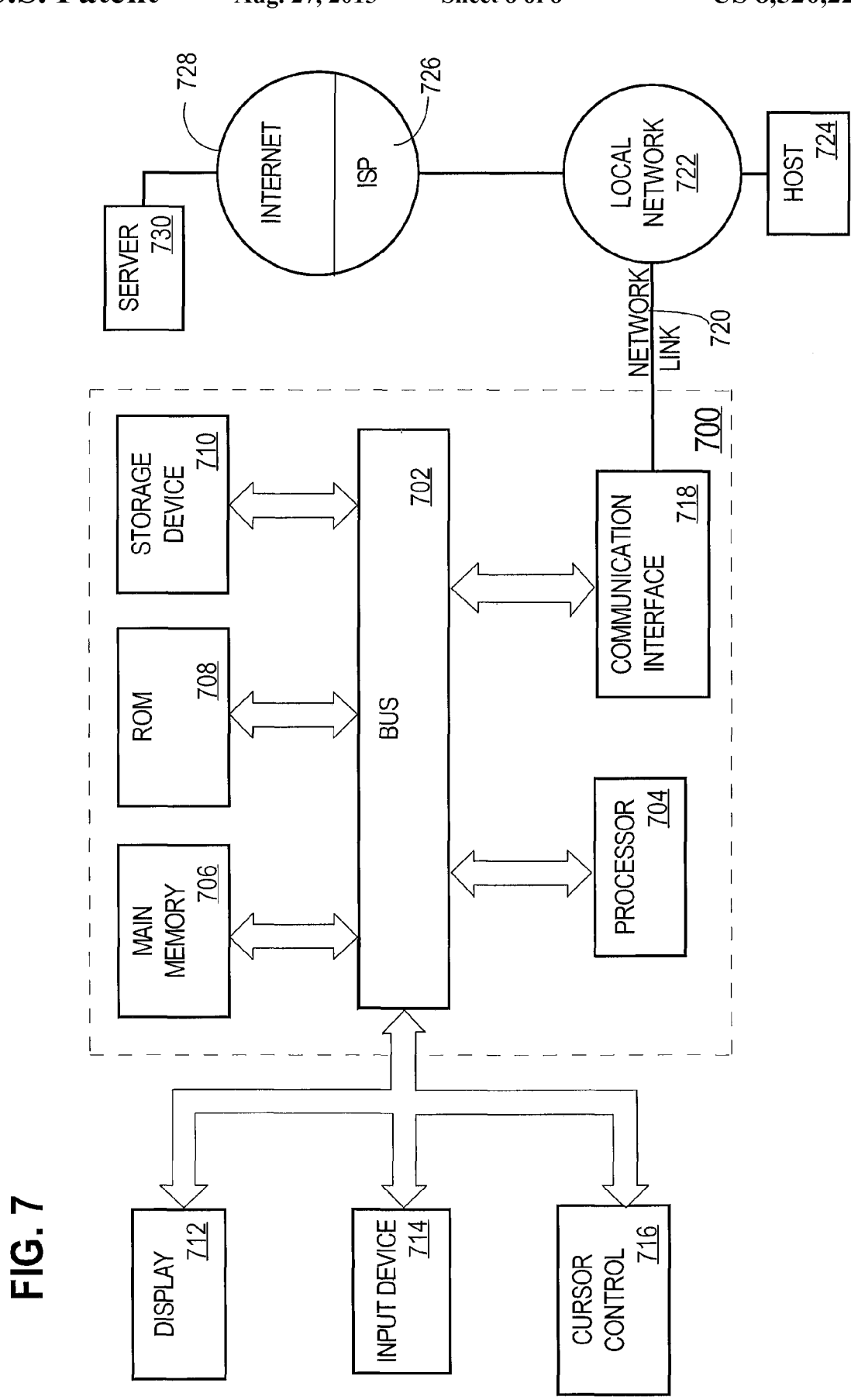
FIG. 7 is a block diagram of a computer system on which embodiments of the invention may be implemented.

FIG. 7 is a block diagram that depicts an example computer system 700 upon which embodiments of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic or computer software which, in combination with the computer system, causes or programs computer system 700 to be a special-purpose machine. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 700, various computer-readable media are involved, for example, in providing instructions to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

VII. APPENDIX A -- EXAMPLE DEVICE CAPABILITIES DATA

```xml
<?xml version="1.0"?>
<RequestedPrinterElements
xmlns:wprt="http://schemas.microsoft.com/windows/2006/08/wdp/print"
xmlns:rodp="http://schemas.Ricoh-Usa.com/wsd/print">
  <wprt:PrinterDescription>
    <wprt:ColorSupported>true</wprt:ColorSupported>
    <wprt:DeviceId>MFG:RICOH;CMD:PJL,RCS,PCL,PCLXL;MDL:Future Printer 2010;STS:12301/13300/13000/10004,0;CLS:PRINTER;DES:RICOH Future Printer 2010;</wprt:DeviceId>
    <wprt:MultipleDocumentJobsSupported>false</wprt:MultipleDocumentJobsSupported>
    <wprt:PagesPerMinute>0</wprt:PagesPerMinute>
    <wprt:PagesPerMinuteColor>0</wprt:PagesPerMinuteColor>
    <wprt:PrinterName>RICOH Future Printer 2010</wprt:PrinterName>
    <wprt:PrinterInfo>No Setting</wprt:PrinterInfo>
    <wprt:PrinterLocation>No Setting</wprt:PrinterLocation>
  </wprt:PrinterDescription>
  <wprt:PrinterConfiguration>
    <wprt:PrinterEventRate>1</wprt:PrinterEventRate>
    <wprt:Storage>
      <wprt:StorageEntry Removed="false" Name="">
        <wprt:Type>HardDisk</wprt:Type>
        <wprt:Size>1024</wprt:Size>
        <wprt:Free>-1</wprt:Free>
      </wprt:StorageEntry>
    </wprt:Storage>
    <wprt:Consumables>
      <wprt:ComsumableEntry Removed="false" Name="Black Toner">
        <wprt:Type>Toner</wprt:Type>
        <wprt:Color>Black</wprt:Color>
        <wprt:Level>70</wprt:Level>
        <wprt:Model>Black Toner</wprt:Model>
      </wprt:ComsumableEntry>
      <wprt:ComsumableEntry Removed="false" Name="Cyan Toner">
        <wprt:Type>Toner</wprt:Type>
        <wprt:Color>Cyan</wprt:Color>
        <wprt:Level>50</wprt:Level>
        <wprt:Model>Cyan Toner</wprt:Model>
      </wprt:ComsumableEntry>
      <wprt:ComsumableEntry Removed="false" Name="Magenta Toner">
        <wprt:Type>Toner</wprt:Type>
        <wprt:Color>Magenta</wprt:Color>
        <wprt:Level>80</wprt:Level>
        <wprt:Model>Magenta Toner</wprt:Model>
      </wprt:ComsumableEntry>
      <wprt:ComsumableEntry Removed="false" Name="Yellow Toner">
        <wprt:Type>Toner</wprt:Type>
```

```xml
    <wprt:Color>Yellow</wprt:Color>
    <wprt:Level>70</wprt:Level>
    <wprt:Model>Yellow Toner</wprt:Model>
  </wprt:ComsumableEntry>
</wprt:Consumables>
<wprt:InputBins>
  <wprt:InputBinEntry Name="Tray1">
    <wprt:FeedDirection>ShortEdgeFirst</wprt:FeedDirection>
    <wprt:MediaSize>Letter</wprt:MediaSize>
    <wprt:MediaType>unknown</wprt:MediaType>
    <wprt:MediaColor>unknown</wprt:MediaColor>
    <wprt:Capacity>550</wprt:Capacity>
    <wprt:Level>275</wprt:Level>
  </wprt:InputBinEntry>
  <wprt:InputBinEntry Name="Tray2">
    <wprt:FeedDirection>LongEdgeFirst</wprt:FeedDirection>
    <wprt:MediaSize>unknown</wprt:MediaSize>
    <wprt:MediaType>unknown</wprt:MediaType>
    <wprt:MediaColor>unknown</wprt:MediaColor>
    <wprt:Capacity>550</wprt:Capacity>
    <wprt:Level>275</wprt:Level>
  </wprt:InputBinEntry>
  <wprt:InputBinEntry Name="unknown">
    <wprt:FeedDirection>ShortEdgeFirst</wprt:FeedDirection>
    <wprt:MediaSize>Letter</wprt:MediaSize>
    <wprt:MediaType>unknown</wprt:MediaType>
    <wprt:MediaColor>unknown</wprt:MediaColor>
    <wprt:Capacity>2000</wprt:Capacity>
    <wprt:Level>0</wprt:Level>
  </wprt:InputBinEntry>
  <wprt:InputBinEntry Name="Bypass">
    <wprt:FeedDirection>ShortEdgeFirst</wprt:FeedDirection>
    <wprt:MediaSize>Letter</wprt:MediaSize>
    <wprt:MediaType>unknown</wprt:MediaType>
    <wprt:MediaColor>unknown</wprt:MediaColor>
    <wprt:Capacity>100</wprt:Capacity>
    <wprt:Level>-3</wprt:Level>
  </wprt:InputBinEntry>
</wprt:InputBins>
<wprt:Finishings>
  <wprt:CollationSupported>true</wprt:CollationSupported>
  <wprt:JogOffsetSupported>true</wprt:JogOffsetSupported>
  <wprt:DuplexerInstalled>true</wprt:DuplexerInstalled>
  <wprt:StaplerInstalled>true</wprt:StaplerInstalled>
  <wprt:HolePunchInstalled>true</wprt:HolePunchInstalled>
</wprt:Finishings>
<wprt:OutputBins>
  <wprt:OutputBinEntry Name="InternalTray1">
```

```xml
      <wprt:Capacity>500</wprt:Capacity>
      <wprt:Level>-1</wprt:Level>
    </wprt:OutputBinEntry>
    <wprt:OutputBinEntry Name="ExternalTray">
      <wprt:Capacity>100</wprt:Capacity>
      <wprt:Level>-1</wprt:Level>
    </wprt:OutputBinEntry>
    <wprt:OutputBinEntry Name="FinisherShiftTray1">
      <wprt:Capacity>500</wprt:Capacity>
      <wprt:Level>-1</wprt:Level>
    </wprt:OutputBinEntry>
    <wprt:OutputBinEntry Name="FinisherShiftTray2">
      <wprt:Capacity>1500</wprt:Capacity>
      <wprt:Level>-1</wprt:Level>
    </wprt:OutputBinEntry>
  </wprt:OutputBins>
  <rodp:RicohPrinterConfiguration>
    <rodp:Storage>
      <rodp:StorageEntry StorageName="RAM">
        <rodp:DisplayName xml:lang="en-US">Printer Memory</rodp:DisplayName>
        <rodp:DefaultOption>65536KB</rodp:DefaultOption>
        <rodp:ConcealFromUI ValueType="BOOL">
          <rodp:ConcealFromUIValue Value="TRUE"/>
        </rodp:ConcealFromUI>
        <rodp:MemoryEntry Name="65536KB">
          <rodp:DisplayName xml:lang="en-US">64MB</rodp:DisplayName>
          <rodp:MemoryConfigKB ValueType="PAIR">
            <rodp:MemoryConfigKBValue Value="65536"/>
            <rodp:MemoryConfigKBValue Value="56700"/>
          </rodp:MemoryConfigKB>
        </rodp:MemoryEntry>
      </rodp:StorageEntry>
      <rodp:StorageEntry StorageName="HardDisk">
        <rodp:DisplayName xml:lang="en-US">HardDisk</rodp:DisplayName>
        <rodp:DefaultOption>Installed</rodp:DefaultOption>
        <rodp:ConcealFromUI ValueType="BOOL">
          <rodp:ConcealFromUIValue Value="TRUE"/>
        </rodp:ConcealFromUI>
        <rodp:MemoryEntry Name="Installed">
          <rodp:DisplayName xml:lang="en-US">Installed</rodp:DisplayName>
        </rodp:MemoryEntry>
      </rodp:StorageEntry>
    </rodp:Storage>
    <rodp:HolePunchUnit>
      <rodp:DisplayName xml:lang="en-US">Punch Unit</rodp:DisplayName>
      <rodp:DefaultOption>NotInstalled</rodp:DefaultOption>
      <rodp:HolePunchUnitEntry Name="NotInstalled">
        <rodp:DisplayName xml:lang="en-US">Not Installed</rodp:DisplayName>
```

```xml
</rodp:HolePunchUnitEntry>
<rodp:HolePunchUnitEntry Name="2and3holes">
  <rodp:DisplayName xml:lang="en-US">2 and 3 holes</rodp:DisplayName>
</rodp:HolePunchUnitEntry>
<rodp:HolePunchUnitEntry Name="2and4holes">
  <rodp:DisplayName xml:lang="en-US">2 and 4 holes</rodp:DisplayName>
</rodp:HolePunchUnitEntry>
<rodp:HolePunchUnitEntry Name="2holesJP">
  <rodp:DisplayName xml:lang="en-US">2 holes type JP</rodp:DisplayName>
</rodp:HolePunchUnitEntry>
<rodp:HolePunchUnitEntry Name="4holesEU">
  <rodp:DisplayName xml:lang="en-US">4 holes type EU</rodp:DisplayName>
</rodp:HolePunchUnitEntry>
<rodp:HolePunchUnitEntry Name="4holesNE">
  <rodp:DisplayName xml:lang="en-US">4 holes type NE</rodp:DisplayName>
</rodp:HolePunchUnitEntry>
</rodp:HolePunchUnit>
<rodp:Finisher>
  <rodp:DisplayName xml:lang="en-US">Finisher</rodp:DisplayName>
  <rodp:DefaultOption>NotInstalled</rodp:DefaultOption>
  <rodp:FinisherEntry Name="NotInstalled">
    <rodp:DisplayName xml:lang="en-US">Not Installed</rodp:DisplayName>
  </rodp:FinisherEntry>
  <rodp:FinisherEntry Name="Finisher2000">
    <rodp:DisplayName xml:lang="en-US">2 Tray Finisher</rodp:DisplayName>
  </rodp:FinisherEntry>
  <rodp:FinisherEntry Name="BookletFinisher">
    <rodp:DisplayName xml:lang="en-US">Booklet Finisher</rodp:DisplayName>
  </rodp:FinisherEntry>
</rodp:Finisher>
<rodp:UVCoating>
  <DisplayName xml:lang="en-US">UVCoatingDisplayName_ENG</DisplayName>
  <DisplayName xml:lang="ja-JP">UVCoatingDisplayName_JP_特徴</DisplayName>
  <DisplayName xml:lang="zh-CN">UVCoatingDisplayName_CN_渡膜</DisplayName>
  <rodp:DefaultOption>UVCoatingOption1</rodp:DefaultOption>
  <rodp:UVCoatingEntry Name="UVCoatingOption1">
    <DisplayName xml:lang="en-US">UVCoatingOption1DisplayName_ENG</DisplayName>
    <DisplayName xml:lang="ja-JP">UVCoatingOption1DisplayName_JP_コーティング_オプション_1</DisplayName>
    <DisplayName xml:lang="zh-CN">UVCoatingOption1DisplayName_CN_渡膜_选项1</DisplayName>
  </rodp:UVCoatingEntry>
  <rodp:UVCoatingEntry Name="UVCoatingOption2">
```

```xml
      <DisplayName xml:lang="en-US">UVCoatingOption2DisplayName_ENG</DisplayName>
      <DisplayName xml:lang="ja-JP">UVCoatingOption2DisplayName_JP_コーティング_オプション_2</DisplayName>
      <DisplayName xml:lang="zh-CN">UVCoatingOption2DisplayName_CN_渡膜_选项2</DisplayName>
    </rodp:UVCoatingEntry>
    <rodp:UVCoatingEntry Name="UVCoatingOption3">
      <DisplayName xml:lang="en-US">UVCoatingOption3DisplayName_ENG</DisplayName>
      <DisplayName xml:lang="ja-JP">UVCoatingOption3DisplayName_JP_コーティング_オプション_3</DisplayName>
      <DisplayName xml:lang="zh-CN">UVCoatingOption3DisplayName_CN_渡膜_选项3</DisplayName>
    </rodp:UVCoatingEntry>
  </rodp:UVCoating>
  <rodp:LeftTray1and2>
    <rodp:DisplayName xml:lang="en-US">Left Tray 1 and 2</rodp:DisplayName>
    <rodp:DefaultOption>NotInstalled</rodp:DefaultOption>
    <rodp:LeftTray1and2Entry Name="NotInstalled">
      <rodp:DisplayName xml:lang="en-US">Not Installed</rodp:DisplayName>
    </rodp:LeftTray1and2Entry>
    <rodp:LeftTray1and2Entry Name="Installed">
      <rodp:DisplayName xml:lang="en-US">Installed</rodp:DisplayName>
    </rodp:LeftTray1and2Entry>
  </rodp:LeftTray1and2>
  <rodp:InputTray3>
    <rodp:DisplayName xml:lang="en-US">Tray 3</rodp:DisplayName>
    <rodp:DefaultOption>NotInstalled</rodp:DefaultOption>
    <rodp:InputTray3Entry Name="NotInstalled">
      <rodp:DisplayName xml:lang="en-US">Not Installed</rodp:DisplayName>
    </rodp:InputTray3Entry>
    <rodp:InputTray3Entry Name="Installed">
      <rodp:DisplayName xml:lang="en-US">Installed</rodp:DisplayName>
    </rodp:InputTray3Entry>
  </rodp:InputTray3>
  <rodp:InputTray4>
    <rodp:DisplayName xml:lang="en-US">Tray 4</rodp:DisplayName>
    <rodp:DefaultOption>NotInstalled</rodp:DefaultOption>
    <rodp:InputTray4Entry Name="NotInstalled">
      <rodp:DisplayName xml:lang="en-US">Not Installed</rodp:DisplayName>
    </rodp:InputTray4Entry>
    <rodp:InputTray4Entry Name="Installed">
      <rodp:DisplayName xml:lang="en-US">Installed</rodp:DisplayName>
    </rodp:InputTray4Entry>
  </rodp:InputTray4>
```

```
    <rodp:LargeCapacityTray>
      <rodp:DisplayName xml:lang="en-US">Large Capacity Tray</rodp:DisplayName>
      <rodp:DefaultOption>NotInstalled</rodp:DefaultOption>
      <rodp:LargeCapacityTrayEntry Name="NotInstalled">
        <rodp:DisplayName xml:lang="en-US">Not Installed</rodp:DisplayName>
      </rodp:LargeCapacityTrayEntry>
      <rodp:LargeCapacityTrayEntry Name="Installed">
        <rodp:DisplayName xml:lang="en-US">Installed</rodp:DisplayName>
      </rodp:LargeCapacityTrayEntry>
    </rodp:LargeCapacityTray>
  </rodp:RicohPrinterConfiguration>
</wprt:PrinterConfiguration>
<wprt:PrinterCapabilities>
  <wprt:JobValues>
    <wprt:JobProcessing>
      <wprt:Copies>
        <wprt:MinValue>1</wprt:MinValue>
        <wprt:MaxValue>999999</wprt:MaxValue>
      </wprt:Copies>
      <wprt:JobFinishings>
        <wprt:Staple>
          <wprt:Localtion>
            <wprt:AllowedValue>unknown</wprt:AllowedValue>
          </wprt:Localtion>
          <wprt:Angle>
            <wprt:AllowedValue>unknown</wprt:AllowedValue>
          </wprt:Angle>
        </wprt:Staple>
        <wprt:HolePunch>
          <wprt:Edge>
            <wprt:AllowedValue>unknown</wprt:AllowedValue>
          </wprt:Edge>
          <wprt:Pattern>
            <wprt:AllowedValue>unknown</wprt:AllowedValue>
          </wprt:Pattern>
        </wprt:HolePunch>
      </wprt:JobFinishings>
      <wprt:Priority>
        <wprt:MinValue>50</wprt:MinValue>
        <wprt:MaxValue>50</wprt:MaxValue>
      </wprt:Priority>
    </wprt:JobProcessing>
    <wprt:DocumentProcessing>
      <wprt:MediaSizeName>
        <wprt:AllowedValue>Letter</wprt:AllowedValue>
        <wprt:AllowedValue>unknown</wprt:AllowedValue>
      </wprt:MediaSizeName>
      <wprt:MediaType>
```

```xml
      <wprt:AllowedValue>unknown</wprt:AllowedValue>
    </wprt:MediaType>
    <wprt:MediaColor>
      <wprt:AllowedValue>unknown</wprt:AllowedValue>
    </wprt:MediaColor>
    <wprt:NumberUp>
      <wprt:PagesPerSheet>
        <wprt:AllowedValue>1</wprt:AllowedValue>
        <wprt:AllowedValue>2</wprt:AllowedValue>
        <wprt:AllowedValue>4</wprt:AllowedValue>
        <wprt:AllowedValue>9</wprt:AllowedValue>
        <wprt:AllowedValue>16</wprt:AllowedValue>
      </wprt:PagesPerSheet>
      <wprt:Direction>
        <wprt:AllowedValue>RightDown</wprt:AllowedValue>
        <wprt:AllowedValue>DownRight</wprt:AllowedValue>
        <wprt:AllowedValue>LeftDown</wprt:AllowedValue>
        <wprt:AllowedValue>DownLeft</wprt:AllowedValue>
      </wprt:Direction>
    </wprt:NumberUp>
    <wprt:Orientation>
      <wprt:AllowedValue>Landscape</wprt:AllowedValue>
      <wprt:AllowedValue>Portrait</wprt:AllowedValue>
      <wprt:AllowedValue>ReverseLandscape</wprt:AllowedValue>
      <wprt:AllowedValue>ReversePortrait</wprt:AllowedValue>
    </wprt:Orientation>
    <wprt:Resolution>
      <wprt:AllowedValue>
        <wprt:Width>1200</wprt:Width>
        <wprt:Height>1200</wprt:Height>
      </wprt:AllowedValue>
    </wprt:Resolution>
    <wprt:PrintQuality>
      <wprt:AllowedValue>Normal</wprt:AllowedValue>
    </wprt:PrintQuality>
    <wprt:Sides>
      <wprt:AllowedValue>OneSided</wprt:AllowedValue>
      <wprt:AllowedValue>TwoSidedLongEdge</wprt:AllowedValue>
      <wprt:AllowedValue>TwoSidedShortEdge</wprt:AllowedValue>
    </wprt:Sides>
  </wprt:DocumentProcessing>
</wprt:JobValues>
<wprt:DocumentValues>
  <wprt:DocumentDescription>
    <wprt:Compression>
      <wprt:AllowedValue>None</wprt:AllowedValue>
    </wprt:Compression>
    <wprt:Format>
```

```xml
      <wprt:AllowedValue>application/octet-stream</wprt:AllowedValue>
      <wprt:AllowedValue>unknown</wprt:AllowedValue>
    </wprt:Format>
  </wprt:DocumentDescription>
</wprt:DocumentValues>
<rodp:RicohPrinterCapabilities>
 <rodp:JobValues>
   <rodp:JobProcessing>
     <rodp:JobFinishings>
       <rodp:Collate>
         <rodp:DisplayName xml:lang="en-US">Collate</rodp:DisplayName>
         <rodp:AllowedValue>
           <rodp:Option>false</rodp:Option>
           <rodp:DisplayName xml:lang="en-US">OFF</rodp:DisplayName>
         </rodp:AllowedValue>
         <rodp:AllowedValue>
           <rodp:Option>true</rodp:Option>
           <rodp:DisplayName xml:lang="en-US">ON</rodp:DisplayName>
         </rodp:AllowedValue>
       </rodp:Collate>
       <rodp:Staple>
         <rodp:DisplayName xml:lang="en-US">Staple</rodp:DisplayName>
         <rodp:AllowedValue>
           <rodp:Option>OFF</rodp:Option>
           <rodp:DisplayName xml:lang="en-US">OFF</rodp:DisplayName>
         </rodp:AllowedValue>
         <rodp:AllowedValue>
           <rodp:Option>TopLeft</rodp:Option>
           <rodp:DisplayName xml:lang="en-US">Top Left</rodp:DisplayName>
         </rodp:AllowedValue>
         <rodp:AllowedValue>
           <rodp:Option>TopRight</rodp:Option>
           <rodp:DisplayName xml:lang="en-US">Top Right</rodp:DisplayName>
         </rodp:AllowedValue>
         <rodp:AllowedValue>
           <rodp:Option>Left2</rodp:Option>
           <rodp:DisplayName xml:lang="en-US">Left 2</rodp:DisplayName>
         </rodp:AllowedValue>
         <rodp:AllowedValue>
           <rodp:Option>Top2</rodp:Option>
           <rodp:DisplayName xml:lang="en-US">Top 2</rodp:DisplayName>
         </rodp:AllowedValue>
         <rodp:AllowedValue>
           <rodp:Option>Right2</rodp:Option>
           <rodp:DisplayName xml:lang="en-US">Right 2</rodp:DisplayName>
         </rodp:AllowedValue>
         <rodp:AllowedValue>
           <rodp:Option>TopLeftSlant</rodp:Option>
```

```xml
    <rodp:DisplayName xml:lang="en-US">Top Left Slant</rodp:DisplayName>
  </rodp:AllowedValue>
  <rodp:AllowedValue>
    <rodp:Option>TopRightSlant</rodp:Option>
    <rodp:DisplayName xml:lang="en-US">Top Right Slant</rodp:DisplayName>
  </rodp:AllowedValue>
  <rodp:AllowedValue>
    <rodp:Option>Booklet</rodp:Option>
    <rodp:DisplayName xml:lang="en-US">Booklet</rodp:DisplayName>
  </rodp:AllowedValue>
</rodp:Staple>
<rodp:HolePunch>
  <rodp:DisplayName xml:lang="en-US">Punch</rodp:DisplayName>
  <rodp:AllowedValue>
    <rodp:Option>OFF</rodp:Option>
    <rodp:DisplayName xml:lang="en-US">OFF</rodp:DisplayName>
  </rodp:AllowedValue>
  <rodp:AllowedValue>
    <rodp:Option>Left2</rodp:Option>
    <rodp:DisplayName xml:lang="en-US">Left 2</rodp:DisplayName>
  </rodp:AllowedValue>
  <rodp:AllowedValue>
    <rodp:Option>Top2</rodp:Option>
    <rodp:DisplayName xml:lang="en-US">Top 2</rodp:DisplayName>
  </rodp:AllowedValue>
  <rodp:AllowedValue>
    <rodp:Option>Right2</rodp:Option>
    <rodp:DisplayName xml:lang="en-US">Right 2</rodp:DisplayName>
  </rodp:AllowedValue>
  <rodp:AllowedValue>
    <rodp:Option>Left3</rodp:Option>
    <rodp:DisplayName xml:lang="en-US">Left 3</rodp:DisplayName>
  </rodp:AllowedValue>
  <rodp:AllowedValue>
    <rodp:Option>Top3</rodp:Option>
    <rodp:DisplayName xml:lang="en-US">Top 3</rodp:DisplayName>
  </rodp:AllowedValue>
  <rodp:AllowedValue>
    <rodp:Option>Right3</rodp:Option>
    <rodp:DisplayName xml:lang="en-US">Right 3</rodp:DisplayName>
  </rodp:AllowedValue>
  <rodp:AllowedValue>
    <rodp:Option>Left4</rodp:Option>
    <rodp:DisplayName xml:lang="en-US">Left 4</rodp:DisplayName>
  </rodp:AllowedValue>
  <rodp:AllowedValue>
    <rodp:Option>Top4</rodp:Option>
    <rodp:DisplayName xml:lang="en-US">Top 4</rodp:DisplayName>
```

```xml
      </rodp:AllowedValue>
      <rodp:AllowedValue>
        <rodp:Option>Right4</rodp:Option>
        <rodp:DisplayName xml:lang="en-US">Right 4</rodp:DisplayName>
      </rodp:AllowedValue>
    </rodp:HolePunch>
  </rodp:JobFinishings>
</rodp:JobProcessing>
<rodp:DocumentProcessing>
  <rodp:Orientation>
    <rodp:DisplayName xml:lang="en-US">Orientation</rodp:DisplayName>
    <rodp:AllowedValue>
      <rodp:Option>Landscape</rodp:Option>
      <rodp:DisplayName xml:lang="en-US">Landscape</rodp:DisplayName>
    </rodp:AllowedValue>
    <rodp:AllowedValue>
      <rodp:Option>Portrait</rodp:Option>
      <rodp:DisplayName xml:lang="en-US">Portrait</rodp:DisplayName>
    </rodp:AllowedValue>
  </rodp:Orientation>
  <rodp:Sides>
    <rodp:DisplayName xml:lang="en-US">Print on Both Sides</rodp:DisplayName>
    <rodp:AllowedValue>
      <rodp:Option>OneSided</rodp:Option>
      <rodp:DisplayName xml:lang="en-US">None</rodp:DisplayName>
    </rodp:AllowedValue>
    <rodp:AllowedValue>
      <rodp:Option>TwoSidedLongEdge</rodp:Option>
      <rodp:DisplayName xml:lang="en-US">Flip on long edge</rodp:DisplayName>
    </rodp:AllowedValue>
    <rodp:AllowedValue>
      <rodp:Option>TwoSidedShortEdge</rodp:Option>
      <rodp:DisplayName xml:lang="en-US">Flip on short edge</rodp:DisplayName>
    </rodp:AllowedValue>
  </rodp:Sides>
  <rodp:Resolution>
    <rodp:DisplayName xml:lang="en-US">Resolution</rodp:DisplayName>
    <rodp:AllowedValue>
      <rodp:Option>600</rodp:Option>
      <rodp:DisplayName xml:lang="en-US">600dpi</rodp:DisplayName>
    </rodp:AllowedValue>
    <rodp:AllowedValue>
      <rodp:Option>1200</rodp:Option>
      <rodp:DisplayName xml:lang="en-US">1200dpi</rodp:DisplayName>
    </rodp:AllowedValue>
  </rodp:Resolution>
  <rodp:MediaType>
    <rodp:DisplayName xml:lang="en-US">Media</rodp:DisplayName>
```

```
        <rodp:ConflictPriority ValueType="INT">
          <rodp:ConflictPriorityValue Value="30"/>
        </rodp:ConflictPriority>
        <rodp:AllowedValue>
          <rodp:Option>Auto</rodp:Option>
          <rodp:DisplayName xml:lang="en-US">Auto Select</rodp:DisplayName>
        </rodp:AllowedValue>
        <rodp:AllowedValue>
          <rodp:Option>STANDARD</rodp:Option>
          <rodp:DisplayName xml:lang="en-US">Plain Paper</rodp:DisplayName>
        </rodp:AllowedValue>
        <rodp:AllowedValue>
          <rodp:Option>Recycled</rodp:Option>
          <rodp:DisplayName xml:lang="en-US">Recycled</rodp:DisplayName>
        </rodp:AllowedValue>
        <rodp:AllowedValue>
          <rodp:Option>Special</rodp:Option>
          <rodp:DisplayName xml:lang="en-US">Special</rodp:DisplayName>
        </rodp:AllowedValue>
        <rodp:AllowedValue>
          <rodp:Option>Thick</rodp:Option>
          <rodp:DisplayName xml:lang="en-US">Thick</rodp:DisplayName>
        </rodp:AllowedValue>
        <rodp:AllowedValue>
          <rodp:Option>TRANSPARENCY</rodp:Option>
          <rodp:DisplayName xml:lang="en-US">Transparency</rodp:DisplayName>
        </rodp:AllowedValue>
        <rodp:AllowedValue>
          <rodp:Option>Color</rodp:Option>
          <rodp:DisplayName xml:lang="en-US">Color</rodp:DisplayName>
        </rodp:AllowedValue>
        <rodp:AllowedValue>
          <rodp:Option>Letterhead</rodp:Option>
          <rodp:DisplayName xml:lang="en-US">Letterhead</rodp:DisplayName>
        </rodp:AllowedValue>
        <rodp:AllowedValue>
          <rodp:Option>Preprinted</rodp:Option>
          <rodp:DisplayName xml:lang="en-US">Preprinted</rodp:DisplayName>
        </rodp:AllowedValue>
        <rodp:AllowedValue>
          <rodp:Option>Labels</rodp:Option>
          <rodp:DisplayName xml:lang="en-US">Labels</rodp:DisplayName>
        </rodp:AllowedValue>
        <rodp:AllowedValue>
          <rodp:Option>Plain_Duplex_Backside</rodp:Option>
          <rodp:DisplayName xml:lang="en-US">Plain (Duplex
Backside)</rodp:DisplayName>
        </rodp:AllowedValue>
```

```
    <rodp:AllowedValue>
     <rodp:Option>Thick_Duplex_Backside</rodp:Option>
     <rodp:DisplayName xml:lang="en-US">Thick (Duplex
Backside)</rodp:DisplayName>
    </rodp:AllowedValue>
   </rodp:MediaType>
   <rodp:MediaSizeName>
    <rodp:DisplayName xml:lang="en-US">Paper Size</rodp:DisplayName>
    <rodp:AllowedValue>
     <rodp:Option>na_arch-b_12x18in</rodp:Option>
     <rodp:DisplayName xml:lang="en-US">12x18</rodp:DisplayName>
     <rodp:PageDimensions ValueType="PAIR">
      <rodp:PageDimensionsValue Value="14400"/>
      <rodp:PageDimensionsValue Value="21600"/>
     </rodp:PageDimensions>
     <rodp:PrintableArea ValueType="PAIR">
      <rodp:PrintableAreaValue Value="14000"/>
      <rodp:PrintableAreaValue Value="21200"/>
     </rodp:PrintableArea>
     <rodp:PrintableOrigin ValueType="PAIR">
      <rodp:PrintableOriginValue Value="200"/>
      <rodp:PrintableOriginValue Value="200"/>
     </rodp:PrintableOrigin>
    </rodp:AllowedValue>
    <rodp:AllowedValue>
     <rodp:Option>na_ledger_11x17in</rodp:Option>
     <rodp:DisplayName xml:lang="en-US">11X17</rodp:DisplayName>
     <rodp:PrintableArea ValueType="PAIR">
      <rodp:PrintableAreaValue Value="12800"/>
      <rodp:PrintableAreaValue Value="20000"/>
     </rodp:PrintableArea>
     <rodp:PrintableOrigin ValueType="PAIR">
      <rodp:PrintableOriginValue Value="200"/>
      <rodp:PrintableOriginValue Value="200"/>
     </rodp:PrintableOrigin>
    </rodp:AllowedValue>
    <rodp:AllowedValue>
     <rodp:Option>na_legal_8.5x14in</rodp:Option>
     <rodp:DisplayName xml:lang="en-US">LEGAL</rodp:DisplayName>
     <rodp:PrintableArea ValueType="PAIR">
      <rodp:PrintableAreaValue Value="9800"/>
      <rodp:PrintableAreaValue Value="16400"/>
     </rodp:PrintableArea>
     <rodp:PrintableOrigin ValueType="PAIR">
      <rodp:PrintableOriginValue Value="200"/>
      <rodp:PrintableOriginValue Value="200"/>
     </rodp:PrintableOrigin>
    </rodp:AllowedValue>
```

```
<rodp:AllowedValue>
 <rodp:Option>na_letter_8.5x11in</rodp:Option>
 <rodp:DisplayName xml:lang="en-US">LETTER</rodp:DisplayName>
 <rodp:PrintableArea ValueType="PAIR">
  <rodp:PrintableAreaValue Value="9800"/>
  <rodp:PrintableAreaValue Value="12800"/>
 </rodp:PrintableArea>
 <rodp:PrintableOrigin ValueType="PAIR">
  <rodp:PrintableOriginValue Value="200"/>
  <rodp:PrintableOriginValue Value="200"/>
 </rodp:PrintableOrigin>
</rodp:AllowedValue>
<rodp:AllowedValue>
 <rodp:Option>na_executive_7.25x10.5in</rodp:Option>
 <rodp:DisplayName xml:lang="en-US">EXECUTIVE</rodp:DisplayName>
 <rodp:PrintableArea ValueType="PAIR">
  <rodp:PrintableAreaValue Value="8300"/>
  <rodp:PrintableAreaValue Value="12200"/>
 </rodp:PrintableArea>
 <rodp:PrintableOrigin ValueType="PAIR">
  <rodp:PrintableOriginValue Value="200"/>
  <rodp:PrintableOriginValue Value="200"/>
 </rodp:PrintableOrigin>
</rodp:AllowedValue>
<rodp:AllowedValue>
 <rodp:Option>na_invoice_5.5x8.5in</rodp:Option>
 <rodp:DisplayName xml:lang="en-US">STATEMENT</rodp:DisplayName>
 <rodp:PrintableArea ValueType="PAIR">
  <rodp:PrintableAreaValue Value="6200"/>
  <rodp:PrintableAreaValue Value="9800"/>
 </rodp:PrintableArea>
 <rodp:PrintableOrigin ValueType="PAIR">
  <rodp:PrintableOriginValue Value="200"/>
  <rodp:PrintableOriginValue Value="200"/>
 </rodp:PrintableOrigin>
</rodp:AllowedValue>
<rodp:AllowedValue>
 <rodp:Option>iso_a3_297x420mm</rodp:Option>
 <rodp:DisplayName xml:lang="en-US">A3</rodp:DisplayName>
 <rodp:PrintableArea ValueType="PAIR">
  <rodp:PrintableAreaValue Value="13628"/>
  <rodp:PrintableAreaValue Value="19440"/>
 </rodp:PrintableArea>
 <rodp:PrintableOrigin ValueType="PAIR">
  <rodp:PrintableOriginValue Value="200"/>
  <rodp:PrintableOriginValue Value="200"/>
 </rodp:PrintableOrigin>
</rodp:AllowedValue>
```

```
<rodp:AllowedValue>
 <rodp:Option>iso_a4_210x297mm</rodp:Option>
 <rodp:DisplayName xml:lang="en-US">A4</rodp:DisplayName>
 <rodp:PrintableArea ValueType="PAIR">
  <rodp:PrintableAreaValue Value="9520"/>
  <rodp:PrintableAreaValue Value="13628"/>
 </rodp:PrintableArea>
 <rodp:PrintableOrigin ValueType="PAIR">
  <rodp:PrintableOriginValue Value="200"/>
  <rodp:PrintableOriginValue Value="200"/>
 </rodp:PrintableOrigin>
</rodp:AllowedValue>
<rodp:AllowedValue>
 <rodp:Option>iso_a5_148x210mm</rodp:Option>
 <rodp:DisplayName xml:lang="en-US">A5</rodp:DisplayName>
 <rodp:PrintableArea ValueType="PAIR">
  <rodp:PrintableAreaValue Value="6592"/>
  <rodp:PrintableAreaValue Value="9520"/>
 </rodp:PrintableArea>
 <rodp:PrintableOrigin ValueType="PAIR">
  <rodp:PrintableOriginValue Value="200"/>
  <rodp:PrintableOriginValue Value="200"/>
 </rodp:PrintableOrigin>
</rodp:AllowedValue>
<rodp:AllowedValue>
 <rodp:Option>iso_a6_105x148mm</rodp:Option>
 <rodp:DisplayName xml:lang="en-US">A6</rodp:DisplayName>
 <rodp:PageDimensions ValueType="PAIR">
  <rodp:PageDimentsionValue Value="4956"/>
  <rodp:PageDimentsionValue Value="6996"/>
 </rodp:PageDimensions>
 <rodp:PrintableArea ValueType="PAIR">
  <rodp:PrintableAreaValue Value="4560"/>
  <rodp:PrintableAreaValue Value="6592"/>
 </rodp:PrintableArea>
 <rodp:PrintableOrigin ValueType="PAIR">
  <rodp:PrintableOriginValue Value="200"/>
  <rodp:PrintableOriginValue Value="200"/>
 </rodp:PrintableOrigin>
</rodp:AllowedValue>
<rodp:AllowedValue>
 <rodp:Option>jis_b4_257x364mm</rodp:Option>
 <rodp:DisplayName xml:lang="en-US">B4</rodp:DisplayName>
 <rodp:PrintableArea ValueType="PAIR">
  <rodp:PrintableAreaValue Value="11740"/>
  <rodp:PrintableAreaValue Value="16796"/>
 </rodp:PrintableArea>
 <rodp:PrintableOrigin ValueType="PAIR">
```

```xml
    <rodp:PrintableOriginValue Value="200"/>
    <rodp:PrintableOriginValue Value="200"/>
  </rodp:PrintableOrigin>
</rodp:AllowedValue>
<rodp:AllowedValue>
  <rodp:Option>jis_b5_182x257mm</rodp:Option>
  <rodp:DisplayName xml:lang="en-US">B5</rodp:DisplayName>
  <rodp:PrintableArea ValueType="PAIR">
    <rodp:PrintableAreaValue Value="8196"/>
    <rodp:PrintableAreaValue Value="11740"/>
  </rodp:PrintableArea>
  <rodp:PrintableOrigin ValueType="PAIR">
    <rodp:PrintableOriginValue Value="200"/>
    <rodp:PrintableOriginValue Value="200"/>
  </rodp:PrintableOrigin>
</rodp:AllowedValue>
<rodp:AllowedValue>
  <rodp:Option>na_number-10_4.125x9.5in</rodp:Option>
  <rodp:DisplayName xml:lang="en-US">ENV_10</rodp:DisplayName>
  <rodp:PrintableArea ValueType="PAIR">
    <rodp:PrintableAreaValue Value="4548"/>
    <rodp:PrintableAreaValue Value="11000"/>
  </rodp:PrintableArea>
  <rodp:PrintableOrigin ValueType="PAIR">
    <rodp:PrintableOriginValue Value="200"/>
    <rodp:PrintableOriginValue Value="200"/>
  </rodp:PrintableOrigin>
</rodp:AllowedValue>
<rodp:AllowedValue>
  <rodp:Option>iso_dl_110x220mm</rodp:Option>
  <rodp:DisplayName xml:lang="en-US">ENV_DL</rodp:DisplayName>
  <rodp:PrintableArea ValueType="PAIR">
    <rodp:PrintableAreaValue Value="4796"/>
    <rodp:PrintableAreaValue Value="9992"/>
  </rodp:PrintableArea>
  <rodp:PrintableOrigin ValueType="PAIR">
    <rodp:PrintableOriginValue Value="200"/>
    <rodp:PrintableOriginValue Value="200"/>
  </rodp:PrintableOrigin>
</rodp:AllowedValue>
<rodp:AllowedValue>
  <rodp:Option>na_monarch_3.875x7.5in</rodp:Option>
  <rodp:DisplayName xml:lang="en-US">ENV_MONARCH</rodp:DisplayName>
  <rodp:PrintableArea ValueType="PAIR">
    <rodp:PrintableAreaValue Value="4248"/>
    <rodp:PrintableAreaValue Value="8600"/>
  </rodp:PrintableArea>
  <rodp:PrintableOrigin ValueType="PAIR">
```

```xml
    <rodp:PrintableOriginValue Value="200"/>
    <rodp:PrintableOriginValue Value="200"/>
  </rodp:PrintableOrigin>
</rodp:AllowedValue>
<rodp:AllowedValue>
  <rodp:Option>iso_c5_162x229mm</rodp:Option>
  <rodp:DisplayName xml:lang="en-US">ENV_C5</rodp:DisplayName>
  <rodp:PrintableArea ValueType="PAIR">
    <rodp:PrintableAreaValue Value="7252"/>
    <rodp:PrintableAreaValue Value="10416"/>
  </rodp:PrintableArea>
  <rodp:PrintableOrigin ValueType="PAIR">
    <rodp:PrintableOriginValue Value="200"/>
    <rodp:PrintableOriginValue Value="200"/>
  </rodp:PrintableOrigin>
</rodp:AllowedValue>
<rodp:AllowedValue>
  <rodp:Option>iso_c6_114x162mm</rodp:Option>
  <rodp:DisplayName xml:lang="en-US">ENV_C6</rodp:DisplayName>
  <rodp:PrintableArea ValueType="PAIR">
    <rodp:PrintableAreaValue Value="4984"/>
    <rodp:PrintableAreaValue Value="7252"/>
  </rodp:PrintableArea>
  <rodp:PrintableOrigin ValueType="PAIR">
    <rodp:PrintableOriginValue Value="200"/>
    <rodp:PrintableOriginValue Value="200"/>
  </rodp:PrintableOrigin>
</rodp:AllowedValue>
<rodp:AllowedValue>
  <rodp:Option>na_foolscap_8.5x13in</rodp:Option>
  <rodp:DisplayName xml:lang="en-US">FOLIO</rodp:DisplayName>
  <rodp:PrintableArea ValueType="PAIR">
    <rodp:PrintableAreaValue Value="9800"/>
    <rodp:PrintableAreaValue Value="15200"/>
  </rodp:PrintableArea>
  <rodp:PrintableOrigin ValueType="PAIR">
    <rodp:PrintableOriginValue Value="200"/>
    <rodp:PrintableOriginValue Value="200"/>
  </rodp:PrintableOrigin>
</rodp:AllowedValue>
<rodp:AllowedValue>
  <rodp:Option>na_unknown_8.25x13in</rodp:Option>
  <rodp:DisplayName xml:lang="en-US">8_25x13</rodp:DisplayName>
  <rodp:PageDimensions ValueType="PAIR">
    <rodp:PageDimensionsValue Value="9900"/>
    <rodp:PageDimensionsValue Value="15600"/>
  </rodp:PageDimensions>
  <rodp:PrintableArea ValueType="PAIR">
```

```xml
    <rodp:PrintableAreaValue Value="9500"/>
    <rodp:PrintableAreaValue Value="15200"/>
  </rodp:PrintableArea>
  <rodp:PrintableOrigin ValueType="PAIR">
    <rodp:PrintableOriginValue Value="200"/>
    <rodp:PrintableOriginValue Value="200"/>
  </rodp:PrintableOrigin>
</rodp:AllowedValue>
<rodp:AllowedValue>
  <rodp:Option>na_govt-legal_8x13in</rodp:Option>
  <rodp:DisplayName xml:lang="en-US">8x13</rodp:DisplayName>
  <rodp:PageDimensions ValueType="PAIR">
    <rodp:PageDimensionsValue Value="9600"/>
    <rodp:PageDimensionsValue Value="15600"/>
  </rodp:PageDimensions>
  <rodp:PrintableArea ValueType="PAIR">
    <rodp:PrintableAreaValue Value="9200"/>
    <rodp:PrintableAreaValue Value="15200"/>
  </rodp:PrintableArea>
  <rodp:PrintableOrigin ValueType="PAIR">
    <rodp:PrintableOriginValue Value="200"/>
    <rodp:PrintableOriginValue Value="200"/>
  </rodp:PrintableOrigin>
</rodp:AllowedValue>
<rodp:AllowedValue>
  <rodp:Option>om_pa-kai_267x389mm</rodp:Option>
  <rodp:DisplayName xml:lang="en-US">8kai</rodp:DisplayName>
  <rodp:PageDimensions ValueType="PAIR">
    <rodp:PageDimensionsValue Value="12612"/>
    <rodp:PageDimensionsValue Value="18424"/>
  </rodp:PageDimensions>
  <rodp:PrintableArea ValueType="PAIR">
    <rodp:PrintableAreaValue Value="12212"/>
    <rodp:PrintableAreaValue Value="18024"/>
  </rodp:PrintableArea>
  <rodp:PrintableOrigin ValueType="PAIR">
    <rodp:PrintableOriginValue Value="200"/>
    <rodp:PrintableOriginValue Value="200"/>
  </rodp:PrintableOrigin>
</rodp:AllowedValue>
<rodp:AllowedValue>
  <rodp:Option>prc_16k_146x215mm</rodp:Option>
  <rodp:DisplayName xml:lang="en-US">16kai</rodp:DisplayName>
  <rodp:PageDimensions ValueType="PAIR">
    <rodp:PageDimensionsValue Value="9212"/>
    <rodp:PageDimensionsValue Value="12612"/>
  </rodp:PageDimensions>
  <rodp:PrintableArea ValueType="PAIR">
```

```xml
      <rodp:PrintableAreaValue Value="8812"/>
      <rodp:PrintableAreaValue Value="12212"/>
    </rodp:PrintableArea>
    <rodp:PrintableOrigin ValueType="PAIR">
      <rodp:PrintableOriginValue Value="200"/>
      <rodp:PrintableOriginValue Value="200"/>
    </rodp:PrintableOrigin>
  </rodp:AllowedValue>
  <rodp:AllowedValue>
    <rodp:Option>custom_papersize</rodp:Option>
    <rodp:DisplayName xml:lang="en-US">CUSTOMSIZE</rodp:DisplayName>
    <rodp:MinSize ValueType="PAIR">
      <rodp:MinSizeValue Value="4251"/>
      <rodp:MinSizeValue Value="6992"/>
    </rodp:MinSize>
    <rodp:MaxSize ValueType="PAIR">
      <rodp:MaxSizeValue Value="14412"/>
      <rodp:MaxSizeValue Value="28346"/>
    </rodp:MaxSize>
    <rodp:MaxPrintableWidth ValueType="INT">
      <rodp:MaxPrintableWidthValue Value="14412"/>
    </rodp:MaxPrintableWidth>
    <rodp:MinLeftMargin ValueType="INT">
      <rodp:MinLeftMarginValue Value="200"/>
    </rodp:MinLeftMargin>
    <rodp:TopMargin ValueType="INT">
      <rodp:TopMarginValue Value="200"/>
    </rodp:TopMargin>
    <rodp:BottomMargin ValueType="INT">
      <rodp:BottomMarginValue Value="200"/>
    </rodp:BottomMargin>
  </rodp:AllowedValue>
 </rodp:MediaSizeName>
</rodp:DocumentProcessing>
<rodp:RicohPrinterSettings>
 <rodp:ColorMode>
  <rodp:DisplayName xml:lang="en-US">Color Mode</rodp:DisplayName>
  <rodp:AllowedValue>
    <rodp:Option>24bpp</rodp:Option>
    <rodp:DisplayName xml:lang="en-US">True Color (24BPP)</rodp:DisplayName>
  </rodp:AllowedValue>
  <rodp:AllowedValue>
    <rodp:Option>Mono</rodp:Option>
    <rodp:DisplayName xml:lang="en-US">Monochrome</rodp:DisplayName>
  </rodp:AllowedValue>
 </rodp:ColorMode>
 <rodp:Dither>
  <rodp:DisplayName xml:lang="en-US">Dither</rodp:DisplayName>
```

```xml
<rodp:AllowedValue>
  <rodp:Option>High</rodp:Option>
  <rodp:DisplayName xml:lang="en-US">High</rodp:DisplayName>
</rodp:AllowedValue>
<rodp:AllowedValue>
  <rodp:Option>Low</rodp:Option>
  <rodp:DisplayName xml:lang="en-US">Low</rodp:DisplayName>
</rodp:AllowedValue>
</rodp:Dither>
<rodp:SlipSheet>
<rodp:DisplayName xml:lang="en-US">Slip Sheet</rodp:DisplayName>
<rodp:ConflictPriority ValueType="INT">
  <rodp:ConflictPriorityValue Value="10"/>
</rodp:ConflictPriority>
<rodp:AllowedValue>
  <rodp:Option>OFF</rodp:Option>
  <rodp:DisplayName xml:lang="en-US">Off</rodp:DisplayName>
</rodp:AllowedValue>
<rodp:AllowedValue>
  <rodp:Option>ON</rodp:Option>
  <rodp:DisplayName xml:lang="en-US">On</rodp:DisplayName>
</rodp:AllowedValue>
</rodp:SlipSheet>
<rodp:SlipSheetInputBin>
<rodp:DisplayName xml:lang="en-US">Slip Sheet Paper Source</rodp:DisplayName>
  <rodp:AllowedValue>
    <rodp:Option>Bypass</rodp:Option>
    <rodp:DisplayName xml:lang="en-US">Bypass Tray</rodp:DisplayName>
  </rodp:AllowedValue>
  <rodp:AllowedValue>
    <rodp:Option>Tray1</rodp:Option>
    <rodp:DisplayName xml:lang="en-US">Tray 1</rodp:DisplayName>
  </rodp:AllowedValue>
  <rodp:AllowedValue>
    <rodp:Option>Tray2</rodp:Option>
    <rodp:DisplayName xml:lang="en-US">Tray 2</rodp:DisplayName>
  </rodp:AllowedValue>
  <rodp:AllowedValue>
    <rodp:Option>Tray3</rodp:Option>
    <rodp:DisplayName xml:lang="en-US">Tray 3</rodp:DisplayName>
  </rodp:AllowedValue>
  <rodp:AllowedValue>
    <rodp:Option>Tray4</rodp:Option>
    <rodp:DisplayName xml:lang="en-US">Tray 4</rodp:DisplayName>
  </rodp:AllowedValue>
  <rodp:AllowedValue>
    <rodp:Option>LargeCapacity</rodp:Option>
```

```xml
      <rodp:DisplayName xml:lang="en-US">Large Capacity Tray</rodp:DisplayName>
     </rodp:AllowedValue>
    </rodp:SlipSheetInputBin>
    <rodp:InputBins>
     <rodp:DisplayName xml:lang="en-US">Paper Source</rodp:DisplayName>
     <rodp:ConflictPriority ValueType="INT">
      <rodp:ConflictPriorityValue Value="20"/>
     </rodp:ConflictPriority>
     <rodp:AllowedValue>
      <rodp:Option>AUTO</rodp:Option>
      <rodp:DisplayName xml:lang="en-US">Auto Select by Printer</rodp:DisplayName>
     </rodp:AllowedValue>
     <rodp:AllowedValue>
      <rodp:Option>Bypass</rodp:Option>
      <rodp:DisplayName xml:lang="en-US">Bypass Tray</rodp:DisplayName>
     </rodp:AllowedValue>
     <rodp:AllowedValue>
      <rodp:Option>Tray1</rodp:Option>
      <rodp:DisplayName xml:lang="en-US">Tray 1</rodp:DisplayName>
     </rodp:AllowedValue>
     <rodp:AllowedValue>
      <rodp:Option>Tray2</rodp:Option>
      <rodp:DisplayName xml:lang="en-US">Tray 2</rodp:DisplayName>
     </rodp:AllowedValue>
     <rodp:AllowedValue>
      <rodp:Option>Tray3</rodp:Option>
      <rodp:DisplayName xml:lang="en-US">Tray 3</rodp:DisplayName>
     </rodp:AllowedValue>
     <rodp:AllowedValue>
      <rodp:Option>Tray4</rodp:Option>
      <rodp:DisplayName xml:lang="en-US">Tray 4</rodp:DisplayName>
     </rodp:AllowedValue>
     <rodp:AllowedValue>
      <rodp:Option>LargeCapacity</rodp:Option>
      <rodp:DisplayName xml:lang="en-US">Large Capacity Tray</rodp:DisplayName>
     </rodp:AllowedValue>
    </rodp:InputBins>
    <rodp:OutputBins>
     <rodp:DisplayName xml:lang="en-US">Output Bin</rodp:DisplayName>
     <rodp:AllowedValue>
      <rodp:Option>PrinterDefault</rodp:Option>
      <rodp:DisplayName xml:lang="en-US">Printer Default</rodp:DisplayName>
     </rodp:AllowedValue>
     <rodp:AllowedValue>
      <rodp:Option>StandardTray</rodp:Option>
      <rodp:DisplayName xml:lang="en-US">Standard Tray</rodp:DisplayName>
     </rodp:AllowedValue>
```

```
      <rodp:AllowedValue>
        <rodp:Option>ExternalTray</rodp:Option>
        <rodp:DisplayName xml:lang="en-US">External Tray</rodp:DisplayName>
      </rodp:AllowedValue>
      <rodp:AllowedValue>
        <rodp:Option>FinisherShiftTray1</rodp:Option>
        <rodp:DisplayName xml:lang="en-US">Finisher Shift Tray 1</rodp:DisplayName>
      </rodp:AllowedValue>
      <rodp:AllowedValue>
        <rodp:Option>FinisherShiftTray2</rodp:Option>
        <rodp:DisplayName xml:lang="en-US">Finisher Shift Tray 2</rodp:DisplayName>
      </rodp:AllowedValue>
      <rodp:AllowedValue>
        <rodp:Option>FinisherShiftTray</rodp:Option>
        <rodp:DisplayName xml:lang="en-US">Finisher Shift Tray</rodp:DisplayName>
      </rodp:AllowedValue>
      <rodp:AllowedValue>
        <rodp:Option>FinisherBookletTray</rodp:Option>
        <rodp:DisplayName xml:lang="en-US">Booklet Finisher Tray</rodp:DisplayName>
      </rodp:AllowedValue>
      <rodp:AllowedValue>
        <rodp:Option>LeftTray1</rodp:Option>
        <rodp:DisplayName xml:lang="en-US">Left Tray 1</rodp:DisplayName>
      </rodp:AllowedValue>
      <rodp:AllowedValue>
        <rodp:Option>LeftTray2</rodp:Option>
        <rodp:DisplayName xml:lang="en-US">Left Tray 2</rodp:DisplayName>
      </rodp:AllowedValue>
     </rodp:OutputBins>
    </rodp:RicohPrinterSettings>
   </rodp:JobValues>
  </rodp:RicohPrinterCapabilities>
 </wprt:PrinterCapabilities>
 <wprt:DefaultPrintTicket>
  <wprt:JobDescription>
   <wprt:JobName>DefaultJob</wprt:JobName>
   <wprt:JobOriginatingUserName>DefaultUser</wprt:JobOriginatingUserName>
  </wprt:JobDescription>
  <wprt:JobProcessing>
   <wprt:Copies>1</wprt:Copies>
   <wprt:JobFinishings>
    <wprt:Collate>false</wprt:Collate>
    <wprt:JogOffset>false</wprt:JogOffset>
    <wprt:Staple>
     <wprt:Location>unknown</wprt:Location>
     <wprt:Angle>unknown</wprt:Angle>
    </wprt:Staple>
```

```xml
      <wprt:HolePunch>
        <wprt:Edge>unknown</wprt:Edge>
        <wprt:Pattern>unknown</wprt:Pattern>
      </wprt:HolePunch>
    </wprt:JobFinishings>
    <wprt:Priority>50</wprt:Priority>
  </wprt:JobProcessing>
  <wprt:DocumentProcessing>
    <wprt:MediaSizeName>na_letter_8.5x11in</wprt:MediaSizeName>
    <wprt:MediaType>Auto</wprt:MediaType>
    <wprt:MediaColor>unknown</wprt:MediaColor>
    <wprt:NumberUp>
      <wprt:PagesPerSheet>1</wprt:PagesPerSheet>
      <wprt:Direction>RightDown</wprt:Direction>
    </wprt:NumberUp>
    <wprt:Orientation>Portrait</wprt:Orientation>
    <wprt:Resolution>
      <wprt:Width>600</wprt:Width>
      <wprt:Height>600</wprt:Height>
    </wprt:Resolution>
    <wprt:PrintQuality>Normal</wprt:PrintQuality>
    <wprt:Sides>OneSided</wprt:Sides>
  </wprt:DocumentProcessing>
  <rodp:RicohDefaultPrintTicket>
    <rodp:JobProcessing>
      <rodp:JobType>Normal</rodp:JobType>
      <rodp:LogEnabled>Disabled</rodp:LogEnabled>
      <rodp:UserName>DefaultUser</rodp:UserName>
      <rodp:JobID>DefaultJobID</rodp:JobID>
      <rodp:Password>Password</rodp:Password>
      <rodp:UserCode>UserDode</rodp:UserCode>
      <rodp:JobName>DefaultJob</rodp:JobName>
      <rodp:JobFinishings>
        <rodp:Staple>OFF</rodp:Staple>
        <rodp:HolePunch>OFF</rodp:HolePunch>
      </rodp:JobFinishings>
    </rodp:JobProcessing>
    <rodp:DocumentProcessing/>
    <rodp:RicohPrinterSettings>
      <rodp:ColorMode>24bpp</rodp:ColorMode>
      <rodp:Dither>High</rodp:Dither>
      <rodp:InputBins>AUTO</rodp:InputBins>
      <rodp:OutputBins>PrinterDefault</rodp:OutputBins>
      <rodp:SlipSheet>OFF</rodp:SlipSheet>
      <rodp:SlipSheetInputBin>Bypass</rodp:SlipSheetInputBin>
    </rodp:RicohPrinterSettings>
  </rodp:RicohDefaultPrintTicket>
</wprt:DefaultPrintTicket>
```

```xml
<wprt:RicohExtensionData>
 <rodp:RicohExtensionData>
  <rodp:DeviceCategory Category="RicohWSDPrototype"/>
  <rodp:PDLHeader>
   <rodp:PrintRateUnit ValueType="DEF">
    <rodp:PrintRateUnitValue Value="PPM"/>
   </rodp:PrintRateUnit>
   <rodp:MasterUnits ValueType="PAIR">
    <rodp:MasterUnitsValue Value="1200"/>
    <rodp:MasterUnitsValue Value="1200"/>
   </rodp:MasterUnits>
   <rodp:PrinterType ValueType="DEF">
    <rodp:PrinterTypeValue Value="PAGE"/>
   </rodp:PrinterType>
   <rodp:Define ValueType="DEF">
    <rodp:DefineValue Value="RI_COLOR"/>
   </rodp:Define>
  </rodp:PDLHeader>
  <rodp:PDLOptionalHeader>
   <rodp:Support8CharPassword>
    <rodp:DisplayName xml:lang="en-US">Support8CharPassword</rodp:DisplayName>
    <rodp:ConcealFromUI ValueType="BOOL">
     <rodp:ConcealFromUIValue Value="TRUE"/>
    </rodp:ConcealFromUI>
    <rodp:DefaultOption>ON</rodp:DefaultOption>
    <rodp:AllowedValue>
     <rodp:Option>ON</rodp:Option>
     <rodp:DisplayName xml:lang="en-US">ON</rodp:DisplayName>
    </rodp:AllowedValue>
   </rodp:Support8CharPassword>
   <rodp:SupportDocUiReplace>
    <rodp:DisplayName xml:lang="en-US">SupportDocUiReplace</rodp:DisplayName>
    <rodp:ConcealFromUI ValueType="BOOL">
     <rodp:ConcealFromUIValue Value="TRUE"/>
    </rodp:ConcealFromUI>
    <rodp:DefaultOption>ON</rodp:DefaultOption>
    <rodp:AllowedValue>
     <rodp:Option>ON</rodp:Option>
     <rodp:DisplayName xml:lang="en-US">ON</rodp:DisplayName>
    </rodp:AllowedValue>
   </rodp:SupportDocUiReplace>
   <rodp:AutoConfig>
    <rodp:DisplayName xml:lang="en-US">AutoConfig</rodp:DisplayName>
    <rodp:ConcealFromUI ValueType="BOOL">
     <rodp:ConcealFromUIValue Value="TRUE"/>
    </rodp:ConcealFromUI>
    <rodp:DefaultOption>ON</rodp:DefaultOption>
    <rodp:AllowedValue>
```

```xml
    <rodp:Option>ON</rodp:Option>
    <rodp:DisplayName xml:lang="en-US">ON</rodp:DisplayName>
   </rodp:AllowedValue>
 </rodp:AutoConfig>
 <rodp:SupportSamplePrint>
  <rodp:DisplayName xml:lang="en-US">SupportSamplePrint</rodp:DisplayName>
  <rodp:ConcealFromUI ValueType="BOOL">
   <rodp:ConcealFromUIValue Value="TRUE"/>
  </rodp:ConcealFromUI>
  <rodp:DefaultOption>ON</rodp:DefaultOption>
  <rodp:AllowedValue>
   <rodp:Option>ON</rodp:Option>
   <rodp:DisplayName xml:lang="en-US">ON</rodp:DisplayName>
  </rodp:AllowedValue>
 </rodp:SupportSamplePrint>
 <rodp:SupportSecurePrint>
  <rodp:DisplayName xml:lang="en-US">SupportSecurePrint</rodp:DisplayName>
  <rodp:ConcealFromUI ValueType="BOOL">
   <rodp:ConcealFromUIValue Value="TRUE"/>
  </rodp:ConcealFromUI>
  <rodp:DefaultOption>ON</rodp:DefaultOption>
  <rodp:AllowedValue>
   <rodp:Option>ON</rodp:Option>
   <rodp:DisplayName xml:lang="en-US">ON</rodp:DisplayName>
  </rodp:AllowedValue>
 </rodp:SupportSecurePrint>
 <rodp:SupportHoldPrint>
  <rodp:DisplayName xml:lang="en-US">SupportHoldPrint</rodp:DisplayName>
  <rodp:ConcealFromUI ValueType="BOOL">
   <rodp:ConcealFromUIValue Value="TRUE"/>
  </rodp:ConcealFromUI>
  <rodp:DefaultOption>ON</rodp:DefaultOption>
  <rodp:AllowedValue>
   <rodp:Option>ON</rodp:Option>
   <rodp:DisplayName xml:lang="en-US">ON</rodp:DisplayName>
  </rodp:AllowedValue>
 </rodp:SupportHoldPrint>
 <rodp:SupportStoredPrint>
  <rodp:DisplayName xml:lang="en-US">SupportStoredPrint</rodp:DisplayName>
  <rodp:ConcealFromUI ValueType="BOOL">
   <rodp:ConcealFromUIValue Value="TRUE"/>
  </rodp:ConcealFromUI>
  <rodp:DefaultOption>ON</rodp:DefaultOption>
  <rodp:AllowedValue>
   <rodp:Option>ON</rodp:Option>
   <rodp:DisplayName xml:lang="en-US">ON</rodp:DisplayName>
  </rodp:AllowedValue>
 </rodp:SupportStoredPrint>
```

```xml
<rodp:SupportDocumentBox>
  <rodp:DisplayName xml:lang="en-US">SupportDocumentBox</rodp:DisplayName>
  <rodp:ConcealFromUI ValueType="BOOL">
    <rodp:ConcealFromUIValue Value="TRUE"/>
  </rodp:ConcealFromUI>
  <rodp:DefaultOption>ON</rodp:DefaultOption>
  <rodp:AllowedValue>
    <rodp:Option>ON</rodp:Option>
    <rodp:DisplayName xml:lang="en-US">ON</rodp:DisplayName>
  </rodp:AllowedValue>
</rodp:SupportDocumentBox>
</rodp:PDLOptionalHeader>
<rodp:DisplayOrder>
  <rodp:DeviceFeature Value="InputTray3"/>
  <rodp:DeviceFeature Value="InputTray4"/>
  <rodp:DeviceFeature Value="LargeCapacityTray"/>
  <rodp:DeviceFeature Value="LeftTray1and2"/>
  <rodp:DeviceFeature Value="Finisher"/>
  <rodp:DeviceFeature Value="HolePunchUnit"/>
  <rodp:DeviceFeature Value="MediaSizeName"/>
  <rodp:DeviceFeature Value="MediaType"/>
  <rodp:DeviceFeature Value="InputBins"/>
  <rodp:DeviceFeature Value="SlipSheet"/>
  <rodp:DeviceFeature Value="SlipSheetInputBin"/>
  <rodp:DeviceFeature Value="OutputBins"/>
  <rodp:DeviceFeature Value="Staple"/>
  <rodp:DeviceFeature Value="HolePunch"/>
  <rodp:DeviceFeature Value="Orientation"/>
  <rodp:DeviceFeature Value="Sides"/>
  <rodp:DeviceFeature Value="Resolution"/>
  <rodp:DeviceFeature Value="TrueTypeFormat"/>
  <rodp:DeviceFeature Value="ColorMode"/>
</rodp:DisplayOrder>
<rodp:DeviceConstraints>
  <rodp:FeatureConstraint Feature="Finisher" Option="NotInstalled">
    <rodp:Constraints>
      <rodp:Constraint Feature="OutputBins" Option="FinisherShiftTray1"/>
      <rodp:Constraint Feature="OutputBins" Option="FinisherShiftTray2"/>
      <rodp:Constraint Feature="OutputBins" Option="FinisherShiftTray"/>
      <rodp:Constraint Feature="OutputBins" Option="FinisherBookletTray"/>
      <rodp:Constraint Feature="HolePunchUnit" Option="2and3holes"/>
      <rodp:Constraint Feature="HolePunchUnit" Option="2and4holes"/>
      <rodp:Constraint Feature="HolePunchUnit" Option="2holesJP"/>
      <rodp:Constraint Feature="HolePunchUnit" Option="4holesEU"/>
      <rodp:Constraint Feature="HolePunchUnit" Option="4holesNE"/>
    </rodp:Constraints>
  </rodp:FeatureConstraint>
  <rodp:FeatureConstraint Feature="Finisher" Option="Finisher2000">
```

```xml
<rodp:Constraints>
  <rodp:Constraint Feature="LeftTray1and2" Option="Installed"/>
  <rodp:Constraint Feature="HolePunchUnit" Option="2holesJP"/>
  <rodp:Constraint Feature="HolePunchUnit" Option="4holesEU"/>
  <rodp:Constraint Feature="OutputBins" Option="FinisherShiftTray"/>
  <rodp:Constraint Feature="OutputBins" Option="FinisherBookletTray"/>
  <rodp:Constraint Feature="OutputBins" Option="LeftTray1"/>
  <rodp:Constraint Feature="OutputBins" Option="LeftTray2"/>
</rodp:Constraints>
</rodp:FeatureConstraint>
<rodp:FeatureConstraint Feature="Finisher" Option="BookletFinisher">
  <rodp:Constraints>
    <rodp:Constraint Feature="LeftTray1and2" Option="Installed"/>
    <rodp:Constraint Feature="HolePunchUnit" Option="2and4holes"/>
    <rodp:Constraint Feature="OutputBins" Option="FinisherShiftTray1"/>
    <rodp:Constraint Feature="OutputBins" Option="FinisherShiftTray2"/>
    <rodp:Constraint Feature="OutputBins" Option="LeftTray1"/>
    <rodp:Constraint Feature="OutputBins" Option="LeftTray2"/>
  </rodp:Constraints>
</rodp:FeatureConstraint>
<rodp:FeatureConstraint Feature="LeftTray1and2" Option="NotInstalled">
  <rodp:Constraints>
    <rodp:Constraint Feature="OutputBins" Option="LeftTray1"/>
    <rodp:Constraint Feature="OutputBins" Option="LeftTray2"/>
  </rodp:Constraints>
</rodp:FeatureConstraint>
<rodp:FeatureConstraint Feature="LeftTray1and2" Option="Installed">
  <rodp:Constraints>
    <rodp:Constraint Feature="HolePunchUnit" Option="2holesJP"/>
    <rodp:Constraint Feature="HolePunchUnit" Option="4holesEU"/>
    <rodp:Constraint Feature="HolePunchUnit" Option="4holesNE"/>
    <rodp:Constraint Feature="HolePunchUnit" Option="2and3holes"/>
    <rodp:Constraint Feature="HolePunchUnit" Option="2and4holes"/>
    <rodp:Constraint Feature="OutputBins" Option="FinisherShiftTray1"/>
    <rodp:Constraint Feature="OutputBins" Option="FinisherShiftTray2"/>
    <rodp:Constraint Feature="OutputBins" Option="FinisherShiftTray"/>
    <rodp:Constraint Feature="OutputBins" Option="FinisherBookletTray"/>
  </rodp:Constraints>
</rodp:FeatureConstraint>
<rodp:FeatureConstraint Feature="InputTray4" Option="Installed">
  <rodp:Constraints>
    <rodp:Constraint Feature="InputTray3" Option="NotInstalled"/>
  </rodp:Constraints>
</rodp:FeatureConstraint>
<rodp:FeatureConstraint Feature="HolePunchUnit" Option="NotInstalled">
  <rodp:Constraints>
    <rodp:Constraint Feature="HolePunch" Option="Left2"/>
    <rodp:Constraint Feature="HolePunch" Option="Top2"/>
```

```xml
      <rodp:Constraint Feature="HolePunch" Option="Right2"/>
      <rodp:Constraint Feature="HolePunch" Option="Left3"/>
      <rodp:Constraint Feature="HolePunch" Option="Top3"/>
      <rodp:Constraint Feature="HolePunch" Option="Right3"/>
      <rodp:Constraint Feature="HolePunch" Option="Left4"/>
      <rodp:Constraint Feature="HolePunch" Option="Top4"/>
      <rodp:Constraint Feature="HolePunch" Option="Right4"/>
    </rodp:Constraints>
  </rodp:FeatureConstraint>
  <rodp:FeatureConstraint Feature="HolePunchUnit" Option="2and3holes">
    <rodp:Constraints>
      <rodp:Constraint Feature="HolePunch" Option="Left4"/>
      <rodp:Constraint Feature="HolePunch" Option="Top4"/>
      <rodp:Constraint Feature="HolePunch" Option="Right4"/>
    </rodp:Constraints>
  </rodp:FeatureConstraint>
  <rodp:FeatureConstraint Feature="HolePunchUnit" Option="2and4holes">
    <rodp:Constraints>
      <rodp:Constraint Feature="HolePunch" Option="Left3"/>
      <rodp:Constraint Feature="HolePunch" Option="Top3"/>
      <rodp:Constraint Feature="HolePunch" Option="Right3"/>
    </rodp:Constraints>
  </rodp:FeatureConstraint>
  <rodp:FeatureConstraint Feature="HolePunchUnit" Option="2holesJP">
    <rodp:Constraints>
      <rodp:Constraint Feature="HolePunch" Option="Left4"/>
      <rodp:Constraint Feature="HolePunch" Option="Top4"/>
      <rodp:Constraint Feature="HolePunch" Option="Right4"/>
      <rodp:Constraint Feature="HolePunch" Option="Left3"/>
      <rodp:Constraint Feature="HolePunch" Option="Top3"/>
      <rodp:Constraint Feature="HolePunch" Option="Right3"/>
    </rodp:Constraints>
  </rodp:FeatureConstraint>
  <rodp:FeatureConstraint Feature="HolePunchUnit" Option="4holesEU">
    <rodp:Constraints>
      <rodp:Constraint Feature="HolePunch" Option="Left2"/>
      <rodp:Constraint Feature="HolePunch" Option="Top2"/>
      <rodp:Constraint Feature="HolePunch" Option="Right2"/>
      <rodp:Constraint Feature="HolePunch" Option="Left3"/>
      <rodp:Constraint Feature="HolePunch" Option="Top3"/>
      <rodp:Constraint Feature="HolePunch" Option="Right3"/>
    </rodp:Constraints>
  </rodp:FeatureConstraint>
  <rodp:FeatureConstraint Feature="HolePunchUnit" Option="4holesNE">
    <rodp:Constraints>
      <rodp:Constraint Feature="HolePunch" Option="Left2"/>
      <rodp:Constraint Feature="HolePunch" Option="Top2"/>
      <rodp:Constraint Feature="HolePunch" Option="Right2"/>
```

```xml
      <rodp:Constraint Feature="HolePunch" Option="Left3"/>
      <rodp:Constraint Feature="HolePunch" Option="Top3"/>
      <rodp:Constraint Feature="HolePunch" Option="Right3"/>
    </rodp:Constraints>
  </rodp:FeatureConstraint>
  <rodp:FeatureConstraint Feature="OutputBins" Option="StandardTray">
    <rodp:DisabledFeatures ValueType="LIST">
      <rodp:DisabledFeature Value="Staple"/>
    </rodp:DisabledFeatures>
    <rodp:DisabledFeatures ValueType="LIST">
      <rodp:DisabledFeature Value="HolePunch"/>
    </rodp:DisabledFeatures>
    <rodp:Constraints>
      <rodp:Constraint Feature="Staple" Option="TopLeft"/>
      <rodp:Constraint Feature="Staple" Option="TopLeftSlant"/>
      <rodp:Constraint Feature="Staple" Option="TopRight"/>
      <rodp:Constraint Feature="Staple" Option="TopRightSlant"/>
      <rodp:Constraint Feature="Staple" Option="Top2"/>
      <rodp:Constraint Feature="Staple" Option="Left2"/>
      <rodp:Constraint Feature="Staple" Option="Right2"/>
      <rodp:Constraint Feature="Staple" Option="Booklet"/>
      <rodp:Constraint Feature="HolePunch" Option="Left2"/>
      <rodp:Constraint Feature="HolePunch" Option="Top2"/>
      <rodp:Constraint Feature="HolePunch" Option="Right2"/>
      <rodp:Constraint Feature="HolePunch" Option="Left3"/>
      <rodp:Constraint Feature="HolePunch" Option="Top3"/>
      <rodp:Constraint Feature="HolePunch" Option="Right3"/>
      <rodp:Constraint Feature="HolePunch" Option="Left4"/>
      <rodp:Constraint Feature="HolePunch" Option="Top4"/>
      <rodp:Constraint Feature="HolePunch" Option="Right4"/>
    </rodp:Constraints>
  </rodp:FeatureConstraint>
  <rodp:FeatureConstraint Feature="OutputBins" Option="ExternalTray">
    <rodp:DisabledFeatures ValueType="LIST">
      <rodp:DisabledFeature Value="Staple"/>
    </rodp:DisabledFeatures>
    <rodp:DisabledFeatures ValueType="LIST">
      <rodp:DisabledFeature Value="HolePunch"/>
    </rodp:DisabledFeatures>
    <rodp:Constraints>
      <rodp:Constraint Feature="Staple" Option="TopLeft"/>
      <rodp:Constraint Feature="Staple" Option="TopLeftSlant"/>
      <rodp:Constraint Feature="Staple" Option="TopRight"/>
      <rodp:Constraint Feature="Staple" Option="TopRightSlant"/>
      <rodp:Constraint Feature="Staple" Option="Top2"/>
      <rodp:Constraint Feature="Staple" Option="Left2"/>
      <rodp:Constraint Feature="Staple" Option="Right2"/>
      <rodp:Constraint Feature="Staple" Option="Booklet"/>
```

```
    <rodp:Constraint Feature="HolePunch" Option="Left2"/>
    <rodp:Constraint Feature="HolePunch" Option="Top2"/>
    <rodp:Constraint Feature="HolePunch" Option="Right2"/>
    <rodp:Constraint Feature="HolePunch" Option="Left3"/>
    <rodp:Constraint Feature="HolePunch" Option="Top3"/>
    <rodp:Constraint Feature="HolePunch" Option="Right3"/>
    <rodp:Constraint Feature="HolePunch" Option="Left4"/>
    <rodp:Constraint Feature="HolePunch" Option="Top4"/>
    <rodp:Constraint Feature="HolePunch" Option="Right4"/>
    <rodp:Constraint Feature="Sides" Option="TwoSidedLongEdge"/>
    <rodp:Constraint Feature="Sides" Option="TwoSidedShortEdge"/>
  </rodp:Constraints>
</rodp:FeatureConstraint>
<rodp:FeatureConstraint Feature="OutputBins" Option="FinisherShiftTray1">
  <rodp:Constraints>
    <rodp:Constraint Feature="Staple" Option="Booklet"/>
  </rodp:Constraints>
</rodp:FeatureConstraint>
<rodp:FeatureConstraint Feature="OutputBins" Option="FinisherShiftTray2">
  <rodp:Constraints>
    <rodp:Constraint Feature="Staple" Option="Booklet"/>
  </rodp:Constraints>
</rodp:FeatureConstraint>
<rodp:FeatureConstraint Feature="OutputBins" Option="FinisherShiftTray">
  <rodp:Constraints>
    <rodp:Constraint Feature="Staple" Option="Booklet"/>
  </rodp:Constraints>
</rodp:FeatureConstraint>
<rodp:FeatureConstraint Feature="OutputBins" Option="FinisherBookletTray">
  <rodp:DisabledFeatures ValueType="LIST">
    <rodp:DisabledFeature Value="HolePunch"/>
  </rodp:DisabledFeatures>
  <rodp:Constraints>
    <rodp:Constraint Feature="Staple" Option="TopLeft"/>
    <rodp:Constraint Feature="Staple" Option="TopLeftSlant"/>
    <rodp:Constraint Feature="Staple" Option="TopRight"/>
    <rodp:Constraint Feature="Staple" Option="TopRightSlant"/>
    <rodp:Constraint Feature="Staple" Option="Top2"/>
    <rodp:Constraint Feature="Staple" Option="Left2"/>
    <rodp:Constraint Feature="Staple" Option="Right2"/>
    <rodp:Constraint Feature="HolePunch" Option="Left2"/>
    <rodp:Constraint Feature="HolePunch" Option="Top2"/>
    <rodp:Constraint Feature="HolePunch" Option="Right2"/>
    <rodp:Constraint Feature="HolePunch" Option="Left3"/>
    <rodp:Constraint Feature="HolePunch" Option="Top3"/>
    <rodp:Constraint Feature="HolePunch" Option="Right3"/>
    <rodp:Constraint Feature="HolePunch" Option="Left4"/>
    <rodp:Constraint Feature="HolePunch" Option="Top4"/>
```

```xml
      <rodp:Constraint Feature="HolePunch" Option="Right4"/>
    </rodp:Constraints>
 </rodp:FeatureConstraint>
 <rodp:FeatureConstraint Feature="OutputBins" Option="LeftTray1">
    <rodp:DisabledFeatures ValueType="LIST">
      <rodp:DisabledFeature Value="Staple"/>
    </rodp:DisabledFeatures>
    <rodp:DisabledFeatures ValueType="LIST">
      <rodp:DisabledFeature Value="HolePunch"/>
    </rodp:DisabledFeatures>
    <rodp:Constraints>
      <rodp:Constraint Feature="Staple" Option="TopLeft"/>
      <rodp:Constraint Feature="Staple" Option="TopLeftSlant"/>
      <rodp:Constraint Feature="Staple" Option="TopRight"/>
      <rodp:Constraint Feature="Staple" Option="TopRightSlant"/>
      <rodp:Constraint Feature="Staple" Option="Top2"/>
      <rodp:Constraint Feature="Staple" Option="Left2"/>
      <rodp:Constraint Feature="Staple" Option="Right2"/>
      <rodp:Constraint Feature="Staple" Option="Booklet"/>
      <rodp:Constraint Feature="HolePunch" Option="Left2"/>
      <rodp:Constraint Feature="HolePunch" Option="Top2"/>
      <rodp:Constraint Feature="HolePunch" Option="Right2"/>
      <rodp:Constraint Feature="HolePunch" Option="Left3"/>
      <rodp:Constraint Feature="HolePunch" Option="Top3"/>
      <rodp:Constraint Feature="HolePunch" Option="Right3"/>
      <rodp:Constraint Feature="HolePunch" Option="Left4"/>
      <rodp:Constraint Feature="HolePunch" Option="Top4"/>
      <rodp:Constraint Feature="HolePunch" Option="Right4"/>
    </rodp:Constraints>
 </rodp:FeatureConstraint>
 <rodp:FeatureConstraint Feature="OutputBins" Option="LeftTray2">
    <rodp:DisabledFeatures ValueType="LIST">
      <rodp:DisabledFeature Value="Staple"/>
    </rodp:DisabledFeatures>
    <rodp:DisabledFeatures ValueType="LIST">
      <rodp:DisabledFeature Value="HolePunch"/>
    </rodp:DisabledFeatures>
    <rodp:Constraints>
      <rodp:Constraint Feature="Staple" Option="TopLeft"/>
      <rodp:Constraint Feature="Staple" Option="TopLeftSlant"/>
      <rodp:Constraint Feature="Staple" Option="TopRight"/>
      <rodp:Constraint Feature="Staple" Option="TopRightSlant"/>
      <rodp:Constraint Feature="Staple" Option="Top2"/>
      <rodp:Constraint Feature="Staple" Option="Left2"/>
      <rodp:Constraint Feature="Staple" Option="Right2"/>
      <rodp:Constraint Feature="Staple" Option="Booklet"/>
      <rodp:Constraint Feature="HolePunch" Option="Left2"/>
      <rodp:Constraint Feature="HolePunch" Option="Top2"/>
```

```xml
      <rodp:Constraint Feature="HolePunch" Option="Right2"/>
      <rodp:Constraint Feature="HolePunch" Option="Left3"/>
      <rodp:Constraint Feature="HolePunch" Option="Top3"/>
      <rodp:Constraint Feature="HolePunch" Option="Right3"/>
      <rodp:Constraint Feature="HolePunch" Option="Left4"/>
      <rodp:Constraint Feature="HolePunch" Option="Top4"/>
      <rodp:Constraint Feature="HolePunch" Option="Right4"/>
    </rodp:Constraints>
  </rodp:FeatureConstraint>
  <rodp:GlobalConstraints>
    <rodp:InvalidCombinations>
      <rodp:InvalidCombination Feature="InputBins" Option="Tray1"/>
      <rodp:InvalidCombination Feature="MediaType" Option="TRANSPARENCY"/>
    </rodp:InvalidCombinations>
    <rodp:InvalidCombinations>
      <rodp:InvalidCombination Feature="InputBins" Option="Tray1"/>
      <rodp:InvalidCombination Feature="MediaType" Option="Thick"/>
    </rodp:InvalidCombinations>
    <rodp:InvalidCombinations>
      <rodp:InvalidCombination Feature="InputBins" Option="Tray1"/>
      <rodp:InvalidCombination Feature="MediaType" Option="Labels"/>
    </rodp:InvalidCombinations>
    <rodp:InvalidCombinations>
      <rodp:InvalidCombination Feature="InputBins" Option="Tray1"/>
      <rodp:InvalidCombination Feature="MediaType" Option="Plain_Duplex_Backside"/>
    </rodp:InvalidCombinations>
    <rodp:InvalidCombinations>
      <rodp:InvalidCombination Feature="InputBins" Option="Tray1"/>
      <rodp:InvalidCombination Feature="MediaType" Option="Thick_Duplex_Backside"/>
    </rodp:InvalidCombinations>
    <rodp:InvalidCombinations>
      <rodp:InvalidCombination Feature="InputBins" Option="Tray2"/>
      <rodp:InvalidCombination Feature="MediaType" Option="TRANSPARENCY"/>
    </rodp:InvalidCombinations>
    <rodp:InvalidCombinations>
      <rodp:InvalidCombination Feature="InputBins" Option="Tray2"/>
      <rodp:InvalidCombination Feature="MediaType" Option="Thick"/>
    </rodp:InvalidCombinations>
    <rodp:InvalidCombinations>
      <rodp:InvalidCombination Feature="InputBins" Option="Tray2"/>
      <rodp:InvalidCombination Feature="MediaType" Option="Labels"/>
    </rodp:InvalidCombinations>
    <rodp:InvalidCombinations>
      <rodp:InvalidCombination Feature="InputBins" Option="Tray2"/>
      <rodp:InvalidCombination Feature="MediaType" Option="Plain_Duplex_Backside"/>
```

```xml
      </rodp:InvalidCombinations>
      <rodp:InvalidCombinations>
        <rodp:InvalidCombination Feature="InputBins" Option="Tray2"/>
        <rodp:InvalidCombination Feature="MediaType" Option="Thick_Duplex_Backside"/>
      </rodp:InvalidCombinations>
      <rodp:InvalidCombinations>
        <rodp:InvalidCombination Feature="InputBins" Option="Tray3"/>
        <rodp:InvalidCombination Feature="MediaType" Option="TRANSPARENCY"/>
      </rodp:InvalidCombinations>
      <rodp:InvalidCombinations>
        <rodp:InvalidCombination Feature="InputBins" Option="Tray3"/>
        <rodp:InvalidCombination Feature="MediaType" Option="Thick"/>
      </rodp:InvalidCombinations>
      <rodp:InvalidCombinations>
        <rodp:InvalidCombination Feature="InputBins" Option="Tray3"/>
        <rodp:InvalidCombination Feature="MediaType" Option="Labels"/>
      </rodp:InvalidCombinations>
      <rodp:InvalidCombinations>
        <rodp:InvalidCombination Feature="InputBins" Option="Tray3"/>
        <rodp:InvalidCombination Feature="MediaType" Option="Plain_Duplex_Backside"/>
      </rodp:InvalidCombinations>
      <rodp:InvalidCombinations>
        <rodp:InvalidCombination Feature="InputBins" Option="Tray3"/>
        <rodp:InvalidCombination Feature="MediaType" Option="Thick_Duplex_Backside"/>
      </rodp:InvalidCombinations>
      <rodp:InvalidCombinations>
        <rodp:InvalidCombination Feature="InputBins" Option="Tray4"/>
        <rodp:InvalidCombination Feature="MediaType" Option="TRANSPARENCY"/>
      </rodp:InvalidCombinations>
      <rodp:InvalidCombinations>
        <rodp:InvalidCombination Feature="InputBins" Option="Tray4"/>
        <rodp:InvalidCombination Feature="MediaType" Option="Thick"/>
      </rodp:InvalidCombinations>
      <rodp:InvalidCombinations>
        <rodp:InvalidCombination Feature="InputBins" Option="Tray4"/>
        <rodp:InvalidCombination Feature="MediaType" Option="Labels"/>
      </rodp:InvalidCombinations>
      <rodp:InvalidCombinations>
        <rodp:InvalidCombination Feature="InputBins" Option="Tray4"/>
        <rodp:InvalidCombination Feature="MediaType" Option="Plain_Duplex_Backside"/>
      </rodp:InvalidCombinations>
      <rodp:InvalidCombinations>
        <rodp:InvalidCombination Feature="InputBins" Option="Tray4"/>
```

```xml
    <rodp:InvalidCombination Feature="MediaType" Option="Thick_Duplex_Backside"/>
  </rodp:InvalidCombinations>
  <rodp:InvalidCombinations>
    <rodp:InvalidCombination Feature="InputBins" Option="LARGECAPACITY"/>
    <rodp:InvalidCombination Feature="MediaType" Option="TRANSPARENCY"/>
  </rodp:InvalidCombinations>
  <rodp:InvalidCombinations>
    <rodp:InvalidCombination Feature="InputBins" Option="LARGECAPACITY"/>
    <rodp:InvalidCombination Feature="MediaType" Option="Thick"/>
  </rodp:InvalidCombinations>
  <rodp:InvalidCombinations>
    <rodp:InvalidCombination Feature="InputBins" Option="LARGECAPACITY"/>
    <rodp:InvalidCombination Feature="MediaType" Option="Labels"/>
  </rodp:InvalidCombinations>
  <rodp:InvalidCombinations>
    <rodp:InvalidCombination Feature="InputBins" Option="LARGECAPACITY"/>
    <rodp:InvalidCombination Feature="MediaType" Option="Plain_Duplex_Backside"/>
  </rodp:InvalidCombinations>
  <rodp:InvalidCombinations>
    <rodp:InvalidCombination Feature="InputBins" Option="LARGECAPACITY"/>
    <rodp:InvalidCombination Feature="MediaType" Option="Thick_Duplex_Backside"/>
  </rodp:InvalidCombinations>
  <rodp:InvalidCombinations>
    <rodp:InvalidCombination Feature="InputTray3" Option="NotInstalled"/>
    <rodp:InvalidCombination Feature="InputBins" Option="Tray3"/>
  </rodp:InvalidCombinations>
  <rodp:InvalidCombinations>
    <rodp:InvalidCombination Feature="InputTray4" Option="NotInstalled"/>
    <rodp:InvalidCombination Feature="InputBins" Option="Tray4"/>
  </rodp:InvalidCombinations>
  <rodp:InvalidCombinations>
    <rodp:InvalidCombination Feature="LargeCapacityTray" Option="NotInstalled"/>
    <rodp:InvalidCombination Feature="InputBins" Option="LARGECAPACITY"/>
  </rodp:InvalidCombinations>
  <rodp:InvalidCombinations>
    <rodp:InvalidCombination Feature="InputTray3" Option="NotInstalled"/>
    <rodp:InvalidCombination Feature="SlipSheetInputBin" Option="Tray3"/>
  </rodp:InvalidCombinations>
  <rodp:InvalidCombinations>
    <rodp:InvalidCombination Feature="InputTray4" Option="NotInstalled"/>
    <rodp:InvalidCombination Feature="SlipSheetInputBin" Option="Tray4"/>
  </rodp:InvalidCombinations>
  <rodp:InvalidCombinations>
    <rodp:InvalidCombination Feature="LargeCapacityTray" Option="NotInstalled"/>
```

```xml
      <rodp:InvalidCombination Feature="SlipSheetInputBin" Option="LARGECAPACITY"/>
    </rodp:InvalidCombinations>
    <rodp:InvalidCombinations>
      <rodp:InvalidCombination Feature="InputBins" Option="BypassTray"/>
      <rodp:InvalidCombination Feature="Sides" Option="TwoSidedLongEdge"/>
    </rodp:InvalidCombinations>
    <rodp:InvalidCombinations>
      <rodp:InvalidCombination Feature="InputBins" Option="BypassTray"/>
      <rodp:InvalidCombination Feature="Sides" Option="TwoSidedShortEdge"/>
    </rodp:InvalidCombinations>
    <rodp:InvalidCombinations>
      <rodp:InvalidCombination Feature="InputBins" Option="BypassTray"/>
      <rodp:InvalidCombination Feature="Staple" Option="TopLeft"/>
    </rodp:InvalidCombinations>
    <rodp:InvalidCombinations>
      <rodp:InvalidCombination Feature="InputBins" Option="BypassTray"/>
      <rodp:InvalidCombination Feature="Staple" Option="TopRight"/>
    </rodp:InvalidCombinations>
    <rodp:InvalidCombinations>
      <rodp:InvalidCombination Feature="InputBins" Option="BypassTray"/>
      <rodp:InvalidCombination Feature="Staple" Option="Top2"/>
    </rodp:InvalidCombinations>
    <rodp:InvalidCombinations>
      <rodp:InvalidCombination Feature="InputBins" Option="BypassTray"/>
      <rodp:InvalidCombination Feature="Staple" Option="Left2"/>
    </rodp:InvalidCombinations>
    <rodp:InvalidCombinations>
      <rodp:InvalidCombination Feature="InputBins" Option="BypassTray"/>
      <rodp:InvalidCombination Feature="Staple" Option="Right2"/>
    </rodp:InvalidCombinations>
    <rodp:InvalidCombinations>
      <rodp:InvalidCombination Feature="InputBins" Option="BypassTray"/>
      <rodp:InvalidCombination Feature="Staple" Option="TopLeftSlant"/>
    </rodp:InvalidCombinations>
    <rodp:InvalidCombinations>
      <rodp:InvalidCombination Feature="InputBins" Option="BypassTray"/>
      <rodp:InvalidCombination Feature="Staple" Option="TopRightSlant"/>
    </rodp:InvalidCombinations>
    <rodp:InvalidCombinations>
      <rodp:InvalidCombination Feature="InputBins" Option="BypassTray"/>
      <rodp:InvalidCombination Feature="Staple" Option="Booklet"/>
    </rodp:InvalidCombinations>
    <rodp:InvalidCombinations>
      <rodp:InvalidCombination Feature="InputBins" Option="BypassTray"/>
      <rodp:InvalidCombination Feature="HolePunch" Option="Left2"/>
    </rodp:InvalidCombinations>
    <rodp:InvalidCombinations>
```

```
  <rodp:InvalidCombination Feature="InputBins" Option="BypassTray"/>
  <rodp:InvalidCombination Feature="HolePunch" Option="Top2"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Right2"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Left3"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Top3"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Right3"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Left4"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Top4"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Right4"/>
</rodp:InvalidCombinations>
<rodp:InvalidCombinations>
  <rodp:InvalidCombination Feature="SlipSheet" Option="ON"/>
  <rodp:InvalidCombination Feature="InputBins" Option="AUTO"/>
</rodp:InvalidCombinations>
<rodp:InvalidCombinations>
  <rodp:InvalidCombination Feature="SlipSheet" Option="ON"/>
  <rodp:InvalidCombination Feature="InputBins" Option="Tray1"/>
</rodp:InvalidCombinations>
<rodp:InvalidCombinations>
  <rodp:InvalidCombination Feature="SlipSheet" Option="ON"/>
  <rodp:InvalidCombination Feature="InputBins" Option="Tray2"/>
</rodp:InvalidCombinations>
<rodp:InvalidCombinations>
  <rodp:InvalidCombination Feature="SlipSheet" Option="ON"/>
  <rodp:InvalidCombination Feature="InputBins" Option="Tray3"/>
</rodp:InvalidCombinations>
<rodp:InvalidCombinations>
```

```
  <rodp:InvalidCombination Feature="SlipSheet" Option="ON"/>
  <rodp:InvalidCombination Feature="InputBins" Option="Tray4"/>
</rodp:InvalidCombinations>
<rodp:InvalidCombinations>
  <rodp:InvalidCombination Feature="SlipSheet" Option="ON"/>
  <rodp:InvalidCombination Feature="InputBins" Option="LARGECAPACITY"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Top2"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Top3"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Top4"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Right2"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Right3"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Right4"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Left2"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Left3"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Left4"/>
</rodp:InvalidCombinations>
<rodp:InvalidCombinations>
  <rodp:InvalidCombination Feature="SlipSheet" Option="ON"/>
  <rodp:InvalidCombination Feature="Staple" Option="TopLeft"/>
</rodp:InvalidCombinations>
<rodp:InvalidCombinations>
```

```xml
<rodp:InvalidCombination Feature="SlipSheet" Option="ON"/>
  <rodp:InvalidCombination Feature="Staple" Option="TopLeftSlant"/>
</rodp:InvalidCombinations>
<rodp:InvalidCombinations>
  <rodp:InvalidCombination Feature="SlipSheet" Option="ON"/>
  <rodp:InvalidCombination Feature="Staple" Option="TopRight"/>
</rodp:InvalidCombinations>
<rodp:InvalidCombinations>
  <rodp:InvalidCombination Feature="SlipSheet" Option="ON"/>
  <rodp:InvalidCombination Feature="Staple" Option="TopRightSlant"/>
</rodp:InvalidCombinations>
<rodp:InvalidCombinations>
  <rodp:InvalidCombination Feature="SlipSheet" Option="ON"/>
  <rodp:InvalidCombination Feature="Staple" Option="Top2"/>
</rodp:InvalidCombinations>
<rodp:InvalidCombinations>
  <rodp:InvalidCombination Feature="SlipSheet" Option="ON"/>
  <rodp:InvalidCombination Feature="Staple" Option="Left2"/>
</rodp:InvalidCombinations>
<rodp:InvalidCombinations>
  <rodp:InvalidCombination Feature="SlipSheet" Option="ON"/>
  <rodp:InvalidCombination Feature="Staple" Option="Right2"/>
</rodp:InvalidCombinations>
<rodp:InvalidCombinations>
  <rodp:InvalidCombination Feature="SlipSheet" Option="ON"/>
  <rodp:InvalidCombination Feature="Staple" Option="Booklet"/>
</rodp:InvalidCombinations>
<rodp:InvalidCombinations>
  <rodp:InvalidCombination Feature="SlipSheet" Option="ON"/>
  <rodp:InvalidCombination Feature="MediaType" Option="STANDARD"/>
</rodp:InvalidCombinations>
<rodp:InvalidCombinations>
  <rodp:InvalidCombination Feature="SlipSheet" Option="ON"/>
  <rodp:InvalidCombination Feature="MediaType" Option="Thick"/>
</rodp:InvalidCombinations>
<rodp:InvalidCombinations>
  <rodp:InvalidCombination Feature="SlipSheet" Option="ON"/>
  <rodp:InvalidCombination Feature="MediaType" Option="Recycled"/>
</rodp:InvalidCombinations>
<rodp:InvalidCombinations>
  <rodp:InvalidCombination Feature="SlipSheet" Option="ON"/>
  <rodp:InvalidCombination Feature="MediaType" Option="Special"/>
</rodp:InvalidCombinations>
<rodp:InvalidCombinations>
  <rodp:InvalidCombination Feature="SlipSheet" Option="ON"/>
  <rodp:InvalidCombination Feature="MediaType" Option="Letterhead"/>
</rodp:InvalidCombinations>
<rodp:InvalidCombinations>
```

```xml
<rodp:InvalidCombination Feature="SlipSheet" Option="ON"/>
<rodp:InvalidCombination Feature="MediaType" Option="Preprinted"/>
</rodp:InvalidCombinations>
<rodp:InvalidCombinations>
  <rodp:InvalidCombination Feature="SlipSheet" Option="ON"/>
  <rodp:InvalidCombination Feature="MediaType" Option="Labels"/>
</rodp:InvalidCombinations>
<rodp:InvalidCombinations>
  <rodp:InvalidCombination Feature="SlipSheet" Option="ON"/>
  <rodp:InvalidCombination Feature="MediaType" Option="Color"/>
</rodp:InvalidCombinations>
<rodp:InvalidCombinations>
  <rodp:InvalidCombination Feature="SlipSheet" Option="ON"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="SlipSheet" Option="ON"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="SlipSheet" Option="ON"/>
  <rodp:InvalidCombination Feature="Sides" Option="TwoSidedLongEdge"/>
</rodp:InvalidCombinations>
<rodp:InvalidCombinations>
  <rodp:InvalidCombination Feature="SlipSheet" Option="ON"/>
  <rodp:InvalidCombination Feature="Sides" Option="TwoSidedShortEdge"/>
</rodp:InvalidCombinations>
<rodp:InvalidCombinations>
  <rodp:InvalidCombination Feature="Staple" Option="TopLeft"/>
  <rodp:InvalidCombination Feature="HolePunch" Option="Right2"/>
</rodp:InvalidCombinations>
<rodp:InvalidCombinations>
  <rodp:InvalidCombination Feature="Staple" Option="TopLeft"/>
  <rodp:InvalidCombination Feature="HolePunch" Option="Right3"/>
</rodp:InvalidCombinations>
<rodp:InvalidCombinations>
  <rodp:InvalidCombination Feature="Staple" Option="TopLeft"/>
  <rodp:InvalidCombination Feature="HolePunch" Option="Right4"/>
</rodp:InvalidCombinations>
<rodp:InvalidCombinations>
  <rodp:InvalidCombination Feature="Staple" Option="TopLeftSlant"/>
  <rodp:InvalidCombination Feature="HolePunch" Option="Right2"/>
</rodp:InvalidCombinations>
<rodp:InvalidCombinations>
  <rodp:InvalidCombination Feature="Staple" Option="TopLeftSlant"/>
  <rodp:InvalidCombination Feature="HolePunch" Option="Right3"/>
```

```xml
</rodp:InvalidCombinations>
<rodp:InvalidCombinations>
  <rodp:InvalidCombination Feature="Staple" Option="TopLeftSlant"/>
  <rodp:InvalidCombination Feature="HolePunch" Option="Right4"/>
</rodp:InvalidCombinations>
<rodp:InvalidCombinations>
  <rodp:InvalidCombination Feature="Staple" Option="TopRight"/>
  <rodp:InvalidCombination Feature="HolePunch" Option="Left2"/>
</rodp:InvalidCombinations>
<rodp:InvalidCombinations>
  <rodp:InvalidCombination Feature="Staple" Option="TopRight"/>
  <rodp:InvalidCombination Feature="HolePunch" Option="Left3"/>
</rodp:InvalidCombinations>
<rodp:InvalidCombinations>
  <rodp:InvalidCombination Feature="Staple" Option="TopRight"/>
  <rodp:InvalidCombination Feature="HolePunch" Option="Left4"/>
</rodp:InvalidCombinations>
<rodp:InvalidCombinations>
  <rodp:InvalidCombination Feature="Staple" Option="TopRightSlant"/>
  <rodp:InvalidCombination Feature="HolePunch" Option="Left2"/>
</rodp:InvalidCombinations>
<rodp:InvalidCombinations>
  <rodp:InvalidCombination Feature="Staple" Option="TopRightSlant"/>
  <rodp:InvalidCombination Feature="HolePunch" Option="Left3"/>
</rodp:InvalidCombinations>
<rodp:InvalidCombinations>
  <rodp:InvalidCombination Feature="Staple" Option="TopRightSlant"/>
  <rodp:InvalidCombination Feature="HolePunch" Option="Left4"/>
</rodp:InvalidCombinations>
<rodp:InvalidCombinations>
  <rodp:InvalidCombination Feature="Staple" Option="Top2"/>
  <rodp:InvalidCombination Feature="HolePunch" Option="Left2"/>
</rodp:InvalidCombinations>
<rodp:InvalidCombinations>
  <rodp:InvalidCombination Feature="Staple" Option="Top2"/>
  <rodp:InvalidCombination Feature="HolePunch" Option="Right2"/>
</rodp:InvalidCombinations>
<rodp:InvalidCombinations>
  <rodp:InvalidCombination Feature="Staple" Option="Top2"/>
  <rodp:InvalidCombination Feature="HolePunch" Option="Left3"/>
</rodp:InvalidCombinations>
<rodp:InvalidCombinations>
  <rodp:InvalidCombination Feature="Staple" Option="Top2"/>
  <rodp:InvalidCombination Feature="HolePunch" Option="Right3"/>
</rodp:InvalidCombinations>
<rodp:InvalidCombinations>
  <rodp:InvalidCombination Feature="Staple" Option="Top2"/>
  <rodp:InvalidCombination Feature="HolePunch" Option="Left4"/>
```

```xml
</rodp:InvalidCombinations>
<rodp:InvalidCombinations>
  <rodp:InvalidCombination Feature="Staple" Option="Top2"/>
  <rodp:InvalidCombination Feature="HolePunch" Option="Right4"/>
</rodp:InvalidCombinations>
<rodp:InvalidCombinations>
  <rodp:InvalidCombination Feature="Staple" Option="Left2"/>
  <rodp:InvalidCombination Feature="HolePunch" Option="Top2"/>
</rodp:InvalidCombinations>
<rodp:InvalidCombinations>
  <rodp:InvalidCombination Feature="Staple" Option="Left2"/>
  <rodp:InvalidCombination Feature="HolePunch" Option="Right2"/>
</rodp:InvalidCombinations>
<rodp:InvalidCombinations>
  <rodp:InvalidCombination Feature="Staple" Option="Left2"/>
  <rodp:InvalidCombination Feature="HolePunch" Option="Top3"/>
</rodp:InvalidCombinations>
<rodp:InvalidCombinations>
  <rodp:InvalidCombination Feature="Staple" Option="Left2"/>
  <rodp:InvalidCombination Feature="HolePunch" Option="Right3"/>
</rodp:InvalidCombinations>
<rodp:InvalidCombinations>
  <rodp:InvalidCombination Feature="Staple" Option="Left2"/>
  <rodp:InvalidCombination Feature="HolePunch" Option="Top4"/>
</rodp:InvalidCombinations>
<rodp:InvalidCombinations>
  <rodp:InvalidCombination Feature="Staple" Option="Left2"/>
  <rodp:InvalidCombination Feature="HolePunch" Option="Right4"/>
</rodp:InvalidCombinations>
<rodp:InvalidCombinations>
  <rodp:InvalidCombination Feature="Staple" Option="Right2"/>
  <rodp:InvalidCombination Feature="HolePunch" Option="Left2"/>
</rodp:InvalidCombinations>
<rodp:InvalidCombinations>
  <rodp:InvalidCombination Feature="Staple" Option="Right2"/>
  <rodp:InvalidCombination Feature="HolePunch" Option="Top2"/>
</rodp:InvalidCombinations>
<rodp:InvalidCombinations>
  <rodp:InvalidCombination Feature="Staple" Option="Right2"/>
  <rodp:InvalidCombination Feature="HolePunch" Option="Left3"/>
</rodp:InvalidCombinations>
<rodp:InvalidCombinations>
  <rodp:InvalidCombination Feature="Staple" Option="Right2"/>
  <rodp:InvalidCombination Feature="HolePunch" Option="Top3"/>
</rodp:InvalidCombinations>
<rodp:InvalidCombinations>
  <rodp:InvalidCombination Feature="Staple" Option="Right2"/>
  <rodp:InvalidCombination Feature="HolePunch" Option="Left4"/>
```

```
</rodp:InvalidCombinations>
<rodp:InvalidCombinations>
  <rodp:InvalidCombination Feature="Staple" Option="Right2"/>
  <rodp:InvalidCombination Feature="HolePunch" Option="Top4"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Left2"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Top2"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Right2"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Left3"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Top3"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Right3"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Left4"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Top4"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Right4"/>
</rodp:InvalidCombinations>
<rodp:InvalidCombinations>
  <rodp:InvalidCombination Feature="Staple" Option="TopLeft"/>
  <rodp:InvalidCombination Feature="MediaType" Option="TRANSPARENCY"/>
</rodp:InvalidCombinations>
<rodp:InvalidCombinations>
  <rodp:InvalidCombination Feature="Staple" Option="TopLeft"/>
  <rodp:InvalidCombination Feature="MediaType" Option="Thick"/>
```

```
</rodp:InvalidCombinations>
<rodp:InvalidCombinations>
  <rodp:InvalidCombination Feature="Staple" Option="TopLeft"/>
  <rodp:InvalidCombination Feature="MediaType" Option="Labels"/>
</rodp:InvalidCombinations>
<rodp:InvalidCombinations>
  <rodp:InvalidCombination Feature="Staple" Option="TopLeft"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="Staple" Option="TopLeft"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="Staple" Option="TopLeftSlant"/>
  <rodp:InvalidCombination Feature="MediaType" Option="TRANSPARENCY"/>
</rodp:InvalidCombinations>
<rodp:InvalidCombinations>
  <rodp:InvalidCombination Feature="Staple" Option="TopLeftSlant"/>
  <rodp:InvalidCombination Feature="MediaType" Option="Thick"/>
</rodp:InvalidCombinations>
<rodp:InvalidCombinations>
  <rodp:InvalidCombination Feature="Staple" Option="TopLeftSlant"/>
  <rodp:InvalidCombination Feature="MediaType" Option="Labels"/>
</rodp:InvalidCombinations>
<rodp:InvalidCombinations>
  <rodp:InvalidCombination Feature="Staple" Option="TopLeftSlant"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="Staple" Option="TopLeftSlant"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="Staple" Option="TopRight"/>
  <rodp:InvalidCombination Feature="MediaType" Option="TRANSPARENCY"/>
</rodp:InvalidCombinations>
<rodp:InvalidCombinations>
  <rodp:InvalidCombination Feature="Staple" Option="TopRight"/>
  <rodp:InvalidCombination Feature="MediaType" Option="Thick"/>
</rodp:InvalidCombinations>
<rodp:InvalidCombinations>
  <rodp:InvalidCombination Feature="Staple" Option="TopRight"/>
  <rodp:InvalidCombination Feature="MediaType" Option="Labels"/>
```

```xml
</rodp:InvalidCombinations>
<rodp:InvalidCombinations>
  <rodp:InvalidCombination Feature="Staple" Option="TopRight"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="Staple" Option="TopRight"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="Staple" Option="TopRightSlant"/>
  <rodp:InvalidCombination Feature="MediaType" Option="TRANSPARENCY"/>
</rodp:InvalidCombinations>
<rodp:InvalidCombinations>
  <rodp:InvalidCombination Feature="Staple" Option="TopRightSlant"/>
  <rodp:InvalidCombination Feature="MediaType" Option="Thick"/>
</rodp:InvalidCombinations>
<rodp:InvalidCombinations>
  <rodp:InvalidCombination Feature="Staple" Option="TopRightSlant"/>
  <rodp:InvalidCombination Feature="MediaType" Option="Labels"/>
</rodp:InvalidCombinations>
<rodp:InvalidCombinations>
  <rodp:InvalidCombination Feature="Staple" Option="TopRightSlant"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="Staple" Option="TopRightSlant"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="Staple" Option="Top2"/>
  <rodp:InvalidCombination Feature="MediaType" Option="TRANSPARENCY"/>
</rodp:InvalidCombinations>
<rodp:InvalidCombinations>
  <rodp:InvalidCombination Feature="Staple" Option="Top2"/>
  <rodp:InvalidCombination Feature="MediaType" Option="Thick"/>
</rodp:InvalidCombinations>
<rodp:InvalidCombinations>
  <rodp:InvalidCombination Feature="Staple" Option="Top2"/>
  <rodp:InvalidCombination Feature="MediaType" Option="Labels"/>
</rodp:InvalidCombinations>
<rodp:InvalidCombinations>
  <rodp:InvalidCombination Feature="Staple" Option="Top2"/>
```

```xml
        <rodp:InvalidCombination Feature="MediaType" Option="Plain_Duplex_Backside"/>
      </rodp:InvalidCombinations>
      <rodp:InvalidCombinations>
        <rodp:InvalidCombination Feature="Staple" Option="Top2"/>
        <rodp:InvalidCombination Feature="MediaType" Option="Thick_Duplex_Backside"/>
      </rodp:InvalidCombinations>
      <rodp:InvalidCombinations>
        <rodp:InvalidCombination Feature="Staple" Option="Left2"/>
        <rodp:InvalidCombination Feature="MediaType" Option="TRANSPARENCY"/>
      </rodp:InvalidCombinations>
      <rodp:InvalidCombinations>
        <rodp:InvalidCombination Feature="Staple" Option="Left2"/>
        <rodp:InvalidCombination Feature="MediaType" Option="Thick"/>
      </rodp:InvalidCombinations>
      <rodp:InvalidCombinations>
        <rodp:InvalidCombination Feature="Staple" Option="Left2"/>
        <rodp:InvalidCombination Feature="MediaType" Option="Labels"/>
      </rodp:InvalidCombinations>
      <rodp:InvalidCombinations>
        <rodp:InvalidCombination Feature="Staple" Option="Left2"/>
        <rodp:InvalidCombination Feature="MediaType" Option="Plain_Duplex_Backside"/>
      </rodp:InvalidCombinations>
      <rodp:InvalidCombinations>
        <rodp:InvalidCombination Feature="Staple" Option="Left2"/>
        <rodp:InvalidCombination Feature="MediaType" Option="Thick_Duplex_Backside"/>
      </rodp:InvalidCombinations>
      <rodp:InvalidCombinations>
        <rodp:InvalidCombination Feature="Staple" Option="Right2"/>
        <rodp:InvalidCombination Feature="MediaType" Option="TRANSPARENCY"/>
      </rodp:InvalidCombinations>
      <rodp:InvalidCombinations>
        <rodp:InvalidCombination Feature="Staple" Option="Right2"/>
        <rodp:InvalidCombination Feature="MediaType" Option="Thick"/>
      </rodp:InvalidCombinations>
      <rodp:InvalidCombinations>
        <rodp:InvalidCombination Feature="Staple" Option="Right2"/>
        <rodp:InvalidCombination Feature="MediaType" Option="Labels"/>
      </rodp:InvalidCombinations>
      <rodp:InvalidCombinations>
        <rodp:InvalidCombination Feature="Staple" Option="Right2"/>
        <rodp:InvalidCombination Feature="MediaType" Option="Plain_Duplex_Backside"/>
      </rodp:InvalidCombinations>
      <rodp:InvalidCombinations>
```

```xml
      <rodp:InvalidCombination Feature="Staple" Option="Right2"/>
      <rodp:InvalidCombination Feature="MediaType" Option="Thick_Duplex_Backside"/>
    </rodp:InvalidCombinations>
    <rodp:InvalidCombinations>
      <rodp:InvalidCombination Feature="Staple" Option="Booklet"/>
      <rodp:InvalidCombination Feature="MediaType" Option="TRANSPARENCY"/>
    </rodp:InvalidCombinations>
    <rodp:InvalidCombinations>
      <rodp:InvalidCombination Feature="Staple" Option="Booklet"/>
      <rodp:InvalidCombination Feature="MediaType" Option="Thick"/>
    </rodp:InvalidCombinations>
    <rodp:InvalidCombinations>
      <rodp:InvalidCombination Feature="Staple" Option="Booklet"/>
      <rodp:InvalidCombination Feature="MediaType" Option="Labels"/>
    </rodp:InvalidCombinations>
    <rodp:InvalidCombinations>
      <rodp:InvalidCombination Feature="Staple" Option="Booklet"/>
      <rodp:InvalidCombination Feature="MediaType" Option="Plain_Duplex_Backside"/>
    </rodp:InvalidCombinations>
    <rodp:InvalidCombinations>
      <rodp:InvalidCombination Feature="Staple" Option="Booklet"/>
      <rodp:InvalidCombination Feature="MediaType" Option="Thick_Duplex_Backside"/>
    </rodp:InvalidCombinations>
    <rodp:InvalidCombinations>
      <rodp:InvalidCombination Feature="MediaSizeName" Option="na_invoice_5.5x8.5in"/>
      <rodp:InvalidCombination Feature="Staple" Option="TopLeft"/>
    </rodp:InvalidCombinations>
    <rodp:InvalidCombinations>
      <rodp:InvalidCombination Feature="MediaSizeName" Option="na_invoice_5.5x8.5in"/>
      <rodp:InvalidCombination Feature="Staple" Option="TopLeftSlant"/>
    </rodp:InvalidCombinations>
    <rodp:InvalidCombinations>
      <rodp:InvalidCombination Feature="MediaSizeName" Option="na_invoice_5.5x8.5in"/>
      <rodp:InvalidCombination Feature="Staple" Option="TopRight"/>
    </rodp:InvalidCombinations>
    <rodp:InvalidCombinations>
      <rodp:InvalidCombination Feature="MediaSizeName" Option="na_invoice_5.5x8.5in"/>
      <rodp:InvalidCombination Feature="Staple" Option="TopRightSlant"/>
    </rodp:InvalidCombinations>
    <rodp:InvalidCombinations>
```

```xml
<rodp:InvalidCombination Feature="MediaSizeName" Option="na_invoice_5.5x8.5in"/>
    <rodp:InvalidCombination Feature="Staple" Option="Top2"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="Staple" Option="Left2"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="Staple" Option="Right2"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="Staple" Option="Booklet"/>
</rodp:InvalidCombinations>
<rodp:InvalidCombinations>
    <rodp:InvalidCombination Feature="MediaSizeName" Option="iso_a5_148x210mm"/>
    <rodp:InvalidCombination Feature="Staple" Option="TopLeft"/>
</rodp:InvalidCombinations>
<rodp:InvalidCombinations>
    <rodp:InvalidCombination Feature="MediaSizeName" Option="iso_a5_148x210mm"/>
    <rodp:InvalidCombination Feature="Staple" Option="TopLeftSlant"/>
</rodp:InvalidCombinations>
<rodp:InvalidCombinations>
    <rodp:InvalidCombination Feature="MediaSizeName" Option="iso_a5_148x210mm"/>
    <rodp:InvalidCombination Feature="Staple" Option="TopRight"/>
</rodp:InvalidCombinations>
<rodp:InvalidCombinations>
    <rodp:InvalidCombination Feature="MediaSizeName" Option="iso_a5_148x210mm"/>
    <rodp:InvalidCombination Feature="Staple" Option="TopRightSlant"/>
</rodp:InvalidCombinations>
<rodp:InvalidCombinations>
    <rodp:InvalidCombination Feature="MediaSizeName" Option="iso_a5_148x210mm"/>
    <rodp:InvalidCombination Feature="Staple" Option="Top2"/>
</rodp:InvalidCombinations>
<rodp:InvalidCombinations>
    <rodp:InvalidCombination Feature="MediaSizeName" Option="iso_a5_148x210mm"/>
    <rodp:InvalidCombination Feature="Staple" Option="Left2"/>
```

```xml
        </rodp:InvalidCombinations>
        <rodp:InvalidCombinations>
          <rodp:InvalidCombination Feature="MediaSizeName" Option="iso_a5_148x210mm"/>
          <rodp:InvalidCombination Feature="Staple" Option="Right2"/>
        </rodp:InvalidCombinations>
        <rodp:InvalidCombinations>
          <rodp:InvalidCombination Feature="MediaSizeName" Option="iso_a5_148x210mm"/>
          <rodp:InvalidCombination Feature="Staple" Option="Booklet"/>
        </rodp:InvalidCombinations>
        <rodp:InvalidCombinations>
          <rodp:InvalidCombination Feature="MediaSizeName" Option="iso_a6_105x148mm"/>
          <rodp:InvalidCombination Feature="Staple" Option="TopLeft"/>
        </rodp:InvalidCombinations>
        <rodp:InvalidCombinations>
          <rodp:InvalidCombination Feature="MediaSizeName" Option="iso_a6_105x148mm"/>
          <rodp:InvalidCombination Feature="Staple" Option="TopLeftSlant"/>
        </rodp:InvalidCombinations>
        <rodp:InvalidCombinations>
          <rodp:InvalidCombination Feature="MediaSizeName" Option="iso_a6_105x148mm"/>
          <rodp:InvalidCombination Feature="Staple" Option="TopRight"/>
        </rodp:InvalidCombinations>
        <rodp:InvalidCombinations>
          <rodp:InvalidCombination Feature="MediaSizeName" Option="iso_a6_105x148mm"/>
          <rodp:InvalidCombination Feature="Staple" Option="TopRightSlant"/>
        </rodp:InvalidCombinations>
        <rodp:InvalidCombinations>
          <rodp:InvalidCombination Feature="MediaSizeName" Option="iso_a6_105x148mm"/>
          <rodp:InvalidCombination Feature="Staple" Option="Top2"/>
        </rodp:InvalidCombinations>
        <rodp:InvalidCombinations>
          <rodp:InvalidCombination Feature="MediaSizeName" Option="iso_a6_105x148mm"/>
          <rodp:InvalidCombination Feature="Staple" Option="Left2"/>
        </rodp:InvalidCombinations>
        <rodp:InvalidCombinations>
          <rodp:InvalidCombination Feature="MediaSizeName" Option="iso_a6_105x148mm"/>
          <rodp:InvalidCombination Feature="Staple" Option="Right2"/>
        </rodp:InvalidCombinations>
        <rodp:InvalidCombinations>
```

```xml
    <rodp:InvalidCombination Feature="MediaSizeName"
Option="iso_a6_105x148mm"/>
        <rodp:InvalidCombination Feature="Staple" Option="Booklet"/>
    </rodp:InvalidCombinations>
    <rodp:InvalidCombinations>
        <rodp:InvalidCombination Feature="MediaSizeName" Option="na_number-10_4.125x9.5in"/>
        <rodp:InvalidCombination Feature="Staple" Option="TopLeft"/>
    </rodp:InvalidCombinations>
    <rodp:InvalidCombinations>
        <rodp:InvalidCombination Feature="MediaSizeName" Option="na_number-10_4.125x9.5in"/>
        <rodp:InvalidCombination Feature="Staple" Option="TopLeftSlant"/>
    </rodp:InvalidCombinations>
    <rodp:InvalidCombinations>
        <rodp:InvalidCombination Feature="MediaSizeName" Option="na_number-10_4.125x9.5in"/>
        <rodp:InvalidCombination Feature="Staple" Option="TopRight"/>
    </rodp:InvalidCombinations>
    <rodp:InvalidCombinations>
        <rodp:InvalidCombination Feature="MediaSizeName" Option="na_number-10_4.125x9.5in"/>
        <rodp:InvalidCombination Feature="Staple" Option="TopRightSlant"/>
    </rodp:InvalidCombinations>
    <rodp:InvalidCombinations>
        <rodp:InvalidCombination Feature="MediaSizeName" Option="na_number-10_4.125x9.5in"/>
        <rodp:InvalidCombination Feature="Staple" Option="Top2"/>
    </rodp:InvalidCombinations>
    <rodp:InvalidCombinations>
        <rodp:InvalidCombination Feature="MediaSizeName" Option="na_number-10_4.125x9.5in"/>
        <rodp:InvalidCombination Feature="Staple" Option="Left2"/>
    </rodp:InvalidCombinations>
    <rodp:InvalidCombinations>
        <rodp:InvalidCombination Feature="MediaSizeName" Option="na_number-10_4.125x9.5in"/>
        <rodp:InvalidCombination Feature="Staple" Option="Right2"/>
    </rodp:InvalidCombinations>
    <rodp:InvalidCombinations>
        <rodp:InvalidCombination Feature="MediaSizeName" Option="na_number-10_4.125x9.5in"/>
        <rodp:InvalidCombination Feature="Staple" Option="Booklet"/>
    </rodp:InvalidCombinations>
    <rodp:InvalidCombinations>
        <rodp:InvalidCombination Feature="MediaSizeName"
Option="iso_dl_110x220mm"/>
        <rodp:InvalidCombination Feature="Staple" Option="TopLeft"/>
```

```xml
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="TopLeftSlant"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="TopRight"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="TopRightSlant"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="Top2"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="Left2"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="Right2"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="Booklet"/>
</rodp:InvalidCombinations>
<rodp:InvalidCombinations>
    <rodp:InvalidCombination Feature="MediaSizeName" Option="na_monarch_3.875x7.5in"/>
    <rodp:InvalidCombination Feature="Staple" Option="TopLeft"/>
</rodp:InvalidCombinations>
<rodp:InvalidCombinations>
    <rodp:InvalidCombination Feature="MediaSizeName" Option="na_monarch_3.875x7.5in"/>
    <rodp:InvalidCombination Feature="Staple" Option="TopLeftSlant"/>
</rodp:InvalidCombinations>
<rodp:InvalidCombinations>
```

```xml
        <rodp:InvalidCombination Feature="MediaSizeName"
Option="na_monarch_3.875x7.5in"/>
        <rodp:InvalidCombination Feature="Staple" Option="TopRight"/>
    </rodp:InvalidCombinations>
    <rodp:InvalidCombinations>
        <rodp:InvalidCombination Feature="MediaSizeName"
Option="na_monarch_3.875x7.5in"/>
        <rodp:InvalidCombination Feature="Staple" Option="TopRightSlant"/>
    </rodp:InvalidCombinations>
    <rodp:InvalidCombinations>
        <rodp:InvalidCombination Feature="MediaSizeName"
Option="na_monarch_3.875x7.5in"/>
        <rodp:InvalidCombination Feature="Staple" Option="Top2"/>
    </rodp:InvalidCombinations>
    <rodp:InvalidCombinations>
        <rodp:InvalidCombination Feature="MediaSizeName"
Option="na_monarch_3.875x7.5in"/>
        <rodp:InvalidCombination Feature="Staple" Option="Left2"/>
    </rodp:InvalidCombinations>
    <rodp:InvalidCombinations>
        <rodp:InvalidCombination Feature="MediaSizeName"
Option="na_monarch_3.875x7.5in"/>
        <rodp:InvalidCombination Feature="Staple" Option="Right2"/>
    </rodp:InvalidCombinations>
    <rodp:InvalidCombinations>
        <rodp:InvalidCombination Feature="MediaSizeName"
Option="na_monarch_3.875x7.5in"/>
        <rodp:InvalidCombination Feature="Staple" Option="Booklet"/>
    </rodp:InvalidCombinations>
    <rodp:InvalidCombinations>
        <rodp:InvalidCombination Feature="MediaSizeName"
Option="iso_c5_162x229mm"/>
        <rodp:InvalidCombination Feature="Staple" Option="TopLeft"/>
    </rodp:InvalidCombinations>
    <rodp:InvalidCombinations>
        <rodp:InvalidCombination Feature="MediaSizeName"
Option="iso_c5_162x229mm"/>
        <rodp:InvalidCombination Feature="Staple" Option="TopLeftSlant"/>
    </rodp:InvalidCombinations>
    <rodp:InvalidCombinations>
        <rodp:InvalidCombination Feature="MediaSizeName"
Option="iso_c5_162x229mm"/>
        <rodp:InvalidCombination Feature="Staple" Option="TopRight"/>
    </rodp:InvalidCombinations>
    <rodp:InvalidCombinations>
        <rodp:InvalidCombination Feature="MediaSizeName"
Option="iso_c5_162x229mm"/>
        <rodp:InvalidCombination Feature="Staple" Option="TopRightSlant"/>
```

```xml
</rodp:InvalidCombinations>
<rodp:InvalidCombinations>
    <rodp:InvalidCombination Feature="MediaSizeName" Option="iso_c5_162x229mm"/>
    <rodp:InvalidCombination Feature="Staple" Option="Top2"/>
</rodp:InvalidCombinations>
<rodp:InvalidCombinations>
    <rodp:InvalidCombination Feature="MediaSizeName" Option="iso_c5_162x229mm"/>
    <rodp:InvalidCombination Feature="Staple" Option="Left2"/>
</rodp:InvalidCombinations>
<rodp:InvalidCombinations>
    <rodp:InvalidCombination Feature="MediaSizeName" Option="iso_c5_162x229mm"/>
    <rodp:InvalidCombination Feature="Staple" Option="Right2"/>
</rodp:InvalidCombinations>
<rodp:InvalidCombinations>
    <rodp:InvalidCombination Feature="MediaSizeName" Option="iso_c5_162x229mm"/>
    <rodp:InvalidCombination Feature="Staple" Option="Booklet"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="Staple" Option="TopLeft"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="Staple" Option="TopLeftSlant"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="Staple" Option="TopRight"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="Staple" Option="TopRightSlant"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="Staple" Option="Top2"/>
</rodp:InvalidCombinations>
<rodp:InvalidCombinations>
```

```xml
        <rodp:InvalidCombination Feature="MediaSizeName" Option="iso_c6_114x162mm"/>
        <rodp:InvalidCombination Feature="Staple" Option="Left2"/>
    </rodp:InvalidCombinations>
    <rodp:InvalidCombinations>
        <rodp:InvalidCombination Feature="MediaSizeName" Option="iso_c6_114x162mm"/>
        <rodp:InvalidCombination Feature="Staple" Option="Right2"/>
    </rodp:InvalidCombinations>
    <rodp:InvalidCombinations>
        <rodp:InvalidCombination Feature="MediaSizeName" Option="iso_c6_114x162mm"/>
        <rodp:InvalidCombination Feature="Staple" Option="Booklet"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="TopLeft"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="TopLeftSlant"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="TopRight"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="TopRightSlant"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="Top2"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="Left2"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="Right2"/>
```

```
</rodp:InvalidCombinations>
<rodp:InvalidCombinations>
  <rodp:InvalidCombination Feature="MediaSizeName" Option="na_arch-b_12x18in"/>
  <rodp:InvalidCombination Feature="Staple" Option="Booklet"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="TopLeft"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="TopLeftSlant"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="TopRight"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="TopRightSlant"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="Top2"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="Left2"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="Right2"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="Booklet"/>
</rodp:InvalidCombinations>
<rodp:InvalidCombinations>
  <rodp:InvalidCombination Feature="HolePunch" Option="Top2"/>
  <rodp:InvalidCombination Feature="MediaType" Option="TRANSPARENCY"/>
</rodp:InvalidCombinations>
<rodp:InvalidCombinations>
  <rodp:InvalidCombination Feature="HolePunch" Option="Top2"/>
  <rodp:InvalidCombination Feature="MediaType" Option="Thick"/>
</rodp:InvalidCombinations>
<rodp:InvalidCombinations>
  <rodp:InvalidCombination Feature="HolePunch" Option="Top2"/>
```

```xml
    <rodp:InvalidCombination Feature="MediaType" Option="Labels"/>
  </rodp:InvalidCombinations>
  <rodp:InvalidCombinations>
    <rodp:InvalidCombination Feature="HolePunch" Option="Top2"/>
    <rodp:InvalidCombination Feature="MediaType" Option="Plain_Duplex_Backside"/>
  </rodp:InvalidCombinations>
  <rodp:InvalidCombinations>
    <rodp:InvalidCombination Feature="HolePunch" Option="Top2"/>
    <rodp:InvalidCombination Feature="MediaType" Option="Thick_Duplex_Backside"/>
  </rodp:InvalidCombinations>
  <rodp:InvalidCombinations>
    <rodp:InvalidCombination Feature="HolePunch" Option="Top3"/>
    <rodp:InvalidCombination Feature="MediaType" Option="TRANSPARENCY"/>
  </rodp:InvalidCombinations>
  <rodp:InvalidCombinations>
    <rodp:InvalidCombination Feature="HolePunch" Option="Top3"/>
    <rodp:InvalidCombination Feature="MediaType" Option="Thick"/>
  </rodp:InvalidCombinations>
  <rodp:InvalidCombinations>
    <rodp:InvalidCombination Feature="HolePunch" Option="Top3"/>
    <rodp:InvalidCombination Feature="MediaType" Option="Labels"/>
  </rodp:InvalidCombinations>
  <rodp:InvalidCombinations>
    <rodp:InvalidCombination Feature="HolePunch" Option="Top3"/>
    <rodp:InvalidCombination Feature="MediaType" Option="Plain_Duplex_Backside"/>
  </rodp:InvalidCombinations>
  <rodp:InvalidCombinations>
    <rodp:InvalidCombination Feature="HolePunch" Option="Top3"/>
    <rodp:InvalidCombination Feature="MediaType" Option="Thick_Duplex_Backside"/>
  </rodp:InvalidCombinations>
  <rodp:InvalidCombinations>
    <rodp:InvalidCombination Feature="HolePunch" Option="Top4"/>
    <rodp:InvalidCombination Feature="MediaType" Option="TRANSPARENCY"/>
  </rodp:InvalidCombinations>
  <rodp:InvalidCombinations>
    <rodp:InvalidCombination Feature="HolePunch" Option="Top4"/>
    <rodp:InvalidCombination Feature="MediaType" Option="Thick"/>
  </rodp:InvalidCombinations>
  <rodp:InvalidCombinations>
    <rodp:InvalidCombination Feature="HolePunch" Option="Top4"/>
    <rodp:InvalidCombination Feature="MediaType" Option="Labels"/>
  </rodp:InvalidCombinations>
  <rodp:InvalidCombinations>
    <rodp:InvalidCombination Feature="HolePunch" Option="Top4"/>
```

```xml
        <rodp:InvalidCombination Feature="MediaType" Option="Plain_Duplex_Backside"/>
      </rodp:InvalidCombinations>
      <rodp:InvalidCombinations>
        <rodp:InvalidCombination Feature="HolePunch" Option="Top4"/>
        <rodp:InvalidCombination Feature="MediaType" Option="Thick_Duplex_Backside"/>
      </rodp:InvalidCombinations>
      <rodp:InvalidCombinations>
        <rodp:InvalidCombination Feature="HolePunch" Option="Right2"/>
        <rodp:InvalidCombination Feature="MediaType" Option="TRANSPARENCY"/>
      </rodp:InvalidCombinations>
      <rodp:InvalidCombinations>
        <rodp:InvalidCombination Feature="HolePunch" Option="Right2"/>
        <rodp:InvalidCombination Feature="MediaType" Option="Thick"/>
      </rodp:InvalidCombinations>
      <rodp:InvalidCombinations>
        <rodp:InvalidCombination Feature="HolePunch" Option="Right2"/>
        <rodp:InvalidCombination Feature="MediaType" Option="Labels"/>
      </rodp:InvalidCombinations>
      <rodp:InvalidCombinations>
        <rodp:InvalidCombination Feature="HolePunch" Option="Right2"/>
        <rodp:InvalidCombination Feature="MediaType" Option="Plain_Duplex_Backside"/>
      </rodp:InvalidCombinations>
      <rodp:InvalidCombinations>
        <rodp:InvalidCombination Feature="HolePunch" Option="Right2"/>
        <rodp:InvalidCombination Feature="MediaType" Option="Thick_Duplex_Backside"/>
      </rodp:InvalidCombinations>
      <rodp:InvalidCombinations>
        <rodp:InvalidCombination Feature="HolePunch" Option="Right3"/>
        <rodp:InvalidCombination Feature="MediaType" Option="TRANSPARENCY"/>
      </rodp:InvalidCombinations>
      <rodp:InvalidCombinations>
        <rodp:InvalidCombination Feature="HolePunch" Option="Right3"/>
        <rodp:InvalidCombination Feature="MediaType" Option="Thick"/>
      </rodp:InvalidCombinations>
      <rodp:InvalidCombinations>
        <rodp:InvalidCombination Feature="HolePunch" Option="Right3"/>
        <rodp:InvalidCombination Feature="MediaType" Option="Labels"/>
      </rodp:InvalidCombinations>
      <rodp:InvalidCombinations>
        <rodp:InvalidCombination Feature="HolePunch" Option="Right3"/>
        <rodp:InvalidCombination Feature="MediaType" Option="Plain_Duplex_Backside"/>
      </rodp:InvalidCombinations>
      <rodp:InvalidCombinations>
```

```xml
      <rodp:InvalidCombination Feature="HolePunch" Option="Right3"/>
      <rodp:InvalidCombination Feature="MediaType" Option="Thick_Duplex_Backside"/>
    </rodp:InvalidCombinations>
    <rodp:InvalidCombinations>
      <rodp:InvalidCombination Feature="HolePunch" Option="Right4"/>
      <rodp:InvalidCombination Feature="MediaType" Option="TRANSPARENCY"/>
    </rodp:InvalidCombinations>
    <rodp:InvalidCombinations>
      <rodp:InvalidCombination Feature="HolePunch" Option="Right4"/>
      <rodp:InvalidCombination Feature="MediaType" Option="Thick"/>
    </rodp:InvalidCombinations>
    <rodp:InvalidCombinations>
      <rodp:InvalidCombination Feature="HolePunch" Option="Right4"/>
      <rodp:InvalidCombination Feature="MediaType" Option="Labels"/>
    </rodp:InvalidCombinations>
    <rodp:InvalidCombinations>
      <rodp:InvalidCombination Feature="HolePunch" Option="Right4"/>
      <rodp:InvalidCombination Feature="MediaType" Option="Plain_Duplex_Backside"/>
    </rodp:InvalidCombinations>
    <rodp:InvalidCombinations>
      <rodp:InvalidCombination Feature="HolePunch" Option="Right4"/>
      <rodp:InvalidCombination Feature="MediaType" Option="Thick_Duplex_Backside"/>
    </rodp:InvalidCombinations>
    <rodp:InvalidCombinations>
      <rodp:InvalidCombination Feature="HolePunch" Option="Left2"/>
      <rodp:InvalidCombination Feature="MediaType" Option="TRANSPARENCY"/>
    </rodp:InvalidCombinations>
    <rodp:InvalidCombinations>
      <rodp:InvalidCombination Feature="HolePunch" Option="Left2"/>
      <rodp:InvalidCombination Feature="MediaType" Option="Thick"/>
    </rodp:InvalidCombinations>
    <rodp:InvalidCombinations>
      <rodp:InvalidCombination Feature="HolePunch" Option="Left2"/>
      <rodp:InvalidCombination Feature="MediaType" Option="Labels"/>
    </rodp:InvalidCombinations>
    <rodp:InvalidCombinations>
      <rodp:InvalidCombination Feature="HolePunch" Option="Left2"/>
      <rodp:InvalidCombination Feature="MediaType" Option="Plain_Duplex_Backside"/>
    </rodp:InvalidCombinations>
    <rodp:InvalidCombinations>
      <rodp:InvalidCombination Feature="HolePunch" Option="Left2"/>
      <rodp:InvalidCombination Feature="MediaType" Option="Thick_Duplex_Backside"/>
    </rodp:InvalidCombinations>
```

```xml
<rodp:InvalidCombinations>
  <rodp:InvalidCombination Feature="HolePunch" Option="Left3"/>
  <rodp:InvalidCombination Feature="MediaType" Option="TRANSPARENCY"/>
</rodp:InvalidCombinations>
<rodp:InvalidCombinations>
  <rodp:InvalidCombination Feature="HolePunch" Option="Left3"/>
  <rodp:InvalidCombination Feature="MediaType" Option="Thick"/>
</rodp:InvalidCombinations>
<rodp:InvalidCombinations>
  <rodp:InvalidCombination Feature="HolePunch" Option="Left3"/>
  <rodp:InvalidCombination Feature="MediaType" Option="Labels"/>
</rodp:InvalidCombinations>
<rodp:InvalidCombinations>
  <rodp:InvalidCombination Feature="HolePunch" Option="Left3"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="HolePunch" Option="Left3"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="HolePunch" Option="Left4"/>
  <rodp:InvalidCombination Feature="MediaType" Option="TRANSPARENCY"/>
</rodp:InvalidCombinations>
<rodp:InvalidCombinations>
  <rodp:InvalidCombination Feature="HolePunch" Option="Left4"/>
  <rodp:InvalidCombination Feature="MediaType" Option="Thick"/>
</rodp:InvalidCombinations>
<rodp:InvalidCombinations>
  <rodp:InvalidCombination Feature="HolePunch" Option="Left4"/>
  <rodp:InvalidCombination Feature="MediaType" Option="Labels"/>
</rodp:InvalidCombinations>
<rodp:InvalidCombinations>
  <rodp:InvalidCombination Feature="HolePunch" Option="Left4"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="HolePunch" Option="Left4"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="MediaSizeName" Option="na_invoice_5.5x8.5in"/>
  <rodp:InvalidCombination Feature="HolePunch" Option="Left2"/>
```

```xml
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="HolePunch" Option="Top2"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="HolePunch" Option="Right2"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="HolePunch" Option="Left3"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="HolePunch" Option="Top3"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="HolePunch" Option="Right3"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="HolePunch" Option="Left4"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="HolePunch" Option="Top4"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="HolePunch" Option="Right4"/>
</rodp:InvalidCombinations>
<rodp:InvalidCombinations>
    <rodp:InvalidCombination Feature="MediaSizeName" Option="iso_a6_105x148mm"/>
    <rodp:InvalidCombination Feature="HolePunch" Option="Left2"/>
</rodp:InvalidCombinations>
<rodp:InvalidCombinations>
```

```xml
            <rodp:InvalidCombination Feature="MediaSizeName"
Option="iso_a6_105x148mm"/>
            <rodp:InvalidCombination Feature="HolePunch" Option="Top2"/>
        </rodp:InvalidCombinations>
        <rodp:InvalidCombinations>
            <rodp:InvalidCombination Feature="MediaSizeName"
Option="iso_a6_105x148mm"/>
            <rodp:InvalidCombination Feature="HolePunch" Option="Right2"/>
        </rodp:InvalidCombinations>
        <rodp:InvalidCombinations>
            <rodp:InvalidCombination Feature="MediaSizeName"
Option="iso_a6_105x148mm"/>
            <rodp:InvalidCombination Feature="HolePunch" Option="Left3"/>
        </rodp:InvalidCombinations>
        <rodp:InvalidCombinations>
            <rodp:InvalidCombination Feature="MediaSizeName"
Option="iso_a6_105x148mm"/>
            <rodp:InvalidCombination Feature="HolePunch" Option="Top3"/>
        </rodp:InvalidCombinations>
        <rodp:InvalidCombinations>
            <rodp:InvalidCombination Feature="MediaSizeName"
Option="iso_a6_105x148mm"/>
            <rodp:InvalidCombination Feature="HolePunch" Option="Right3"/>
        </rodp:InvalidCombinations>
        <rodp:InvalidCombinations>
            <rodp:InvalidCombination Feature="MediaSizeName"
Option="iso_a6_105x148mm"/>
            <rodp:InvalidCombination Feature="HolePunch" Option="Left4"/>
        </rodp:InvalidCombinations>
        <rodp:InvalidCombinations>
            <rodp:InvalidCombination Feature="MediaSizeName"
Option="iso_a6_105x148mm"/>
            <rodp:InvalidCombination Feature="HolePunch" Option="Top4"/>
        </rodp:InvalidCombinations>
        <rodp:InvalidCombinations>
            <rodp:InvalidCombination Feature="MediaSizeName"
Option="iso_a6_105x148mm"/>
            <rodp:InvalidCombination Feature="HolePunch" Option="Right4"/>
        </rodp:InvalidCombinations>
        <rodp:InvalidCombinations>
            <rodp:InvalidCombination Feature="MediaSizeName" Option="na_number-
10_4.125x9.5in"/>
            <rodp:InvalidCombination Feature="HolePunch" Option="Left2"/>
        </rodp:InvalidCombinations>
        <rodp:InvalidCombinations>
            <rodp:InvalidCombination Feature="MediaSizeName" Option="na_number-
10_4.125x9.5in"/>
            <rodp:InvalidCombination Feature="HolePunch" Option="Top2"/>
```

```xml
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="HolePunch" Option="Right2"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="HolePunch" Option="Left3"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="HolePunch" Option="Top3"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="HolePunch" Option="Right3"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="HolePunch" Option="Left4"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="HolePunch" Option="Top4"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="HolePunch" Option="Right4"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="HolePunch" Option="Left2"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="HolePunch" Option="Top2"/>
</rodp:InvalidCombinations>
<rodp:InvalidCombinations>
```

```xml
            <rodp:InvalidCombination Feature="MediaSizeName" Option="iso_dl_110x220mm"/>
            <rodp:InvalidCombination Feature="HolePunch" Option="Right2"/>
        </rodp:InvalidCombinations>
        <rodp:InvalidCombinations>
            <rodp:InvalidCombination Feature="MediaSizeName" Option="iso_dl_110x220mm"/>
            <rodp:InvalidCombination Feature="HolePunch" Option="Left3"/>
        </rodp:InvalidCombinations>
        <rodp:InvalidCombinations>
            <rodp:InvalidCombination Feature="MediaSizeName" Option="iso_dl_110x220mm"/>
            <rodp:InvalidCombination Feature="HolePunch" Option="Top3"/>
        </rodp:InvalidCombinations>
        <rodp:InvalidCombinations>
            <rodp:InvalidCombination Feature="MediaSizeName" Option="iso_dl_110x220mm"/>
            <rodp:InvalidCombination Feature="HolePunch" Option="Right3"/>
        </rodp:InvalidCombinations>
        <rodp:InvalidCombinations>
            <rodp:InvalidCombination Feature="MediaSizeName" Option="iso_dl_110x220mm"/>
            <rodp:InvalidCombination Feature="HolePunch" Option="Left4"/>
        </rodp:InvalidCombinations>
        <rodp:InvalidCombinations>
            <rodp:InvalidCombination Feature="MediaSizeName" Option="iso_dl_110x220mm"/>
            <rodp:InvalidCombination Feature="HolePunch" Option="Top4"/>
        </rodp:InvalidCombinations>
        <rodp:InvalidCombinations>
            <rodp:InvalidCombination Feature="MediaSizeName" Option="iso_dl_110x220mm"/>
            <rodp:InvalidCombination Feature="HolePunch" Option="Right4"/>
        </rodp:InvalidCombinations>
        <rodp:InvalidCombinations>
            <rodp:InvalidCombination Feature="MediaSizeName" Option="na_monarch_3.875x7.5in"/>
            <rodp:InvalidCombination Feature="HolePunch" Option="Left2"/>
        </rodp:InvalidCombinations>
        <rodp:InvalidCombinations>
            <rodp:InvalidCombination Feature="MediaSizeName" Option="na_monarch_3.875x7.5in"/>
            <rodp:InvalidCombination Feature="HolePunch" Option="Top2"/>
        </rodp:InvalidCombinations>
        <rodp:InvalidCombinations>
            <rodp:InvalidCombination Feature="MediaSizeName" Option="na_monarch_3.875x7.5in"/>
            <rodp:InvalidCombination Feature="HolePunch" Option="Right2"/>
```

```
        </rodp:InvalidCombinations>
        <rodp:InvalidCombinations>
          <rodp:InvalidCombination Feature="MediaSizeName" Option="na_monarch_3.875x7.5in"/>
          <rodp:InvalidCombination Feature="HolePunch" Option="Left3"/>
        </rodp:InvalidCombinations>
        <rodp:InvalidCombinations>
          <rodp:InvalidCombination Feature="MediaSizeName" Option="na_monarch_3.875x7.5in"/>
          <rodp:InvalidCombination Feature="HolePunch" Option="Top3"/>
        </rodp:InvalidCombinations>
        <rodp:InvalidCombinations>
          <rodp:InvalidCombination Feature="MediaSizeName" Option="na_monarch_3.875x7.5in"/>
          <rodp:InvalidCombination Feature="HolePunch" Option="Right3"/>
        </rodp:InvalidCombinations>
        <rodp:InvalidCombinations>
          <rodp:InvalidCombination Feature="MediaSizeName" Option="na_monarch_3.875x7.5in"/>
          <rodp:InvalidCombination Feature="HolePunch" Option="Left4"/>
        </rodp:InvalidCombinations>
        <rodp:InvalidCombinations>
          <rodp:InvalidCombination Feature="MediaSizeName" Option="na_monarch_3.875x7.5in"/>
          <rodp:InvalidCombination Feature="HolePunch" Option="Top4"/>
        </rodp:InvalidCombinations>
        <rodp:InvalidCombinations>
          <rodp:InvalidCombination Feature="MediaSizeName" Option="na_monarch_3.875x7.5in"/>
          <rodp:InvalidCombination Feature="HolePunch" Option="Right4"/>
        </rodp:InvalidCombinations>
        <rodp:InvalidCombinations>
          <rodp:InvalidCombination Feature="MediaSizeName" Option="iso_c5_162x229mm"/>
          <rodp:InvalidCombination Feature="HolePunch" Option="Left2"/>
        </rodp:InvalidCombinations>
        <rodp:InvalidCombinations>
          <rodp:InvalidCombination Feature="MediaSizeName" Option="iso_c5_162x229mm"/>
          <rodp:InvalidCombination Feature="HolePunch" Option="Top2"/>
        </rodp:InvalidCombinations>
        <rodp:InvalidCombinations>
          <rodp:InvalidCombination Feature="MediaSizeName" Option="iso_c5_162x229mm"/>
          <rodp:InvalidCombination Feature="HolePunch" Option="Right2"/>
        </rodp:InvalidCombinations>
        <rodp:InvalidCombinations>
```

```xml
        <rodp:InvalidCombination Feature="MediaSizeName"
Option="iso_c5_162x229mm"/>
        <rodp:InvalidCombination Feature="HolePunch" Option="Left3"/>
      </rodp:InvalidCombinations>
      <rodp:InvalidCombinations>
        <rodp:InvalidCombination Feature="MediaSizeName"
Option="iso_c5_162x229mm"/>
        <rodp:InvalidCombination Feature="HolePunch" Option="Top3"/>
      </rodp:InvalidCombinations>
      <rodp:InvalidCombinations>
        <rodp:InvalidCombination Feature="MediaSizeName"
Option="iso_c5_162x229mm"/>
        <rodp:InvalidCombination Feature="HolePunch" Option="Right3"/>
      </rodp:InvalidCombinations>
      <rodp:InvalidCombinations>
        <rodp:InvalidCombination Feature="MediaSizeName"
Option="iso_c5_162x229mm"/>
        <rodp:InvalidCombination Feature="HolePunch" Option="Left4"/>
      </rodp:InvalidCombinations>
      <rodp:InvalidCombinations>
        <rodp:InvalidCombination Feature="MediaSizeName"
Option="iso_c5_162x229mm"/>
        <rodp:InvalidCombination Feature="HolePunch" Option="Top4"/>
      </rodp:InvalidCombinations>
      <rodp:InvalidCombinations>
        <rodp:InvalidCombination Feature="MediaSizeName"
Option="iso_c5_162x229mm"/>
        <rodp:InvalidCombination Feature="HolePunch" Option="Right4"/>
      </rodp:InvalidCombinations>
      <rodp:InvalidCombinations>
        <rodp:InvalidCombination Feature="MediaSizeName"
Option="iso_c6_114x162mm"/>
        <rodp:InvalidCombination Feature="HolePunch" Option="Left2"/>
      </rodp:InvalidCombinations>
      <rodp:InvalidCombinations>
        <rodp:InvalidCombination Feature="MediaSizeName"
Option="iso_c6_114x162mm"/>
        <rodp:InvalidCombination Feature="HolePunch" Option="Top2"/>
      </rodp:InvalidCombinations>
      <rodp:InvalidCombinations>
        <rodp:InvalidCombination Feature="MediaSizeName"
Option="iso_c6_114x162mm"/>
        <rodp:InvalidCombination Feature="HolePunch" Option="Right2"/>
      </rodp:InvalidCombinations>
      <rodp:InvalidCombinations>
        <rodp:InvalidCombination Feature="MediaSizeName"
Option="iso_c6_114x162mm"/>
        <rodp:InvalidCombination Feature="HolePunch" Option="Left3"/>
```

```xml
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="HolePunch" Option="Top3"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="HolePunch" Option="Right3"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="HolePunch" Option="Left4"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="HolePunch" Option="Top4"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="HolePunch" Option="Right4"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="HolePunch" Option="Left2"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="HolePunch" Option="Top2"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="HolePunch" Option="Right2"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="HolePunch" Option="Left3"/>
</rodp:InvalidCombinations>
<rodp:InvalidCombinations>
```

```xml
      <rodp:InvalidCombination Feature="MediaSizeName" Option="na_arch-b_12x18in"/>
      <rodp:InvalidCombination Feature="HolePunch" Option="Top3"/>
    </rodp:InvalidCombinations>
    <rodp:InvalidCombinations>
      <rodp:InvalidCombination Feature="MediaSizeName" Option="na_arch-b_12x18in"/>
      <rodp:InvalidCombination Feature="HolePunch" Option="Right3"/>
    </rodp:InvalidCombinations>
    <rodp:InvalidCombinations>
      <rodp:InvalidCombination Feature="MediaSizeName" Option="na_arch-b_12x18in"/>
      <rodp:InvalidCombination Feature="HolePunch" Option="Left4"/>
    </rodp:InvalidCombinations>
    <rodp:InvalidCombinations>
      <rodp:InvalidCombination Feature="MediaSizeName" Option="na_arch-b_12x18in"/>
      <rodp:InvalidCombination Feature="HolePunch" Option="Top4"/>
    </rodp:InvalidCombinations>
    <rodp:InvalidCombinations>
      <rodp:InvalidCombination Feature="MediaSizeName" Option="na_arch-b_12x18in"/>
      <rodp:InvalidCombination Feature="HolePunch" Option="Right4"/>
    </rodp:InvalidCombinations>
    <rodp:InvalidCombinations>
      <rodp:InvalidCombination Feature="MediaSizeName" Option="custom_papersize"/>
      <rodp:InvalidCombination Feature="HolePunch" Option="Left2"/>
    </rodp:InvalidCombinations>
    <rodp:InvalidCombinations>
      <rodp:InvalidCombination Feature="MediaSizeName" Option="custom_papersize"/>
      <rodp:InvalidCombination Feature="HolePunch" Option="Top2"/>
    </rodp:InvalidCombinations>
    <rodp:InvalidCombinations>
      <rodp:InvalidCombination Feature="MediaSizeName" Option="custom_papersize"/>
      <rodp:InvalidCombination Feature="HolePunch" Option="Right2"/>
    </rodp:InvalidCombinations>
    <rodp:InvalidCombinations>
      <rodp:InvalidCombination Feature="MediaSizeName" Option="custom_papersize"/>
      <rodp:InvalidCombination Feature="HolePunch" Option="Left3"/>
    </rodp:InvalidCombinations>
    <rodp:InvalidCombinations>
      <rodp:InvalidCombination Feature="MediaSizeName" Option="custom_papersize"/>
      <rodp:InvalidCombination Feature="HolePunch" Option="Top3"/>
    </rodp:InvalidCombinations>
    <rodp:InvalidCombinations>
      <rodp:InvalidCombination Feature="MediaSizeName" Option="custom_papersize"/>
      <rodp:InvalidCombination Feature="HolePunch" Option="Right3"/>
    </rodp:InvalidCombinations>
```

```xml
<rodp:InvalidCombinations>
  <rodp:InvalidCombination Feature="MediaSizeName" Option="custom_papersize"/>
  <rodp:InvalidCombination Feature="HolePunch" Option="Left4"/>
</rodp:InvalidCombinations>
<rodp:InvalidCombinations>
  <rodp:InvalidCombination Feature="MediaSizeName" Option="custom_papersize"/>
  <rodp:InvalidCombination Feature="HolePunch" Option="Top4"/>
</rodp:InvalidCombinations>
<rodp:InvalidCombinations>
  <rodp:InvalidCombination Feature="MediaSizeName" Option="custom_papersize"/>
  <rodp:InvalidCombination Feature="HolePunch" Option="Right4"/>
</rodp:InvalidCombinations>
<rodp:InvalidCombinations>
  <rodp:InvalidCombination Feature="MediaSizeName" Option="na_invoice_5.5x8.5in"/>
  <rodp:InvalidCombination Feature="Sides" Option="TwoSidedLongEdge"/>
</rodp:InvalidCombinations>
<rodp:InvalidCombinations>
  <rodp:InvalidCombination Feature="MediaSizeName" Option="iso_a6_105x148mm"/>
  <rodp:InvalidCombination Feature="Sides" Option="TwoSidedLongEdge"/>
</rodp:InvalidCombinations>
<rodp:InvalidCombinations>
  <rodp:InvalidCombination Feature="MediaSizeName" Option="na_number-10_4.125x9.5in"/>
  <rodp:InvalidCombination Feature="Sides" Option="TwoSidedLongEdge"/>
</rodp:InvalidCombinations>
<rodp:InvalidCombinations>
  <rodp:InvalidCombination Feature="MediaSizeName" Option="iso_dl_110x220mm"/>
  <rodp:InvalidCombination Feature="Sides" Option="TwoSidedLongEdge"/>
</rodp:InvalidCombinations>
<rodp:InvalidCombinations>
  <rodp:InvalidCombination Feature="MediaSizeName" Option="na_monarch_3.875x7.5in"/>
  <rodp:InvalidCombination Feature="Sides" Option="TwoSidedLongEdge"/>
</rodp:InvalidCombinations>
<rodp:InvalidCombinations>
  <rodp:InvalidCombination Feature="MediaSizeName" Option="iso_c5_162x229mm"/>
  <rodp:InvalidCombination Feature="Sides" Option="TwoSidedLongEdge"/>
</rodp:InvalidCombinations>
<rodp:InvalidCombinations>
  <rodp:InvalidCombination Feature="MediaSizeName" Option="iso_c6_114x162mm"/>
  <rodp:InvalidCombination Feature="Sides" Option="TwoSidedLongEdge"/>
</rodp:InvalidCombinations>
<rodp:InvalidCombinations>
```

```xml
        <rodp:InvalidCombination Feature="MediaSizeName" Option="na_arch-b_12x18in"/>
        <rodp:InvalidCombination Feature="Sides" Option="TwoSidedLongEdge"/>
    </rodp:InvalidCombinations>
    <rodp:InvalidCombinations>
        <rodp:InvalidCombination Feature="MediaSizeName" Option="custom_papersize"/>
        <rodp:InvalidCombination Feature="Sides" Option="TwoSidedLongEdge"/>
    </rodp:InvalidCombinations>
    <rodp:InvalidCombinations>
        <rodp:InvalidCombination Feature="MediaSizeName" Option="na_invoice_5.5x8.5in"/>
        <rodp:InvalidCombination Feature="Sides" Option="TwoSidedShortEdge"/>
    </rodp:InvalidCombinations>
    <rodp:InvalidCombinations>
        <rodp:InvalidCombination Feature="MediaSizeName" Option="iso_a6_105x148mm"/>
        <rodp:InvalidCombination Feature="Sides" Option="TwoSidedShortEdge"/>
    </rodp:InvalidCombinations>
    <rodp:InvalidCombinations>
        <rodp:InvalidCombination Feature="MediaSizeName" Option="na_number-10_4.125x9.5in"/>
        <rodp:InvalidCombination Feature="Sides" Option="TwoSidedShortEdge"/>
    </rodp:InvalidCombinations>
    <rodp:InvalidCombinations>
        <rodp:InvalidCombination Feature="MediaSizeName" Option="iso_dl_110x220mm"/>
        <rodp:InvalidCombination Feature="Sides" Option="TwoSidedShortEdge"/>
    </rodp:InvalidCombinations>
    <rodp:InvalidCombinations>
        <rodp:InvalidCombination Feature="MediaSizeName" Option="na_monarch_3.875x7.5in"/>
        <rodp:InvalidCombination Feature="Sides" Option="TwoSidedShortEdge"/>
    </rodp:InvalidCombinations>
    <rodp:InvalidCombinations>
        <rodp:InvalidCombination Feature="MediaSizeName" Option="iso_c5_162x229mm"/>
        <rodp:InvalidCombination Feature="Sides" Option="TwoSidedShortEdge"/>
    </rodp:InvalidCombinations>
    <rodp:InvalidCombinations>
        <rodp:InvalidCombination Feature="MediaSizeName" Option="iso_c6_114x162mm"/>
        <rodp:InvalidCombination Feature="Sides" Option="TwoSidedShortEdge"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Sides" Option="TwoSidedShortEdge"/>
    </rodp:InvalidCombinations>
```

```xml
<rodp:InvalidCombinations>
  <rodp:InvalidCombination Feature="MediaSizeName" Option="custom_papersize"/>
  <rodp:InvalidCombination Feature="Sides" Option="TwoSidedShortEdge"/>
</rodp:InvalidCombinations>
<rodp:InvalidCombinations>
  <rodp:InvalidCombination Feature="Sides" Option="TwoSidedLongEdge"/>
  <rodp:InvalidCombination Feature="MediaType" Option="TRANSPARENCY"/>
</rodp:InvalidCombinations>
<rodp:InvalidCombinations>
  <rodp:InvalidCombination Feature="Sides" Option="TwoSidedLongEdge"/>
  <rodp:InvalidCombination Feature="MediaType" Option="Thick"/>
</rodp:InvalidCombinations>
<rodp:InvalidCombinations>
  <rodp:InvalidCombination Feature="Sides" Option="TwoSidedLongEdge"/>
  <rodp:InvalidCombination Feature="MediaType" Option="Labels"/>
</rodp:InvalidCombinations>
<rodp:InvalidCombinations>
  <rodp:InvalidCombination Feature="Sides" Option="TwoSidedLongEdge"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="Sides" Option="TwoSidedLongEdge"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="Sides" Option="TwoSidedShortEdge"/>
  <rodp:InvalidCombination Feature="MediaType" Option="TRANSPARENCY"/>
</rodp:InvalidCombinations>
<rodp:InvalidCombinations>
  <rodp:InvalidCombination Feature="Sides" Option="TwoSidedShortEdge"/>
  <rodp:InvalidCombination Feature="MediaType" Option="Thick"/>
</rodp:InvalidCombinations>
<rodp:InvalidCombinations>
  <rodp:InvalidCombination Feature="Sides" Option="TwoSidedShortEdge"/>
  <rodp:InvalidCombination Feature="MediaType" Option="Labels"/>
</rodp:InvalidCombinations>
<rodp:InvalidCombinations>
  <rodp:InvalidCombination Feature="Sides" Option="TwoSidedShortEdge"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="Sides" Option="TwoSidedShortEdge"/>
  <rodp:InvalidCombination Feature="MediaType" Option="Thick_Duplex_Backside"/>
</rodp:InvalidCombinations>
```

```
        </rodp:GlobalConstraints>
      </rodp:DeviceConstraints>
    </rodp:RicohExtensionData>
  </wprt:RicohExtensionData>
</RequestedPrinterElements>
```

XIII. APPENDIX B -- EXAMPLE CORE MAPPING DATA

```
<mapfile>
 <DeviceFeature Value="RAM">
  <!--GPD Keyword-->
  <PDLKeyword Value="Memory"/>
  <rcNameID Value="PRINTER_MEMORY_DISPLAY" />
  <Featureoption Value="65536KB">
   <PDLKeyword Value="65536KB" />
  </Featureoption >
 </DeviceFeature >
 <!--No Hard Disk is defined, since no name need to map-->
 <DeviceFeature Value="Finisher">
  <PDLKeyword Value="Finisher"/>
  <rcNameID Value="RC_STR_FINISHER" />
  <FeatureOption Value="NotInstalled">
   <PDLKeyword Value="NotInstalled" />
   <rcNameID Value="RC_STR_NOTINSTALLED" />
  </FeatureOption >
  <FeatureOption Value="Finisher2000">
   <PDLKeyword Value="Finisher2000" />
   <rcNameID Value="RC_STR_2TRAY_FINISHER" />
  </FeatureOption >
  <FeatureOption Value="BookletFinisher">
   <PDLKeyword Value="BookletFinisher" />
   <rcNameID Value="RC_STR_BOOKLET_FINISHER" />
  </FeatureOption>
  <FeatureOption Value="FinisherSR790">
   <PDLKeyword Value="FinisherSR790" />
   <rcNameID Value="RC_STR_FINISHER_SR790" />
  </FeatureOption>
  <FeatureOption Value="FinisherSR3030">
   <PDLKeyword Value="FinisherSR3030" />
   <rcNameID Value="RC_STR_FINISHER_SR3030" />
  </FeatureOption>
 </DeviceFeature >
 <DeviceFeature Value="LeftTray1and2">
  <PDLKeyword Value="LeftTray1and2"/>
  <rcNameID Value="RC_STR_LEFT_TRAY_1_AND_2" />
  <FeatureOption Value="NotInstalled">
   <PDLKeyword Value="NotInstalled" />
   <rcNameID Value="RC_STR_NOTINSTALLED" />
  </FeatureOption >
  <FeatureOption Value="Installed">
   <PDLKeyword Value="Installed" />
   <rcNameID Value="RC_STR_INSTALLED" />
  </FeatureOption >
 </DeviceFeature >
```

```xml
<DeviceFeature Value="InputTray3">
 <PDLKeyword Value="InputTray3"/>
 <rcNameID Value="RC_STR_TRAY3" />
 <FeatureOption Value="NotInstalled">
  <PDLKeyword Value="NotInstalled" />
  <rcNameID Value="RC_STR_NOTINSTALLED" />
 </FeatureOption >
 <FeatureOption Value="Installed">
  <PDLKeyword Value="Installed" />
  <rcNameID Value="RC_STR_INSTALLED" />
 </FeatureOption >
</DeviceFeature >
<DeviceFeature Value="InputTray4">
 <PDLKeyword Value="InputTray4"/>
 <rcNameID Value="RC_STR_TRAY4" />
 <FeatureOption Value="NotInstalled">
  <PDLKeyword Value="NotInstalled" />
  <rcNameID Value="RC_STR_NOTINSTALLED" />
 </FeatureOption >
 <FeatureOption Value="Installed">
  <PDLKeyword Value="Installed" />
  <rcNameID Value="RC_STR_INSTALLED" />
 </FeatureOption >
</DeviceFeature >
<DeviceFeature Value="LargeCapacityTray">
 <PDLKeyword Value="LargeCapacityTray"/>
 <rcNameID Value="RC_STR_LARGE_CAPACITY_TRAY" />
 <FeatureOption Value="NotInstalled">
  <PDLKeyword Value="NotInstalled" />
  <rcNameID Value="RC_STR_NOTINSTALLED" />
 </FeatureOption >
 <FeatureOption Value="Installed">
  <PDLKeyword Value="Installed" />
  <rcNameID Value="RC_STR_INSTALLED" />
 </FeatureOption>
</DeviceFeature>
<DeviceFeature Value="HolePunchUnit">
 <PDLKeyword Value="PunchUnit"/>
 <rcNameID Value="RC_STR_PUNCH_UNIT" />
 <FeatureOption Value="NotInstalled">
  <PDLKeyword Value="NotInstalled" />
  <rcNameID Value="RC_STR_NOTINSTALLED" />
 </FeatureOption >
 <FeatureOption Value="2and3holes">
  <PDLKeyword Value="2and3holes" />
  <rcNameID Value="RC_STR_PUNCH_UNIT_2_AND_3" />
 </FeatureOption >
 <FeatureOption Value="2and4holes">
```

```xml
  <PDLKeyword Value="2and4holes" />
  <rcNameID Value="RC_STR_PUNCH_UNIT_2_AND_4" />
</FeatureOption>
<FeatureOption Value="2holesJP">
  <PDLKeyword Value="2holesJP" />
  <rcNameID Value="RC_STR_PUNCH_UNIT_2_JP" />
</FeatureOption>
<FeatureOption Value="4holesEU">
  <PDLKeyword Value="4holesEU" />
  <rcNameID Value="RC_STR_PUNCH_UNIT_4_EU" />
</FeatureOption>
<FeatureOption Value="4holesNE">
  <PDLKeyword Value="4holesNE" />
  <rcNameID Value="RC_STR_PUNCH_UNIT_4_NE" />
</FeatureOption>
</DeviceFeature>
<DeviceFeature Value="MediaSizeName">
  <PDLKeyword Value="PaperSize"/>
  <rcNameID Value="PAPER_SIZE_DISPLAY" />
  <FeatureOption Value="na_arch-b_12x18in">
    <PDLKeyword Value="12x18" />
    <rcNameID Value="RC_STR_12X18" />
    <BlockMacro Value="=Cmd_Macro_PaperSize_12x18"/>
  </FeatureOption>
  <FeatureOption Value="na_ledger_11x17in">
    <PDLKeyword Value="11X17" />
    <rcNameID Value="RCID_DMPAPER_SYSTEM_NAME" />
    <BlockMacro Value="=Cmd_Macro_PaperSize_11X17"/>
  </FeatureOption>
  <FeatureOption Value="na_legal_8.5x14in">
    <PDLKeyword Value="LEGAL" />
    <rcNameID Value="RCID_DMPAPER_SYSTEM_NAME" />
    <BlockMacro Value="=Cmd_Macro_PaperSize_LEGAL"/>
  </FeatureOption>
  <FeatureOption Value="na_letter_8.5x11in">
    <PDLKeyword Value="LETTER" />
    <rcNameID Value="RCID_DMPAPER_SYSTEM_NAME" />
    <BlockMacro Value="=Cmd_Macro_PaperSize_LETTER"/>
  </FeatureOption>
  <FeatureOption Value="na_executive_7.25x10.5in">
    <PDLKeyword Value="EXECUTIVE" />
    <rcNameID Value="RCID_DMPAPER_SYSTEM_NAME" />
    <BlockMacro Value="=Cmd_Macro_PaperSize_EXECUTIVE"/>
  </FeatureOption>
  <FeatureOption Value="na_invoice_5.5x8.5in">
    <PDLKeyword Value="STATEMENT" />
    <rcNameID Value="RC_STR_5_5X8_5" />
    <BlockMacro Value="=Cmd_Macro_PaperSize_STATEMENT"/>
```

```xml
</FeatureOption >
<FeatureOption Value="iso_a3_297x420mm">
 <PDLKeyword Value="A3" />
 <rcNameID Value="RCID_DMPAPER_SYSTEM_NAME" />
 <BlockMacro Value="=Cmd_Macro_PaperSize_A3"/>
</FeatureOption >
<FeatureOption Value="iso_a4_210x297mm">
 <PDLKeyword Value="A4" />
 <rcNameID Value="RCID_DMPAPER_SYSTEM_NAME" />
 <BlockMacro Value="=Cmd_Macro_PaperSize_A4"/>
</FeatureOption >
<FeatureOption Value="iso_a5_148x210mm">
 <PDLKeyword Value="A5" />
 <rcNameID Value="RCID_DMPAPER_SYSTEM_NAME" />
 <BlockMacro Value="=Cmd_Macro_PaperSize_A5"/>
</FeatureOption >
<FeatureOption Value="iso_a6_105x148mm">
 <PDLKeyword Value="A6" />
 <rcNameID Value="RC_STR_A6" />
 <BlockMacro Value="=Cmd_Macro_PaperSize_A6"/>
</FeatureOption >
<FeatureOption Value="jis_b4_257x364mm">
 <PDLKeyword Value="B4" />
 <rcNameID Value="RCID_DMPAPER_SYSTEM_NAME" />
 <BlockMacro Value="=Cmd_Macro_PaperSize_B4"/>
</FeatureOption >
<FeatureOption Value="jis_b5_182x257mm">
 <PDLKeyword Value="B5" />
 <rcNameID Value="RCID_DMPAPER_SYSTEM_NAME" />
 <BlockMacro Value="=Cmd_Macro_PaperSize_B5"/>
</FeatureOption >
<FeatureOption Value="na_number-10_4.125x9.5in">
 <PDLKeyword Value="ENV_10" />
 <rcNameID Value="RCID_DMPAPER_SYSTEM_NAME" />
 <BlockMacro Value="=Cmd_Macro_PaperSize_ENV_10"/>
</FeatureOption >
<FeatureOption Value="iso_dl_110x220mm">
 <PDLKeyword Value="ENV_DL" />
 <rcNameID Value="RCID_DMPAPER_SYSTEM_NAME" />
 <BlockMacro Value="=Cmd_Macro_PaperSize_ENV_DL"/>
</FeatureOption >
<FeatureOption Value="na_monarch_3.875x7.5in">
 <PDLKeyword Value="ENV_MONARCH" />
 <rcNameID Value="RCID_DMPAPER_SYSTEM_NAME" />
 <BlockMacro Value="=Cmd_Macro_PaperSize_ENV_MONARCH"/>
</FeatureOption >
<FeatureOption Value="iso_c5_162x229mm">
 <PDLKeyword Value="ENV_C5" />
```

```
<rcNameID Value="RCID_DMPAPER_SYSTEM_NAME" />
<BlockMacro Value="=Cmd_Macro_PaperSize_ENV_C5"/>
</FeatureOption >
<FeatureOption Value="iso_c6_114x162mm">
 <PDLKeyword Value="ENV_C6" />
 <rcNameID Value="RCID_DMPAPER_SYSTEM_NAME" />
 <BlockMacro Value="=Cmd_Macro_PaperSize_ENV_C6"/>
</FeatureOption >
<FeatureOption Value="na_foolscap_8.5x13in">
 <PDLKeyword Value="FOLIO" />
 <rcNameID Value="RC_STR_8_5X13" />
 <BlockMacro Value="=Cmd_Macro_PaperSize_FOLIO"/>
</FeatureOption >
<FeatureOption Value="na_unknown_8.25x13in">
 <PDLKeyword Value="8_25x13" />
 <rcNameID Value="RC_STR_8_25X13" />
 <BlockMacro Value="=Cmd_Macro_PaperSize_8_25x13"/>
</FeatureOption >
<FeatureOption Value="na_govt-legal_8x13in">
 <PDLKeyword Value="8x13" />
 <rcNameID Value="RC_STR_8X13" />
 <BlockMacro Value="=Cmd_Macro_PaperSize_8x13"/>
</FeatureOption >
<FeatureOption Value="om_pa-kai_267x389mm">
 <PDLKeyword Value="8kai" />
 <rcNameID Value="RC_STR_8K" />
 <BlockMacro Value="=Cmd_Macro_PaperSize_8kai"/>
</FeatureOption >
<FeatureOption Value="prc_16k_146x215mm">
 <PDLKeyword Value="16kai" />
 <rcNameID Value="RC_STR_16K" />
 <BlockMacro Value="=Cmd_Macro_PaperSize_16kai"/>
</FeatureOption >
<FeatureOption Value="custom_papersize">
 <PDLKeyword Value="CUSTOMSIZE" />
 <rcNameID Value="RCID_DMPAPER_SYSTEM_NAME" />
 <BlockMacro Value="=Cmd_Macro_PaperSize_CUSTOMSIZE"/>
</FeatureOption >
</DeviceFeature >
<DeviceFeature Value="MediaType">
 <PDLKeyword Value="MediaType"/>
 <rcNameID Value="MEDIA_TYPE_DISPLAY" />
 <FeatureOption Value="Auto">
  <PDLKeyword Value="Auto" />
  <rcNameID Value="HT_AUTO_SELECT_DISPLAY" />
 </FeatureOption >
 <FeatureOption Value="STANDARD">
  <PDLKeyword Value="STANDARD" />
```

```
<rcNameID Value="RC_STR_PLAIN" />
</FeatureOption>
<FeatureOption Value="Recycled">
 <PDLKeyword Value="Recycled" />
 <rcNameID Value="RC_STR_RECYCLED" />
</FeatureOption >
<FeatureOption Value="Special">
 <PDLKeyword Value="Special" />
 <rcNameID Value="RC_STR_SPECIAL" />
</FeatureOption >
<FeatureOption Value="Thick">
 <PDLKeyword Value="Thick" />
 <rcNameID Value="RC_STR_THICK" />
</FeatureOption >
<FeatureOption Value="TRANSPARENCY">
 <PDLKeyword Value="TRANSPARENCY" />
 <rcNameID Value="TRANSPARENCY_DISPLAY" />
</FeatureOption >
<FeatureOption Value="Color">
 <PDLKeyword Value="Color" />
 <rcNameID Value="RC_STR_COLOR" />
</FeatureOption >
<FeatureOption Value="Letterhead">
 <PDLKeyword Value="Letterhead" />
 <rcNameID Value="RC_STR_LETTERHEAD" />
</FeatureOption >
<FeatureOption Value="Preprinted">
 <PDLKeyword Value="Preprinted" />
 <rcNameID Value="RC_STR_PREPRINTED" />
</FeatureOption >
<FeatureOption Value="Labels">
 <PDLKeyword Value="Labels" />
 <rcNameID Value="RC_STR_LABELS" />
</FeatureOption >
<FeatureOption Value="Plain_Duplex_Backside">
 <PDLKeyword Value="Plain_Duplex_Backside" />
 <rcNameID Value="RC_STR_PLAIN_DUPLEX_BACKSIDE" />
</FeatureOption >
<FeatureOption Value="Thick_Duplex_Backside">
 <PDLKeyword Value="Thick_Duplex_Backside" />
 <rcNameID Value="RC_STR_THICK_DUPLEX_BACKSIDE" />
</FeatureOption>
<FeatureOption Value="Special1">
 <PDLKeyword Value="Special1" />
 <rcNameID Value="RC_STR_SPECIAL1" />
</FeatureOption >
<FeatureOption Value="Special2">
 <PDLKeyword Value="Special2" />
```

```xml
<rcNameID Value="RC_STR_SPECIAL2" />
</FeatureOption >
<FeatureOption Value="Special3">
 <PDLKeyword Value="Special3" />
 <rcNameID Value="RC_STR_SPECIAL3" />
</FeatureOption >
<FeatureOption Value="Thick1">
 <PDLKeyword Value="Thick1" />
 <rcNameID Value="RC_STR_THICK1" />
</FeatureOption >
<FeatureOption Value="Thick2">
 <PDLKeyword Value="Thick2" />
 <rcNameID Value="RC_STR_THICK2" />
</FeatureOption >
<FeatureOption Value="Thick3">
 <PDLKeyword Value="Thick3" />
 <rcNameID Value="RC_STR_THICK3" />
</FeatureOption >
<FeatureOption Value="Cardstock">
 <PDLKeyword Value="Cardstock" />
 <rcNameID Value="RC_STR_CARDSTOCK" />
</FeatureOption >
<FeatureOption Value="MiddleThick">
 <PDLKeyword Value="MiddleThick" />
 <rcNameID Value="RC_STR_MIDDLETHICK" />
</FeatureOption >
<FeatureOption Value="Thick_Duplex_Backside1">
 <PDLKeyword Value="Thick_Duplex_Backside1" />
 <rcNameID Value="RC_STR_THICK_DUPLEX_BACKSIDE1" />
</FeatureOption >
<FeatureOption Value="Thick_Duplex_Backside2">
 <PDLKeyword Value="Thick_Duplex_Backside2" />
 <rcNameID Value="RC_STR_THICK_DUPLEX_BACKSIDE2" />
</FeatureOption >
<FeatureOption Value="Thick_Duplex_Backside3">
 <PDLKeyword Value="Thick_Duplex_Backside3" />
 <rcNameID Value="RC_STR_THICK_DUPLEX_BACKSIDE3" />
</FeatureOption >
<FeatureOption Value="Thick1GAP3">
 <PDLKeyword Value="Thick1GAP3" />
 <rcNameID Value="RC_STR_THICK1GAP3" />
</FeatureOption >
<FeatureOption Value="Thick2GAP3">
 <PDLKeyword Value="Thick2GAP3" />
 <rcNameID Value="RC_STR_THICK2GAP3" />
</FeatureOption >
<FeatureOption Value="Plain_Duplex_Backside">
 <PDLKeyword Value="Plain_Duplex_Backside" />
```

```xml
    <rcNameID Value="RC_STR_PLAIN_DUPLEX_BACKSIDE" />
</FeatureOption >
<FeatureOption Value="ThinGAP3">
    <PDLKeyword Value="ThinGAP3" />
    <rcNameID Value="RC_STR_THINGAP3" />
</FeatureOption >
<FeatureOption Value="GLOSSY">
    <PDLKeyword Value="GLOSSY" />
    <rcNameID Value="GLOSSY_PAPER_DISPLAY" />
</FeatureOption >
<FeatureOption Value="Coated">
    <PDLKeyword Value="Coated" />
    <rcNameID Value="RC_STR_COATED" />
</FeatureOption >
<FeatureOption Value="PlainPaperGAP3">
    <PDLKeyword Value="PlainPaperGAP3" />
    <rcNameID Value="RC_STR_PLAINGAP3" />
</FeatureOption >
<FeatureOption Value="Bond">
    <PDLKeyword Value="Bond" />
    <rcNameID Value="RC_STR_BOND" />
</FeatureOption >
<FeatureOption Value="Thin">
    <PDLKeyword Value="Thin" />
    <rcNameID Value="RC_STR_THIN" />
</FeatureOption >
</DeviceFeature >
<DeviceFeature Value="InputBins">
    <PDLKeyword Value="InputBin"/>
    <rcNameID Value="PAPER_SOURCE_DISPLAY" />
    <FeatureOption Value="AUTO">
        <PDLKeyword Value="AUTO" />
        <rcNameID Value="RC_STR_AUTO_SELECT_BY_PRINTER" />
    </FeatureOption >
    <FeatureOption Value="Bypass">
        <PDLKeyword Value="BypassTray" />
        <rcNameID Value="RC_STR_BYPASS_TRAY" />
        <OptionID Value="RI_DMBINBYPASS_TRAY" />
    </FeatureOption >
    <FeatureOption Value="Tray1">
        <PDLKeyword Value="Tray1" />
        <rcNameID Value="RC_STR_TRAY1" />
        <OptionID Value="RI_DMBIN_TRAY1" />
    </FeatureOption >
    <FeatureOption Value="Tray2">
        <PDLKeyword Value="Tray2" />
        <rcNameID Value="RC_STR_TRAY2" />
        <OptionID Value="RI_DMBIN_TRAY2" />
```

```
</FeatureOption >
<FeatureOption Value="Tray3">
 <PDLKeyword Value="Tray3" />
 <rcNameID Value="RC_STR_TRAY3" />
 <OptionID Value="RI_DMBIN_TRAY3" />
</FeatureOption >
<FeatureOption Value="Tray4">
 <PDLKeyword Value="Tray4" />
 <rcNameID Value="RC_STR_TRAY4" />
 <OptionID Value="RI_DMBIN_TRAY4" />
</FeatureOption >
<FeatureOption Value="LargeCapacity">
 <PDLKeyword Value="LARGECAPACITY" />
 <rcNameID Value="RC_STR_LARGE_CAPACITY_TRAY" />
</FeatureOption>
</DeviceFeature >
<DeviceFeature Value="SlipSheet">
 <PDLKeyword Value="SlipSheet"/>
 <rcNameID Value="RC_STR_SLIPSHEET" />
 <FeatureOption Value="OFF">
  <PDLKeyword Value="OFF" />
  <rcNameID Value="OFF_DISPLAY" />
 </FeatureOption>
 <FeatureOption Value="ON">
  <PDLKeyword Value="ON" />
  <rcNameID Value="ON_DISPLAY" />
 </FeatureOption>
</DeviceFeature >
<DeviceFeature Value="SlipSheetInputBin">
 <PDLKeyword Value="SlipSheetInputBin"/>
 <rcNameID Value="RC_STR_SLIPSHEET_PAPER_SOURCE" />
 <FeatureOption Value="Bypass">
  <PDLKeyword Value="BypassTray" />
  <rcNameID Value="RC_STR_BYPASS_TRAY" />
 </FeatureOption>
 <FeatureOption Value="Tray1">
  <PDLKeyword Value="Tray1" />
  <rcNameID Value="RC_STR_TRAY1" />
 </FeatureOption>
 <FeatureOption Value="Tray2">
  <PDLKeyword Value="Tray2" />
  <rcNameID Value="RC_STR_TRAY2" />
 </FeatureOption>
 <FeatureOption Value="Tray3">
  <PDLKeyword Value="Tray3" />
  <rcNameID Value="RC_STR_TRAY3" />
 </FeatureOption>
 <FeatureOption Value="Tray4">
```

```xml
    <PDLKeyword Value="Tray4" />
    <rcNameID Value="RC_STR_TRAY4" />
  </FeatureOption>
  <FeatureOption Value="LargeCapacity">
    <PDLKeyword Value="LARGECAPACITY" />
    <rcNameID Value="RC_STR_LARGE_CAPACITY_TRAY" />
  </FeatureOption>
</DeviceFeature >
<DeviceFeature Value="OutputBins">
  <PDLKeyword Value="OutputBin"/>
  <rcNameID Value="OUTPUTBIN_DISPLAY" />
  <FeatureOption Value="PrinterDefault">
    <PDLKeyword Value="PrinterDefault" />
    <rcNameID Value="RC_STR_PRINTER_DEFAULT" />
  </FeatureOption>
  <FeatureOption Value="StandardTray">
    <PDLKeyword Value="StandardTray" />
    <rcNameID Value="RC_STR_STANDARD_TRAY" />
  </FeatureOption>
  <FeatureOption Value="ExternalTray">
    <PDLKeyword Value="ExternalTray" />
    <rcNameID Value="RC_STR_EXTERNAL_TRAY" />
  </FeatureOption>
  <FeatureOption Value="FinisherShiftTray1">
    <PDLKeyword Value="FinisherShiftTray1" />
    <rcNameID Value="RC_STR_FINISHER_SHIFT_TRAY1" />
  </FeatureOption>
  <FeatureOption Value="FinisherShiftTray2">
    <PDLKeyword Value="FinisherShiftTray2" />
    <rcNameID Value="RC_STR_FINISHER_SHIFT_TRAY2" />
  </FeatureOption>
  <FeatureOption Value="FinisherShiftTray">
    <PDLKeyword Value="FinisherShiftTray" />
    <rcNameID Value="RC_STR_FINISHER_SHIFT_TRAY" />
  </FeatureOption>
  <FeatureOption Value="FinisherBookletTray">
    <PDLKeyword Value="FinisherBookletTray" />
    <rcNameID Value="RC_STR_BOOKLET_FINISHER_TRAY" />
  </FeatureOption>
  <FeatureOption Value="LeftTray1">
    <PDLKeyword Value="LeftTray1" />
    <rcNameID Value="RC_STR_LEFT_TRAY1" />
  </FeatureOption>
  <FeatureOption Value="LeftTray2">
    <PDLKeyword Value="LeftTray2" />
    <rcNameID Value="RC_STR_LEFT_TRAY2" />
  </FeatureOption>
  <FeatureOption Value="FinisherUpperTray">
```

```xml
<PDLKeyword Value="FinisherUpperTray" />
  <rcNameID Value="RC_STR_FINISHER_UPPER_TRAY" />
 </FeatureOption>
</DeviceFeature >
<DeviceFeature Value="Staple">
 <PDLKeyword Value="Stapling"/>
 <rcNameID Value="RC_STR_STAPLE" />
 <FeatureOption Value="OFF">
  <PDLKeyword Value="OFF" />
  <rcNameID Value="OFF_DISPLAY" />
 </FeatureOption>
 <FeatureOption Value="TopLeft">
  <PDLKeyword Value="TopLeft" />
  <rcNameID Value="RC_STR_TOP_LEFT" />
 </FeatureOption>
 <FeatureOption Value="TopRight">
  <PDLKeyword Value="TopRight" />
  <rcNameID Value="RC_STR_TOP_RIGHT" />
 </FeatureOption>
 <FeatureOption Value="Left2">
  <PDLKeyword Value="Left2" />
  <rcNameID Value="RC_STR_LEFT2" />
 </FeatureOption>
 <FeatureOption Value="Top2">
  <PDLKeyword Value="Top2" />
  <rcNameID Value="RC_STR_TOP2" />
 </FeatureOption>
 <FeatureOption Value="Right2">
  <PDLKeyword Value="Right2" />
  <rcNameID Value="RC_STR_RIGHT2" />
 </FeatureOption>
 <FeatureOption Value="TopLeftSlant">
  <PDLKeyword Value="TopLeftSlant" />
  <rcNameID Value="RC_STR_TOP_LEFT_SLANT" />
 </FeatureOption>
 <FeatureOption Value="TopRightSlant">
  <PDLKeyword Value="TopRightSlant" />
  <rcNameID Value="RC_STR_TOP_RIGHT_SLANT" />
 </FeatureOption>
 <FeatureOption Value="Booklet">
  <PDLKeyword Value="Booklet" />
  <rcNameID Value="RC_STR_BOOKLET" />
 </FeatureOption>
</DeviceFeature >
<DeviceFeature Value="HolePunch">
 <PDLKeyword Value="Punching"/>
 <rcNameID Value="RC_STR_PUNCH" />
 <FeatureOption Value="OFF">
```

```
    <PDLKeyword Value="OFF" />
    <rcNameID Value="OFF_DISPLAY" />
  </FeatureOption >
  <FeatureOption Value="Left2">
    <PDLKeyword Value="Left2" />
    <rcNameID Value="RC_STR_LEFT2" />
  </FeatureOption >
  <FeatureOption Value="Top2">
    <PDLKeyword Value="Top2" />
    <rcNameID Value="RC_STR_TOP2" />
  </FeatureOption >
  <FeatureOption Value="Right2">
    <PDLKeyword Value="Right2" />
    <rcNameID Value="RC_STR_RIGHT2" />
  </FeatureOption >
  <FeatureOption Value="Left3">
    <PDLKeyword Value="Left3" />
    <rcNameID Value="RC_STR_LEFT3" />
  </FeatureOption >
  <FeatureOption Value="Top3">
    <PDLKeyword Value="Top3" />
    <rcNameID Value="RC_STR_TOP3" />
  </FeatureOption >
  <FeatureOption Value="Right3">
    <PDLKeyword Value="Right3" />
    <rcNameID Value="RC_STR_RIGHT3" />
  </FeatureOption >
  <FeatureOption Value="Left4">
    <PDLKeyword Value="Left4" />
    <rcNameID Value="RC_STR_LEFT4" />
  </FeatureOption >
  <FeatureOption Value="Top4">
    <PDLKeyword Value="Top4" />
    <rcNameID Value="RC_STR_TOP4" />
  </FeatureOption >
  <FeatureOption Value="Right4">
    <PDLKeyword Value="Right4" />
    <rcNameID Value="RC_STR_RIGHT4" />
  </FeatureOption >
</DeviceFeature >
<DeviceFeature Value="Orientation">
  <PDLKeyword Value="Orientation"/>
  <rcNameID Value="ORIENTATION_DISPLAY" />
  <FeatureOption Value="Portrait">
    <PDLKeyword Value="PORTRAIT" />
    <rcNameID Value="PORTRAIT_DISPLAY" />
  </FeatureOption >
  <FeatureOption Value="Landscape">
```

```xml
    <PDLKeyword Value="LANDSCAPE_CC90" />
    <rcNameID Value="LANDSCAPE_DISPLAY" />
  </FeatureOption >
</DeviceFeature >
<DeviceFeature Value="Sides">
  <PDLKeyword Value="Duplex"/>
  <rcNameID Value="TWO_SIDED_PRINTING_DISPLAY" />
  <FeatureOption Value="OneSided">
    <PDLKeyword Value="NONE" />
    <rcNameID Value="NONE_DISPLAY" />
  </FeatureOption >
  <FeatureOption Value="TwoSidedLongEdge">
    <PDLKeyword Value="VERTICAL" />
    <rcNameID Value="FLIP_ON_LONG_EDGE_DISPLAY" />
  </FeatureOption >
  <FeatureOption Value="TwoSidedShortEdge">
    <PDLKeyword Value="HORIZONTAL" />
    <rcNameID Value="FLIP_ON_SHORT_EDGE_DISPLAY" />
  </FeatureOption >
</DeviceFeature >
<DeviceFeature Value="Dither">
  <PDLKeyword Value="Dither"/>
  <rcNameID Value="RC_STR_DITHER_QUALITY" />
  <FeatureOption Value="High">
    <PDLKeyword Value="High" />
    <rcNameID Value="RC_STR_HIGH" />
  </FeatureOption >
  <FeatureOption Value="Low">
    <PDLKeyword Value="Low" />
    <rcNameID Value="RC_STR_LOW" />
  </FeatureOption >
</DeviceFeature >
<DeviceFeature Value="Resolution">
  <PDLKeyword Value="Resolution"/>
  <rcNameID Value="RESOLUTION_DISPLAY" />
  <FeatureOption Value="1200">
    <PDLKeyword Value="1200dpi"/>
    <rcNameID Value="RC_STR_1200DPI" />
  </FeatureOption >
  <FeatureOption Value="600">
    <PDLKeyword Value="600dpi"/>
    <rcNameID Value="RC_STR_600DPI" />
  </FeatureOption >
</DeviceFeature >
<DeviceFeature Value="TrueTypeFormat">
  <PDLKeyword Value="TrueTypeFormat"/>
  <rcNameID Value="RC_STR_TRUETYPE_FORMAT" />
  <FeatureOption Value="TTFDownloadAsBitmap">
```

```xml
    <PDLKeyword Value="TTFDownloadAsBitmap" />
    <rcNameID Value="RC_STR_TRUETYPE_BITMAP" />
  </FeatureOption>
  <FeatureOption Value="TTFDownloadDisabled">
    <PDLKeyword Value="TTFDownloadDisabled" />
    <rcNameID Value="RC_STR_TRUETYPE_DOWNLOADNONE" />
  </FeatureOption>
</DeviceFeature>
<DeviceFeature Value="ColorMode">
  <PDLKeyword Value="ColorMode"/>
  <rcNameID Value="COLOR_PRINTING_MODE_DISPLAY" />
  <FeatureOption Value="24bpp">
    <PDLKeyword Value="24bpp"/>
    <rcNameID Value="24BPP_DISPLAY" />
  </FeatureOption>
  <FeatureOption Value="Mono">
    <PDLKeyword Value="Mono"/>
    <rcNameID Value="MONO_DISPLAY" />
  </FeatureOption>
</DeviceFeature>
<DeviceFeature Value="Collate">
  <PDLKeyword Value="Collate"/>
  <FeatureOption Value="true">
    <PDLKeyword Value="ON" />
    <rcNameID Value="ON_DISPLAY" />
  </FeatureOption>
  <FeatureOption Value="false">
    <PDLKeyword Value="OFF" />
    <rcNameID Value="OFF_DISPLAY" />
  </FeatureOption>
</DeviceFeature>
<DeviceFeature Value="PrintQuality">
  <PDLKeyword Value="PrintQuality"/>
  <rcNameID Value="TEXT_QUALITY_DISPLAY" />
  <FeatureOption Value="SmoothingOff">
    <PDLKeyword Value="SmoothingOff" />
    <rcNameID Value="RC_STR_EDGE_SMOOTHING_OFF" />
  </FeatureOption>
  <FeatureOption Value="SmoothingOn">
    <PDLKeyword Value="SmoothingOn" />
    <rcNameID Value="RC_STR_EDGE_SMOOTHING_ON" />
  </FeatureOption>
</DeviceFeature>
<DeviceFeature Value="PrintDensity">
  <PDLKeyword Value="PrintDensity"/>
  <rcNameID Value="PRINTDENSITY_DISPLAY" />
  <FeatureOption Value="EconomodeOff">
    <PDLKeyword Value="EconomodeOff" />
```

```xml
    <rcNameID Value="RC_STR_TONER_SAVER_OFF" />
   </FeatureOption>
   <FeatureOption Value="EconomodeOn">
    <PDLKeyword Value="EconomodeOn" />
    <rcNameID Value="RC_STR_TONER_SAVER_ON" />
   </FeatureOption>
  </DeviceFeature>
  <DeviceFeature Value="LCTDetail">
   <PDLKeyword Value="LCTDetail"/>
   <rcNameID Value="RC_STR_LARGE_CAPACITY_TRAY" />
   <FeatureOption Value="NotInstalled">
    <PDLKeyword Value="NotInstalled" />
    <rcNameID Value="RC_STR_NOTINSTALLED" />
   </FeatureOption >
   <FeatureOption Value="Installed">
    <PDLKeyword Value="Installed" />
    <rcNameID Value="RC_STR_INSTALLED" />
   </FeatureOption>
  </DeviceFeature>
  <DeviceFeature Value="Tray3LCT">
   <PDLKeyword Value="Tray3LCT"/>
   <rcNameID Value="RC_STR_TRAY3_LCT" />
   <FeatureOption Value="NotInstalled">
    <PDLKeyword Value="NotInstalled" />
    <rcNameID Value="RC_STR_NOTINSTALLED" />
   </FeatureOption >
   <FeatureOption Value="Installed">
    <PDLKeyword Value="Installed" />
    <rcNameID Value="RC_STR_INSTALLED" />
   </FeatureOption>
  </DeviceFeature>
  <DeviceFeature Value="Memory_HardDisk">
   <PDLKeyword Value="Memory_HardDisk"/>
   <rcNameID Value="RC_STR_MEMORY_HARDDISK" />
   <FeatureOption Value="256MB_NotInstalled">
    <PDLKeyword Value="256MB_NotInstalled" />
    <rcNameID Value="RC_STR_256MB_NOTINSTALLED" />
   </FeatureOption >
   <FeatureOption Value="256MB_Installed">
    <PDLKeyword Value="256MB_Installed" />
    <rcNameID Value="RC_STR_256MB_INSTALLED" />
   </FeatureOption>
   <FeatureOption Value="384MBorMore_NotInstalled">
    <PDLKeyword Value="384MBorMore_NotInstalled" />
    <rcNameID Value="RC_STR_384MBORMORE_NOTINSTALLED" />
   </FeatureOption>
   <FeatureOption Value="384MBorMore_Installed">
    <PDLKeyword Value="384MBorMore_Installed" />
```

```xml
    <rcNameID Value="RC_STR_384MBORMORE_INSTALLED" />
  </FeatureOption>
</DeviceFeature>
<DeviceFeature Value="EdgeToEdgePrint">
  <PDLKeyword Value="EdgeToEdgePrint"/>
  <rcNameID Value="RC_STR_EDGE_TO_EDGE_PRINT" />
  <FeatureOption Value="OFF">
    <PDLKeyword Value="OFF" />
    <rcNameID Value="OFF_DISPLAY" />
  </FeatureOption >
  <FeatureOption Value="ON">
    <PDLKeyword Value="ON" />
    <rcNameID Value="ON_DISPLAY" />
  </FeatureOption>
</DeviceFeature>
<DeviceFeature Value="InputTray2">
  <PDLKeyword Value="InputTray2"/>
  <rcNameID Value="RC_STR_TRAY2" />
  <FeatureOption Value="NotInstalled">
    <PDLKeyword Value="NotInstalled" />
    <rcNameID Value="RC_STR_NOTINSTALLED" />
  </FeatureOption >
  <FeatureOption Value="Installed">
    <PDLKeyword Value="Installed" />
    <rcNameID Value="RC_STR_INSTALLED" />
  </FeatureOption>
</DeviceFeature>
<DeviceFeature Value="HardDisk">
  <PDLKeyword Value="HardDisk"/>
  <rcNameID Value="RC_STR_HARDDISK" />
  <FeatureOption Value="NotInstalled">
    <PDLKeyword Value="NotInstalled" />
    <rcNameID Value="RC_STR_NOTINSTALLED" />
  </FeatureOption >
  <FeatureOption Value="Installed">
    <PDLKeyword Value="Installed" />
    <rcNameID Value="RC_STR_INSTALLED" />
  </FeatureOption>
</DeviceFeature>
</mapfile>
```

IX. APPENDIX C -- EXAMPLE PRINTER DESCRIPTION DATA

```xml
<PrinterDescriptionData Device="RICOH Future Printer 2010">
  <DeviceFeatures>
    <DeviceFeature Value="InputTray3" PrinterProperty="true">
      <PDLKeyword Value="InputTray3"/>
      <rcNameID Value="RC_STR_TRAY3"/>
      <DisplayName xml:lang="en-US">Tray 3</DisplayName>
      <DefaultOption>NotInstalled</DefaultOption>
      <FeatureOption Value="NotInstalled">
        <PDLKeyword Value="NotInstalled"/>
        <rcNameID Value="RC_STR_NOTINSTALLED"/>
        <DisplayName xml:lang="en-US">Not Installed</DisplayName>
      </FeatureOption>
      <FeatureOption Value="Installed">
        <PDLKeyword Value="Installed"/>
        <rcNameID Value="RC_STR_INSTALLED"/>
        <DisplayName xml:lang="en-US">Installed</DisplayName>
      </FeatureOption>
    </DeviceFeature>
    <DeviceFeature Value="InputTray4" PrinterProperty="true">
      <PDLKeyword Value="InputTray4"/>
      <rcNameID Value="RC_STR_TRAY4"/>
      <DisplayName xml:lang="en-US">Tray 4</DisplayName>
      <DefaultOption>NotInstalled</DefaultOption>
      <FeatureOption Value="NotInstalled">
        <PDLKeyword Value="NotInstalled"/>
        <rcNameID Value="RC_STR_NOTINSTALLED"/>
        <DisplayName xml:lang="en-US">Not Installed</DisplayName>
      </FeatureOption>
      <FeatureOption Value="Installed">
        <PDLKeyword Value="Installed"/>
        <rcNameID Value="RC_STR_INSTALLED"/>
        <DisplayName xml:lang="en-US">Installed</DisplayName>
        <Constraints>
          <Constraint Feature="InputTray3" Option="NotInstalled"/>
        </Constraints>
      </FeatureOption>
    </DeviceFeature>
    <DeviceFeature Value="LargeCapacityTray" PrinterProperty="true">
      <PDLKeyword Value="LargeCapacityTray"/>
      <rcNameID Value="RC_STR_LARGE_CAPACITY_TRAY"/>
      <DisplayName xml:lang="en-US">Large Capacity Tray</DisplayName>
      <DefaultOption>NotInstalled</DefaultOption>
      <FeatureOption Value="NotInstalled">
        <PDLKeyword Value="NotInstalled"/>
        <rcNameID Value="RC_STR_NOTINSTALLED"/>
        <DisplayName xml:lang="en-US">Not Installed</DisplayName>
```

```xml
    </FeatureOption>
    <FeatureOption Value="Installed">
      <PDLKeyword Value="Installed"/>
      <rcNameID Value="RC_STR_INSTALLED"/>
      <DisplayName xml:lang="en-US">Installed</DisplayName>
    </FeatureOption>
  </DeviceFeature>
  <DeviceFeature Value="LeftTray1and2" PrinterProperty="true">
    <PDLKeyword Value="LeftTray1and2"/>
    <rcNameID Value="RC_STR_LEFT_TRAY_1_AND_2"/>
    <DisplayName xml:lang="en-US">Left Tray 1 and 2</DisplayName>
    <DefaultOption>NotInstalled</DefaultOption>
    <FeatureOption Value="NotInstalled">
      <PDLKeyword Value="NotInstalled"/>
      <rcNameID Value="RC_STR_NOTINSTALLED"/>
      <DisplayName xml:lang="en-US">Not Installed</DisplayName>
      <Constraints>
        <Constraint Feature="OutputBins" Option="LeftTray1"/>
        <Constraint Feature="OutputBins" Option="LeftTray2"/>
      </Constraints>
    </FeatureOption>
    <FeatureOption Value="Installed">
      <PDLKeyword Value="Installed"/>
      <rcNameID Value="RC_STR_INSTALLED"/>
      <DisplayName xml:lang="en-US">Installed</DisplayName>
      <Constraints>
        <Constraint Feature="HolePunchUnit" Option="2holesJP"/>
        <Constraint Feature="HolePunchUnit" Option="4holesEU"/>
        <Constraint Feature="HolePunchUnit" Option="4holesNE"/>
        <Constraint Feature="HolePunchUnit" Option="2and3holes"/>
        <Constraint Feature="HolePunchUnit" Option="2and4holes"/>
        <Constraint Feature="OutputBins" Option="FinisherShiftTray1"/>
        <Constraint Feature="OutputBins" Option="FinisherShiftTray2"/>
        <Constraint Feature="OutputBins" Option="FinisherShiftTray"/>
        <Constraint Feature="OutputBins" Option="FinisherBookletTray"/>
      </Constraints>
    </FeatureOption>
  </DeviceFeature>
  <DeviceFeature Value="Finisher" PrinterProperty="true">
    <PDLKeyword Value="Finisher"/>
    <rcNameID Value="RC_STR_FINISHER"/>
    <DisplayName xml:lang="en-US">Finisher</DisplayName>
    <DefaultOption>NotInstalled</DefaultOption>
    <FeatureOption Value="NotInstalled">
      <PDLKeyword Value="NotInstalled"/>
      <rcNameID Value="RC_STR_NOTINSTALLED"/>
      <DisplayName xml:lang="en-US">Not Installed</DisplayName>
      <Constraints>
```

```xml
    <Constraint Feature="OutputBins" Option="FinisherShiftTray1"/>
    <Constraint Feature="OutputBins" Option="FinisherShiftTray2"/>
    <Constraint Feature="OutputBins" Option="FinisherShiftTray"/>
    <Constraint Feature="OutputBins" Option="FinisherBookletTray"/>
    <Constraint Feature="HolePunchUnit" Option="2and3holes"/>
    <Constraint Feature="HolePunchUnit" Option="2and4holes"/>
    <Constraint Feature="HolePunchUnit" Option="2holesJP"/>
    <Constraint Feature="HolePunchUnit" Option="4holesEU"/>
    <Constraint Feature="HolePunchUnit" Option="4holesNE"/>
  </Constraints>
</FeatureOption>
<FeatureOption Value="Finisher2000">
  <PDLKeyword Value="Finisher2000"/>
  <rcNameID Value="RC_STR_2TRAY_FINISHER"/>
  <DisplayName xml:lang="en-US">2 Tray Finisher</DisplayName>
  <Constraints>
    <Constraint Feature="LeftTray1and2" Option="Installed"/>
    <Constraint Feature="HolePunchUnit" Option="2holesJP"/>
    <Constraint Feature="HolePunchUnit" Option="4holesEU"/>
    <Constraint Feature="OutputBins" Option="FinisherShiftTray"/>
    <Constraint Feature="OutputBins" Option="FinisherBookletTray"/>
    <Constraint Feature="OutputBins" Option="LeftTray1"/>
    <Constraint Feature="OutputBins" Option="LeftTray2"/>
  </Constraints>
</FeatureOption>
<FeatureOption Value="BookletFinisher">
  <PDLKeyword Value="BookletFinisher"/>
  <rcNameID Value="RC_STR_BOOKLET_FINISHER"/>
  <DisplayName xml:lang="en-US">Booklet Finisher</DisplayName>
  <Constraints>
    <Constraint Feature="LeftTray1and2" Option="Installed"/>
    <Constraint Feature="HolePunchUnit" Option="2and4holes"/>
    <Constraint Feature="OutputBins" Option="FinisherShiftTray1"/>
    <Constraint Feature="OutputBins" Option="FinisherShiftTray2"/>
    <Constraint Feature="OutputBins" Option="LeftTray1"/>
    <Constraint Feature="OutputBins" Option="LeftTray2"/>
  </Constraints>
</FeatureOption>
</DeviceFeature>
<DeviceFeature Value="HolePunchUnit" PrinterProperty="true">
  <PDLKeyword Value="PunchUnit"/>
  <rcNameID Value="RC_STR_PUNCH_UNIT"/>
  <DisplayName xml:lang="en-US">Punch Unit</DisplayName>
  <DefaultOption>NotInstalled</DefaultOption>
  <FeatureOption Value="NotInstalled">
    <PDLKeyword Value="NotInstalled"/>
    <rcNameID Value="RC_STR_NOTINSTALLED"/>
    <DisplayName xml:lang="en-US">Not Installed</DisplayName>
```

```xml
<Constraints>
  <Constraint Feature="HolePunch" Option="Left2"/>
  <Constraint Feature="HolePunch" Option="Top2"/>
  <Constraint Feature="HolePunch" Option="Right2"/>
  <Constraint Feature="HolePunch" Option="Left3"/>
  <Constraint Feature="HolePunch" Option="Top3"/>
  <Constraint Feature="HolePunch" Option="Right3"/>
  <Constraint Feature="HolePunch" Option="Left4"/>
  <Constraint Feature="HolePunch" Option="Top4"/>
  <Constraint Feature="HolePunch" Option="Right4"/>
</Constraints>
</FeatureOption>
<FeatureOption Value="2and3holes">
 <PDLKeyword Value="2and3holes"/>
 <rcNameID Value="RC_STR_PUNCH_UNIT_2_AND_3"/>
 <DisplayName xml:lang="en-US">2 and 3 holes</DisplayName>
 <Constraints>
  <Constraint Feature="HolePunch" Option="Left4"/>
  <Constraint Feature="HolePunch" Option="Top4"/>
  <Constraint Feature="HolePunch" Option="Right4"/>
 </Constraints>
</FeatureOption>
<FeatureOption Value="2and4holes">
 <PDLKeyword Value="2and4holes"/>
 <rcNameID Value="RC_STR_PUNCH_UNIT_2_AND_4"/>
 <DisplayName xml:lang="en-US">2 and 4 holes</DisplayName>
 <Constraints>
  <Constraint Feature="HolePunch" Option="Left3"/>
  <Constraint Feature="HolePunch" Option="Top3"/>
  <Constraint Feature="HolePunch" Option="Right3"/>
 </Constraints>
</FeatureOption>
<FeatureOption Value="2holesJP">
 <PDLKeyword Value="2holesJP"/>
 <rcNameID Value="RC_STR_PUNCH_UNIT_2_JP"/>
 <DisplayName xml:lang="en-US">2 holes type JP</DisplayName>
 <Constraints>
  <Constraint Feature="HolePunch" Option="Left4"/>
  <Constraint Feature="HolePunch" Option="Top4"/>
  <Constraint Feature="HolePunch" Option="Right4"/>
  <Constraint Feature="HolePunch" Option="Left3"/>
  <Constraint Feature="HolePunch" Option="Top3"/>
  <Constraint Feature="HolePunch" Option="Right3"/>
 </Constraints>
</FeatureOption>
<FeatureOption Value="4holesEU">
 <PDLKeyword Value="4holesEU"/>
 <rcNameID Value="RC_STR_PUNCH_UNIT_4_EU"/>
```

```xml
    <DisplayName xml:lang="en-US">4 holes type EU</DisplayName>
    <Constraints>
      <Constraint Feature="HolePunch" Option="Left2"/>
      <Constraint Feature="HolePunch" Option="Top2"/>
      <Constraint Feature="HolePunch" Option="Right2"/>
      <Constraint Feature="HolePunch" Option="Left3"/>
      <Constraint Feature="HolePunch" Option="Top3"/>
      <Constraint Feature="HolePunch" Option="Right3"/>
    </Constraints>
  </FeatureOption>
  <FeatureOption Value="4holesNE">
    <PDLKeyword Value="4holesNE"/>
    <rcNameID Value="RC_STR_PUNCH_UNIT_4_NE"/>
    <DisplayName xml:lang="en-US">4 holes type NE</DisplayName>
    <Constraints>
      <Constraint Feature="HolePunch" Option="Left2"/>
      <Constraint Feature="HolePunch" Option="Top2"/>
      <Constraint Feature="HolePunch" Option="Right2"/>
      <Constraint Feature="HolePunch" Option="Left3"/>
      <Constraint Feature="HolePunch" Option="Top3"/>
      <Constraint Feature="HolePunch" Option="Right3"/>
    </Constraints>
  </FeatureOption>
</DeviceFeature>
<DeviceFeature Value="MediaSizeName">
  <PDLKeyword Value="PaperSize"/>
  <rcNameID Value="PAPER_SIZE_DISPLAY"/>
  <DisplayName xml:lang="en-US">Paper Size</DisplayName>
  <FeatureOption Value="na_arch-b_12x18in">
    <PDLKeyword Value="12x18"/>
    <rcNameID Value="RC_STR_12X18"/>
    <BlockMacro Value="=Cmd_Macro_PaperSize_12x18"/>
    <DisplayName xml:lang="en-US">12x18</DisplayName>
    <PageDimensions ValueType="PAIR" Value="14400,21600"/>
    <PrintableArea ValueType="PAIR" Value="14000,21200"/>
    <PrintableOrigin ValueType="PAIR" Value="200,200"/>
  </FeatureOption>
  <FeatureOption Value="na_ledger_11x17in">
    <PDLKeyword Value="11X17"/>
    <rcNameID Value="RCID_DMPAPER_SYSTEM_NAME"/>
    <BlockMacro Value="=Cmd_Macro_PaperSize_11X17"/>
    <DisplayName xml:lang="en-US">11X17</DisplayName>
    <PrintableArea ValueType="PAIR" Value="12800,20000"/>
    <PrintableOrigin ValueType="PAIR" Value="200,200"/>
  </FeatureOption>
  <FeatureOption Value="na_legal_8.5x14in">
    <PDLKeyword Value="LEGAL"/>
    <rcNameID Value="RCID_DMPAPER_SYSTEM_NAME"/>
```

```xml
    <BlockMacro Value="=Cmd_Macro_PaperSize_LEGAL"/>
    <DisplayName xml:lang="en-US">LEGAL</DisplayName>
    <PrintableArea ValueType="PAIR" Value="9800,16400"/>
    <PrintableOrigin ValueType="PAIR" Value="200,200"/>
</FeatureOption>
<FeatureOption Value="na_letter_8.5x11in">
    <PDLKeyword Value="LETTER"/>
    <rcNameID Value="RCID_DMPAPER_SYSTEM_NAME"/>
    <BlockMacro Value="=Cmd_Macro_PaperSize_LETTER"/>
    <DisplayName xml:lang="en-US">LETTER</DisplayName>
    <PrintableArea ValueType="PAIR" Value="9800,12800"/>
    <PrintableOrigin ValueType="PAIR" Value="200,200"/>
</FeatureOption>
<FeatureOption Value="na_executive_7.25x10.5in">
    <PDLKeyword Value="EXECUTIVE"/>
    <rcNameID Value="RCID_DMPAPER_SYSTEM_NAME"/>
    <BlockMacro Value="=Cmd_Macro_PaperSize_EXECUTIVE"/>
    <DisplayName xml:lang="en-US">EXECUTIVE</DisplayName>
    <PrintableArea ValueType="PAIR" Value="8300,12200"/>
    <PrintableOrigin ValueType="PAIR" Value="200,200"/>
</FeatureOption>
<FeatureOption Value="na_invoice_5.5x8.5in">
    <PDLKeyword Value="STATEMENT"/>
    <rcNameID Value="RC_STR_5_5X8_5"/>
    <BlockMacro Value="=Cmd_Macro_PaperSize_STATEMENT"/>
    <DisplayName xml:lang="en-US">STATEMENT</DisplayName>
    <PrintableArea ValueType="PAIR" Value="6200,9800"/>
    <PrintableOrigin ValueType="PAIR" Value="200,200"/>
</FeatureOption>
<FeatureOption Value="iso_a3_297x420mm">
    <PDLKeyword Value="A3"/>
    <rcNameID Value="RCID_DMPAPER_SYSTEM_NAME"/>
    <BlockMacro Value="=Cmd_Macro_PaperSize_A3"/>
    <DisplayName xml:lang="en-US">A3</DisplayName>
    <PrintableArea ValueType="PAIR" Value="13628,19440"/>
    <PrintableOrigin ValueType="PAIR" Value="200,200"/>
</FeatureOption>
<FeatureOption Value="iso_a4_210x297mm">
    <PDLKeyword Value="A4"/>
    <rcNameID Value="RCID_DMPAPER_SYSTEM_NAME"/>
    <BlockMacro Value="=Cmd_Macro_PaperSize_A4"/>
    <DisplayName xml:lang="en-US">A4</DisplayName>
    <PrintableArea ValueType="PAIR" Value="9520,13628"/>
    <PrintableOrigin ValueType="PAIR" Value="200,200"/>
</FeatureOption>
<FeatureOption Value="iso_a5_148x210mm">
    <PDLKeyword Value="A5"/>
    <rcNameID Value="RCID_DMPAPER_SYSTEM_NAME"/>
```

```
<BlockMacro Value="=Cmd_Macro_PaperSize_A5"/>
<DisplayName xml:lang="en-US">A5</DisplayName>
<PrintableArea ValueType="PAIR" Value="6592,9520"/>
<PrintableOrigin ValueType="PAIR" Value="200,200"/>
</FeatureOption>
<FeatureOption Value="iso_a6_105x148mm">
 <PDLKeyword Value="A6"/>
 <rcNameID Value="RC_STR_A6"/>
 <BlockMacro Value="=Cmd_Macro_PaperSize_A6"/>
 <DisplayName xml:lang="en-US">A6</DisplayName>
 <PageDimensions ValueType="PAIR" Value=""/>
 <PrintableArea ValueType="PAIR" Value="4560,6592"/>
 <PrintableOrigin ValueType="PAIR" Value="200,200"/>
</FeatureOption>
<FeatureOption Value="jis_b4_257x364mm">
 <PDLKeyword Value="B4"/>
 <rcNameID Value="RCID_DMPAPER_SYSTEM_NAME"/>
 <BlockMacro Value="=Cmd_Macro_PaperSize_B4"/>
 <DisplayName xml:lang="en-US">B4</DisplayName>
 <PrintableArea ValueType="PAIR" Value="11740,16796"/>
 <PrintableOrigin ValueType="PAIR" Value="200,200"/>
</FeatureOption>
<FeatureOption Value="jis_b5_182x257mm">
 <PDLKeyword Value="B5"/>
 <rcNameID Value="RCID_DMPAPER_SYSTEM_NAME"/>
 <BlockMacro Value="=Cmd_Macro_PaperSize_B5"/>
 <DisplayName xml:lang="en-US">B5</DisplayName>
 <PrintableArea ValueType="PAIR" Value="8196,11740"/>
 <PrintableOrigin ValueType="PAIR" Value="200,200"/>
</FeatureOption>
<FeatureOption Value="na_number-10_4.125x9.5in">
 <PDLKeyword Value="ENV_10"/>
 <rcNameID Value="RCID_DMPAPER_SYSTEM_NAME"/>
 <BlockMacro Value="=Cmd_Macro_PaperSize_ENV_10"/>
 <DisplayName xml:lang="en-US">ENV_10</DisplayName>
 <PrintableArea ValueType="PAIR" Value="4548,11000"/>
 <PrintableOrigin ValueType="PAIR" Value="200,200"/>
</FeatureOption>
<FeatureOption Value="iso_dl_110x220mm">
 <PDLKeyword Value="ENV_DL"/>
 <rcNameID Value="RCID_DMPAPER_SYSTEM_NAME"/>
 <BlockMacro Value="=Cmd_Macro_PaperSize_ENV_DL"/>
 <DisplayName xml:lang="en-US">ENV_DL</DisplayName>
 <PrintableArea ValueType="PAIR" Value="4796,9992"/>
 <PrintableOrigin ValueType="PAIR" Value="200,200"/>
</FeatureOption>
<FeatureOption Value="na_monarch_3.875x7.5in">
 <PDLKeyword Value="ENV_MONARCH"/>
```

```xml
  <rcNameID Value="RCID_DMPAPER_SYSTEM_NAME"/>
  <BlockMacro Value="=Cmd_Macro_PaperSize_ENV_MONARCH"/>
  <DisplayName xml:lang="en-US">ENV_MONARCH</DisplayName>
  <PrintableArea ValueType="PAIR" Value="4248,8600"/>
  <PrintableOrigin ValueType="PAIR" Value="200,200"/>
</FeatureOption>
<FeatureOption Value="iso_c5_162x229mm">
  <PDLKeyword Value="ENV_C5"/>
  <rcNameID Value="RCID_DMPAPER_SYSTEM_NAME"/>
  <BlockMacro Value="=Cmd_Macro_PaperSize_ENV_C5"/>
  <DisplayName xml:lang="en-US">ENV_C5</DisplayName>
  <PrintableArea ValueType="PAIR" Value="7252,10416"/>
  <PrintableOrigin ValueType="PAIR" Value="200,200"/>
</FeatureOption>
<FeatureOption Value="iso_c6_114x162mm">
  <PDLKeyword Value="ENV_C6"/>
  <rcNameID Value="RCID_DMPAPER_SYSTEM_NAME"/>
  <BlockMacro Value="=Cmd_Macro_PaperSize_ENV_C6"/>
  <DisplayName xml:lang="en-US">ENV_C6</DisplayName>
  <PrintableArea ValueType="PAIR" Value="4984,7252"/>
  <PrintableOrigin ValueType="PAIR" Value="200,200"/>
</FeatureOption>
<FeatureOption Value="na_foolscap_8.5x13in">
  <PDLKeyword Value="FOLIO"/>
  <rcNameID Value="RC_STR_8_5X13"/>
  <BlockMacro Value="=Cmd_Macro_PaperSize_FOLIO"/>
  <DisplayName xml:lang="en-US">FOLIO</DisplayName>
  <PrintableArea ValueType="PAIR" Value="9800,15200"/>
  <PrintableOrigin ValueType="PAIR" Value="200,200"/>
</FeatureOption>
<FeatureOption Value="na_unknown_8.25x13in">
  <PDLKeyword Value="8_25x13"/>
  <rcNameID Value="RC_STR_8_25X13"/>
  <BlockMacro Value="=Cmd_Macro_PaperSize_8_25x13"/>
  <DisplayName xml:lang="en-US">8_25x13</DisplayName>
  <PageDimensions ValueType="PAIR" Value="9900,15600"/>
  <PrintableArea ValueType="PAIR" Value="9500,15200"/>
  <PrintableOrigin ValueType="PAIR" Value="200,200"/>
</FeatureOption>
<FeatureOption Value="na_govt-legal_8x13in">
  <PDLKeyword Value="8x13"/>
  <rcNameID Value="RC_STR_8X13"/>
  <BlockMacro Value="=Cmd_Macro_PaperSize_8x13"/>
  <DisplayName xml:lang="en-US">8x13</DisplayName>
  <PageDimensions ValueType="PAIR" Value="9600,15600"/>
  <PrintableArea ValueType="PAIR" Value="9200,15200"/>
  <PrintableOrigin ValueType="PAIR" Value="200,200"/>
</FeatureOption>
```

```xml
<FeatureOption Value="om_pa-kai_267x389mm">
 <PDLKeyword Value="8kai"/>
 <rcNameID Value="RC_STR_8K"/>
 <BlockMacro Value="=Cmd_Macro_PaperSize_8kai"/>
 <DisplayName xml:lang="en-US">8kai</DisplayName>
 <PageDimensions ValueType="PAIR" Value="12612,18424"/>
 <PrintableArea ValueType="PAIR" Value="12212,18024"/>
 <PrintableOrigin ValueType="PAIR" Value="200,200"/>
</FeatureOption>
<FeatureOption Value="prc_16k_146x215mm">
 <PDLKeyword Value="16kai"/>
 <rcNameID Value="RC_STR_16K"/>
 <BlockMacro Value="=Cmd_Macro_PaperSize_16kai"/>
 <DisplayName xml:lang="en-US">16kai</DisplayName>
 <PageDimensions ValueType="PAIR" Value="9212,12612"/>
 <PrintableArea ValueType="PAIR" Value="8812,12212"/>
 <PrintableOrigin ValueType="PAIR" Value="200,200"/>
</FeatureOption>
<FeatureOption Value="custom_papersize">
 <PDLKeyword Value="CUSTOMSIZE"/>
 <rcNameID Value="RCID_DMPAPER_SYSTEM_NAME"/>
 <BlockMacro Value="=Cmd_Macro_PaperSize_CUSTOMSIZE"/>
 <DisplayName xml:lang="en-US">CUSTOMSIZE</DisplayName>
 <MinSize ValueType="PAIR" Value="4251,6992"/>
 <MaxSize ValueType="PAIR" Value="14412,28346"/>
 <MaxPrintableWidth ValueType="INT" Value="14412"/>
 <MinLeftMargin ValueType="INT" Value="200"/>
 <TopMargin ValueType="INT" Value="200"/>
 <BottomMargin ValueType="INT" Value="200"/>
</FeatureOption>
</DeviceFeature>
<DeviceFeature Value="MediaType">
 <PDLKeyword Value="MediaType"/>
 <rcNameID Value="MEDIA_TYPE_DISPLAY"/>
 <DisplayName xml:lang="en-US">Media</DisplayName>
 <ConflictPriority ValueType="INT" Value="30"/>
 <FeatureOption Value="Auto">
  <PDLKeyword Value="Auto"/>
  <rcNameID Value="HT_AUTO_SELECT_DISPLAY"/>
  <DisplayName xml:lang="en-US">Auto Select</DisplayName>
 </FeatureOption>
 <FeatureOption Value="STANDARD">
  <PDLKeyword Value="STANDARD"/>
  <rcNameID Value="RC_STR_PLAIN"/>
  <DisplayName xml:lang="en-US">Plain Paper</DisplayName>
 </FeatureOption>
 <FeatureOption Value="Recycled">
  <PDLKeyword Value="Recycled"/>
```

```xml
<rcNameID Value="RC_STR_RECYCLED"/>
<DisplayName xml:lang="en-US">Recycled</DisplayName>
</FeatureOption>
<FeatureOption Value="Special">
 <PDLKeyword Value="Special"/>
 <rcNameID Value="RC_STR_SPECIAL"/>
 <DisplayName xml:lang="en-US">Special</DisplayName>
</FeatureOption>
<FeatureOption Value="Thick">
 <PDLKeyword Value="Thick"/>
 <rcNameID Value="RC_STR_THICK"/>
 <DisplayName xml:lang="en-US">Thick</DisplayName>
</FeatureOption>
<FeatureOption Value="TRANSPARENCY">
 <PDLKeyword Value="TRANSPARENCY"/>
 <rcNameID Value="TRANSPARENCY_DISPLAY"/>
 <DisplayName xml:lang="en-US">Transparency</DisplayName>
</FeatureOption>
<FeatureOption Value="Color">
 <PDLKeyword Value="Color"/>
 <rcNameID Value="RC_STR_COLOR"/>
 <DisplayName xml:lang="en-US">Color</DisplayName>
</FeatureOption>
<FeatureOption Value="Letterhead">
 <PDLKeyword Value="Letterhead"/>
 <rcNameID Value="RC_STR_LETTERHEAD"/>
 <DisplayName xml:lang="en-US">Letterhead</DisplayName>
</FeatureOption>
<FeatureOption Value="Preprinted">
 <PDLKeyword Value="Preprinted"/>
 <rcNameID Value="RC_STR_PREPRINTED"/>
 <DisplayName xml:lang="en-US">Preprinted</DisplayName>
</FeatureOption>
<FeatureOption Value="Labels">
 <PDLKeyword Value="Labels"/>
 <rcNameID Value="RC_STR_LABELS"/>
 <DisplayName xml:lang="en-US">Labels</DisplayName>
</FeatureOption>
<FeatureOption Value="Plain_Duplex_Backside">
 <PDLKeyword Value="Plain_Duplex_Backside"/>
 <rcNameID Value="RC_STR_PLAIN_DUPLEX_BACKSIDE"/>
 <DisplayName xml:lang="en-US">Plain (Duplex Backside)</DisplayName>
</FeatureOption>
<FeatureOption Value="Thick_Duplex_Backside">
 <PDLKeyword Value="Thick_Duplex_Backside"/>
 <rcNameID Value="RC_STR_THICK_DUPLEX_BACKSIDE"/>
 <DisplayName xml:lang="en-US">Thick (Duplex Backside)</DisplayName>
</FeatureOption>
```

```xml
</DeviceFeature>
<DeviceFeature Value="InputBins">
 <PDLKeyword Value="InputBin"/>
 <rcNameID Value="PAPER_SOURCE_DISPLAY"/>
 <DefaultOption>AUTO</DefaultOption>
 <DisplayName xml:lang="en-US">Paper Source</DisplayName>
 <ConflictPriority ValueType="INT" Value="20"/>
 <FeatureOption Value="AUTO">
  <PDLKeyword Value="AUTO"/>
  <rcNameID Value="RC_STR_AUTO_SELECT_BY_PRINTER"/>
  <DisplayName xml:lang="en-US">Auto Select by Printer</DisplayName>
 </FeatureOption>
 <FeatureOption Value="Bypass">
  <PDLKeyword Value="BypassTray"/>
  <rcNameID Value="RC_STR_BYPASS_TRAY"/>
  <OptionID Value="RI_DMBINBYPASS_TRAY"/>
  <DisplayName xml:lang="en-US">Bypass Tray</DisplayName>
 </FeatureOption>
 <FeatureOption Value="Tray1">
  <PDLKeyword Value="Tray1"/>
  <rcNameID Value="RC_STR_TRAY1"/>
  <OptionID Value="RI_DMBIN_TRAY1"/>
  <DisplayName xml:lang="en-US">Tray 1</DisplayName>
 </FeatureOption>
 <FeatureOption Value="Tray2">
  <PDLKeyword Value="Tray2"/>
  <rcNameID Value="RC_STR_TRAY2"/>
  <OptionID Value="RI_DMBIN_TRAY2"/>
  <DisplayName xml:lang="en-US">Tray 2</DisplayName>
 </FeatureOption>
 <FeatureOption Value="Tray3">
  <PDLKeyword Value="Tray3"/>
  <rcNameID Value="RC_STR_TRAY3"/>
  <OptionID Value="RI_DMBIN_TRAY3"/>
  <DisplayName xml:lang="en-US">Tray 3</DisplayName>
 </FeatureOption>
 <FeatureOption Value="Tray4">
  <PDLKeyword Value="Tray4"/>
  <rcNameID Value="RC_STR_TRAY4"/>
  <OptionID Value="RI_DMBIN_TRAY4"/>
  <DisplayName xml:lang="en-US">Tray 4</DisplayName>
 </FeatureOption>
 <FeatureOption Value="LargeCapacity">
  <PDLKeyword Value="LARGECAPACITY"/>
  <rcNameID Value="RC_STR_LARGE_CAPACITY_TRAY"/>
  <DisplayName xml:lang="en-US">Large Capacity Tray</DisplayName>
 </FeatureOption>
</DeviceFeature>
```

```xml
<DeviceFeature Value="SlipSheet">
 <PDLKeyword Value="SlipSheet"/>
 <rcNameID Value="RC_STR_SLIPSHEET"/>
 <DefaultOption>OFF</DefaultOption>
 <DisplayName xml:lang="en-US">Slip Sheet</DisplayName>
 <ConflictPriority ValueType="INT" Value="10"/>
 <FeatureOption Value="OFF">
  <PDLKeyword Value="OFF"/>
  <rcNameID Value="OFF_DISPLAY"/>
  <DisplayName xml:lang="en-US">Off</DisplayName>
 </FeatureOption>
 <FeatureOption Value="ON">
  <PDLKeyword Value="ON"/>
  <rcNameID Value="ON_DISPLAY"/>
  <DisplayName xml:lang="en-US">On</DisplayName>
 </FeatureOption>
</DeviceFeature>
<DeviceFeature Value="SlipSheetInputBin">
 <PDLKeyword Value="SlipSheetInputBin"/>
 <rcNameID Value="RC_STR_SLIPSHEET_PAPER_SOURCE"/>
 <DefaultOption>Bypass</DefaultOption>
 <DisplayName xml:lang="en-US">Slip Sheet Paper Source</DisplayName>
 <FeatureOption Value="Bypass">
  <PDLKeyword Value="BypassTray"/>
  <rcNameID Value="RC_STR_BYPASS_TRAY"/>
  <DisplayName xml:lang="en-US">Bypass Tray</DisplayName>
 </FeatureOption>
 <FeatureOption Value="Tray1">
  <PDLKeyword Value="Tray1"/>
  <rcNameID Value="RC_STR_TRAY1"/>
  <DisplayName xml:lang="en-US">Tray 1</DisplayName>
 </FeatureOption>
 <FeatureOption Value="Tray2">
  <PDLKeyword Value="Tray2"/>
  <rcNameID Value="RC_STR_TRAY2"/>
  <DisplayName xml:lang="en-US">Tray 2</DisplayName>
 </FeatureOption>
 <FeatureOption Value="Tray3">
  <PDLKeyword Value="Tray3"/>
  <rcNameID Value="RC_STR_TRAY3"/>
  <DisplayName xml:lang="en-US">Tray 3</DisplayName>
 </FeatureOption>
 <FeatureOption Value="Tray4">
  <PDLKeyword Value="Tray4"/>
  <rcNameID Value="RC_STR_TRAY4"/>
  <DisplayName xml:lang="en-US">Tray 4</DisplayName>
 </FeatureOption>
 <FeatureOption Value="LargeCapacity">
```

```xml
    <PDLKeyword Value="LARGECAPACITY"/>
    <rcNameID Value="RC_STR_LARGE_CAPACITY_TRAY"/>
    <DisplayName xml:lang="en-US">Large Capacity Tray</DisplayName>
  </FeatureOption>
</DeviceFeature>
<DeviceFeature Value="OutputBins">
  <PDLKeyword Value="OutputBin"/>
  <rcNameID Value="OUTPUTBIN_DISPLAY"/>
  <DefaultOption>PrinterDefault</DefaultOption>
  <DisplayName xml:lang="en-US">Output Bin</DisplayName>
  <FeatureOption Value="PrinterDefault">
    <PDLKeyword Value="PrinterDefault"/>
    <rcNameID Value="RC_STR_PRINTER_DEFAULT"/>
    <DisplayName xml:lang="en-US">Printer Default</DisplayName>
  </FeatureOption>
  <FeatureOption Value="StandardTray">
    <PDLKeyword Value="StandardTray"/>
    <rcNameID Value="RC_STR_STANDARD_TRAY"/>
    <DisplayName xml:lang="en-US">Standard Tray</DisplayName>
    <DisabledFeatures ValueType="LIST">
      <DisabledFeature Value="Staple"/>
    </DisabledFeatures>
    <DisabledFeatures ValueType="LIST">
      <DisabledFeature Value="HolePunch"/>
    </DisabledFeatures>
    <Constraints>
      <Constraint Feature="Staple" Option="TopLeft"/>
      <Constraint Feature="Staple" Option="TopLeftSlant"/>
      <Constraint Feature="Staple" Option="TopRight"/>
      <Constraint Feature="Staple" Option="TopRightSlant"/>
      <Constraint Feature="Staple" Option="Top2"/>
      <Constraint Feature="Staple" Option="Left2"/>
      <Constraint Feature="Staple" Option="Right2"/>
      <Constraint Feature="Staple" Option="Booklet"/>
      <Constraint Feature="HolePunch" Option="Left2"/>
      <Constraint Feature="HolePunch" Option="Top2"/>
      <Constraint Feature="HolePunch" Option="Right2"/>
      <Constraint Feature="HolePunch" Option="Left3"/>
      <Constraint Feature="HolePunch" Option="Top3"/>
      <Constraint Feature="HolePunch" Option="Right3"/>
      <Constraint Feature="HolePunch" Option="Left4"/>
      <Constraint Feature="HolePunch" Option="Top4"/>
      <Constraint Feature="HolePunch" Option="Right4"/>
    </Constraints>
  </FeatureOption>
  <FeatureOption Value="ExternalTray">
    <PDLKeyword Value="ExternalTray"/>
    <rcNameID Value="RC_STR_EXTERNAL_TRAY"/>
```

```xml
<DisplayName xml:lang="en-US">External Tray</DisplayName>
<DisabledFeatures ValueType="LIST">
 <DisabledFeature Value="Staple"/>
</DisabledFeatures>
<DisabledFeatures ValueType="LIST">
 <DisabledFeature Value="HolePunch"/>
</DisabledFeatures>
<Constraints>
 <Constraint Feature="Staple" Option="TopLeft"/>
 <Constraint Feature="Staple" Option="TopLeftSlant"/>
 <Constraint Feature="Staple" Option="TopRight"/>
 <Constraint Feature="Staple" Option="TopRightSlant"/>
 <Constraint Feature="Staple" Option="Top2"/>
 <Constraint Feature="Staple" Option="Left2"/>
 <Constraint Feature="Staple" Option="Right2"/>
 <Constraint Feature="Staple" Option="Booklet"/>
 <Constraint Feature="HolePunch" Option="Left2"/>
 <Constraint Feature="HolePunch" Option="Top2"/>
 <Constraint Feature="HolePunch" Option="Right2"/>
 <Constraint Feature="HolePunch" Option="Left3"/>
 <Constraint Feature="HolePunch" Option="Top3"/>
 <Constraint Feature="HolePunch" Option="Right3"/>
 <Constraint Feature="HolePunch" Option="Left4"/>
 <Constraint Feature="HolePunch" Option="Top4"/>
 <Constraint Feature="HolePunch" Option="Right4"/>
 <Constraint Feature="Sides" Option="TwoSidedLongEdge"/>
 <Constraint Feature="Sides" Option="TwoSidedShortEdge"/>
</Constraints>
</FeatureOption>
<FeatureOption Value="FinisherShiftTray1">
 <PDLKeyword Value="FinisherShiftTray1"/>
 <rcNameID Value="RC_STR_FINISHER_SHIFT_TRAY1"/>
 <DisplayName xml:lang="en-US">Finisher Shift Tray 1</DisplayName>
 <Constraints>
  <Constraint Feature="Staple" Option="Booklet"/>
 </Constraints>
</FeatureOption>
<FeatureOption Value="FinisherShiftTray2">
 <PDLKeyword Value="FinisherShiftTray2"/>
 <rcNameID Value="RC_STR_FINISHER_SHIFT_TRAY2"/>
 <DisplayName xml:lang="en-US">Finisher Shift Tray 2</DisplayName>
 <Constraints>
  <Constraint Feature="Staple" Option="Booklet"/>
 </Constraints>
</FeatureOption>
<FeatureOption Value="FinisherShiftTray">
 <PDLKeyword Value="FinisherShiftTray"/>
 <rcNameID Value="RC_STR_FINISHER_SHIFT_TRAY"/>
```

```xml
    <DisplayName xml:lang="en-US">Finisher Shift Tray</DisplayName>
    <Constraints>
     <Constraint Feature="Staple" Option="Booklet"/>
    </Constraints>
   </FeatureOption>
   <FeatureOption Value="FinisherBookletTray">
    <PDLKeyword Value="FinisherBookletTray"/>
    <rcNameID Value="RC_STR_BOOKLET_FINISHER_TRAY"/>
    <DisplayName xml:lang="en-US">Booklet Finisher Tray</DisplayName>
    <DisabledFeatures ValueType="LIST">
     <DisabledFeature Value="HolePunch"/>
    </DisabledFeatures>
    <Constraints>
     <Constraint Feature="Staple" Option="TopLeft"/>
     <Constraint Feature="Staple" Option="TopLeftSlant"/>
     <Constraint Feature="Staple" Option="TopRight"/>
     <Constraint Feature="Staple" Option="TopRightSlant"/>
     <Constraint Feature="Staple" Option="Top2"/>
     <Constraint Feature="Staple" Option="Left2"/>
     <Constraint Feature="Staple" Option="Right2"/>
     <Constraint Feature="HolePunch" Option="Left2"/>
     <Constraint Feature="HolePunch" Option="Top2"/>
     <Constraint Feature="HolePunch" Option="Right2"/>
     <Constraint Feature="HolePunch" Option="Left3"/>
     <Constraint Feature="HolePunch" Option="Top3"/>
     <Constraint Feature="HolePunch" Option="Right3"/>
     <Constraint Feature="HolePunch" Option="Left4"/>
     <Constraint Feature="HolePunch" Option="Top4"/>
     <Constraint Feature="HolePunch" Option="Right4"/>
    </Constraints>
   </FeatureOption>
   <FeatureOption Value="LeftTray1">
    <PDLKeyword Value="LeftTray1"/>
    <rcNameID Value="RC_STR_LEFT_TRAY1"/>
    <DisplayName xml:lang="en-US">Left Tray 1</DisplayName>
    <DisabledFeatures ValueType="LIST">
     <DisabledFeature Value="Staple"/>
    </DisabledFeatures>
    <DisabledFeatures ValueType="LIST">
     <DisabledFeature Value="HolePunch"/>
    </DisabledFeatures>
    <Constraints>
     <Constraint Feature="Staple" Option="TopLeft"/>
     <Constraint Feature="Staple" Option="TopLeftSlant"/>
     <Constraint Feature="Staple" Option="TopRight"/>
     <Constraint Feature="Staple" Option="TopRightSlant"/>
     <Constraint Feature="Staple" Option="Top2"/>
     <Constraint Feature="Staple" Option="Left2"/>
```

```xml
      <Constraint Feature="Staple" Option="Right2"/>
      <Constraint Feature="Staple" Option="Booklet"/>
      <Constraint Feature="HolePunch" Option="Left2"/>
      <Constraint Feature="HolePunch" Option="Top2"/>
      <Constraint Feature="HolePunch" Option="Right2"/>
      <Constraint Feature="HolePunch" Option="Left3"/>
      <Constraint Feature="HolePunch" Option="Top3"/>
      <Constraint Feature="HolePunch" Option="Right3"/>
      <Constraint Feature="HolePunch" Option="Left4"/>
      <Constraint Feature="HolePunch" Option="Top4"/>
      <Constraint Feature="HolePunch" Option="Right4"/>
    </Constraints>
  </FeatureOption>
  <FeatureOption Value="LeftTray2">
    <PDLKeyword Value="LeftTray2"/>
    <rcNameID Value="RC_STR_LEFT_TRAY2"/>
    <DisplayName xml:lang="en-US">Left Tray 2</DisplayName>
    <DisabledFeatures ValueType="LIST">
      <DisabledFeature Value="Staple"/>
    </DisabledFeatures>
    <DisabledFeatures ValueType="LIST">
      <DisabledFeature Value="HolePunch"/>
    </DisabledFeatures>
    <Constraints>
      <Constraint Feature="Staple" Option="TopLeft"/>
      <Constraint Feature="Staple" Option="TopLeftSlant"/>
      <Constraint Feature="Staple" Option="TopRight"/>
      <Constraint Feature="Staple" Option="TopRightSlant"/>
      <Constraint Feature="Staple" Option="Top2"/>
      <Constraint Feature="Staple" Option="Left2"/>
      <Constraint Feature="Staple" Option="Right2"/>
      <Constraint Feature="Staple" Option="Booklet"/>
      <Constraint Feature="HolePunch" Option="Left2"/>
      <Constraint Feature="HolePunch" Option="Top2"/>
      <Constraint Feature="HolePunch" Option="Right2"/>
      <Constraint Feature="HolePunch" Option="Left3"/>
      <Constraint Feature="HolePunch" Option="Top3"/>
      <Constraint Feature="HolePunch" Option="Right3"/>
      <Constraint Feature="HolePunch" Option="Left4"/>
      <Constraint Feature="HolePunch" Option="Top4"/>
      <Constraint Feature="HolePunch" Option="Right4"/>
    </Constraints>
  </FeatureOption>
</DeviceFeature>
<DeviceFeature Value="Staple">
  <PDLKeyword Value="Stapling"/>
  <rcNameID Value="RC_STR_STAPLE"/>
  <DefaultOption>OFF</DefaultOption>
```

```xml
<DisplayName xml:lang="en-US">Staple</DisplayName>
<FeatureOption Value="OFF">
 <PDLKeyword Value="OFF"/>
 <rcNameID Value="OFF_DISPLAY"/>
 <DisplayName xml:lang="en-US">OFF</DisplayName>
</FeatureOption>
<FeatureOption Value="TopLeft">
 <PDLKeyword Value="TopLeft"/>
 <rcNameID Value="RC_STR_TOP_LEFT"/>
 <DisplayName xml:lang="en-US">Top Left</DisplayName>
</FeatureOption>
<FeatureOption Value="TopRight">
 <PDLKeyword Value="TopRight"/>
 <rcNameID Value="RC_STR_TOP_RIGHT"/>
 <DisplayName xml:lang="en-US">Top Right</DisplayName>
</FeatureOption>
<FeatureOption Value="Left2">
 <PDLKeyword Value="Left2"/>
 <rcNameID Value="RC_STR_LEFT2"/>
 <DisplayName xml:lang="en-US">Left 2</DisplayName>
</FeatureOption>
<FeatureOption Value="Top2">
 <PDLKeyword Value="Top2"/>
 <rcNameID Value="RC_STR_TOP2"/>
 <DisplayName xml:lang="en-US">Top 2</DisplayName>
</FeatureOption>
<FeatureOption Value="Right2">
 <PDLKeyword Value="Right2"/>
 <rcNameID Value="RC_STR_RIGHT2"/>
 <DisplayName xml:lang="en-US">Right 2</DisplayName>
</FeatureOption>
<FeatureOption Value="TopLeftSlant">
 <PDLKeyword Value="TopLeftSlant"/>
 <rcNameID Value="RC_STR_TOP_LEFT_SLANT"/>
 <DisplayName xml:lang="en-US">Top Left Slant</DisplayName>
</FeatureOption>
<FeatureOption Value="TopRightSlant">
 <PDLKeyword Value="TopRightSlant"/>
 <rcNameID Value="RC_STR_TOP_RIGHT_SLANT"/>
 <DisplayName xml:lang="en-US">Top Right Slant</DisplayName>
</FeatureOption>
<FeatureOption Value="Booklet">
 <PDLKeyword Value="Booklet"/>
 <rcNameID Value="RC_STR_BOOKLET"/>
 <DisplayName xml:lang="en-US">Booklet</DisplayName>
</FeatureOption>
</DeviceFeature>
<DeviceFeature Value="HolePunch">
```

```xml
<PDLKeyword Value="Punching"/>
<rcNameID Value="RC_STR_PUNCH"/>
<DefaultOption>OFF</DefaultOption>
<DisplayName xml:lang="en-US">Punch</DisplayName>
<FeatureOption Value="OFF">
 <PDLKeyword Value="OFF"/>
 <rcNameID Value="OFF_DISPLAY"/>
 <DisplayName xml:lang="en-US">OFF</DisplayName>
</FeatureOption>
<FeatureOption Value="Left2">
 <PDLKeyword Value="Left2"/>
 <rcNameID Value="RC_STR_LEFT2"/>
 <DisplayName xml:lang="en-US">Left 2</DisplayName>
</FeatureOption>
<FeatureOption Value="Top2">
 <PDLKeyword Value="Top2"/>
 <rcNameID Value="RC_STR_TOP2"/>
 <DisplayName xml:lang="en-US">Top 2</DisplayName>
</FeatureOption>
<FeatureOption Value="Right2">
 <PDLKeyword Value="Right2"/>
 <rcNameID Value="RC_STR_RIGHT2"/>
 <DisplayName xml:lang="en-US">Right 2</DisplayName>
</FeatureOption>
<FeatureOption Value="Left3">
 <PDLKeyword Value="Left3"/>
 <rcNameID Value="RC_STR_LEFT3"/>
 <DisplayName xml:lang="en-US">Left 3</DisplayName>
</FeatureOption>
<FeatureOption Value="Top3">
 <PDLKeyword Value="Top3"/>
 <rcNameID Value="RC_STR_TOP3"/>
 <DisplayName xml:lang="en-US">Top 3</DisplayName>
</FeatureOption>
<FeatureOption Value="Right3">
 <PDLKeyword Value="Right3"/>
 <rcNameID Value="RC_STR_RIGHT3"/>
 <DisplayName xml:lang="en-US">Right 3</DisplayName>
</FeatureOption>
<FeatureOption Value="Left4">
 <PDLKeyword Value="Left4"/>
 <rcNameID Value="RC_STR_LEFT4"/>
 <DisplayName xml:lang="en-US">Left 4</DisplayName>
</FeatureOption>
<FeatureOption Value="Top4">
 <PDLKeyword Value="Top4"/>
 <rcNameID Value="RC_STR_TOP4"/>
 <DisplayName xml:lang="en-US">Top 4</DisplayName>
```

```xml
  </FeatureOption>
  <FeatureOption Value="Right4">
   <PDLKeyword Value="Right4"/>
   <rcNameID Value="RC_STR_RIGHT4"/>
   <DisplayName xml:lang="en-US">Right 4</DisplayName>
  </FeatureOption>
 </DeviceFeature>
 <DeviceFeature Value="Orientation">
  <PDLKeyword Value="Orientation"/>
  <rcNameID Value="ORIENTATION_DISPLAY"/>
  <DisplayName xml:lang="en-US">Orientation</DisplayName>
  <FeatureOption Value="Landscape">
   <PDLKeyword Value="LANDSCAPE_CC90"/>
   <rcNameID Value="LANDSCAPE_DISPLAY"/>
   <DisplayName xml:lang="en-US">Landscape</DisplayName>
  </FeatureOption>
  <FeatureOption Value="Portrait">
   <PDLKeyword Value="PORTRAIT"/>
   <rcNameID Value="PORTRAIT_DISPLAY"/>
   <DisplayName xml:lang="en-US">Portrait</DisplayName>
  </FeatureOption>
 </DeviceFeature>
 <DeviceFeature Value="Sides">
  <PDLKeyword Value="Duplex"/>
  <rcNameID Value="TWO_SIDED_PRINTING_DISPLAY"/>
  <DisplayName xml:lang="en-US">Print on Both Sides</DisplayName>
  <FeatureOption Value="OneSided">
   <PDLKeyword Value="NONE"/>
   <rcNameID Value="NONE_DISPLAY"/>
   <DisplayName xml:lang="en-US">None</DisplayName>
  </FeatureOption>
  <FeatureOption Value="TwoSidedLongEdge">
   <PDLKeyword Value="VERTICAL"/>
   <rcNameID Value="FLIP_ON_LONG_EDGE_DISPLAY"/>
   <DisplayName xml:lang="en-US">Flip on long edge</DisplayName>
  </FeatureOption>
  <FeatureOption Value="TwoSidedShortEdge">
   <PDLKeyword Value="HORIZONTAL"/>
   <rcNameID Value="FLIP_ON_SHORT_EDGE_DISPLAY"/>
   <DisplayName xml:lang="en-US">Flip on short edge</DisplayName>
  </FeatureOption>
 </DeviceFeature>
 <DeviceFeature Value="Resolution">
  <PDLKeyword Value="Resolution"/>
  <rcNameID Value="RESOLUTION_DISPLAY"/>
  <DisplayName xml:lang="en-US">Resolution</DisplayName>
  <FeatureOption Value="600">
   <PDLKeyword Value="600dpi"/>
```

```xml
    <rcNameID Value="RC_STR_600DPI"/>
    <DisplayName xml:lang="en-US">600dpi</DisplayName>
  </FeatureOption>
  <FeatureOption Value="1200">
    <PDLKeyword Value="1200dpi"/>
    <rcNameID Value="RC_STR_1200DPI"/>
    <DisplayName xml:lang="en-US">1200dpi</DisplayName>
  </FeatureOption>
</DeviceFeature>
<DeviceFeature Value="TrueTypeFormat"/>
<DeviceFeature Value="ColorMode">
  <PDLKeyword Value="ColorMode"/>
  <rcNameID Value="COLOR_PRINTING_MODE_DISPLAY"/>
  <DefaultOption>24bpp</DefaultOption>
  <DisplayName xml:lang="en-US">Color Mode</DisplayName>
  <FeatureOption Value="24bpp">
    <PDLKeyword Value="24bpp"/>
    <rcNameID Value="24BPP_DISPLAY"/>
    <DisplayName xml:lang="en-US">True Color (24BPP)</DisplayName>
  </FeatureOption>
  <FeatureOption Value="Mono">
    <PDLKeyword Value="Mono"/>
    <rcNameID Value="MONO_DISPLAY"/>
    <DisplayName xml:lang="en-US">Monochrome</DisplayName>
  </FeatureOption>
</DeviceFeature>
<DeviceFeature Value="RAM" PrinterProperty="true">
  <DisplayName xml:lang="en-US">Printer Memory</DisplayName>
  <DefaultOption>65536KB</DefaultOption>
  <ConcealFromUI ValueType="BOOL" Value="TRUE"/>
  <FeatureOption Value="65536KB">
    <PDLKeyword Value="65536KB"/>
    <DisplayName xml:lang="en-US">64MB</DisplayName>
  </FeatureOption>
</DeviceFeature>
<DeviceFeature Value="HardDisk" PrinterProperty="true">
  <DisplayName xml:lang="en-US">HardDisk</DisplayName>
  <DefaultOption>Installed</DefaultOption>
  <ConcealFromUI ValueType="BOOL" Value="TRUE"/>
  <FeatureOption Value="Installed">
    <PDLKeyword Value="Installed"/>
    <rcNameID Value="RC_STR_INSTALLED"/>
    <DisplayName xml:lang="en-US">Installed</DisplayName>
  </FeatureOption>
</DeviceFeature>
<DeviceFeature Value="UVCoating" PrinterProperty="true">
  <PDLKeyword Value="UVCoatingPDLName"/>
  <DisplayName xml:lang="en-US">UVCoatingDisplayName_ENG</DisplayName>
```

```xml
<DisplayName xml:lang="ja-JP">UVCoatingDisplayName_JP_特徴</DisplayName>
<DisplayName xml:lang="zh-CN">UVCoatingDisplayName_CN_渡膜</DisplayName>
<DefaultOption>UVCoatingOption1</DefaultOption>
<FeatureOption Value="UVCoatingOption1">
  <DisplayName xml:lang="en-US">UVCoatingOption1DisplayName_ENG</DisplayName>
  <DisplayName xml:lang="ja-JP">UVCoatingOption1DisplayName_JP_コーティング_オプション_1</DisplayName>
  <DisplayName xml:lang="zh-CN">UVCoatingOption1DisplayName_CN_渡膜_选项1</DisplayName>
</FeatureOption>
<FeatureOption Value="UVCoatingOption2">
  <DisplayName xml:lang="en-US">UVCoatingOption2DisplayName_ENG</DisplayName>
  <DisplayName xml:lang="ja-JP">UVCoatingOption2DisplayName_JP_コーティング_オプション_2</DisplayName>
  <DisplayName xml:lang="zh-CN">UVCoatingOption2DisplayName_CN_渡膜_选项2</DisplayName>
</FeatureOption>
<FeatureOption Value="UVCoatingOption3">
  <DisplayName xml:lang="en-US">UVCoatingOption3DisplayName_ENG</DisplayName>
  <DisplayName xml:lang="ja-JP">UVCoatingOption3DisplayName_JP_コーティング_オプション_3</DisplayName>
  <DisplayName xml:lang="zh-CN">UVCoatingOption3DisplayName_CN_渡膜_选项3</DisplayName>
</FeatureOption>
</DeviceFeature>
<DeviceFeature Value="Copies" MinValue="1" MaxValue="999999"/>
<DeviceFeature Value="PagesPerSheet">
  <FeatureOption Value="1"/>
  <FeatureOption Value="2"/>
  <FeatureOption Value="4"/>
  <FeatureOption Value="9"/>
  <FeatureOption Value="16"/>
</DeviceFeature>
<DeviceFeature Value="Direction">
  <FeatureOption Value="RightDown"/>
  <FeatureOption Value="DownRight"/>
  <FeatureOption Value="LeftDown"/>
  <FeatureOption Value="DownLeft"/>
</DeviceFeature>
<DeviceFeature Value="Collate">
  <PDLKeyword Value="Collate"/>
```

```xml
<DisplayName xml:lang="en-US">Collate</DisplayName>
<FeatureOption Value="false">
  <PDLKeyword Value="OFF"/>
  <rcNameID Value="OFF_DISPLAY"/>
  <DisplayName xml:lang="en-US">OFF</DisplayName>
</FeatureOption>
<FeatureOption Value="true">
  <PDLKeyword Value="ON"/>
  <rcNameID Value="ON_DISPLAY"/>
  <DisplayName xml:lang="en-US">ON</DisplayName>
</FeatureOption>
</DeviceFeature>
<DeviceFeature Value="Dither">
  <PDLKeyword Value="Dither"/>
  <rcNameID Value="RC_STR_DITHER_QUALITY"/>
  <DefaultOption>High</DefaultOption>
  <DisplayName xml:lang="en-US">Dither</DisplayName>
  <FeatureOption Value="High">
    <PDLKeyword Value="High"/>
    <rcNameID Value="RC_STR_HIGH"/>
    <DisplayName xml:lang="en-US">High</DisplayName>
  </FeatureOption>
  <FeatureOption Value="Low">
    <PDLKeyword Value="Low"/>
    <rcNameID Value="RC_STR_LOW"/>
    <DisplayName xml:lang="en-US">Low</DisplayName>
  </FeatureOption>
</DeviceFeature>
<DeviceFeature Value="Support8CharPassword">
  <DisplayName xml:lang="en-US">Support8CharPassword</DisplayName>
  <ConcealFromUI ValueType="BOOL" Value="TRUE"/>
  <DefaultOption>ON</DefaultOption>
  <FeatureOption Value="ON">
    <DisplayName xml:lang="en-US">ON</DisplayName>
  </FeatureOption>
</DeviceFeature>
<DeviceFeature Value="SupportDocUiReplace">
  <DisplayName xml:lang="en-US">SupportDocUiReplace</DisplayName>
  <ConcealFromUI ValueType="BOOL" Value="TRUE"/>
  <DefaultOption>ON</DefaultOption>
  <FeatureOption Value="ON">
    <DisplayName xml:lang="en-US">ON</DisplayName>
  </FeatureOption>
</DeviceFeature>
<DeviceFeature Value="AutoConfig">
  <DisplayName xml:lang="en-US">AutoConfig</DisplayName>
  <ConcealFromUI ValueType="BOOL" Value="TRUE"/>
  <DefaultOption>ON</DefaultOption>
```

```xml
    <FeatureOption Value="ON">
      <DisplayName xml:lang="en-US">ON</DisplayName>
    </FeatureOption>
  </DeviceFeature>
  <DeviceFeature Value="SupportSamplePrint">
    <DisplayName xml:lang="en-US">SupportSamplePrint</DisplayName>
    <ConcealFromUI ValueType="BOOL" Value="TRUE"/>
    <DefaultOption>ON</DefaultOption>
    <FeatureOption Value="ON">
      <DisplayName xml:lang="en-US">ON</DisplayName>
    </FeatureOption>
  </DeviceFeature>
  <DeviceFeature Value="SupportSecurePrint">
    <DisplayName xml:lang="en-US">SupportSecurePrint</DisplayName>
    <ConcealFromUI ValueType="BOOL" Value="TRUE"/>
    <DefaultOption>ON</DefaultOption>
    <FeatureOption Value="ON">
      <DisplayName xml:lang="en-US">ON</DisplayName>
    </FeatureOption>
  </DeviceFeature>
  <DeviceFeature Value="SupportHoldPrint">
    <DisplayName xml:lang="en-US">SupportHoldPrint</DisplayName>
    <ConcealFromUI ValueType="BOOL" Value="TRUE"/>
    <DefaultOption>ON</DefaultOption>
    <FeatureOption Value="ON">
      <DisplayName xml:lang="en-US">ON</DisplayName>
    </FeatureOption>
  </DeviceFeature>
  <DeviceFeature Value="SupportStoredPrint">
    <DisplayName xml:lang="en-US">SupportStoredPrint</DisplayName>
    <ConcealFromUI ValueType="BOOL" Value="TRUE"/>
    <DefaultOption>ON</DefaultOption>
    <FeatureOption Value="ON">
      <DisplayName xml:lang="en-US">ON</DisplayName>
    </FeatureOption>
  </DeviceFeature>
  <DeviceFeature Value="SupportDocumentBox">
    <DisplayName xml:lang="en-US">SupportDocumentBox</DisplayName>
    <ConcealFromUI ValueType="BOOL" Value="TRUE"/>
    <DefaultOption>ON</DefaultOption>
    <FeatureOption Value="ON">
      <DisplayName xml:lang="en-US">ON</DisplayName>
    </FeatureOption>
  </DeviceFeature>
</DeviceFeatures>
<GlobalConstraints>
  <InvalidCombinations>
    <InvalidCombination Feature="InputBins" Option="Tray1"/>
```

```xml
    <InvalidCombination Feature="MediaType" Option="TRANSPARENCY"/>
</InvalidCombinations>
<InvalidCombinations>
    <InvalidCombination Feature="InputBins" Option="Tray1"/>
    <InvalidCombination Feature="MediaType" Option="Thick"/>
</InvalidCombinations>
<InvalidCombinations>
    <InvalidCombination Feature="InputBins" Option="Tray1"/>
    <InvalidCombination Feature="MediaType" Option="Labels"/>
</InvalidCombinations>
<InvalidCombinations>
    <InvalidCombination Feature="InputBins" Option="Tray1"/>
    <InvalidCombination Feature="MediaType" Option="Plain_Duplex_Backside"/>
</InvalidCombinations>
<InvalidCombinations>
    <InvalidCombination Feature="InputBins" Option="Tray1"/>
    <InvalidCombination Feature="MediaType" Option="Thick_Duplex_Backside"/>
</InvalidCombinations>
<InvalidCombinations>
    <InvalidCombination Feature="InputBins" Option="Tray2"/>
    <InvalidCombination Feature="MediaType" Option="TRANSPARENCY"/>
</InvalidCombinations>
<InvalidCombinations>
    <InvalidCombination Feature="InputBins" Option="Tray2"/>
    <InvalidCombination Feature="MediaType" Option="Thick"/>
</InvalidCombinations>
<InvalidCombinations>
    <InvalidCombination Feature="InputBins" Option="Tray2"/>
    <InvalidCombination Feature="MediaType" Option="Labels"/>
</InvalidCombinations>
<InvalidCombinations>
    <InvalidCombination Feature="InputBins" Option="Tray2"/>
    <InvalidCombination Feature="MediaType" Option="Plain_Duplex_Backside"/>
</InvalidCombinations>
<InvalidCombinations>
    <InvalidCombination Feature="InputBins" Option="Tray2"/>
    <InvalidCombination Feature="MediaType" Option="Thick_Duplex_Backside"/>
</InvalidCombinations>
<InvalidCombinations>
    <InvalidCombination Feature="InputBins" Option="Tray3"/>
    <InvalidCombination Feature="MediaType" Option="TRANSPARENCY"/>
</InvalidCombinations>
<InvalidCombinations>
    <InvalidCombination Feature="InputBins" Option="Tray3"/>
    <InvalidCombination Feature="MediaType" Option="Thick"/>
</InvalidCombinations>
<InvalidCombinations>
    <InvalidCombination Feature="InputBins" Option="Tray3"/>
```

```xml
    <InvalidCombination Feature="MediaType" Option="Labels"/>
</InvalidCombinations>
<InvalidCombinations>
    <InvalidCombination Feature="InputBins" Option="Tray3"/>
    <InvalidCombination Feature="MediaType" Option="Plain_Duplex_Backside"/>
</InvalidCombinations>
<InvalidCombinations>
    <InvalidCombination Feature="InputBins" Option="Tray3"/>
    <InvalidCombination Feature="MediaType" Option="Thick_Duplex_Backside"/>
</InvalidCombinations>
<InvalidCombinations>
    <InvalidCombination Feature="InputBins" Option="Tray4"/>
    <InvalidCombination Feature="MediaType" Option="TRANSPARENCY"/>
</InvalidCombinations>
<InvalidCombinations>
    <InvalidCombination Feature="InputBins" Option="Tray4"/>
    <InvalidCombination Feature="MediaType" Option="Thick"/>
</InvalidCombinations>
<InvalidCombinations>
    <InvalidCombination Feature="InputBins" Option="Tray4"/>
    <InvalidCombination Feature="MediaType" Option="Labels"/>
</InvalidCombinations>
<InvalidCombinations>
    <InvalidCombination Feature="InputBins" Option="Tray4"/>
    <InvalidCombination Feature="MediaType" Option="Plain_Duplex_Backside"/>
</InvalidCombinations>
<InvalidCombinations>
    <InvalidCombination Feature="InputBins" Option="Tray4"/>
    <InvalidCombination Feature="MediaType" Option="Thick_Duplex_Backside"/>
</InvalidCombinations>
<InvalidCombinations>
    <InvalidCombination Feature="InputBins" Option="LARGECAPACITY"/>
    <InvalidCombination Feature="MediaType" Option="TRANSPARENCY"/>
</InvalidCombinations>
<InvalidCombinations>
    <InvalidCombination Feature="InputBins" Option="LARGECAPACITY"/>
    <InvalidCombination Feature="MediaType" Option="Thick"/>
</InvalidCombinations>
<InvalidCombinations>
    <InvalidCombination Feature="InputBins" Option="LARGECAPACITY"/>
    <InvalidCombination Feature="MediaType" Option="Labels"/>
</InvalidCombinations>
<InvalidCombinations>
    <InvalidCombination Feature="InputBins" Option="LARGECAPACITY"/>
    <InvalidCombination Feature="MediaType" Option="Plain_Duplex_Backside"/>
</InvalidCombinations>
<InvalidCombinations>
    <InvalidCombination Feature="InputBins" Option="LARGECAPACITY"/>
```

```xml
    <InvalidCombination Feature="MediaType" Option="Thick_Duplex_Backside"/>
</InvalidCombinations>
<InvalidCombinations>
    <InvalidCombination Feature="InputTray3" Option="NotInstalled"/>
    <InvalidCombination Feature="InputBins" Option="Tray3"/>
</InvalidCombinations>
<InvalidCombinations>
    <InvalidCombination Feature="InputTray4" Option="NotInstalled"/>
    <InvalidCombination Feature="InputBins" Option="Tray4"/>
</InvalidCombinations>
<InvalidCombinations>
    <InvalidCombination Feature="LargeCapacityTray" Option="NotInstalled"/>
    <InvalidCombination Feature="InputBins" Option="LARGECAPACITY"/>
</InvalidCombinations>
<InvalidCombinations>
    <InvalidCombination Feature="InputTray3" Option="NotInstalled"/>
    <InvalidCombination Feature="SlipSheetInputBin" Option="Tray3"/>
</InvalidCombinations>
<InvalidCombinations>
    <InvalidCombination Feature="InputTray4" Option="NotInstalled"/>
    <InvalidCombination Feature="SlipSheetInputBin" Option="Tray4"/>
</InvalidCombinations>
<InvalidCombinations>
    <InvalidCombination Feature="LargeCapacityTray" Option="NotInstalled"/>
    <InvalidCombination Feature="SlipSheetInputBin" Option="LARGECAPACITY"/>
</InvalidCombinations>
<InvalidCombinations>
    <InvalidCombination Feature="InputBins" Option="BypassTray"/>
    <InvalidCombination Feature="Sides" Option="TwoSidedLongEdge"/>
</InvalidCombinations>
<InvalidCombinations>
    <InvalidCombination Feature="InputBins" Option="BypassTray"/>
    <InvalidCombination Feature="Sides" Option="TwoSidedShortEdge"/>
</InvalidCombinations>
<InvalidCombinations>
    <InvalidCombination Feature="InputBins" Option="BypassTray"/>
    <InvalidCombination Feature="Staple" Option="TopLeft"/>
</InvalidCombinations>
<InvalidCombinations>
    <InvalidCombination Feature="InputBins" Option="BypassTray"/>
    <InvalidCombination Feature="Staple" Option="TopRight"/>
</InvalidCombinations>
<InvalidCombinations>
    <InvalidCombination Feature="InputBins" Option="BypassTray"/>
    <InvalidCombination Feature="Staple" Option="Top2"/>
</InvalidCombinations>
<InvalidCombinations>
    <InvalidCombination Feature="InputBins" Option="BypassTray"/>
```

```xml
  <InvalidCombination Feature="Staple" Option="Left2"/>
</InvalidCombinations>
<InvalidCombinations>
  <InvalidCombination Feature="InputBins" Option="BypassTray"/>
  <InvalidCombination Feature="Staple" Option="Right2"/>
</InvalidCombinations>
<InvalidCombinations>
  <InvalidCombination Feature="InputBins" Option="BypassTray"/>
  <InvalidCombination Feature="Staple" Option="TopLeftSlant"/>
</InvalidCombinations>
<InvalidCombinations>
  <InvalidCombination Feature="InputBins" Option="BypassTray"/>
  <InvalidCombination Feature="Staple" Option="TopRightSlant"/>
</InvalidCombinations>
<InvalidCombinations>
  <InvalidCombination Feature="InputBins" Option="BypassTray"/>
  <InvalidCombination Feature="Staple" Option="Booklet"/>
</InvalidCombinations>
<InvalidCombinations>
  <InvalidCombination Feature="InputBins" Option="BypassTray"/>
  <InvalidCombination Feature="HolePunch" Option="Left2"/>
</InvalidCombinations>
<InvalidCombinations>
  <InvalidCombination Feature="InputBins" Option="BypassTray"/>
  <InvalidCombination Feature="HolePunch" Option="Top2"/>
</InvalidCombinations>
<InvalidCombinations>
  <InvalidCombination Feature="InputBins" Option="BypassTray"/>
  <InvalidCombination Feature="HolePunch" Option="Right2"/>
</InvalidCombinations>
<InvalidCombinations>
  <InvalidCombination Feature="InputBins" Option="BypassTray"/>
  <InvalidCombination Feature="HolePunch" Option="Left3"/>
</InvalidCombinations>
<InvalidCombinations>
  <InvalidCombination Feature="InputBins" Option="BypassTray"/>
  <InvalidCombination Feature="HolePunch" Option="Top3"/>
</InvalidCombinations>
<InvalidCombinations>
  <InvalidCombination Feature="InputBins" Option="BypassTray"/>
  <InvalidCombination Feature="HolePunch" Option="Right3"/>
</InvalidCombinations>
<InvalidCombinations>
  <InvalidCombination Feature="InputBins" Option="BypassTray"/>
  <InvalidCombination Feature="HolePunch" Option="Left4"/>
</InvalidCombinations>
<InvalidCombinations>
  <InvalidCombination Feature="InputBins" Option="BypassTray"/>
```

```xml
    <InvalidCombination Feature="HolePunch" Option="Top4"/>
</InvalidCombinations>
<InvalidCombinations>
    <InvalidCombination Feature="InputBins" Option="BypassTray"/>
    <InvalidCombination Feature="HolePunch" Option="Right4"/>
</InvalidCombinations>
<InvalidCombinations>
    <InvalidCombination Feature="SlipSheet" Option="ON"/>
    <InvalidCombination Feature="InputBins" Option="AUTO"/>
</InvalidCombinations>
<InvalidCombinations>
    <InvalidCombination Feature="SlipSheet" Option="ON"/>
    <InvalidCombination Feature="InputBins" Option="Tray1"/>
</InvalidCombinations>
<InvalidCombinations>
    <InvalidCombination Feature="SlipSheet" Option="ON"/>
    <InvalidCombination Feature="InputBins" Option="Tray2"/>
</InvalidCombinations>
<InvalidCombinations>
    <InvalidCombination Feature="SlipSheet" Option="ON"/>
    <InvalidCombination Feature="InputBins" Option="Tray3"/>
</InvalidCombinations>
<InvalidCombinations>
    <InvalidCombination Feature="SlipSheet" Option="ON"/>
    <InvalidCombination Feature="InputBins" Option="Tray4"/>
</InvalidCombinations>
<InvalidCombinations>
    <InvalidCombination Feature="SlipSheet" Option="ON"/>
    <InvalidCombination Feature="InputBins" Option="LARGECAPACITY"/>
</InvalidCombinations>
<InvalidCombinations>
    <InvalidCombination Feature="SlipSheet" Option="ON"/>
    <InvalidCombination Feature="HolePunch" Option="Top2"/>
</InvalidCombinations>
<InvalidCombinations>
    <InvalidCombination Feature="SlipSheet" Option="ON"/>
    <InvalidCombination Feature="HolePunch" Option="Top3"/>
</InvalidCombinations>
<InvalidCombinations>
    <InvalidCombination Feature="SlipSheet" Option="ON"/>
    <InvalidCombination Feature="HolePunch" Option="Top4"/>
</InvalidCombinations>
<InvalidCombinations>
    <InvalidCombination Feature="SlipSheet" Option="ON"/>
    <InvalidCombination Feature="HolePunch" Option="Right2"/>
</InvalidCombinations>
<InvalidCombinations>
    <InvalidCombination Feature="SlipSheet" Option="ON"/>
```

```xml
    <InvalidCombination Feature="HolePunch" Option="Right3"/>
</InvalidCombinations>
<InvalidCombinations>
    <InvalidCombination Feature="SlipSheet" Option="ON"/>
    <InvalidCombination Feature="HolePunch" Option="Right4"/>
</InvalidCombinations>
<InvalidCombinations>
    <InvalidCombination Feature="SlipSheet" Option="ON"/>
    <InvalidCombination Feature="HolePunch" Option="Left2"/>
</InvalidCombinations>
<InvalidCombinations>
    <InvalidCombination Feature="SlipSheet" Option="ON"/>
    <InvalidCombination Feature="HolePunch" Option="Left3"/>
</InvalidCombinations>
<InvalidCombinations>
    <InvalidCombination Feature="SlipSheet" Option="ON"/>
    <InvalidCombination Feature="HolePunch" Option="Left4"/>
</InvalidCombinations>
<InvalidCombinations>
    <InvalidCombination Feature="SlipSheet" Option="ON"/>
    <InvalidCombination Feature="Staple" Option="TopLeft"/>
</InvalidCombinations>
<InvalidCombinations>
    <InvalidCombination Feature="SlipSheet" Option="ON"/>
    <InvalidCombination Feature="Staple" Option="TopLeftSlant"/>
</InvalidCombinations>
<InvalidCombinations>
    <InvalidCombination Feature="SlipSheet" Option="ON"/>
    <InvalidCombination Feature="Staple" Option="TopRight"/>
</InvalidCombinations>
<InvalidCombinations>
    <InvalidCombination Feature="SlipSheet" Option="ON"/>
    <InvalidCombination Feature="Staple" Option="TopRightSlant"/>
</InvalidCombinations>
<InvalidCombinations>
    <InvalidCombination Feature="SlipSheet" Option="ON"/>
    <InvalidCombination Feature="Staple" Option="Top2"/>
</InvalidCombinations>
<InvalidCombinations>
    <InvalidCombination Feature="SlipSheet" Option="ON"/>
    <InvalidCombination Feature="Staple" Option="Left2"/>
</InvalidCombinations>
<InvalidCombinations>
    <InvalidCombination Feature="SlipSheet" Option="ON"/>
    <InvalidCombination Feature="Staple" Option="Right2"/>
</InvalidCombinations>
<InvalidCombinations>
    <InvalidCombination Feature="SlipSheet" Option="ON"/>
```

```xml
  <InvalidCombination Feature="Staple" Option="Booklet"/>
</InvalidCombinations>
<InvalidCombinations>
  <InvalidCombination Feature="SlipSheet" Option="ON"/>
  <InvalidCombination Feature="MediaType" Option="STANDARD"/>
</InvalidCombinations>
<InvalidCombinations>
  <InvalidCombination Feature="SlipSheet" Option="ON"/>
  <InvalidCombination Feature="MediaType" Option="Thick"/>
</InvalidCombinations>
<InvalidCombinations>
  <InvalidCombination Feature="SlipSheet" Option="ON"/>
  <InvalidCombination Feature="MediaType" Option="Recycled"/>
</InvalidCombinations>
<InvalidCombinations>
  <InvalidCombination Feature="SlipSheet" Option="ON"/>
  <InvalidCombination Feature="MediaType" Option="Special"/>
</InvalidCombinations>
<InvalidCombinations>
  <InvalidCombination Feature="SlipSheet" Option="ON"/>
  <InvalidCombination Feature="MediaType" Option="Letterhead"/>
</InvalidCombinations>
<InvalidCombinations>
  <InvalidCombination Feature="SlipSheet" Option="ON"/>
  <InvalidCombination Feature="MediaType" Option="Preprinted"/>
</InvalidCombinations>
<InvalidCombinations>
  <InvalidCombination Feature="SlipSheet" Option="ON"/>
  <InvalidCombination Feature="MediaType" Option="Labels"/>
</InvalidCombinations>
<InvalidCombinations>
  <InvalidCombination Feature="SlipSheet" Option="ON"/>
  <InvalidCombination Feature="MediaType" Option="Color"/>
</InvalidCombinations>
<InvalidCombinations>
  <InvalidCombination Feature="SlipSheet" Option="ON"/>
  <InvalidCombination Feature="MediaType" Option="Plain_Duplex_Backside"/>
</InvalidCombinations>
<InvalidCombinations>
  <InvalidCombination Feature="SlipSheet" Option="ON"/>
  <InvalidCombination Feature="MediaType" Option="Thick_Duplex_Backside"/>
</InvalidCombinations>
<InvalidCombinations>
  <InvalidCombination Feature="SlipSheet" Option="ON"/>
  <InvalidCombination Feature="Sides" Option="TwoSidedLongEdge"/>
</InvalidCombinations>
<InvalidCombinations>
  <InvalidCombination Feature="SlipSheet" Option="ON"/>
```

```xml
<InvalidCombination Feature="Sides" Option="TwoSidedShortEdge"/>
</InvalidCombinations>
<InvalidCombinations>
  <InvalidCombination Feature="Staple" Option="TopLeft"/>
  <InvalidCombination Feature="HolePunch" Option="Right2"/>
</InvalidCombinations>
<InvalidCombinations>
  <InvalidCombination Feature="Staple" Option="TopLeft"/>
  <InvalidCombination Feature="HolePunch" Option="Right3"/>
</InvalidCombinations>
<InvalidCombinations>
  <InvalidCombination Feature="Staple" Option="TopLeft"/>
  <InvalidCombination Feature="HolePunch" Option="Right4"/>
</InvalidCombinations>
<InvalidCombinations>
  <InvalidCombination Feature="Staple" Option="TopLeftSlant"/>
  <InvalidCombination Feature="HolePunch" Option="Right2"/>
</InvalidCombinations>
<InvalidCombinations>
  <InvalidCombination Feature="Staple" Option="TopLeftSlant"/>
  <InvalidCombination Feature="HolePunch" Option="Right3"/>
</InvalidCombinations>
<InvalidCombinations>
  <InvalidCombination Feature="Staple" Option="TopLeftSlant"/>
  <InvalidCombination Feature="HolePunch" Option="Right4"/>
</InvalidCombinations>
<InvalidCombinations>
  <InvalidCombination Feature="Staple" Option="TopRight"/>
  <InvalidCombination Feature="HolePunch" Option="Left2"/>
</InvalidCombinations>
<InvalidCombinations>
  <InvalidCombination Feature="Staple" Option="TopRight"/>
  <InvalidCombination Feature="HolePunch" Option="Left3"/>
</InvalidCombinations>
<InvalidCombinations>
  <InvalidCombination Feature="Staple" Option="TopRight"/>
  <InvalidCombination Feature="HolePunch" Option="Left4"/>
</InvalidCombinations>
<InvalidCombinations>
  <InvalidCombination Feature="Staple" Option="TopRightSlant"/>
  <InvalidCombination Feature="HolePunch" Option="Left2"/>
</InvalidCombinations>
<InvalidCombinations>
  <InvalidCombination Feature="Staple" Option="TopRightSlant"/>
  <InvalidCombination Feature="HolePunch" Option="Left3"/>
</InvalidCombinations>
<InvalidCombinations>
  <InvalidCombination Feature="Staple" Option="TopRightSlant"/>
```

```xml
  <InvalidCombination Feature="HolePunch" Option="Left4"/>
</InvalidCombinations>
<InvalidCombinations>
  <InvalidCombination Feature="Staple" Option="Top2"/>
  <InvalidCombination Feature="HolePunch" Option="Left2"/>
</InvalidCombinations>
<InvalidCombinations>
  <InvalidCombination Feature="Staple" Option="Top2"/>
  <InvalidCombination Feature="HolePunch" Option="Right2"/>
</InvalidCombinations>
<InvalidCombinations>
  <InvalidCombination Feature="Staple" Option="Top2"/>
  <InvalidCombination Feature="HolePunch" Option="Left3"/>
</InvalidCombinations>
<InvalidCombinations>
  <InvalidCombination Feature="Staple" Option="Top2"/>
  <InvalidCombination Feature="HolePunch" Option="Right3"/>
</InvalidCombinations>
<InvalidCombinations>
  <InvalidCombination Feature="Staple" Option="Top2"/>
  <InvalidCombination Feature="HolePunch" Option="Left4"/>
</InvalidCombinations>
<InvalidCombinations>
  <InvalidCombination Feature="Staple" Option="Top2"/>
  <InvalidCombination Feature="HolePunch" Option="Right4"/>
</InvalidCombinations>
<InvalidCombinations>
  <InvalidCombination Feature="Staple" Option="Left2"/>
  <InvalidCombination Feature="HolePunch" Option="Top2"/>
</InvalidCombinations>
<InvalidCombinations>
  <InvalidCombination Feature="Staple" Option="Left2"/>
  <InvalidCombination Feature="HolePunch" Option="Right2"/>
</InvalidCombinations>
<InvalidCombinations>
  <InvalidCombination Feature="Staple" Option="Left2"/>
  <InvalidCombination Feature="HolePunch" Option="Top3"/>
</InvalidCombinations>
<InvalidCombinations>
  <InvalidCombination Feature="Staple" Option="Left2"/>
  <InvalidCombination Feature="HolePunch" Option="Right3"/>
</InvalidCombinations>
<InvalidCombinations>
  <InvalidCombination Feature="Staple" Option="Left2"/>
  <InvalidCombination Feature="HolePunch" Option="Top4"/>
</InvalidCombinations>
<InvalidCombinations>
  <InvalidCombination Feature="Staple" Option="Left2"/>
```

```xml
    <InvalidCombination Feature="HolePunch" Option="Right4"/>
</InvalidCombinations>
<InvalidCombinations>
    <InvalidCombination Feature="Staple" Option="Right2"/>
    <InvalidCombination Feature="HolePunch" Option="Left2"/>
</InvalidCombinations>
<InvalidCombinations>
    <InvalidCombination Feature="Staple" Option="Right2"/>
    <InvalidCombination Feature="HolePunch" Option="Top2"/>
</InvalidCombinations>
<InvalidCombinations>
    <InvalidCombination Feature="Staple" Option="Right2"/>
    <InvalidCombination Feature="HolePunch" Option="Left3"/>
</InvalidCombinations>
<InvalidCombinations>
    <InvalidCombination Feature="Staple" Option="Right2"/>
    <InvalidCombination Feature="HolePunch" Option="Top3"/>
</InvalidCombinations>
<InvalidCombinations>
    <InvalidCombination Feature="Staple" Option="Right2"/>
    <InvalidCombination Feature="HolePunch" Option="Left4"/>
</InvalidCombinations>
<InvalidCombinations>
    <InvalidCombination Feature="Staple" Option="Right2"/>
    <InvalidCombination Feature="HolePunch" Option="Top4"/>
</InvalidCombinations>
<InvalidCombinations>
    <InvalidCombination Feature="Staple" Option="Booklet"/>
    <InvalidCombination Feature="HolePunch" Option="Left2"/>
</InvalidCombinations>
<InvalidCombinations>
    <InvalidCombination Feature="Staple" Option="Booklet"/>
    <InvalidCombination Feature="HolePunch" Option="Top2"/>
</InvalidCombinations>
<InvalidCombinations>
    <InvalidCombination Feature="Staple" Option="Booklet"/>
    <InvalidCombination Feature="HolePunch" Option="Right2"/>
</InvalidCombinations>
<InvalidCombinations>
    <InvalidCombination Feature="Staple" Option="Booklet"/>
    <InvalidCombination Feature="HolePunch" Option="Left3"/>
</InvalidCombinations>
<InvalidCombinations>
    <InvalidCombination Feature="Staple" Option="Booklet"/>
    <InvalidCombination Feature="HolePunch" Option="Top3"/>
</InvalidCombinations>
<InvalidCombinations>
    <InvalidCombination Feature="Staple" Option="Booklet"/>
```

```xml
    <InvalidCombination Feature="HolePunch" Option="Right3"/>
</InvalidCombinations>
<InvalidCombinations>
    <InvalidCombination Feature="Staple" Option="Booklet"/>
    <InvalidCombination Feature="HolePunch" Option="Left4"/>
</InvalidCombinations>
<InvalidCombinations>
    <InvalidCombination Feature="Staple" Option="Booklet"/>
    <InvalidCombination Feature="HolePunch" Option="Top4"/>
</InvalidCombinations>
<InvalidCombinations>
    <InvalidCombination Feature="Staple" Option="Booklet"/>
    <InvalidCombination Feature="HolePunch" Option="Right4"/>
</InvalidCombinations>
<InvalidCombinations>
    <InvalidCombination Feature="Staple" Option="TopLeft"/>
    <InvalidCombination Feature="MediaType" Option="TRANSPARENCY"/>
</InvalidCombinations>
<InvalidCombinations>
    <InvalidCombination Feature="Staple" Option="TopLeft"/>
    <InvalidCombination Feature="MediaType" Option="Thick"/>
</InvalidCombinations>
<InvalidCombinations>
    <InvalidCombination Feature="Staple" Option="TopLeft"/>
    <InvalidCombination Feature="MediaType" Option="Labels"/>
</InvalidCombinations>
<InvalidCombinations>
    <InvalidCombination Feature="Staple" Option="TopLeft"/>
    <InvalidCombination Feature="MediaType" Option="Plain_Duplex_Backside"/>
</InvalidCombinations>
<InvalidCombinations>
    <InvalidCombination Feature="Staple" Option="TopLeft"/>
    <InvalidCombination Feature="MediaType" Option="Thick_Duplex_Backside"/>
</InvalidCombinations>
<InvalidCombinations>
    <InvalidCombination Feature="Staple" Option="TopLeftSlant"/>
    <InvalidCombination Feature="MediaType" Option="TRANSPARENCY"/>
</InvalidCombinations>
<InvalidCombinations>
    <InvalidCombination Feature="Staple" Option="TopLeftSlant"/>
    <InvalidCombination Feature="MediaType" Option="Thick"/>
</InvalidCombinations>
<InvalidCombinations>
    <InvalidCombination Feature="Staple" Option="TopLeftSlant"/>
    <InvalidCombination Feature="MediaType" Option="Labels"/>
</InvalidCombinations>
<InvalidCombinations>
    <InvalidCombination Feature="Staple" Option="TopLeftSlant"/>
```

```xml
    <InvalidCombination Feature="MediaType" Option="Plain_Duplex_Backside"/>
  </InvalidCombinations>
  <InvalidCombinations>
    <InvalidCombination Feature="Staple" Option="TopLeftSlant"/>
    <InvalidCombination Feature="MediaType" Option="Thick_Duplex_Backside"/>
  </InvalidCombinations>
  <InvalidCombinations>
    <InvalidCombination Feature="Staple" Option="TopRight"/>
    <InvalidCombination Feature="MediaType" Option="TRANSPARENCY"/>
  </InvalidCombinations>
  <InvalidCombinations>
    <InvalidCombination Feature="Staple" Option="TopRight"/>
    <InvalidCombination Feature="MediaType" Option="Thick"/>
  </InvalidCombinations>
  <InvalidCombinations>
    <InvalidCombination Feature="Staple" Option="TopRight"/>
    <InvalidCombination Feature="MediaType" Option="Labels"/>
  </InvalidCombinations>
  <InvalidCombinations>
    <InvalidCombination Feature="Staple" Option="TopRight"/>
    <InvalidCombination Feature="MediaType" Option="Plain_Duplex_Backside"/>
  </InvalidCombinations>
  <InvalidCombinations>
    <InvalidCombination Feature="Staple" Option="TopRight"/>
    <InvalidCombination Feature="MediaType" Option="Thick_Duplex_Backside"/>
  </InvalidCombinations>
  <InvalidCombinations>
    <InvalidCombination Feature="Staple" Option="TopRightSlant"/>
    <InvalidCombination Feature="MediaType" Option="TRANSPARENCY"/>
  </InvalidCombinations>
  <InvalidCombinations>
    <InvalidCombination Feature="Staple" Option="TopRightSlant"/>
    <InvalidCombination Feature="MediaType" Option="Thick"/>
  </InvalidCombinations>
  <InvalidCombinations>
    <InvalidCombination Feature="Staple" Option="TopRightSlant"/>
    <InvalidCombination Feature="MediaType" Option="Labels"/>
  </InvalidCombinations>
  <InvalidCombinations>
    <InvalidCombination Feature="Staple" Option="TopRightSlant"/>
    <InvalidCombination Feature="MediaType" Option="Plain_Duplex_Backside"/>
  </InvalidCombinations>
  <InvalidCombinations>
    <InvalidCombination Feature="Staple" Option="TopRightSlant"/>
    <InvalidCombination Feature="MediaType" Option="Thick_Duplex_Backside"/>
  </InvalidCombinations>
  <InvalidCombinations>
    <InvalidCombination Feature="Staple" Option="Top2"/>
```

```xml
    <InvalidCombination Feature="MediaType" Option="TRANSPARENCY"/>
</InvalidCombinations>
<InvalidCombinations>
    <InvalidCombination Feature="Staple" Option="Top2"/>
    <InvalidCombination Feature="MediaType" Option="Thick"/>
</InvalidCombinations>
<InvalidCombinations>
    <InvalidCombination Feature="Staple" Option="Top2"/>
    <InvalidCombination Feature="MediaType" Option="Labels"/>
</InvalidCombinations>
<InvalidCombinations>
    <InvalidCombination Feature="Staple" Option="Top2"/>
    <InvalidCombination Feature="MediaType" Option="Plain_Duplex_Backside"/>
</InvalidCombinations>
<InvalidCombinations>
    <InvalidCombination Feature="Staple" Option="Top2"/>
    <InvalidCombination Feature="MediaType" Option="Thick_Duplex_Backside"/>
</InvalidCombinations>
<InvalidCombinations>
    <InvalidCombination Feature="Staple" Option="Left2"/>
    <InvalidCombination Feature="MediaType" Option="TRANSPARENCY"/>
</InvalidCombinations>
<InvalidCombinations>
    <InvalidCombination Feature="Staple" Option="Left2"/>
    <InvalidCombination Feature="MediaType" Option="Thick"/>
</InvalidCombinations>
<InvalidCombinations>
    <InvalidCombination Feature="Staple" Option="Left2"/>
    <InvalidCombination Feature="MediaType" Option="Labels"/>
</InvalidCombinations>
<InvalidCombinations>
    <InvalidCombination Feature="Staple" Option="Left2"/>
    <InvalidCombination Feature="MediaType" Option="Plain_Duplex_Backside"/>
</InvalidCombinations>
<InvalidCombinations>
    <InvalidCombination Feature="Staple" Option="Left2"/>
    <InvalidCombination Feature="MediaType" Option="Thick_Duplex_Backside"/>
</InvalidCombinations>
<InvalidCombinations>
    <InvalidCombination Feature="Staple" Option="Right2"/>
    <InvalidCombination Feature="MediaType" Option="TRANSPARENCY"/>
</InvalidCombinations>
<InvalidCombinations>
    <InvalidCombination Feature="Staple" Option="Right2"/>
    <InvalidCombination Feature="MediaType" Option="Thick"/>
</InvalidCombinations>
<InvalidCombinations>
    <InvalidCombination Feature="Staple" Option="Right2"/>
```

```xml
    <InvalidCombination Feature="MediaType" Option="Labels"/>
</InvalidCombinations>
<InvalidCombinations>
    <InvalidCombination Feature="Staple" Option="Right2"/>
    <InvalidCombination Feature="MediaType" Option="Plain_Duplex_Backside"/>
</InvalidCombinations>
<InvalidCombinations>
    <InvalidCombination Feature="Staple" Option="Right2"/>
    <InvalidCombination Feature="MediaType" Option="Thick_Duplex_Backside"/>
</InvalidCombinations>
<InvalidCombinations>
    <InvalidCombination Feature="Staple" Option="Booklet"/>
    <InvalidCombination Feature="MediaType" Option="TRANSPARENCY"/>
</InvalidCombinations>
<InvalidCombinations>
    <InvalidCombination Feature="Staple" Option="Booklet"/>
    <InvalidCombination Feature="MediaType" Option="Thick"/>
</InvalidCombinations>
<InvalidCombinations>
    <InvalidCombination Feature="Staple" Option="Booklet"/>
    <InvalidCombination Feature="MediaType" Option="Labels"/>
</InvalidCombinations>
<InvalidCombinations>
    <InvalidCombination Feature="Staple" Option="Booklet"/>
    <InvalidCombination Feature="MediaType" Option="Plain_Duplex_Backside"/>
</InvalidCombinations>
<InvalidCombinations>
    <InvalidCombination Feature="Staple" Option="Booklet"/>
    <InvalidCombination Feature="MediaType" Option="Thick_Duplex_Backside"/>
</InvalidCombinations>
<InvalidCombinations>
    <InvalidCombination Feature="MediaSizeName" Option="na_invoice_5.5x8.5in"/>
    <InvalidCombination Feature="Staple" Option="TopLeft"/>
</InvalidCombinations>
<InvalidCombinations>
    <InvalidCombination Feature="MediaSizeName" Option="na_invoice_5.5x8.5in"/>
    <InvalidCombination Feature="Staple" Option="TopLeftSlant"/>
</InvalidCombinations>
<InvalidCombinations>
    <InvalidCombination Feature="MediaSizeName" Option="na_invoice_5.5x8.5in"/>
    <InvalidCombination Feature="Staple" Option="TopRight"/>
</InvalidCombinations>
<InvalidCombinations>
    <InvalidCombination Feature="MediaSizeName" Option="na_invoice_5.5x8.5in"/>
    <InvalidCombination Feature="Staple" Option="TopRightSlant"/>
</InvalidCombinations>
<InvalidCombinations>
    <InvalidCombination Feature="MediaSizeName" Option="na_invoice_5.5x8.5in"/>
```

```xml
  <InvalidCombination Feature="Staple" Option="Top2"/>
</InvalidCombinations>
<InvalidCombinations>
  <InvalidCombination Feature="MediaSizeName" Option="na_invoice_5.5x8.5in"/>
  <InvalidCombination Feature="Staple" Option="Left2"/>
</InvalidCombinations>
<InvalidCombinations>
  <InvalidCombination Feature="MediaSizeName" Option="na_invoice_5.5x8.5in"/>
  <InvalidCombination Feature="Staple" Option="Right2"/>
</InvalidCombinations>
<InvalidCombinations>
  <InvalidCombination Feature="MediaSizeName" Option="na_invoice_5.5x8.5in"/>
  <InvalidCombination Feature="Staple" Option="Booklet"/>
</InvalidCombinations>
<InvalidCombinations>
  <InvalidCombination Feature="MediaSizeName" Option="iso_a5_148x210mm"/>
  <InvalidCombination Feature="Staple" Option="TopLeft"/>
</InvalidCombinations>
<InvalidCombinations>
  <InvalidCombination Feature="MediaSizeName" Option="iso_a5_148x210mm"/>
  <InvalidCombination Feature="Staple" Option="TopLeftSlant"/>
</InvalidCombinations>
<InvalidCombinations>
  <InvalidCombination Feature="MediaSizeName" Option="iso_a5_148x210mm"/>
  <InvalidCombination Feature="Staple" Option="TopRight"/>
</InvalidCombinations>
<InvalidCombinations>
  <InvalidCombination Feature="MediaSizeName" Option="iso_a5_148x210mm"/>
  <InvalidCombination Feature="Staple" Option="TopRightSlant"/>
</InvalidCombinations>
<InvalidCombinations>
  <InvalidCombination Feature="MediaSizeName" Option="iso_a5_148x210mm"/>
  <InvalidCombination Feature="Staple" Option="Top2"/>
</InvalidCombinations>
<InvalidCombinations>
  <InvalidCombination Feature="MediaSizeName" Option="iso_a5_148x210mm"/>
  <InvalidCombination Feature="Staple" Option="Left2"/>
</InvalidCombinations>
<InvalidCombinations>
  <InvalidCombination Feature="MediaSizeName" Option="iso_a5_148x210mm"/>
  <InvalidCombination Feature="Staple" Option="Right2"/>
</InvalidCombinations>
<InvalidCombinations>
  <InvalidCombination Feature="MediaSizeName" Option="iso_a5_148x210mm"/>
  <InvalidCombination Feature="Staple" Option="Booklet"/>
</InvalidCombinations>
<InvalidCombinations>
  <InvalidCombination Feature="MediaSizeName" Option="iso_a6_105x148mm"/>
```

```xml
<InvalidCombination Feature="Staple" Option="TopLeft"/>
</InvalidCombinations>
<InvalidCombinations>
 <InvalidCombination Feature="MediaSizeName" Option="iso_a6_105x148mm"/>
 <InvalidCombination Feature="Staple" Option="TopLeftSlant"/>
</InvalidCombinations>
<InvalidCombinations>
 <InvalidCombination Feature="MediaSizeName" Option="iso_a6_105x148mm"/>
 <InvalidCombination Feature="Staple" Option="TopRight"/>
</InvalidCombinations>
<InvalidCombinations>
 <InvalidCombination Feature="MediaSizeName" Option="iso_a6_105x148mm"/>
 <InvalidCombination Feature="Staple" Option="TopRightSlant"/>
</InvalidCombinations>
<InvalidCombinations>
 <InvalidCombination Feature="MediaSizeName" Option="iso_a6_105x148mm"/>
 <InvalidCombination Feature="Staple" Option="Top2"/>
</InvalidCombinations>
<InvalidCombinations>
 <InvalidCombination Feature="MediaSizeName" Option="iso_a6_105x148mm"/>
 <InvalidCombination Feature="Staple" Option="Left2"/>
</InvalidCombinations>
<InvalidCombinations>
 <InvalidCombination Feature="MediaSizeName" Option="iso_a6_105x148mm"/>
 <InvalidCombination Feature="Staple" Option="Right2"/>
</InvalidCombinations>
<InvalidCombinations>
 <InvalidCombination Feature="MediaSizeName" Option="iso_a6_105x148mm"/>
 <InvalidCombination Feature="Staple" Option="Booklet"/>
</InvalidCombinations>
<InvalidCombinations>
 <InvalidCombination Feature="MediaSizeName" Option="na_number-10_4.125x9.5in"/>
 <InvalidCombination Feature="Staple" Option="TopLeft"/>
</InvalidCombinations>
<InvalidCombinations>
 <InvalidCombination Feature="MediaSizeName" Option="na_number-10_4.125x9.5in"/>
 <InvalidCombination Feature="Staple" Option="TopLeftSlant"/>
</InvalidCombinations>
<InvalidCombinations>
 <InvalidCombination Feature="MediaSizeName" Option="na_number-10_4.125x9.5in"/>
 <InvalidCombination Feature="Staple" Option="TopRight"/>
</InvalidCombinations>
<InvalidCombinations>
 <InvalidCombination Feature="MediaSizeName" Option="na_number-10_4.125x9.5in"/>
 <InvalidCombination Feature="Staple" Option="TopRightSlant"/>
</InvalidCombinations>
<InvalidCombinations>
 <InvalidCombination Feature="MediaSizeName" Option="na_number-10_4.125x9.5in"/>
```

```xml
    <InvalidCombination Feature="Staple" Option="Top2"/>
  </InvalidCombinations>
  <InvalidCombinations>
    <InvalidCombination Feature="MediaSizeName" Option="na_number-10_4.125x9.5in"/>
    <InvalidCombination Feature="Staple" Option="Left2"/>
  </InvalidCombinations>
  <InvalidCombinations>
    <InvalidCombination Feature="MediaSizeName" Option="na_number-10_4.125x9.5in"/>
    <InvalidCombination Feature="Staple" Option="Right2"/>
  </InvalidCombinations>
  <InvalidCombinations>
    <InvalidCombination Feature="MediaSizeName" Option="na_number-10_4.125x9.5in"/>
    <InvalidCombination Feature="Staple" Option="Booklet"/>
  </InvalidCombinations>
  <InvalidCombinations>
    <InvalidCombination Feature="MediaSizeName" Option="iso_dl_110x220mm"/>
    <InvalidCombination Feature="Staple" Option="TopLeft"/>
  </InvalidCombinations>
  <InvalidCombinations>
    <InvalidCombination Feature="MediaSizeName" Option="iso_dl_110x220mm"/>
    <InvalidCombination Feature="Staple" Option="TopLeftSlant"/>
  </InvalidCombinations>
  <InvalidCombinations>
    <InvalidCombination Feature="MediaSizeName" Option="iso_dl_110x220mm"/>
    <InvalidCombination Feature="Staple" Option="TopRight"/>
  </InvalidCombinations>
  <InvalidCombinations>
    <InvalidCombination Feature="MediaSizeName" Option="iso_dl_110x220mm"/>
    <InvalidCombination Feature="Staple" Option="TopRightSlant"/>
  </InvalidCombinations>
  <InvalidCombinations>
    <InvalidCombination Feature="MediaSizeName" Option="iso_dl_110x220mm"/>
    <InvalidCombination Feature="Staple" Option="Top2"/>
  </InvalidCombinations>
  <InvalidCombinations>
    <InvalidCombination Feature="MediaSizeName" Option="iso_dl_110x220mm"/>
    <InvalidCombination Feature="Staple" Option="Left2"/>
  </InvalidCombinations>
  <InvalidCombinations>
    <InvalidCombination Feature="MediaSizeName" Option="iso_dl_110x220mm"/>
    <InvalidCombination Feature="Staple" Option="Right2"/>
  </InvalidCombinations>
  <InvalidCombinations>
    <InvalidCombination Feature="MediaSizeName" Option="iso_dl_110x220mm"/>
    <InvalidCombination Feature="Staple" Option="Booklet"/>
  </InvalidCombinations>
  <InvalidCombinations>
    <InvalidCombination Feature="MediaSizeName" Option="na_monarch_3.875x7.5in"/>
```

```xml
  <InvalidCombination Feature="Staple" Option="TopLeft"/>
</InvalidCombinations>
<InvalidCombinations>
  <InvalidCombination Feature="MediaSizeName" Option="na_monarch_3.875x7.5in"/>
  <InvalidCombination Feature="Staple" Option="TopLeftSlant"/>
</InvalidCombinations>
<InvalidCombinations>
  <InvalidCombination Feature="MediaSizeName" Option="na_monarch_3.875x7.5in"/>
  <InvalidCombination Feature="Staple" Option="TopRight"/>
</InvalidCombinations>
<InvalidCombinations>
  <InvalidCombination Feature="MediaSizeName" Option="na_monarch_3.875x7.5in"/>
  <InvalidCombination Feature="Staple" Option="TopRightSlant"/>
</InvalidCombinations>
<InvalidCombinations>
  <InvalidCombination Feature="MediaSizeName" Option="na_monarch_3.875x7.5in"/>
  <InvalidCombination Feature="Staple" Option="Top2"/>
</InvalidCombinations>
<InvalidCombinations>
  <InvalidCombination Feature="MediaSizeName" Option="na_monarch_3.875x7.5in"/>
  <InvalidCombination Feature="Staple" Option="Left2"/>
</InvalidCombinations>
<InvalidCombinations>
  <InvalidCombination Feature="MediaSizeName" Option="na_monarch_3.875x7.5in"/>
  <InvalidCombination Feature="Staple" Option="Right2"/>
</InvalidCombinations>
<InvalidCombinations>
  <InvalidCombination Feature="MediaSizeName" Option="na_monarch_3.875x7.5in"/>
  <InvalidCombination Feature="Staple" Option="Booklet"/>
</InvalidCombinations>
<InvalidCombinations>
  <InvalidCombination Feature="MediaSizeName" Option="iso_c5_162x229mm"/>
  <InvalidCombination Feature="Staple" Option="TopLeft"/>
</InvalidCombinations>
<InvalidCombinations>
  <InvalidCombination Feature="MediaSizeName" Option="iso_c5_162x229mm"/>
  <InvalidCombination Feature="Staple" Option="TopLeftSlant"/>
</InvalidCombinations>
<InvalidCombinations>
  <InvalidCombination Feature="MediaSizeName" Option="iso_c5_162x229mm"/>
  <InvalidCombination Feature="Staple" Option="TopRight"/>
</InvalidCombinations>
<InvalidCombinations>
  <InvalidCombination Feature="MediaSizeName" Option="iso_c5_162x229mm"/>
  <InvalidCombination Feature="Staple" Option="TopRightSlant"/>
</InvalidCombinations>
<InvalidCombinations>
  <InvalidCombination Feature="MediaSizeName" Option="iso_c5_162x229mm"/>
```

```xml
    <InvalidCombination Feature="Staple" Option="Top2"/>
</InvalidCombinations>
<InvalidCombinations>
    <InvalidCombination Feature="MediaSizeName" Option="iso_c5_162x229mm"/>
    <InvalidCombination Feature="Staple" Option="Left2"/>
</InvalidCombinations>
<InvalidCombinations>
    <InvalidCombination Feature="MediaSizeName" Option="iso_c5_162x229mm"/>
    <InvalidCombination Feature="Staple" Option="Right2"/>
</InvalidCombinations>
<InvalidCombinations>
    <InvalidCombination Feature="MediaSizeName" Option="iso_c5_162x229mm"/>
    <InvalidCombination Feature="Staple" Option="Booklet"/>
</InvalidCombinations>
<InvalidCombinations>
    <InvalidCombination Feature="MediaSizeName" Option="iso_c6_114x162mm"/>
    <InvalidCombination Feature="Staple" Option="TopLeft"/>
</InvalidCombinations>
<InvalidCombinations>
    <InvalidCombination Feature="MediaSizeName" Option="iso_c6_114x162mm"/>
    <InvalidCombination Feature="Staple" Option="TopLeftSlant"/>
</InvalidCombinations>
<InvalidCombinations>
    <InvalidCombination Feature="MediaSizeName" Option="iso_c6_114x162mm"/>
    <InvalidCombination Feature="Staple" Option="TopRight"/>
</InvalidCombinations>
<InvalidCombinations>
    <InvalidCombination Feature="MediaSizeName" Option="iso_c6_114x162mm"/>
    <InvalidCombination Feature="Staple" Option="TopRightSlant"/>
</InvalidCombinations>
<InvalidCombinations>
    <InvalidCombination Feature="MediaSizeName" Option="iso_c6_114x162mm"/>
    <InvalidCombination Feature="Staple" Option="Top2"/>
</InvalidCombinations>
<InvalidCombinations>
    <InvalidCombination Feature="MediaSizeName" Option="iso_c6_114x162mm"/>
    <InvalidCombination Feature="Staple" Option="Left2"/>
</InvalidCombinations>
<InvalidCombinations>
    <InvalidCombination Feature="MediaSizeName" Option="iso_c6_114x162mm"/>
    <InvalidCombination Feature="Staple" Option="Right2"/>
</InvalidCombinations>
<InvalidCombinations>
    <InvalidCombination Feature="MediaSizeName" Option="iso_c6_114x162mm"/>
    <InvalidCombination Feature="Staple" Option="Booklet"/>
</InvalidCombinations>
<InvalidCombinations>
    <InvalidCombination Feature="MediaSizeName" Option="na_arch-b_12x18in"/>
```

```xml
  <InvalidCombination Feature="Staple" Option="TopLeft"/>
</InvalidCombinations>
<InvalidCombinations>
  <InvalidCombination Feature="MediaSizeName" Option="na_arch-b_12x18in"/>
  <InvalidCombination Feature="Staple" Option="TopLeftSlant"/>
</InvalidCombinations>
<InvalidCombinations>
  <InvalidCombination Feature="MediaSizeName" Option="na_arch-b_12x18in"/>
  <InvalidCombination Feature="Staple" Option="TopRight"/>
</InvalidCombinations>
<InvalidCombinations>
  <InvalidCombination Feature="MediaSizeName" Option="na_arch-b_12x18in"/>
  <InvalidCombination Feature="Staple" Option="TopRightSlant"/>
</InvalidCombinations>
<InvalidCombinations>
  <InvalidCombination Feature="MediaSizeName" Option="na_arch-b_12x18in"/>
  <InvalidCombination Feature="Staple" Option="Top2"/>
</InvalidCombinations>
<InvalidCombinations>
  <InvalidCombination Feature="MediaSizeName" Option="na_arch-b_12x18in"/>
  <InvalidCombination Feature="Staple" Option="Left2"/>
</InvalidCombinations>
<InvalidCombinations>
  <InvalidCombination Feature="MediaSizeName" Option="na_arch-b_12x18in"/>
  <InvalidCombination Feature="Staple" Option="Right2"/>
</InvalidCombinations>
<InvalidCombinations>
  <InvalidCombination Feature="MediaSizeName" Option="na_arch-b_12x18in"/>
  <InvalidCombination Feature="Staple" Option="Booklet"/>
</InvalidCombinations>
<InvalidCombinations>
  <InvalidCombination Feature="MediaSizeName" Option="custom_papersize"/>
  <InvalidCombination Feature="Staple" Option="TopLeft"/>
</InvalidCombinations>
<InvalidCombinations>
  <InvalidCombination Feature="MediaSizeName" Option="custom_papersize"/>
  <InvalidCombination Feature="Staple" Option="TopLeftSlant"/>
</InvalidCombinations>
<InvalidCombinations>
  <InvalidCombination Feature="MediaSizeName" Option="custom_papersize"/>
  <InvalidCombination Feature="Staple" Option="TopRight"/>
</InvalidCombinations>
<InvalidCombinations>
  <InvalidCombination Feature="MediaSizeName" Option="custom_papersize"/>
  <InvalidCombination Feature="Staple" Option="TopRightSlant"/>
</InvalidCombinations>
<InvalidCombinations>
  <InvalidCombination Feature="MediaSizeName" Option="custom_papersize"/>
```

```xml
  <InvalidCombination Feature="Staple" Option="Top2"/>
</InvalidCombinations>
<InvalidCombinations>
  <InvalidCombination Feature="MediaSizeName" Option="custom_papersize"/>
  <InvalidCombination Feature="Staple" Option="Left2"/>
</InvalidCombinations>
<InvalidCombinations>
  <InvalidCombination Feature="MediaSizeName" Option="custom_papersize"/>
  <InvalidCombination Feature="Staple" Option="Right2"/>
</InvalidCombinations>
<InvalidCombinations>
  <InvalidCombination Feature="MediaSizeName" Option="custom_papersize"/>
  <InvalidCombination Feature="Staple" Option="Booklet"/>
</InvalidCombinations>
<InvalidCombinations>
  <InvalidCombination Feature="HolePunch" Option="Top2"/>
  <InvalidCombination Feature="MediaType" Option="TRANSPARENCY"/>
</InvalidCombinations>
<InvalidCombinations>
  <InvalidCombination Feature="HolePunch" Option="Top2"/>
  <InvalidCombination Feature="MediaType" Option="Thick"/>
</InvalidCombinations>
<InvalidCombinations>
  <InvalidCombination Feature="HolePunch" Option="Top2"/>
  <InvalidCombination Feature="MediaType" Option="Labels"/>
</InvalidCombinations>
<InvalidCombinations>
  <InvalidCombination Feature="HolePunch" Option="Top2"/>
  <InvalidCombination Feature="MediaType" Option="Plain_Duplex_Backside"/>
</InvalidCombinations>
<InvalidCombinations>
  <InvalidCombination Feature="HolePunch" Option="Top2"/>
  <InvalidCombination Feature="MediaType" Option="Thick_Duplex_Backside"/>
</InvalidCombinations>
<InvalidCombinations>
  <InvalidCombination Feature="HolePunch" Option="Top3"/>
  <InvalidCombination Feature="MediaType" Option="TRANSPARENCY"/>
</InvalidCombinations>
<InvalidCombinations>
  <InvalidCombination Feature="HolePunch" Option="Top3"/>
  <InvalidCombination Feature="MediaType" Option="Thick"/>
</InvalidCombinations>
<InvalidCombinations>
  <InvalidCombination Feature="HolePunch" Option="Top3"/>
  <InvalidCombination Feature="MediaType" Option="Labels"/>
</InvalidCombinations>
<InvalidCombinations>
  <InvalidCombination Feature="HolePunch" Option="Top3"/>
```

```xml
    <InvalidCombination Feature="MediaType" Option="Plain_Duplex_Backside"/>
</InvalidCombinations>
<InvalidCombinations>
    <InvalidCombination Feature="HolePunch" Option="Top3"/>
    <InvalidCombination Feature="MediaType" Option="Thick_Duplex_Backside"/>
</InvalidCombinations>
<InvalidCombinations>
    <InvalidCombination Feature="HolePunch" Option="Top4"/>
    <InvalidCombination Feature="MediaType" Option="TRANSPARENCY"/>
</InvalidCombinations>
<InvalidCombinations>
    <InvalidCombination Feature="HolePunch" Option="Top4"/>
    <InvalidCombination Feature="MediaType" Option="Thick"/>
</InvalidCombinations>
<InvalidCombinations>
    <InvalidCombination Feature="HolePunch" Option="Top4"/>
    <InvalidCombination Feature="MediaType" Option="Labels"/>
</InvalidCombinations>
<InvalidCombinations>
    <InvalidCombination Feature="HolePunch" Option="Top4"/>
    <InvalidCombination Feature="MediaType" Option="Plain_Duplex_Backside"/>
</InvalidCombinations>
<InvalidCombinations>
    <InvalidCombination Feature="HolePunch" Option="Top4"/>
    <InvalidCombination Feature="MediaType" Option="Thick_Duplex_Backside"/>
</InvalidCombinations>
<InvalidCombinations>
    <InvalidCombination Feature="HolePunch" Option="Right2"/>
    <InvalidCombination Feature="MediaType" Option="TRANSPARENCY"/>
</InvalidCombinations>
<InvalidCombinations>
    <InvalidCombination Feature="HolePunch" Option="Right2"/>
    <InvalidCombination Feature="MediaType" Option="Thick"/>
</InvalidCombinations>
<InvalidCombinations>
    <InvalidCombination Feature="HolePunch" Option="Right2"/>
    <InvalidCombination Feature="MediaType" Option="Labels"/>
</InvalidCombinations>
<InvalidCombinations>
    <InvalidCombination Feature="HolePunch" Option="Right2"/>
    <InvalidCombination Feature="MediaType" Option="Plain_Duplex_Backside"/>
</InvalidCombinations>
<InvalidCombinations>
    <InvalidCombination Feature="HolePunch" Option="Right2"/>
    <InvalidCombination Feature="MediaType" Option="Thick_Duplex_Backside"/>
</InvalidCombinations>
<InvalidCombinations>
    <InvalidCombination Feature="HolePunch" Option="Right3"/>
```

```xml
  <InvalidCombination Feature="MediaType" Option="TRANSPARENCY"/>
</InvalidCombinations>
<InvalidCombinations>
  <InvalidCombination Feature="HolePunch" Option="Right3"/>
  <InvalidCombination Feature="MediaType" Option="Thick"/>
</InvalidCombinations>
<InvalidCombinations>
  <InvalidCombination Feature="HolePunch" Option="Right3"/>
  <InvalidCombination Feature="MediaType" Option="Labels"/>
</InvalidCombinations>
<InvalidCombinations>
  <InvalidCombination Feature="HolePunch" Option="Right3"/>
  <InvalidCombination Feature="MediaType" Option="Plain_Duplex_Backside"/>
</InvalidCombinations>
<InvalidCombinations>
  <InvalidCombination Feature="HolePunch" Option="Right3"/>
  <InvalidCombination Feature="MediaType" Option="Thick_Duplex_Backside"/>
</InvalidCombinations>
<InvalidCombinations>
  <InvalidCombination Feature="HolePunch" Option="Right4"/>
  <InvalidCombination Feature="MediaType" Option="TRANSPARENCY"/>
</InvalidCombinations>
<InvalidCombinations>
  <InvalidCombination Feature="HolePunch" Option="Right4"/>
  <InvalidCombination Feature="MediaType" Option="Thick"/>
</InvalidCombinations>
<InvalidCombinations>
  <InvalidCombination Feature="HolePunch" Option="Right4"/>
  <InvalidCombination Feature="MediaType" Option="Labels"/>
</InvalidCombinations>
<InvalidCombinations>
  <InvalidCombination Feature="HolePunch" Option="Right4"/>
  <InvalidCombination Feature="MediaType" Option="Plain_Duplex_Backside"/>
</InvalidCombinations>
<InvalidCombinations>
  <InvalidCombination Feature="HolePunch" Option="Right4"/>
  <InvalidCombination Feature="MediaType" Option="Thick_Duplex_Backside"/>
</InvalidCombinations>
<InvalidCombinations>
  <InvalidCombination Feature="HolePunch" Option="Left2"/>
  <InvalidCombination Feature="MediaType" Option="TRANSPARENCY"/>
</InvalidCombinations>
<InvalidCombinations>
  <InvalidCombination Feature="HolePunch" Option="Left2"/>
  <InvalidCombination Feature="MediaType" Option="Thick"/>
</InvalidCombinations>
<InvalidCombinations>
  <InvalidCombination Feature="HolePunch" Option="Left2"/>
```

```xml
    <InvalidCombination Feature="MediaType" Option="Labels"/>
</InvalidCombinations>
<InvalidCombinations>
    <InvalidCombination Feature="HolePunch" Option="Left2"/>
    <InvalidCombination Feature="MediaType" Option="Plain_Duplex_Backside"/>
</InvalidCombinations>
<InvalidCombinations>
    <InvalidCombination Feature="HolePunch" Option="Left2"/>
    <InvalidCombination Feature="MediaType" Option="Thick_Duplex_Backside"/>
</InvalidCombinations>
<InvalidCombinations>
    <InvalidCombination Feature="HolePunch" Option="Left3"/>
    <InvalidCombination Feature="MediaType" Option="TRANSPARENCY"/>
</InvalidCombinations>
<InvalidCombinations>
    <InvalidCombination Feature="HolePunch" Option="Left3"/>
    <InvalidCombination Feature="MediaType" Option="Thick"/>
</InvalidCombinations>
<InvalidCombinations>
    <InvalidCombination Feature="HolePunch" Option="Left3"/>
    <InvalidCombination Feature="MediaType" Option="Labels"/>
</InvalidCombinations>
<InvalidCombinations>
    <InvalidCombination Feature="HolePunch" Option="Left3"/>
    <InvalidCombination Feature="MediaType" Option="Plain_Duplex_Backside"/>
</InvalidCombinations>
<InvalidCombinations>
    <InvalidCombination Feature="HolePunch" Option="Left3"/>
    <InvalidCombination Feature="MediaType" Option="Thick_Duplex_Backside"/>
</InvalidCombinations>
<InvalidCombinations>
    <InvalidCombination Feature="HolePunch" Option="Left4"/>
    <InvalidCombination Feature="MediaType" Option="TRANSPARENCY"/>
</InvalidCombinations>
<InvalidCombinations>
    <InvalidCombination Feature="HolePunch" Option="Left4"/>
    <InvalidCombination Feature="MediaType" Option="Thick"/>
</InvalidCombinations>
<InvalidCombinations>
    <InvalidCombination Feature="HolePunch" Option="Left4"/>
    <InvalidCombination Feature="MediaType" Option="Labels"/>
</InvalidCombinations>
<InvalidCombinations>
    <InvalidCombination Feature="HolePunch" Option="Left4"/>
    <InvalidCombination Feature="MediaType" Option="Plain_Duplex_Backside"/>
</InvalidCombinations>
<InvalidCombinations>
    <InvalidCombination Feature="HolePunch" Option="Left4"/>
```

```xml
    <InvalidCombination Feature="MediaType" Option="Thick_Duplex_Backside"/>
  </InvalidCombinations>
  <InvalidCombinations>
    <InvalidCombination Feature="MediaSizeName" Option="na_invoice_5.5x8.5in"/>
    <InvalidCombination Feature="HolePunch" Option="Left2"/>
  </InvalidCombinations>
  <InvalidCombinations>
    <InvalidCombination Feature="MediaSizeName" Option="na_invoice_5.5x8.5in"/>
    <InvalidCombination Feature="HolePunch" Option="Top2"/>
  </InvalidCombinations>
  <InvalidCombinations>
    <InvalidCombination Feature="MediaSizeName" Option="na_invoice_5.5x8.5in"/>
    <InvalidCombination Feature="HolePunch" Option="Right2"/>
  </InvalidCombinations>
  <InvalidCombinations>
    <InvalidCombination Feature="MediaSizeName" Option="na_invoice_5.5x8.5in"/>
    <InvalidCombination Feature="HolePunch" Option="Left3"/>
  </InvalidCombinations>
  <InvalidCombinations>
    <InvalidCombination Feature="MediaSizeName" Option="na_invoice_5.5x8.5in"/>
    <InvalidCombination Feature="HolePunch" Option="Top3"/>
  </InvalidCombinations>
  <InvalidCombinations>
    <InvalidCombination Feature="MediaSizeName" Option="na_invoice_5.5x8.5in"/>
    <InvalidCombination Feature="HolePunch" Option="Right3"/>
  </InvalidCombinations>
  <InvalidCombinations>
    <InvalidCombination Feature="MediaSizeName" Option="na_invoice_5.5x8.5in"/>
    <InvalidCombination Feature="HolePunch" Option="Left4"/>
  </InvalidCombinations>
  <InvalidCombinations>
    <InvalidCombination Feature="MediaSizeName" Option="na_invoice_5.5x8.5in"/>
    <InvalidCombination Feature="HolePunch" Option="Top4"/>
  </InvalidCombinations>
  <InvalidCombinations>
    <InvalidCombination Feature="MediaSizeName" Option="na_invoice_5.5x8.5in"/>
    <InvalidCombination Feature="HolePunch" Option="Right4"/>
  </InvalidCombinations>
  <InvalidCombinations>
    <InvalidCombination Feature="MediaSizeName" Option="iso_a6_105x148mm"/>
    <InvalidCombination Feature="HolePunch" Option="Left2"/>
  </InvalidCombinations>
  <InvalidCombinations>
    <InvalidCombination Feature="MediaSizeName" Option="iso_a6_105x148mm"/>
    <InvalidCombination Feature="HolePunch" Option="Top2"/>
  </InvalidCombinations>
  <InvalidCombinations>
    <InvalidCombination Feature="MediaSizeName" Option="iso_a6_105x148mm"/>
```

```xml
  <InvalidCombination Feature="HolePunch" Option="Right2"/>
</InvalidCombinations>
<InvalidCombinations>
  <InvalidCombination Feature="MediaSizeName" Option="iso_a6_105x148mm"/>
  <InvalidCombination Feature="HolePunch" Option="Left3"/>
</InvalidCombinations>
<InvalidCombinations>
  <InvalidCombination Feature="MediaSizeName" Option="iso_a6_105x148mm"/>
  <InvalidCombination Feature="HolePunch" Option="Top3"/>
</InvalidCombinations>
<InvalidCombinations>
  <InvalidCombination Feature="MediaSizeName" Option="iso_a6_105x148mm"/>
  <InvalidCombination Feature="HolePunch" Option="Right3"/>
</InvalidCombinations>
<InvalidCombinations>
  <InvalidCombination Feature="MediaSizeName" Option="iso_a6_105x148mm"/>
  <InvalidCombination Feature="HolePunch" Option="Left4"/>
</InvalidCombinations>
<InvalidCombinations>
  <InvalidCombination Feature="MediaSizeName" Option="iso_a6_105x148mm"/>
  <InvalidCombination Feature="HolePunch" Option="Top4"/>
</InvalidCombinations>
<InvalidCombinations>
  <InvalidCombination Feature="MediaSizeName" Option="iso_a6_105x148mm"/>
  <InvalidCombination Feature="HolePunch" Option="Right4"/>
</InvalidCombinations>
<InvalidCombinations>
  <InvalidCombination Feature="MediaSizeName" Option="na_number-10_4.125x9.5in"/>
  <InvalidCombination Feature="HolePunch" Option="Left2"/>
</InvalidCombinations>
<InvalidCombinations>
  <InvalidCombination Feature="MediaSizeName" Option="na_number-10_4.125x9.5in"/>
  <InvalidCombination Feature="HolePunch" Option="Top2"/>
</InvalidCombinations>
<InvalidCombinations>
  <InvalidCombination Feature="MediaSizeName" Option="na_number-10_4.125x9.5in"/>
  <InvalidCombination Feature="HolePunch" Option="Right2"/>
</InvalidCombinations>
<InvalidCombinations>
  <InvalidCombination Feature="MediaSizeName" Option="na_number-10_4.125x9.5in"/>
  <InvalidCombination Feature="HolePunch" Option="Left3"/>
</InvalidCombinations>
<InvalidCombinations>
  <InvalidCombination Feature="MediaSizeName" Option="na_number-10_4.125x9.5in"/>
  <InvalidCombination Feature="HolePunch" Option="Top3"/>
</InvalidCombinations>
<InvalidCombinations>
  <InvalidCombination Feature="MediaSizeName" Option="na_number-10_4.125x9.5in"/>
```

```xml
    <InvalidCombination Feature="HolePunch" Option="Right3"/>
</InvalidCombinations>
<InvalidCombinations>
    <InvalidCombination Feature="MediaSizeName" Option="na_number-10_4.125x9.5in"/>
    <InvalidCombination Feature="HolePunch" Option="Left4"/>
</InvalidCombinations>
<InvalidCombinations>
    <InvalidCombination Feature="MediaSizeName" Option="na_number-10_4.125x9.5in"/>
    <InvalidCombination Feature="HolePunch" Option="Top4"/>
</InvalidCombinations>
<InvalidCombinations>
    <InvalidCombination Feature="MediaSizeName" Option="na_number-10_4.125x9.5in"/>
    <InvalidCombination Feature="HolePunch" Option="Right4"/>
</InvalidCombinations>
<InvalidCombinations>
    <InvalidCombination Feature="MediaSizeName" Option="iso_dl_110x220mm"/>
    <InvalidCombination Feature="HolePunch" Option="Left2"/>
</InvalidCombinations>
<InvalidCombinations>
    <InvalidCombination Feature="MediaSizeName" Option="iso_dl_110x220mm"/>
    <InvalidCombination Feature="HolePunch" Option="Top2"/>
</InvalidCombinations>
<InvalidCombinations>
    <InvalidCombination Feature="MediaSizeName" Option="iso_dl_110x220mm"/>
    <InvalidCombination Feature="HolePunch" Option="Right2"/>
</InvalidCombinations>
<InvalidCombinations>
    <InvalidCombination Feature="MediaSizeName" Option="iso_dl_110x220mm"/>
    <InvalidCombination Feature="HolePunch" Option="Left3"/>
</InvalidCombinations>
<InvalidCombinations>
    <InvalidCombination Feature="MediaSizeName" Option="iso_dl_110x220mm"/>
    <InvalidCombination Feature="HolePunch" Option="Top3"/>
</InvalidCombinations>
<InvalidCombinations>
    <InvalidCombination Feature="MediaSizeName" Option="iso_dl_110x220mm"/>
    <InvalidCombination Feature="HolePunch" Option="Right3"/>
</InvalidCombinations>
<InvalidCombinations>
    <InvalidCombination Feature="MediaSizeName" Option="iso_dl_110x220mm"/>
    <InvalidCombination Feature="HolePunch" Option="Left4"/>
</InvalidCombinations>
<InvalidCombinations>
    <InvalidCombination Feature="MediaSizeName" Option="iso_dl_110x220mm"/>
    <InvalidCombination Feature="HolePunch" Option="Top4"/>
</InvalidCombinations>
<InvalidCombinations>
    <InvalidCombination Feature="MediaSizeName" Option="iso_dl_110x220mm"/>
```

```xml
    <InvalidCombination Feature="HolePunch" Option="Right4"/>
</InvalidCombinations>
<InvalidCombinations>
    <InvalidCombination Feature="MediaSizeName" Option="na_monarch_3.875x7.5in"/>
    <InvalidCombination Feature="HolePunch" Option="Left2"/>
</InvalidCombinations>
<InvalidCombinations>
    <InvalidCombination Feature="MediaSizeName" Option="na_monarch_3.875x7.5in"/>
    <InvalidCombination Feature="HolePunch" Option="Top2"/>
</InvalidCombinations>
<InvalidCombinations>
    <InvalidCombination Feature="MediaSizeName" Option="na_monarch_3.875x7.5in"/>
    <InvalidCombination Feature="HolePunch" Option="Right2"/>
</InvalidCombinations>
<InvalidCombinations>
    <InvalidCombination Feature="MediaSizeName" Option="na_monarch_3.875x7.5in"/>
    <InvalidCombination Feature="HolePunch" Option="Left3"/>
</InvalidCombinations>
<InvalidCombinations>
    <InvalidCombination Feature="MediaSizeName" Option="na_monarch_3.875x7.5in"/>
    <InvalidCombination Feature="HolePunch" Option="Top3"/>
</InvalidCombinations>
<InvalidCombinations>
    <InvalidCombination Feature="MediaSizeName" Option="na_monarch_3.875x7.5in"/>
    <InvalidCombination Feature="HolePunch" Option="Right3"/>
</InvalidCombinations>
<InvalidCombinations>
    <InvalidCombination Feature="MediaSizeName" Option="na_monarch_3.875x7.5in"/>
    <InvalidCombination Feature="HolePunch" Option="Left4"/>
</InvalidCombinations>
<InvalidCombinations>
    <InvalidCombination Feature="MediaSizeName" Option="na_monarch_3.875x7.5in"/>
    <InvalidCombination Feature="HolePunch" Option="Top4"/>
</InvalidCombinations>
<InvalidCombinations>
    <InvalidCombination Feature="MediaSizeName" Option="na_monarch_3.875x7.5in"/>
    <InvalidCombination Feature="HolePunch" Option="Right4"/>
</InvalidCombinations>
<InvalidCombinations>
    <InvalidCombination Feature="MediaSizeName" Option="iso_c5_162x229mm"/>
    <InvalidCombination Feature="HolePunch" Option="Left2"/>
</InvalidCombinations>
<InvalidCombinations>
    <InvalidCombination Feature="MediaSizeName" Option="iso_c5_162x229mm"/>
    <InvalidCombination Feature="HolePunch" Option="Top2"/>
</InvalidCombinations>
<InvalidCombinations>
    <InvalidCombination Feature="MediaSizeName" Option="iso_c5_162x229mm"/>
```

```xml
    <InvalidCombination Feature="HolePunch" Option="Right2"/>
</InvalidCombinations>
<InvalidCombinations>
    <InvalidCombination Feature="MediaSizeName" Option="iso_c5_162x229mm"/>
    <InvalidCombination Feature="HolePunch" Option="Left3"/>
</InvalidCombinations>
<InvalidCombinations>
    <InvalidCombination Feature="MediaSizeName" Option="iso_c5_162x229mm"/>
    <InvalidCombination Feature="HolePunch" Option="Top3"/>
</InvalidCombinations>
<InvalidCombinations>
    <InvalidCombination Feature="MediaSizeName" Option="iso_c5_162x229mm"/>
    <InvalidCombination Feature="HolePunch" Option="Right3"/>
</InvalidCombinations>
<InvalidCombinations>
    <InvalidCombination Feature="MediaSizeName" Option="iso_c5_162x229mm"/>
    <InvalidCombination Feature="HolePunch" Option="Left4"/>
</InvalidCombinations>
<InvalidCombinations>
    <InvalidCombination Feature="MediaSizeName" Option="iso_c5_162x229mm"/>
    <InvalidCombination Feature="HolePunch" Option="Top4"/>
</InvalidCombinations>
<InvalidCombinations>
    <InvalidCombination Feature="MediaSizeName" Option="iso_c5_162x229mm"/>
    <InvalidCombination Feature="HolePunch" Option="Right4"/>
</InvalidCombinations>
<InvalidCombinations>
    <InvalidCombination Feature="MediaSizeName" Option="iso_c6_114x162mm"/>
    <InvalidCombination Feature="HolePunch" Option="Left2"/>
</InvalidCombinations>
<InvalidCombinations>
    <InvalidCombination Feature="MediaSizeName" Option="iso_c6_114x162mm"/>
    <InvalidCombination Feature="HolePunch" Option="Top2"/>
</InvalidCombinations>
<InvalidCombinations>
    <InvalidCombination Feature="MediaSizeName" Option="iso_c6_114x162mm"/>
    <InvalidCombination Feature="HolePunch" Option="Right2"/>
</InvalidCombinations>
<InvalidCombinations>
    <InvalidCombination Feature="MediaSizeName" Option="iso_c6_114x162mm"/>
    <InvalidCombination Feature="HolePunch" Option="Left3"/>
</InvalidCombinations>
<InvalidCombinations>
    <InvalidCombination Feature="MediaSizeName" Option="iso_c6_114x162mm"/>
    <InvalidCombination Feature="HolePunch" Option="Top3"/>
</InvalidCombinations>
<InvalidCombinations>
    <InvalidCombination Feature="MediaSizeName" Option="iso_c6_114x162mm"/>
```

```xml
    <InvalidCombination Feature="HolePunch" Option="Right3"/>
</InvalidCombinations>
<InvalidCombinations>
    <InvalidCombination Feature="MediaSizeName" Option="iso_c6_114x162mm"/>
    <InvalidCombination Feature="HolePunch" Option="Left4"/>
</InvalidCombinations>
<InvalidCombinations>
    <InvalidCombination Feature="MediaSizeName" Option="iso_c6_114x162mm"/>
    <InvalidCombination Feature="HolePunch" Option="Top4"/>
</InvalidCombinations>
<InvalidCombinations>
    <InvalidCombination Feature="MediaSizeName" Option="iso_c6_114x162mm"/>
    <InvalidCombination Feature="HolePunch" Option="Right4"/>
</InvalidCombinations>
<InvalidCombinations>
    <InvalidCombination Feature="MediaSizeName" Option="na_arch-b_12x18in"/>
    <InvalidCombination Feature="HolePunch" Option="Left2"/>
</InvalidCombinations>
<InvalidCombinations>
    <InvalidCombination Feature="MediaSizeName" Option="na_arch-b_12x18in"/>
    <InvalidCombination Feature="HolePunch" Option="Top2"/>
</InvalidCombinations>
<InvalidCombinations>
    <InvalidCombination Feature="MediaSizeName" Option="na_arch-b_12x18in"/>
    <InvalidCombination Feature="HolePunch" Option="Right2"/>
</InvalidCombinations>
<InvalidCombinations>
    <InvalidCombination Feature="MediaSizeName" Option="na_arch-b_12x18in"/>
    <InvalidCombination Feature="HolePunch" Option="Left3"/>
</InvalidCombinations>
<InvalidCombinations>
    <InvalidCombination Feature="MediaSizeName" Option="na_arch-b_12x18in"/>
    <InvalidCombination Feature="HolePunch" Option="Top3"/>
</InvalidCombinations>
<InvalidCombinations>
    <InvalidCombination Feature="MediaSizeName" Option="na_arch-b_12x18in"/>
    <InvalidCombination Feature="HolePunch" Option="Right3"/>
</InvalidCombinations>
<InvalidCombinations>
    <InvalidCombination Feature="MediaSizeName" Option="na_arch-b_12x18in"/>
    <InvalidCombination Feature="HolePunch" Option="Left4"/>
</InvalidCombinations>
<InvalidCombinations>
    <InvalidCombination Feature="MediaSizeName" Option="na_arch-b_12x18in"/>
    <InvalidCombination Feature="HolePunch" Option="Top4"/>
</InvalidCombinations>
<InvalidCombinations>
    <InvalidCombination Feature="MediaSizeName" Option="na_arch-b_12x18in"/>
```

```xml
    <InvalidCombination Feature="HolePunch" Option="Right4"/>
  </InvalidCombinations>
  <InvalidCombinations>
    <InvalidCombination Feature="MediaSizeName" Option="custom_papersize"/>
    <InvalidCombination Feature="HolePunch" Option="Left2"/>
  </InvalidCombinations>
  <InvalidCombinations>
    <InvalidCombination Feature="MediaSizeName" Option="custom_papersize"/>
    <InvalidCombination Feature="HolePunch" Option="Top2"/>
  </InvalidCombinations>
  <InvalidCombinations>
    <InvalidCombination Feature="MediaSizeName" Option="custom_papersize"/>
    <InvalidCombination Feature="HolePunch" Option="Right2"/>
  </InvalidCombinations>
  <InvalidCombinations>
    <InvalidCombination Feature="MediaSizeName" Option="custom_papersize"/>
    <InvalidCombination Feature="HolePunch" Option="Left3"/>
  </InvalidCombinations>
  <InvalidCombinations>
    <InvalidCombination Feature="MediaSizeName" Option="custom_papersize"/>
    <InvalidCombination Feature="HolePunch" Option="Top3"/>
  </InvalidCombinations>
  <InvalidCombinations>
    <InvalidCombination Feature="MediaSizeName" Option="custom_papersize"/>
    <InvalidCombination Feature="HolePunch" Option="Right3"/>
  </InvalidCombinations>
  <InvalidCombinations>
    <InvalidCombination Feature="MediaSizeName" Option="custom_papersize"/>
    <InvalidCombination Feature="HolePunch" Option="Left4"/>
  </InvalidCombinations>
  <InvalidCombinations>
    <InvalidCombination Feature="MediaSizeName" Option="custom_papersize"/>
    <InvalidCombination Feature="HolePunch" Option="Top4"/>
  </InvalidCombinations>
  <InvalidCombinations>
    <InvalidCombination Feature="MediaSizeName" Option="custom_papersize"/>
    <InvalidCombination Feature="HolePunch" Option="Right4"/>
  </InvalidCombinations>
  <InvalidCombinations>
    <InvalidCombination Feature="MediaSizeName" Option="na_invoice_5.5x8.5in"/>
    <InvalidCombination Feature="Sides" Option="TwoSidedLongEdge"/>
  </InvalidCombinations>
  <InvalidCombinations>
    <InvalidCombination Feature="MediaSizeName" Option="iso_a6_105x148mm"/>
    <InvalidCombination Feature="Sides" Option="TwoSidedLongEdge"/>
  </InvalidCombinations>
  <InvalidCombinations>
    <InvalidCombination Feature="MediaSizeName" Option="na_number-10_4.125x9.5in"/>
```

```xml
    <InvalidCombination Feature="Sides" Option="TwoSidedLongEdge"/>
</InvalidCombinations>
<InvalidCombinations>
    <InvalidCombination Feature="MediaSizeName" Option="iso_dl_110x220mm"/>
    <InvalidCombination Feature="Sides" Option="TwoSidedLongEdge"/>
</InvalidCombinations>
<InvalidCombinations>
    <InvalidCombination Feature="MediaSizeName" Option="na_monarch_3.875x7.5in"/>
    <InvalidCombination Feature="Sides" Option="TwoSidedLongEdge"/>
</InvalidCombinations>
<InvalidCombinations>
    <InvalidCombination Feature="MediaSizeName" Option="iso_c5_162x229mm"/>
    <InvalidCombination Feature="Sides" Option="TwoSidedLongEdge"/>
</InvalidCombinations>
<InvalidCombinations>
    <InvalidCombination Feature="MediaSizeName" Option="iso_c6_114x162mm"/>
    <InvalidCombination Feature="Sides" Option="TwoSidedLongEdge"/>
</InvalidCombinations>
<InvalidCombinations>
    <InvalidCombination Feature="MediaSizeName" Option="na_arch-b_12x18in"/>
    <InvalidCombination Feature="Sides" Option="TwoSidedLongEdge"/>
</InvalidCombinations>
<InvalidCombinations>
    <InvalidCombination Feature="MediaSizeName" Option="custom_papersize"/>
    <InvalidCombination Feature="Sides" Option="TwoSidedLongEdge"/>
</InvalidCombinations>
<InvalidCombinations>
    <InvalidCombination Feature="MediaSizeName" Option="na_invoice_5.5x8.5in"/>
    <InvalidCombination Feature="Sides" Option="TwoSidedShortEdge"/>
</InvalidCombinations>
<InvalidCombinations>
    <InvalidCombination Feature="MediaSizeName" Option="iso_a6_105x148mm"/>
    <InvalidCombination Feature="Sides" Option="TwoSidedShortEdge"/>
</InvalidCombinations>
<InvalidCombinations>
    <InvalidCombination Feature="MediaSizeName" Option="na_number-10_4.125x9.5in"/>
    <InvalidCombination Feature="Sides" Option="TwoSidedShortEdge"/>
</InvalidCombinations>
<InvalidCombinations>
    <InvalidCombination Feature="MediaSizeName" Option="iso_dl_110x220mm"/>
    <InvalidCombination Feature="Sides" Option="TwoSidedShortEdge"/>
</InvalidCombinations>
<InvalidCombinations>
    <InvalidCombination Feature="MediaSizeName" Option="na_monarch_3.875x7.5in"/>
    <InvalidCombination Feature="Sides" Option="TwoSidedShortEdge"/>
</InvalidCombinations>
<InvalidCombinations>
    <InvalidCombination Feature="MediaSizeName" Option="iso_c5_162x229mm"/>
```

```xml
  <InvalidCombination Feature="Sides" Option="TwoSidedShortEdge"/>
</InvalidCombinations>
<InvalidCombinations>
  <InvalidCombination Feature="MediaSizeName" Option="iso_c6_114x162mm"/>
  <InvalidCombination Feature="Sides" Option="TwoSidedShortEdge"/>
</InvalidCombinations>
<InvalidCombinations>
  <InvalidCombination Feature="MediaSizeName" Option="na_arch-b_12x18in"/>
  <InvalidCombination Feature="Sides" Option="TwoSidedShortEdge"/>
</InvalidCombinations>
<InvalidCombinations>
  <InvalidCombination Feature="MediaSizeName" Option="custom_papersize"/>
  <InvalidCombination Feature="Sides" Option="TwoSidedShortEdge"/>
</InvalidCombinations>
<InvalidCombinations>
  <InvalidCombination Feature="Sides" Option="TwoSidedLongEdge"/>
  <InvalidCombination Feature="MediaType" Option="TRANSPARENCY"/>
</InvalidCombinations>
<InvalidCombinations>
  <InvalidCombination Feature="Sides" Option="TwoSidedLongEdge"/>
  <InvalidCombination Feature="MediaType" Option="Thick"/>
</InvalidCombinations>
<InvalidCombinations>
  <InvalidCombination Feature="Sides" Option="TwoSidedLongEdge"/>
  <InvalidCombination Feature="MediaType" Option="Labels"/>
</InvalidCombinations>
<InvalidCombinations>
  <InvalidCombination Feature="Sides" Option="TwoSidedLongEdge"/>
  <InvalidCombination Feature="MediaType" Option="Plain_Duplex_Backside"/>
</InvalidCombinations>
<InvalidCombinations>
  <InvalidCombination Feature="Sides" Option="TwoSidedLongEdge"/>
  <InvalidCombination Feature="MediaType" Option="Thick_Duplex_Backside"/>
</InvalidCombinations>
<InvalidCombinations>
  <InvalidCombination Feature="Sides" Option="TwoSidedShortEdge"/>
  <InvalidCombination Feature="MediaType" Option="TRANSPARENCY"/>
</InvalidCombinations>
<InvalidCombinations>
  <InvalidCombination Feature="Sides" Option="TwoSidedShortEdge"/>
  <InvalidCombination Feature="MediaType" Option="Thick"/>
</InvalidCombinations>
<InvalidCombinations>
  <InvalidCombination Feature="Sides" Option="TwoSidedShortEdge"/>
  <InvalidCombination Feature="MediaType" Option="Labels"/>
</InvalidCombinations>
<InvalidCombinations>
  <InvalidCombination Feature="Sides" Option="TwoSidedShortEdge"/>
```

```xml
      <InvalidCombination Feature="MediaType" Option="Plain_Duplex_Backside"/>
    </InvalidCombinations>
    <InvalidCombinations>
      <InvalidCombination Feature="Sides" Option="TwoSidedShortEdge"/>
      <InvalidCombination Feature="MediaType" Option="Thick_Duplex_Backside"/>
    </InvalidCombinations>
  </GlobalConstraints>
</PrinterDescriptionData>
```

What is claimed is:

1. A computer-implemented method for printing to a Web service-enabled printing device, comprising:
a print driver executing on a client device and retrieving, from the Web service-enabled printing device, printing device capabilities data that specifies a plurality of features and options currently supported by the Web service-enabled printing device;
wherein the printing device capabilities data specifies, for a particular feature and a particular option of the plurality of features and options, a plurality of languages in which the particular feature and the particular option may be displayed;
the print driver generating, based at least upon the printing device capabilities data, printer description data that specifies display data that indicates how the particular feature and the particular option are to be displayed, on a graphical user interface, in the plurality of languages;
in response to user input, the print driver generating, based at least upon the display data contained in the printer description data and language data, graphical user interface data which, when processed at the client device, causes the particular feature and the particular option to be displayed on a graphical user interface in a particular language of the plurality of languages that is currently selected for the client device, wherein the language data specifies the particular language;
the print driver receiving, from an application program, application data generated by the application program;
the print driver generating, based at least upon the application data, print data and a print job ticket; and
the print driver causing the print data and the print job ticket to be transmitted to the Web service-enabled printing device.

2. The method of claim 1, wherein the language data is a localization setting of an operating system of the client device.

3. The method of claim 1, wherein:
the display data specifies a string variable that corresponds to the particular feature, and
generating the graphical user interface data includes retrieving a string that corresponds to the string variable.

4. The method of claim 1, further comprising:
in response to a particular user logging in to a computer system, causing the language data to specify a second language that is different than the particular language; and
in response to second user input, the print driver generating, based at least upon the display data contained in the printer description data and the language data, second graphical user interface data which, when processed at the client device, causes the particular feature and the particular option to be displayed on a second graphical user interface in the second language.

5. The method of claim 1, wherein:
the graphical user interface data includes an option to display the particular feature and the particular option in another language that is different than the particular language and is of the plurality of languages;
the method further comprising, in response to second user input selecting a second language that is different than the particular language, the print driver generating, based at least upon the display data contained in the printer description data and the second language, second graphical user interface data which, when processed at the client device, causes the particular feature and the particular option to be displayed on a second graphical user interface in the second language.

6. The method of claim 1, further comprising:
the print driver retrieving, from the Web service-enabled printing device, second printing device capabilities data that specifies the plurality of features and options of the Web service-enabled printing device;
wherein the second printing device capabilities data specifies, for the particular feature and the particular option of the plurality of features and options, a second plurality of languages in which the particular feature and the particular option may be displayed;
wherein the second plurality of languages includes a second language that is not included in the plurality of languages;
the print driver generating, based at least upon the printing device capabilities data, second printer description data that specifies second display data that indicates how the particular feature and the particular option are to be displayed, on a another graphical user interface, in the second plurality of languages;
in response to second user input, the print driver generating, based at least upon the second display data contained in the second printer description data and second language data that specifies the second language, second graphical user interface data which, when processed at the client device, causes the particular feature and the particular option to be displayed on a second graphical user interface in the second language.

7. The method of claim 1, further comprising:
the print driver retrieving, from a second Web service-enabled printing device that is different than the Web service-enabled printing device, second printing device capabilities data that specifies a second plurality of features and options currently supported by the second Web service-enabled printing device;
wherein the second printing device capabilities data specifies, for a second particular feature and a second particular option of the second plurality of features and options, a second plurality of languages in which the second particular feature and the second particular option may be displayed;
wherein the second plurality of languages includes a second language that is not included in the plurality of languages;
the print driver generating, based at least upon the second printing device capabilities data, second printer description data that specifies second display data that indicates how the second particular feature and the second particular option are to be displayed, on another graphical user interface, in the second plurality of languages;
in response to second user input, the print driver generating, based at least upon the second display data contained in the second printer description data and second language data that specifies the second language, second graphical user interface data which, when processed at the client device, causes the particular feature and the particular option to be displayed on a second graphical user interface in the second language, wherein the second language is currently selected for the client device.

8. A non-transitory computer-readable medium for printing to a Web services-enabled printing device, the non-transitory computer-readable medium carrying instructions which, when processed by one or more processors, causes:
a print driver executing on a client device and retrieving, from the Web service-enabled printing device, printing device capabilities data that specifies a plurality of features and options currently supported by the Web service-enabled printing device;

wherein the printing device capabilities data specifies, for a particular feature and a particular option of the plurality of features and options, a plurality of languages in which the particular feature and the particular option may be displayed;

the print driver generating, based at least upon the printing device capabilities data, printer description data that specifies display data that indicates how the particular feature and the particular option are to be displayed, on a graphical user interface, in the plurality of languages;

in response to user input, the print driver generating, based at least upon the display data contained in the printer description data and language data, graphical user interface data which, when processed at the client device, causes the particular feature and the particular option to be displayed on a graphical user interface in a particular language of the plurality of languages that is currently selected for the client device, wherein the language data specifies the particular language;

the print driver receiving, from an application program, application data generated by the application program;

the print driver generating, based at least upon the application data, print data and a print job ticket; and the print driver causing the print data and the print job ticket to be transmitted to the Web service-enabled printing device.

9. The non-transitory computer-readable medium of claim 8, wherein the language data is a localization setting of an operating system of the client device.

10. The non-transitory computer-readable medium of claim 8, wherein:

the display data specifies a string variable that corresponds to the particular feature, and generating the graphical user interface data includes retrieving a string that corresponds to the string variable.

11. The non-transitory computer-readable medium of claim 8, further comprising additional instructions which, when processed by the one or more processors, causes:

in response to a particular user logging in to a computer system, causing the language data to specify a second language that is different than the particular language; and in response to second user input, the print driver generating, based at least upon the display data contained in the printer description data and the language data, second graphical user interface data which, when processed at the client device, causes the particular feature and the particular option to be displayed on a second graphical user interface in the second language.

12. The non-transitory computer-readable medium of claim 8, wherein:

the graphical user interface data includes an option to display the particular feature and the particular option in another language that is different than the particular language and is of the plurality of languages;

further comprising additional instructions which, when processed by the one or more processors, causes, in response to second user input selecting a second language that is different than the particular language, the print driver generating, based at least upon the display data contained in the printer description data and the second language, second graphical user interface data which, when processed at the client device, causes the particular feature and the particular option to be displayed on a second graphical user interface in the second language.

13. The non-transitory computer-readable medium of claim 8, further comprising additional instructions which, when processed by the one or more processors, causes:

the print driver retrieving, from the Web service-enabled printing device, second printing device capabilities data that specifies the plurality of features and options of the Web service-enabled printing device;

wherein the second printing device capabilities data specifies, for the particular feature and the particular option of the plurality of features and options, a second plurality of languages in which the particular feature and the particular option may be displayed;

wherein the second plurality of languages includes a second language that is not included in the plurality of languages;

the print driver generating, based at least upon the printing device capabilities data, second printer description data that specifies second display data that indicates how the particular feature and the particular option are to be displayed, on a another graphical user interface, in the second plurality of languages;

in response to second user input, the print driver generating, based at least upon the second display data contained in the second printer description data and second language data that specifies the second language, second graphical user interface data which, when processed at the client device, causes the particular feature and the particular option to be displayed on a second graphical user interface in the second language.

14. The non-transitory computer-readable medium of claim 8, further comprising additional instructions which, when processed by the one or more processors, causes:

the print driver retrieving, from a second Web service-enabled printing device that is different than the Web service-enabled printing device, second printing device capabilities data that specifies a second plurality of features and options currently supported by the second Web service-enabled printing device;

wherein the second printing device capabilities data specifies, for a second particular feature and a second particular option of the second plurality of features and options, a second plurality of languages in which the second particular feature and the second particular option may be displayed;

wherein the second plurality of languages includes a second language that is not included in the plurality of languages;

the print driver generating, based at least upon the second printing device capabilities data, second printer description data that specifies second display data that indicates how the second particular feature and the second particular option are to be displayed, on another graphical user interface, in the second plurality of languages;

in response to second user input, the print driver generating, based at least upon the second display data contained in the second printer description data and second language data that specifies the second language, second graphical user interface data which, when processed at the client device, causes the particular feature and the particular option to be displayed on a second graphical user interface in the second language, wherein the second language is currently selected for the client device.

15. An apparatus for printing to a Web services-enabled printing device, the apparatus comprising a memory storing instructions which, when processed by one or more processors, causes:

a print driver executing on a client device and retrieving, from the Web service-enabled printing device, printing device capabilities data that specifies a plurality of features and options currently supported by the Web service-enabled printing device;

wherein the printing device capabilities data specifies, for a particular feature and a particular option of the plurality of features and options, a plurality of languages in which the particular feature and the particular option may be displayed;

the print driver generating, based at least upon the printing device capabilities data, printer description data that specifies display data that indicates how the particular feature and the particular option are to be displayed, on a graphical user interface, in the plurality of languages;

in response to user input, the print driver generating, based at least upon the display data contained in the printer description data and language data, graphical user interface data which, when processed at the client device, causes the particular feature and the particular option to be displayed on a graphical user interface in a particular language of the plurality of languages that is currently selected for the client device, wherein the language data specifies the particular language;

the print driver receiving, from an application program, application data generated by the application program;

the print driver generating, based at least upon the application data, print data and a print job ticket; and the print driver causing the print data and the print job ticket to be transmitted to the Web service-enabled printing device.

16. The apparatus of claim 15, wherein:
the display data specifies a string variable that corresponds to the particular feature, and
generating the graphical user interface data includes retrieving a string that corresponds to the string variable.

17. The apparatus of claim 15, wherein the memory stores additional instructions which, when processed by the one or more processors, causes:

in response to a particular user logging in to a computer system, causing the language data to specify a second language that is different than the particular language; and in response to second user input, the print driver generating, based at least upon the display data contained in the printer description data and the language data, second graphical user interface data which, when processed at the client device, causes the particular feature and the particular option to be displayed on a second graphical user interface in the second language.

18. The apparatus of claim 15, wherein:
the graphical user interface data includes an option to display the particular feature and the particular option in another language that is different than the particular language and is of the plurality of languages;
the memory stores additional instructions which, when processed by the one or more processors, causes in response to second user input selecting a second language that is different than the particular language, the print driver generating, based at least upon the display data contained in the printer description data and the second language, second graphical user interface data which, when processed at the client device, causes the particular feature and the particular option to be displayed on a second graphical user interface in the second language.

19. The apparatus of claim 15, wherein the memory stores additional instructions which, when processed by the one or more processors, causes:

the print driver retrieving, from the Web service-enabled printing device, second printing device capabilities data that specifies the plurality of features and options of the Web service-enabled printing device;

wherein the second printing device capabilities data specifies, for the particular feature and the particular option of the plurality of features and options, a second plurality of languages in which the particular feature and the particular option may be displayed;

wherein the second plurality of languages includes a second language that is not included in the plurality of languages;

the print driver generating, based at least upon the printing device capabilities data, second printer description data that specifies second display data that indicates how the particular feature and the particular option are to be displayed, on a another graphical user interface, in the second plurality of languages;

in response to second user input, the print driver generating, based at least upon the second display data contained in the second printer description data and second language data that specifies the second language, second graphical user interface data which, when processed at the client device, causes the particular feature and the particular option to be displayed on a second graphical user interface in the second language.

20. The apparatus of claim 15, wherein the memory stores additional instructions which, when processed by the one or more processors, causes:

the print driver retrieving, from a second Web service-enabled printing device that is different than the Web service-enabled printing device, second printing device capabilities data that specifies a second plurality of features and options currently supported by the second Web service-enabled printing device;

wherein the second printing device capabilities data specifies, for a second particular feature and a second particular option of the second plurality of features and options, a second plurality of languages in which the second particular feature and the second particular option may be displayed;

wherein the second plurality of languages includes a second language that is not included in the plurality of languages;

the print driver generating, based at least upon the second printing device capabilities data, second printer description data that specifies second display data that indicates how the second particular feature and the second particular option are to be displayed, on another graphical user interface, in the second plurality of languages;

in response to second user input, the print driver generating, based at least upon the second display data contained in the second printer description data and second language data that specifies the second language, second graphical user interface data which, when processed at the client device, causes the particular feature and the particular option to be displayed on a second graphical user interface in the second language, wherein the second language is currently selected for the client device.

* * * * *